US 11,882,486 B2

United States Patent
Kim et al.

(10) Patent No.: US 11,882,486 B2
(45) Date of Patent: Jan. 23, 2024

(54) METHOD AND APPARATUS FOR PERFORMING HANDOVER IN WIRELESS COMMUNICATION SYSTEM

(71) Applicant: Samsung Electronics Co., Ltd., Suwon-si (KR)

(72) Inventors: Donggun Kim, Suwon-si (KR); Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/828,787

(22) Filed: May 31, 2022

(65) Prior Publication Data
US 2022/0295354 A1    Sep. 15, 2022

Related U.S. Application Data

(63) Continuation of application No. 17/088,933, filed on Nov. 4, 2020, now Pat. No. 11,356,904.

(30) Foreign Application Priority Data

Nov. 6, 2019  (KR) .................... 10-2019-0141250
Nov. 6, 2019  (KR) .................... 10-2019-0141260
(Continued)

(51) Int. Cl.
*H04W 36/00*    (2009.01)
*H04W 76/27*    (2018.01)
(Continued)

(52) U.S. Cl.
CPC ... *H04W 36/0022* (2013.01); *H04W 28/0263* (2013.01); *H04W 28/0268* (2013.01);
(Continued)

(58) Field of Classification Search
CPC ............ H04W 36/0022; H04W 76/27; H04W 36/0069; H04W 28/0263; H04W 28/0268; H04W 80/02
(Continued)

(56) References Cited

U.S. PATENT DOCUMENTS 11,140,695 B1   10/2021   Eyuboglu
11,202,246 B2   12/2021   Ryu et al.
(Continued)

FOREIGN PATENT DOCUMENTS

| EP | 3 706 461 A1 | 9/2020 |
|---|---|---|
| WO | 2019/093835 A1 | 5/2019 |
| WO | 2019/135649 A1 | 7/2019 |

OTHER PUBLICATIONS

Indian Office Action dated Jun. 14, 2022, issued in Indian Application No. 202137031857.
(Continued)

*Primary Examiner* — Nghi H Ly
(74) *Attorney, Agent, or Firm* — Jefferson IP Law, LLP

(57) ABSTRACT

A method, performed by a terminal, in a wireless communication system is provided. The method includes receiving, from a source base station, a radio resource control (RRC) reconfiguration message including data radio bearer (DRB) configuration information, wherein the DRB configuration information includes an identifier of a DRB and an indicator for a dual active protocol stack (DAPS) handover, and in case that the DRB configuration information includes service data adaptation protocol (SDAP) configuration information, and completion of a random access to a target base station is indicated by a target medium access control (MAC) entity for the target base station, reconfiguring a SDAP entity based on the SDAP configuration information.

14 Claims, 25 Drawing Sheets

(30) Foreign Application Priority Data

May 20, 2020 (KR) ........................ 10-2020-0060629
Jul. 16, 2020 (KR) ........................ 10-2020-0088449

(51) Int. Cl.
*H04W 28/02* (2009.01)
*H04W 80/02* (2009.01)

(52) U.S. Cl.
CPC ....... *H04W 36/0069* (2018.08); *H04W 76/27* (2018.02); *H04W 80/02* (2013.01)

(58) Field of Classification Search
USPC ....... 370/331, 328, 329, 338, 341, 345, 350; 455/436, 442
See application file for complete search history.

(56) References Cited

U.S. PATENT DOCUMENTS

| | | | |
|---|---|---|---|
| 11,356,904 B2* | 6/2022 | Kim | ........................ H04W 4/50 |
| 2018/0234839 A1 | 8/2018 | Tenny et al. | |
| 2019/0254114 A1 | 8/2019 | Son | |
| 2021/0105674 A1* | 4/2021 | Kim | .................. H04W 74/0833 |

OTHER PUBLICATIONS

5G; NR; Radio Resource Control (RRC); Protocol specification (3GPP TS 38.331 version 15.7.0 Release 15), ETSI TS 138 331 V15.7.0, Sep. 27, 2019.

Nokia et al., Analysis of DAPS Operation, 3GPP TSG-RAN WG2 Meeting #107, R2-1909036, Aug. 15, 2019, Prague, Czech Republic.

Mediatek Inc., Bearer handling for RUDI during HO with DAPS, 3GPP TSG-RAN WG2 #107bis, R2-1912968, Oct. 4, 2019, Chongqing, China.

ZTE Corporation et al., Discussion on PDCP aspects for RUDI, 3GPP TSG RAN WG2 Meeting #107, R2-1910758, Aug. 16, 2019, Prague, Czech Republic.

Intel Corporation, SDAP and PDCP handling for DAPS HO, 3GPP TSG RAN WG2 Meeting #108, R2-1914838, Nov. 8, 2019, Reno, USA.

International Search Report dated Feb. 16, 2021, issued in International Application No. PCT/KR2020/015324.

Intel Corporation, Stage 2 TP for DAPS based RUDI, 3GPP TSG-RAN WG2 Meeting #107bis, R2-1912778, Oct. 4, 2019, Chongqing, China.

Qualcomm Wireless Gmbh et al., Correction to SDAP Test Cases, 3GPP TSG-RAN5 Meeting #82, R5-192297, Mar. 13, 2019, Athens, Greece.

European Search Report dated Dec. 22, 2021, issued in European Application No. 20885381.2.

* cited by examiner

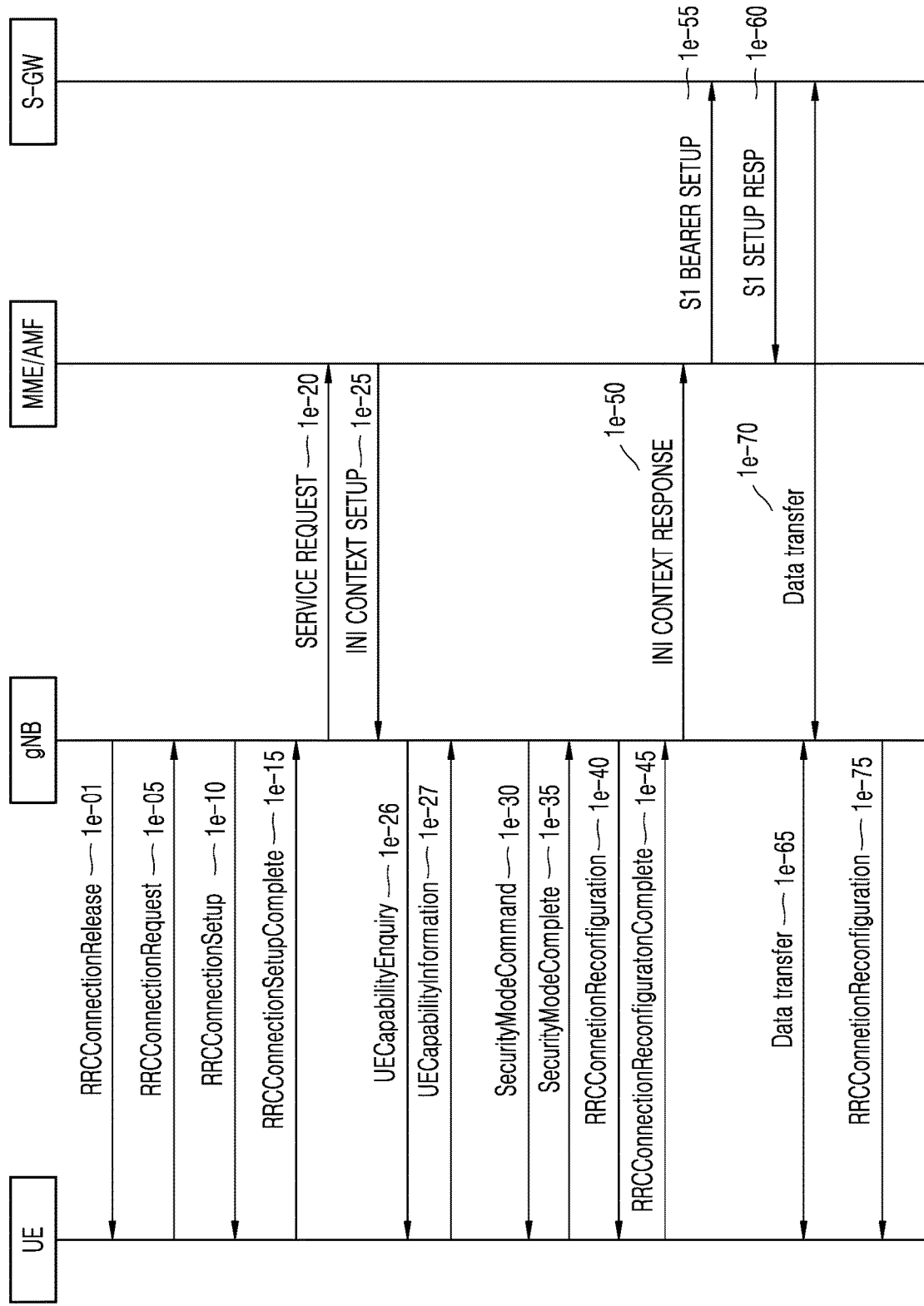

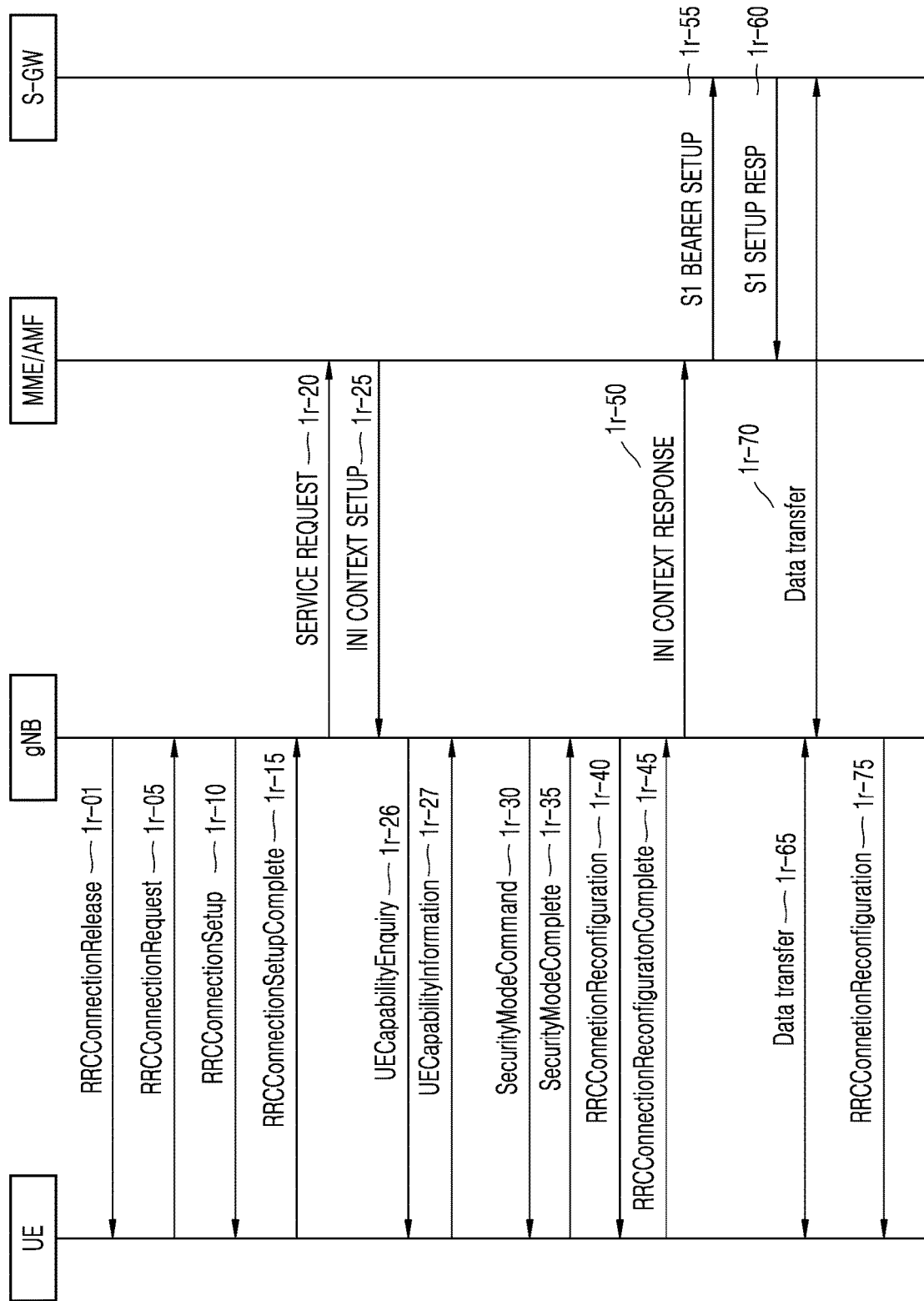

METHOD AND APPARATUS FOR PERFORMING HANDOVER IN WIRELESS COMMUNICATION SYSTEM

CROSS-REFERENCE TO RELATED APPLICATION(S)

This application is a continuation application of prior application Ser. No. 17/088,933, filed on Nov. 4, 2020, which has issued as U.S. Pat. No. 11,356,904 on Jun. 7, 2022 and is based on and claims priority under 35 U.S.C. § 119(a) of a Korean patent application number 10-2019-0141250, filed on Nov. 6, 2019, Korean patent application number 10-2019-0141260, filed on Nov. 6, 2019, Korean application number 10-2020-0060629, filed on May 20, 2020, and Korean patent application number 10-2020-0088449, filed on Jul. 16, 2020, in the Korean Intellectual Property Office, the disclosure of each of which is incorporated by reference herein in its entirety.

BACKGROUND

1. Field

The disclosure relates to a method and an apparatus for performing handover in a wireless communication system. More specifically, the disclosure relates to a method for effectively providing a service in a mobile communication system.

2. Description of Related Art

In order to meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies, such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies, such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements, such as objects exchange information with each other to process the information. Internet of everything (IoE) technology has emerged, in which the IoT technology is combined with, for example, technology for processing big data through connection with a cloud server. In order to implement the IoT, various technological elements, such as detection technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields, such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

Because various services can be provided due to the aforementioned development of wireless communication systems, methods for effectively providing these services are required.

Therefore, a need exists for an apparatus and a method for effectively providing a service in a mobile communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively providing a service in a mobile communication system.

Additional aspects will be set forth in part in the description which follows and, in part, will be apparent from the description, or may be learned by practice of the presented embodiments of the disclosure.

In accordance with an aspect of the disclosure, a method, performed by a terminal, in a wireless communication system is provided. The method includes receiving, from a source base station, a radio resource control (RRC) reconfiguration message including data radio bearer (DRB) configuration information, wherein the DRB configuration information includes an identifier of a DRB and an indicator for a dual active protocol stack (DAPS) handover, and in case that the DRB configuration information includes service data adaptation protocol (SDAP) configuration information, and completion of a random access to a target base station is indicated by a target medium access control (MAC) entity for the target base station, reconfiguring a SDAP entity based on the SDAP configuration information.

In accordance with another aspect of the disclosure, a terminal in a wireless communication system is provided. The terminal in a wireless communication system includes a transceiver, and at least one processor configured to: receive, via the transceiver, from a source base station, a radio resource control (RRC) reconfiguration message including data radio bearer (DRB) configuration information, wherein the DRB configuration information includes an identifier of a DRB and an indicator for a dual active protocol stack (DAPS) handover, and in case that the DRB configuration information includes service data adaptation protocol (SDAP) configuration information, and completion of a random access to a target base station is indicated by a target medium access control (MAC) entity for the target base station, reconfigure a SDAP entity based on the SDAP configuration information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1E is a diagram illustrating procedures in which a user equipment (UE) switches a radio resource control (RRC) idle mode to an RRC connected mode and establishes connection with a network according to an embodiment of the disclosure;

FIG. 1O is a diagram illustrating a radio protocol architecture of an LTE system according to an embodiment of the disclosure;

FIG. 1R is a diagram illustrating procedures in which a UE switches an RRC idle mode to an RRC connected mode and establishes connection with a network according to an embodiment of the disclosure;

Throughout the drawings, like reference numerals will be understood to refer to like parts, components, and structures.

DETAILED DESCRIPTION

Figure 1A:
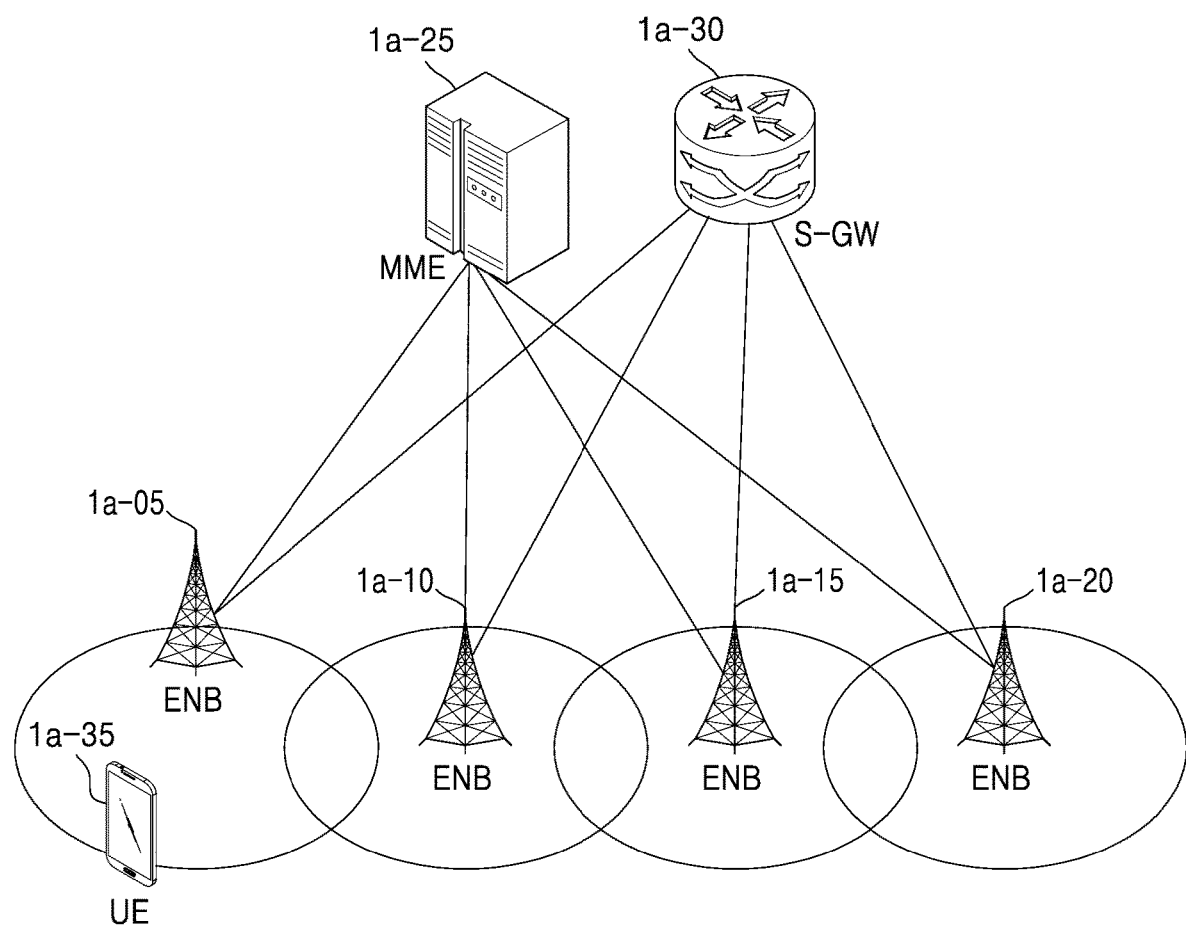
FIG. 1A is a diagram illustrating a configuration of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and methods of achieving them will become apparent with reference to embodiments of the disclosure described below with reference to the accompanying drawings. The disclosure may, however, be embodied in many different forms and should not be construed as limited to embodiments set forth herein, rather these embodiments are provided so that this disclosure will be thorough and complete, and will fully convey the scope of the disclosure only defined by the claims to one of ordinary skill in the art. In the specification, the same elements are denoted by the same reference numerals.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~ unit", as used in the embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. In addition, a "unit" may include one or more processors in embodiments of the disclosure.

In the following descriptions of the disclosure, well-known functions or configurations are not described because they would obscure the disclosure with unnecessary details. Hereinafter, embodiments of the disclosure will be described with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of description, the disclosure uses terms and names defined in the $3^{rd}$ generation partnership project (3GPP) long term evolution (LTE) standards. However, the disclosure is not limited to these terms and names, and may be equally applied to communication systems conforming to other standards. In particular, the disclosure may be applied to 3GPP new radio (NR) (the $5^{th}$ generation (5G) mobile communication standard). In the disclosure, an evolved node B (eNB) may be interchangeably used with a next-generation node B (gNB) for convenience of descriptions. For example, a BS described as an eNB may represent a gNB. In the disclosure, the term "terminals" may refer to not only mobile phones, narrowband Internet of Things (NB-IoT) devices, and sensors but also other wireless communication devices.

Hereinafter, a base station is an entity that allocates resources to a terminal, and may be at least one of a gNode B, an eNode B, a Node B, a base station (BS), a radio access unit, a BS controller, or a node on a network. In the disclosure, a terminal may include a user terminal (UE), a mobile station (MS), a cellular phone, a smartphone, a computer, or a multimedia system capable of performing a communication function. However, the disclosure is not limited to the aforementioned examples.

In the disclosure, provided are non-interruption handover methods capable of minimizing a data interruption time due to handover or making the data interruption time become 0 ms in a next-generation mobile communication system.

More specifically, efficient handover methods provided in the disclosure may have one or more features from among a plurality of features described below.

In addition, with respect to efficient handover methods proposed in the disclosure, different handover methods may be applied to different bearers.

When a UE receives a handover command message (e.g., a handover command message or a radio resource control (RRC) reconfiguration message) from a source BS, the UE performing data transmission or reception (uplink (UL)) or downlink (DL) data transmission and reception) to or from the source BS by using each of protocol layers (i.e., a Physical (PHY) layer, a medium access control (MAC) layer, a radio link control (RLC) layer, and a packet data convergence protocol (PDCP) layer) for a plurality of first bearers, the UE may configure protocol layers for a plurality of new second bearers (e.g., having a same bearer identifier) corresponding to the protocol layers for the plurality of first bearers, and may perform data transmission or reception (UL or DL data transmission and reception) without discontinuing but maintaining data transmission or reception (UL or DL data transmission and reception) to or from the source BS via the plurality of first bearers.

The protocol layers (a PHY layer, a MAC layer, a RLC layer, and a PDCP layer) for the plurality of second bearers which are newly configured after the UE receives the handover command message are configured for data transmission and reception to and from a target BS, based on bearer configuration information or a plurality of pieces of protocol layer information included in the handover command message.

In the aforementioned situation, the UE may be configured to perform data transmission or reception (UL or DL data transmission and reception) to or from the source BS by using the protocol layers for the plurality of first bearers and to perform a random access procedure on the target BS by using a protocol layer (e.g., the MAC layer) for the plurality of second bearers. In the aforementioned situation, the random access procedure may include transmission of a preamble, reception of a random access response, transmission of a message 3, reception of a message 4 (e.g., reception of contention resolution MAC control element (CE) or a UL transport resource), or the like.

In the aforementioned situation, the UE may be configured to perform data transmission or reception to or from the source BS by using the protocol layers for the plurality of first bearers and to complete the random access procedure with respect to the target BS by using the protocol layer (e.g., the MAC layer) for the plurality of second bearers and transmit a handover complete message to the target BS by using the protocol layers for the plurality of second bearers.

In the aforementioned situation, the UE may be configured to perform data transmission or reception to or from the source BS by using the protocol layers for the plurality of first bearers and to complete the random access procedure on the target BS by using the protocol layer (e.g., the MAC layer) for the plurality of second bearers, transmit the handover complete message to the target BS by using the protocol layers for the plurality of second bearers, and perform data transmission and reception (UL or DL).

In the aforementioned situation, the UE may be configured in such a manner that, when the UE successfully completes the random access procedure with respect to the target BS and then initially receives a UL transport resource from the target BS, the UE discontinues data transmission to the source BS by using the protocol layers for the plurality of first bearers, switches UL transmission, and then transmits data to the target BS by using the plurality of second bearers.

In the aforementioned situation, the UE may be configured in such a manner that, when the UE receives the handover command message, the UE continuously performs data transmission or reception (UL or DL data transmission and reception) to or from the source BS, and performs the random access procedure on the target BS by using the protocol layers for the plurality of second bearers, and when the UE successfully completes the random access procedure and then initially receives the UL transport resource from the target BS, the UE discontinues data transmission to the source BS by using the protocol layers for the plurality of first bearers, and performs UL data transmission to the target BS only by using the protocol layers for the plurality of second bearers. In addition, the UE may be configured to continuously receive DL data from the source BS by using the protocol layers for the plurality of first bearers, and to continuously receive DL data from the target BS by using the protocol layers for the plurality of second bearers.

In the aforementioned situation, a first bearer and a second bearer may be configured for a second PDCP layer architecture, and in the second PDCP layer architecture, the first bearer (e.g., a RLC layer, a MAC layer, or a PHY layer) for the source BS and the second bearer (e.g., a RLC layer, a MAC layer, or a PHY layer) for the target BS are all connected to one PDCP layer, and UL data may be transmitted via one bearer from among the first bearer or the second bearer by using the PDCP layer. For example, before the UE performs a random access procedure on the target BS, successfully completes the random access procedure, and initially receives a UL transport resource from the target BS, the UE transmits the UL data via the first bearer, and when the UE performs the random access procedure on the target BS, successfully completes the random access procedure, and initially receives the UL transport resource from the target BS, the UE may discontinue data transmission via the first bearer, may switch the data transmission, and then may transmit the UL data to the target BS via the second bearer. In this regard, the UE with the second PDCP layer architecture may be configured to receive DL data from the source BS or the target BS via the first bearer or the second bearer.

Hereinafter, the disclosure provides efficient handover procedures without a data interruption time, based on the aforementioned features.

When a UE performs an efficient handover method without a data interruption time proposed in the disclosure, in a case where the UE fails in handover, the UE may reconfigure a link to a source BS by rapidly falling back to the source BS by using features of the efficient handover method proposed in the disclosure. The features of the efficient handover method proposed in the disclosure may particularly mean that the UE maintains a link to the source BS even when the UE performs a handover procedure. In addition, the disclosure proposes a particular method by which, even when the UE fails in a handover procedure, the UE falls back to the source BS by using previous a radio link to the source BS.

The disclosure provides a method and an apparatus for applying configuration information to each of bearers in a dual active protocol stack (DAPS) handover method of a next generation mobile communication system.

The disclosure relates to a method and an apparatus for performing fallback in response to failure of handover when an efficient handover method without a data interruption time is performed during the handover in the next generation mobile communication system.

According to an embodiment of the disclosure, the next generation mobile communication system may require an efficient handover method to support a service without data interruption along with low transmission latency. When handover fails, a method for performing fallback with a minimum data interruption time may be required.

The disclosure may propose various efficient handover methods by which a data interruption time due to handover does not occur during the handover in the next generation mobile communication system. By doing so, a service without data interruption may be supported. In addition, efficient methods by which a UE can rapidly fall back to a source BS when the UE fails in handover will be described.

FIG. 1A is a diagram illustrating a configuration of an LTE system according to an embodiment of the disclosure.

Referring to FIG. 1A, a radio access network (RAN) of the LTE system includes a plurality of evolved nodes B (eNBs) (or nodes B or base stations) 1a-05, 1a-10, 1a-15, and 1a-20, a mobility management entity (MME) 1a-25, and a serving-gateway (S-GW) 1a-30. A UE (or a terminal) 1a-35 may access an external network via the eNB 1a-05, 1a-10, 1a-15, or 1a-20 and the S-GW 1a-30.

Referring to FIG. 1A, the eNB 1a-05, 1a-10, 1a-15, or 1a-20 may correspond to an existing node B of a universal mobile telecommunications system (UMTS). The eNB 1a-05, 1a-10, 1a-15, or 1a-20 may be connected to the UE 1a-35 through wireless channels and may perform complex functions compared to the existing node B. All user traffic data including real-time services, such as voice over Internet protocol (VoIP) may be serviced through shared channels in the LTE system, and thus an entity for collating status information, e.g., buffer status information, available transmission power status information, and channel state information, of UEs and performing scheduling may be required and the eNB 1a-05, 1a-10, 1a-15, or 1a-20 may operate as such an entity. One eNB generally controls a plurality of cells. For example, the LTE system may use radio access technology, such as orthogonal frequency division multiplexing (OFDM) at a bandwidth of 20 MHz to achieve a data rate of 100 Mbps. Adaptive modulation & coding (AMC) may be used to determine a modulation scheme and a channel coding rate in accordance with a channel state of a UE. The S-GW 1a-30 is an entity for providing data bearers and may establish and release the data bearers by the control of the MME 1a-25. The MME 1a-25 is an entity for performing a mobility management function and various control functions on the UE 1a-35 and is connected to the plurality of eNBs 1a-05, 1a-10, 1a-15, and 1a-20.

Figure 1B:
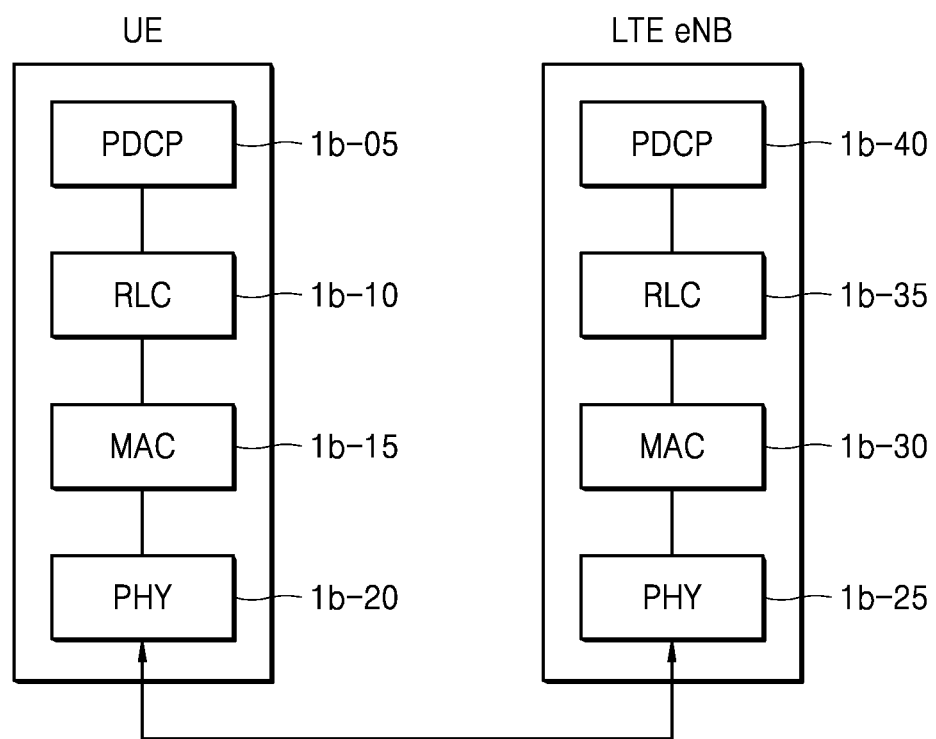
FIG. 1B is a diagram illustrating a radio protocol architecture of an LTE system according to an embodiment of the disclosure.

FIG. 1B is a diagram illustrating a radio protocol architecture of an LTE system according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and medium access control (MAC) layers 1b-15 and 1b-30 respectively for a UE and an eNB. The PDCP layer 1b-05 or 1b-40 may perform, for example, IP header compression/decompression. Main functions of the PDCP layer 1b-05 or 1b-40 are summarized as shown below.

Header compression and decompression: robust header compression (ROHC) only
    Transfer of user data
    In-sequence delivery of upper layer packet data units (PDUs) at PDCP re-establishment procedure for RLC acknowledged mode (AM)
    For split bearers in DC (only support for RLC AM): PDCP PDU routing for transmission and PDCP PDU reordering for reception
    Duplicate detection of lower layer service data units (SDUs) at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in uplink The RLC layer 1b-10 or 1b-35 may perform an automatic repeat request (ARQ) operation by reconfiguring packet data convergence protocol packet data units (PDCP PDUs) to appropriate sizes. Main functions of the RLC layer 1b-10 or 1b-35 may be summarized as shown below.

Transfer of upper layer PDUs
    Error correction through ARQ (only for AM data transfer)
    Concatenation, segmentation and reassembly of RLC SDUs (only for unacknowledged mode (UM) and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MAC layer 1b-15 or 1b-30 may be connected to a plurality of RLC layers configured for one UE and may multiplex RLC PDUs into a MAC PDU and may demultiplex the RLC PDUs from the MAC PDU. Main functions of the MAC layer 1b-15 or 1b-30 may be summarized as shown below.

Mapping between logical channels and transport channels
    Multiplexing/demultiplexing of MAC SDUs belonging to one or different logical channels into/from transport blocks (TBs) delivered to/from the physical layer on transport channels
    Scheduling information reporting
    Error correction through hybrid ARQ (HARQ)
    Priority handling between logical channels of one UE
    Priority handling between UEs by means of dynamic scheduling
    Multimedia broadcast/multicast service (MBMS) service identification
    Transport format selection
    Padding A physical (PHY) layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 1C:
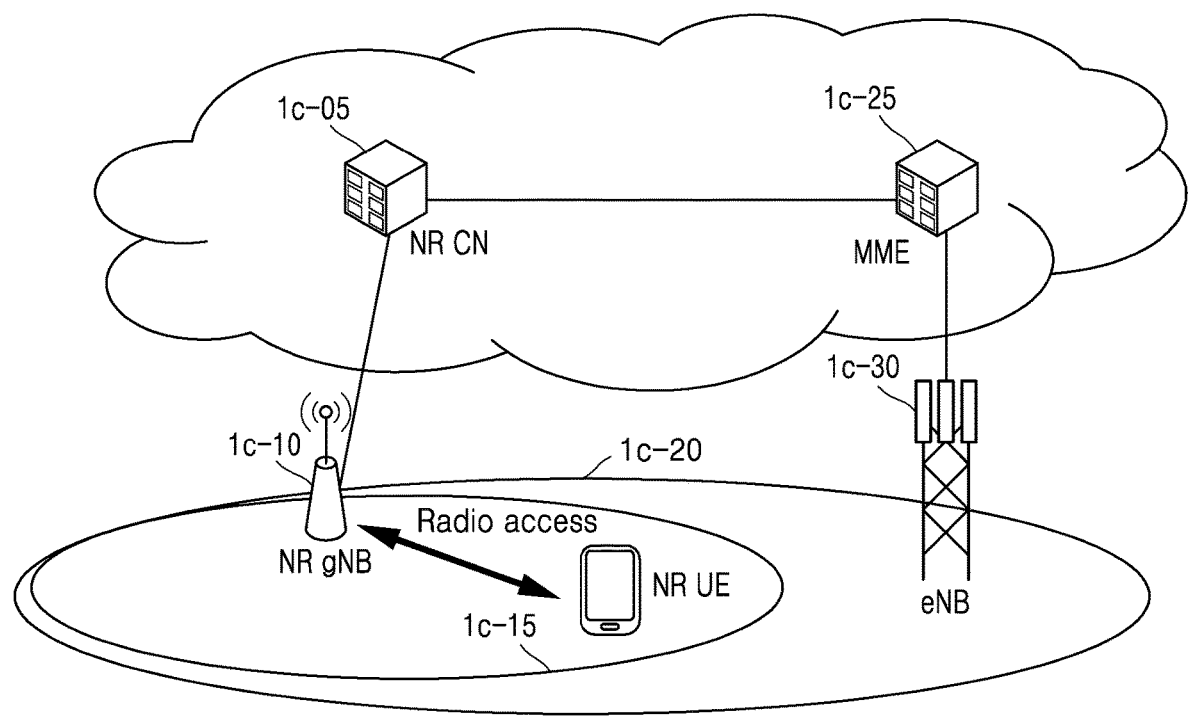
FIG. 1C is a diagram illustrating a next-generation mobile communication system according to an embodiment of the disclosure.

FIG. 1C is a diagram illustrating a next-generation mobile communication system according to an embodiment of the disclosure.

Referring to FIG. 1C, as illustrated, a radio access network of the next-generation mobile communication system (hereinafter, referred to as the NR or 5G communication system) includes a new radio node B (NR gNB, NR NB, or gNB) 1c-10 and a new radio core network (NR CN) 1c-05. A NR UE (or terminal) 1c-15, located in region 1c-20, accesses an external network via the NR gNB 1c-10 and the NR CN 1c-05.

Referring to FIG. 1C, the NR gNB 1c-10 corresponds to an eNB of a legacy LTE system. The NR gNB 1c-10 may be connected to the NR UE 1c-15 through wireless channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. One NR gNB generally controls a plurality of cells. The NR or 5G communication system may have a bandwidth greater than the maximum bandwidth of the existing LTE system so as to achieve an ultrahigh data rate, compared to the existing LTE system, and may use OFDM as a radio access technology and may additionally use a beamforming technology. In addition, the NR gNB 1c-10 uses AMC to determine a modulation scheme and a channel coding rate in accordance with a channel state of the NR UE 1c-15. The NR CN 1c-05 performs functions, such as mobility support, bearer configuration, and quality of service (QoS) configuration. The NR CN 1c-05 is an entity for performing a mobility management function and various control functions on the NR UE 1c-15 and is connected to a plurality of base stations. The NR or 5G mobile communication system may cooperate with the existing LTE system, and the NR CN 1c-05 may be connected to an MME 1c-25 through a network interface. The MME 1c-25 is connected to an eNB 1c-30 that is a legacy base station.

Figure 1D:
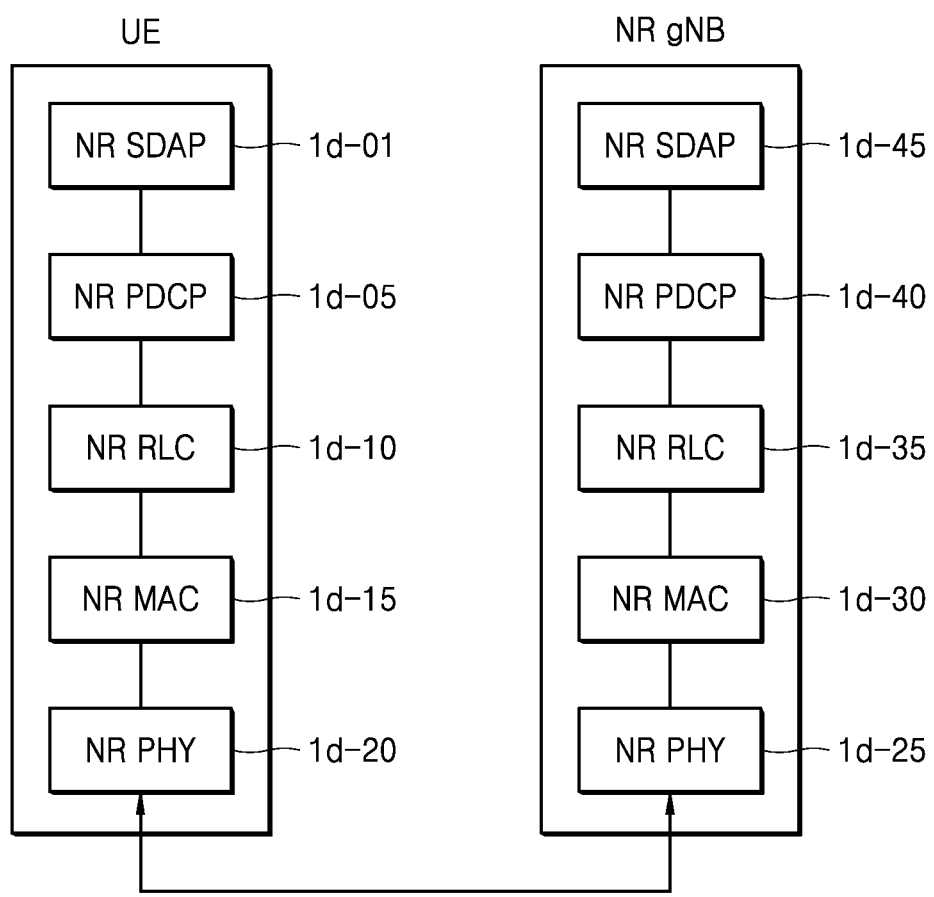
FIG. 1D is a diagram illustrating a radio protocol architecture of a new radio (NR) or 5th generation (5G) mobile communication system according to an embodiment of the disclosure.

FIG. 1D is a diagram illustrating a radio protocol architecture of a NR or 5G mobile communication system according to an embodiment of the disclosure.

Referring to FIG. 1D, the radio protocol architecture of the NR or 5G mobile communication system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

Main functions of the NR SDAP layer 1d-01 or 1d-45 may include some of the following functions.
  Transfer of user plane data
  Mapping between a QoS flow and a data radio bearer (DRB) for both DL and UL
  Marking QoS flow identifier (ID) in both DL and UL packets
  Reflective QoS flow to DRB mapping for the UL SDAP PDUs With regard to a SDAP layer, the UE may be configured, through an RRC message, whether to use a header of the SDAP layer or to use functions of the SDAP layer per PDCP layer, per bearer, or per logical channel. When the SDAP header is configured, a 1-bit non access stratum (NAS) reflective QoS indicator and a 1-bit access stratum (AS) reflective QoS indicator of the SDAP header may indicate the UE to update or reconfigure UL and DL QoS flow and data bearer mapping information. The SDAP header may include QoS flow ID information indicating QoS. The QoS information may be used as data processing priority information or scheduling information for appropriately supporting a service.

Main functions of the NR PDCP layer 1d-05 or 1d-40 may include some of the following functions.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink The reordering function of the NR PDCP layer 1d-05 or 1d-40 may indicate a function of reordering PDCP PDUs received from a lower layer, on a PDCP sequence number (SN) basis. The reordering function may include a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

Main functions of the NR RLC layer 1d-10 or 1d-35 may include some of the following functions.
  Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery function of the NR RLC layer 1d-10 or 1d-35 may indicate a function of delivering RLC SDUs received from a lower layer, to an upper layer in order. The in-sequence delivery function may include a function of reassembling the RLC SDUs and delivering the reassembled RLC SDU when a plurality of RLC SDUs segmented from one RLC SDU are received, a function of reordering received RLC PDUs on a RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received up to a current time, to an upper layer in order when a certain timer expires, even when a missing RLC SDU exists. The NR RLC layer 1d-10 or 1d-35 may process the RLC PDUs in order of reception and deliver the RLC PDUs to the NR PDCP layer 1d-05 or 1d-40 regardless of SNs (out-of-sequence delivery), and when a segment is received, the NR RLC layer 1d-10 or 1d-35 may reassemble the segment with other segments stored in a buffer or subsequently received, into a whole RLC PDU and may deliver the RLC PDU to the NR PDCP layer 1d-05 or 1d-40. The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

The out-of-sequence delivery function of the NR RLC layer 1d-10 or 1d-35 may include a function of directly delivering RLC SDUs received from a lower layer, to an upper layer out of order, a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

The NR MAC layer 1d-15 or 1d-30 may be connected to a plurality of NR RLC layers configured for one UE, and main functions of the NR MAC layer 1d-15 or 1d-30 may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1d-20 or 1d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

FIG. 1E is a diagram illustrating procedures in which a UE switches an RRC idle mode to an RRC connected mode and establishes connection with a network according to an embodiment of the disclosure.

Referring to FIG. 1E, when the UE configured to transmit and receive data in an RRC connected mode does not transmit or receive data due to a predefined reason or for a predefined time, a gNB may transmit an RRCConnection-Release message to the UE so as to allow the UE to transit to an RRC idle mode in operation 1e-01. Afterward, when the UE that is not currently configured for a link (hereinafter, also referred to as the idle-mode UE) has data to be transmitted, the UE may perform an RRC connection establishment procedure on the gNB. The UE establishes inverse direction transmission synchronization with the gNB through a random access procedure, and transmits an RRC-ConnectionRequest message to the gNB in operation 1e-05. The RRCConnectionRequest message may include an identifier of the UE, an establishment cause or the like. The gNB transmits an RRCConnectionSetup message to allow the UE to establish RRC connection in operation 1e-10.

The RRCConnectionSetup message includes configuration information for each service/bearer/RLC layer or each logical channel or each bearer, and PDCP layer configuration information (pdcp-config) may include information about whether to use ROHC for each bearer/logical channel, ROHC configuration information (e.g., a ROHC version, initial information, and the like), statusReportRequired information (information with which a BS indicates a PDCP Status report to a UE), and drb-ContinueROHC information (configuration information indicating to continue and changelessly use ROHC configuration information) and may be transmitted. In addition, the RRCConnectionSetup may include RRC connection configuration information. A bearer for RRC connection is called a signaling radio bearer (SRB) and is used in transmission and reception of an RRC message that is a control message between the UE and the gNB.

The UE that established the RRC connection transmits an RRCConnectionSetupComplete message to the gNB in operation 1e-15. The RRCConnectionSetupComplete message may include a control message, such as a SERVICE REQUEST message for requesting, by the UE, an MME or an access and mobility management function (AMF) to configure a bearer for a certain service. The gNB transmits the SERVICE REQUEST message included in the RRCCo-nnectionSetupComplete message to the MME or the AMF in operation 1e-20, and the MME or the AMF may determine whether to provide the service requested by the UE. As a result of the determination, when the service requested by the UE is to be provided, the MME or the AMF transmits an INITIAL CONTEXT SETUP REQUEST message to the gNB in operation 1e-25. The INITIAL CONTEXT SETUP REQUEST message may include QoS information to be applied in configuring a DRB, security information (e.g., a security key, a security algorithm, or the like) to be applied to the DRB, or the like.

When the gNB does not receive UE capability information from the MME or the AMF, the gNB may transmit a UE capability information request message to the UE so as to determine the UE capability information in operation 1e-26. When the UE receives the UE capability information request message, the UE may configure, generate, and report a UE capability information message to the gNB in operation 1e-27. The UE capability information may include information about which types of handover methods are supported by the UE. For example, the UE may report information about a UE capability to the gNB via an indicator, the information indicating whether or not the UE supports an efficient handover method (i.e., a DAPS handover method) proposed in the disclosure. When the gNB determines the UE capability information, the gNB may indicate handover to the UE by defining an indicator indicating which handover type is indicated in a handover command message, according to each of handover methods For example, the gNB may indicate the efficient handover method (the DAPS handover method) proposed in the disclosure to the UE, or may configure the DAPS handover method to the UE according to each bearer (DRB or SRB). When the gNB configures the DAPS handover method to the UE, the gNB also indicates other handover methods (e.g., a conditional handover method (configurations of a plurality of target cells and a plurality of conditions are configured to the UE, and when the UE satisfies the conditions in a cell selection procedure or a cell reselection procedure, the UE performs a handover procedure on one target cell) or a handover method without a random access procedure), thereby preventing data loss or a transmission delay which may occur in handover. The UE may perform a handover procedure on a target gNB according to the handover method indicated in the handover command message.

To configure security with the UE, the gNB exchanges a SecurityModeCommand message in operation 1e-30 and a SecurityModeComplete message in operation 1e-35. When security configuration is complete, the gNB transmits an RRCConnectionReconfiguration message to the UE in operation 1e-40.

The RRCConnectionReconfiguration message includes configuration information for each service/bearer/RLC layer or each logical channel or each bearer, and PDCP layer configuration information (pdcp-config) may include information about whether to use ROHC for each bearer/logical channel, ROHC configuration information (e.g., a ROHC version, initial information, and the like), statusReportRequired information (information with which a BS indicates a PDCP Status report to a UE), and drb-ContinueROHC information (configuration information indicating to continue and changelessly use ROHC configuration information) and may be transmitted. In addition, the RRCConnectionReconfiguration may include RRC connection configuration information. A bearer for RRC connection is called an SRB and is used in transmission and reception of an RRC message that is a control message between the UE and the gNB.

The RRCConnectionReconfiguration message includes configuration information of a DRB in which user data is to be processed, and the UE configures the DRB by using the configuration information of the DRB and transmits an RRCConnectionReconfigurationComplete message to the gNB in operation 1e-45. When configuration of the DRB with respect to the UE is complete, the gNB transmits an INITIAL CONTEXT SETUP COMPLETE message to the MME or the AMF in operation 1e-50, and upon reception, the MME or the AMF may exchange an S1 BEARER SETUP message and an S1 BEARER SETUP RESPONSE message with an S-GW to configure an S1 bearer in operations 1e-55 and 1e-60. The S1 bearer refers to a link for data transmission, which is configured between the S-GW and the eNB, and corresponds to the DRB in a one-to-one manner After the above procedures are completed, the UE may transmit or receive data to or from the gNB through the S-GW in operations 1e-65 and 1e-70. As such, general data transmission processes are largely include three operations of RRC connection establishment, security setting, and DRB configuration. In addition, the gNB may transmit, to the UE, an RRCConnectionReconfiguration message to renew, add, or change the configuration for a certain reason in operation 1e-75.

In the disclosure, a bearer may include an SRB and a DRB where the SRB stands for a signaling radio bearer and the DRB stands for a data radio bearer. The SRB is mainly used to transmit and receive an RRC message of an RRC layer, and the DRB is mainly used to transmit and receive a plurality of items of user plane data. An UM DRB indicates a DRB configured to use an RLC layer operating in an unacknowledged mode (UM), and an acknowledged mode (AM) DRB indicates a DRB configured to use an RLC layer operating in an AM.

In the disclosure, a bearer configured with the DAPS handover method may refer to or indicate a bearer whose identifier is included in a list of bearers configured with the DAPS handover method, a bearer whose identifier is not included in a list of bearers not configured with the DAPS handover method, a bearer whose bearer configuration information includes a DAPS handover method configuration indicator, or at least one bearer from among bearers with a DAPS handover method configuration indicator configured in PDCP layer configuration information.

In the disclosure, a bearer not configured with the DAPS handover method may refer to or indicate a bearer whose identifier is not included in a list of bearers configured with the DAPS handover method, a bearer whose identifier is included in a list of bearers not configured with the DAPS handover method, a bearer whose bearer configuration information does not include a DAPS handover method configuration indicator, or at least one bearer from among bearers with a DAPS handover method configuration indicator not configured in PDCP layer configuration information.

In the disclosure, the source BS may be interpreted as a source cell (PCell, SpCell, or SCell) or a source cell group (cell group or master cell group), and the target BS may be interpreted as a target cell (PCell, SpCell, or SCell) or a target cell group (cell group or master cell group).

Figure 1F:
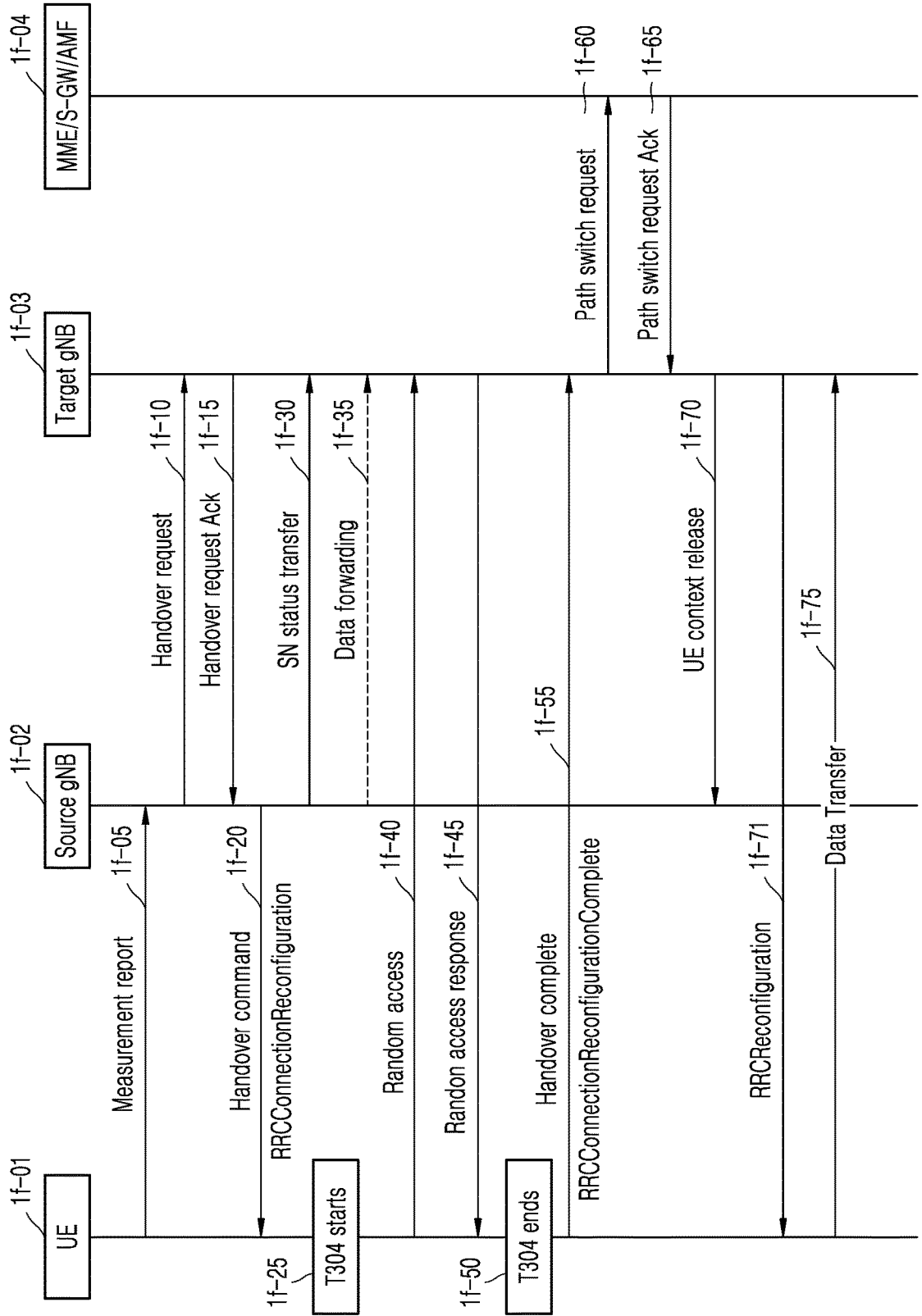
FIG. 1F is a diagram illustrating signaling procedures in which a handover is performed in a next-generation mobile communication system according to an embodiment of the disclosure.

FIG. 1F is a diagram illustrating signaling procedures in which a handover is performed in a next-generation mobile communication system according to the embodiment of the disclosure.

Referring to FIG. 1F, a UE 1f-01 in an RRC connected mode status reports a cell measurement report to a current source gNB 1f-02 in a periodic manner or when a particular event is satisfied in operation 1f-05.

According to the disclosure, the source gNB may be referred to a source base station, and the target gNB may be referred to a target base station. The source gNB 1f-02 determines, based on the cell measurement report, whether the UE 1f-01 is to perform handover to an adjacent cell. The handover refers to a technology of switching a source BS to another BS (or another cell in a same BS), the source gNB 1f-02 providing a service to the UE 1f-01 in a connected mode state. When the source gNB 1f-02 determines handover, the source gNB 1f-02 requests the handover by transmitting a handover request message (e.g., a handover preparation information message) to a target gNB 1f-03 that is a new BS to provide a service to the UE 1f-01 in operation 1f-10. When the target gNB 1f-03 accepts the handover request, the target gNB 1f-03 transmits a handover request acknowledgement (Ack) message (e.g., a handover command message) to the source gNB 1f-02 in operation 1f-15. Upon receiving the message, the source gNB 1f-02 transmits, to the UE 1f-01, the handover command message (an RRCReconfiguration message included in a dedicated control channel (DCCH) of the handover request Ack message) in operation 1f-20. The source gNB 1f-02 extracts the handover command message from a message received from the target gNB 1f-03 and transmits the handover command message to the UE 1f-01 by using an RRC Connection Reconfiguration message in operation 1f-20.

In the disclosure, provided is a method of determining an efficient DAPS handover method by using two messages (i.e., a handover preparation information message in operation 1f-10 and a handover command message in operation 1f-15) when the source gNB 1f-02 transmits the handover preparation information message in operation 1f-10, and in response thereto, the target gNB 1f-03 transmits the handover command message in operation 1f-15 to the source gNB 1f-02.

Embodiment 1 of determining the efficient DAPS handover method, which is provided in the disclosure, will now be described.

In Embodiment 1 of the disclosure, an entity for determining the DAPS handover method may be the source gNB 1f-02. In addition, in Embodiment 1 of the disclosure, in a case where the source gNB 1f-02 requests the target gNB 1f-03 for the DAPS handover method, the target gNB 1f-03 may always indicate or perform the DAPS handover method.

The source gNB 1f-02 may indicate, to the target gNB 1f-03 and by defining a new indicator in the handover preparation information message, that the source gNB 1f-02 is to perform the DAPS handover method proposed in the disclosure, and may request the DAPS handover method. The handover preparation information message may include current bearer configuration information of the UE 1f-01, security key information, cell group configuration information, capability information of the UE 1f-01, or the like. The source gNB 1f-02 is configured to pre-share a capability of the target gNB 1f-03 and thus may know in advance whether the target BS supports the DAPS handover method. The source gNB 1f-02 may indicate, to the target gNB 1f-03, that the source gNB 1f-02 is to perform the DAPS handover method, may indicate, to the target BS, that the source gNB 1f-02 may perform early data forwarding fast or in advance, and may indicate the target gNB 1f-03 to prepare to receive data forwarding and perform processing. The source gNB 1f-02 may request the DAPS handover method with respect to each bearer (DRB or SRB).

In a case where the target BS 1f-03 receives the handover preparation information message and identifies that an indicator requesting the DAPS handover method is included therein, when the target BS 1f-03 configures an RRCReconfiguration message to indicate handover to the UE 1f-01, the target BS 1f-03 may add, to the RRCReconfiguration message, an indicator indicating the DAPS handover method, bearer configuration information required for the UE 1f-01 to perform the DAPS handover method, bearer configuration information, security key information, cell group configuration information, or system information. In addition, the target BS 1f-03 may add the RRCReconfiguration message to a DL-DCCH message of a handover command message and may transmit the handover command message to the source BS 1f-02. The target BS 1f-03 may perform indication of the DAPS handover method with respect to each bearer (DRB or SRB).

When the source BS 1f-02 receives the handover command message, the source BS 1f-02 may extract the RRCReconfiguration message included in the handover command message, may transmit the RRCReconfiguration message to the UE 1f-01, and thus may indicate handover. The source BS 1f-02 may identify the indicated DAPS handover method for each bearer, and may perform the DAPS handover method for each bearer (DRB or SRB).

Embodiment 2 of determining an efficient DAPS handover method, which is provided in the disclosure, will now be described.

In Embodiment 2 of the disclosure, an entity for determining a DAPS handover method may be the target BS 1f-03. In addition, in Embodiment 2 of the disclosure, in a case where the source BS 1f-02 requests the target BS 1f-03 for the DAPS handover method, the target BS 1f-03 may reject or accept the request from the source BS 1f-02 or may indicate another handover method to the source BS 1f-02 via a handover command message indicating the other handover method.

The source BS 1f-02 may indicate, to the target BS 1f-03 and by defining a new indicator in the handover preparation information message, that the source BS 1f-02 is to perform the DAPS handover method proposed in the disclosure, and may request the DAPS handover method. The handover preparation information message may include current bearer configuration information of the UE 1f-01, security key information, cell group configuration information, capability information of the UE 1f-01, or the like. The source BS 1f-02 is configured to pre-share a capability of the target BS 1f-03 and thus may know in advance whether the target BS 1f-03 supports the DAPS handover method. The source BS 1f-02 may indicate, to the target BS 1f-03, that the source BS 1f-02 is to perform the DAPS handover method, may indicate, to the target BS 1f-03, that the source BS 1f-02 may perform early data forwarding, and may indicate the target BS 1f-03 to prepare to receive data forwarding and perform processing. The source BS 1f-02 may request each bearer (DRB or SRB) for a request for the DAPS handover method.

In a case where the target BS 1f-03 receives the handover preparation information message and identifies that an indicator requesting the DAPS handover method is included therein, the target BS 1f-03 may reject or accept the request for the DAPS handover method from the source BS 1f-02 or may indicate another handover method to the source BS 1f-02, based on whether the target BS 1f-03 can support the DAPS handover method, an amount of current transport resources, or scheduling. —The target BS 1f-03 may add, to a handover command message, an indicator to reject the request for the DAPS handover method, an indicator to accept the request for the DAPS handover method, or an indicator to indicate the other handover method, and may transmit the handover command message. In a case where the target BS 1f-03 configures an RRCReconfiguration message to indicate handover to the UE 1f-01, the target BS 1f-03 may configure the RRCReconfiguration message in such a manner that the RRCReconfiguration message includes the indicator indicating the DAPS handover method when the DAPS handover request is accepted or the RRCReconfiguration message includes the indicator indicating the other handover method when the DAPS handover request is rejected, and the RRCReconfiguration message includes bearer configuration information necessary for the UE 1f-01 to perform the DAPS handover method or the other handover method, bearer configuration information, security key information, cell group configuration information, or system information. In addition, the target BS 1f-03 may add the RRCReconfiguration message to a DL-DCCH message of a handover command message and may transmit the handover command message to the source BS 1f-02. The target BS 1f-03 may perform indication of the DAPS handover method with respect to each bearer (DRB or SRB).

When the source BS 1f-02 receives the handover command message, the source BS 1f-02 may determine an indicator included in the handover command message and thus may identify whether the request for the DAPS handover method is accepted or rejected. When the request for the DAPS handover method is accepted, the source BS 1f-02 may perform the DAPS handover method, may extract the RRCReconfiguration message included in the handover command message, may transmit the RRCReconfiguration message to the UE 1f-01, and thus may indicate handover. When the source BS 1f-02 determines the indicator included in the handover command message, when the request for the DAPS handover method is rejected or the other handover message is indicated, the source BS 1f-02 may perform the other handover method indicated by the target BS 1*f*-03. In addition, the source BS 1*f*-02 may extract the RRCReconfiguration message included in the handover command message, may transmit the RRCReconfiguration message to the UE 1*f*-01, and thus may indicate handover. As another method, when a separate indicator is not included in the handover command message, the source BS 1*f*-02 may determine a type of a handover message indicated by the target BS 1*f*-03 by reading the RRCReconfiguration message included in the handover command message, and may identify whether the request for the DAPS handover method is accepted or rejected. The source BS 1*f*-02 may perform a handover method (e.g., the DAPS handover method or another handover method) indicated in the RRCReconfiguration message. The source BS 1*f*-02 may identify the indicated DAPS handover method for each bearer, and may perform the DAPS handover method for each bearer (DRB or SRB).

Embodiment 3 of determining an efficient DAPS handover method, which is provided in the disclosure, will now be described.

In Embodiment 3 of the disclosure, an entity for determining a DAPS handover method may be a target BS. In addition, in Embodiment 3 of the disclosure, the target BS 1*f*-03 may determine capability of the UE 1*f*-01, and may determine a handover method (e.g., a DAPS handover method) based on whether the target BS can support the DAPS handover method, an amount of current transport resources, or scheduling.

The source BS 1*f*-02 may add, to a handover preparation information message, current bearer configuration information of the UE 1*f*-01, security key information, cell group configuration information, capability information of the UE 1*f*-01, or the like, and may transmit the handover preparation information message to request the target BS 1*f*-03 for handover. The source BS 1*f*-02 is configured to pre-share a capability of the target BS 1*f*-03 and thus may know in advance whether the target BS 1*f*-03 supports the DAPS handover method. When the target BS 1*f*-03 indicates to perform the DAPS handover method, the source BS 1*f*-02 may perform early data forwarding fast or in advance.

The target BS 1*f*-03 may receive the handover preparation information message, and may determine the handover method (e.g., the DAPS handover method) based on capability information of the UE 1*f*-01, whether the target BS 1*f*-03 can support the DAPS handover method, an amount of current transport resources, or scheduling. When the target BS 1*f*-03 determines the DAPS handover method, the target BS 1*f*-03 may add, to the handover command message, an indicator indicating the DAPS handover method, and may transmit the handover command message to the UE 1*f*-01. In a case where the target BS 1*f*-03 configures an RRCReconfiguration message to indicate handover to the UE 1*f*-01, the target BS 1*f*-03 may configure the RRCReconfiguration message in such a manner that the RRCReconfiguration message includes the indicator indicating the DAPS handover method when the DAPS handover request is determined or the RRCReconfiguration message includes the indicator indicating the other handover method when the DAPS handover request is determined, and the RRCReconfiguration message includes bearer configuration information necessary for the UE 1*f*-01 to perform the DAPS handover method or the other handover method, bearer configuration information, security key information, cell group configuration information, or system information. In addition, the target BS 1*f*-03 may add the RRCReconfiguration message to a DL-DCCH message of a handover command message and may transmit the handover command message to the source BS 1*f*-02. The target BS 1*f*-03 may perform indication of the DAPS handover method with respect to each bearer (DRB or SRB).

When the source BS 1*f*-02 receives the handover command message, the source BS 1*f*-02 may determine an indicator included in the handover command message and thus may identify whether the DAPS handover method is determined. When the DAPS handover method is indicated, the source BS 1*f*-02 may perform the DAPS handover method, may extract the RRCReconfiguration message included in the handover command message, may transmit the RRCReconfiguration message to the UE 1*f*-01, and thus may indicate handover. When the source BS 1*f*-02 determines the indicator included in the handover command message, when the DAPS handover method is not determined or the other handover message is indicated, the source BS 1*f*-02 may perform the other handover method indicated by the target BS 1*f*-03. In addition, the source BS 1*f*-02 may extract the RRCReconfiguration message included in the handover command message, may transmit the RRCReconfiguration message to the UE 1*f*-01, and thus may indicate handover. As another method, when a separate indicator is not included in the handover command message, the source BS 1*f*-02 may determine a type of a handover message indicated by the target BS 1*f*-03 by reading the RRCReconfiguration message included in the handover command message, and may identify whether the DAPS handover method is determined. When the other handover method is indicated, the source BS 1*f*-02 may perform the indicated other handover method. The source BS 1*f*-02 may identify the indicated DAPS handover method for each bearer, and may perform the DAPS handover method for each bearer (DRB or SRB).

A new embodiment may be derived by combining methods of Embodiment 1, Embodiment 2, or Embodiment 3 of determining an efficient DAPS handover method.

According to an embodiment of the disclosure, a BS may indicate, via the RRCReconfiguration message, an efficient handover method (the DAPS handover method) proposed in the disclosure to the UE 1*f*-01, or in another method, the BS may configure the DAPS handover method for each bearer (DRB or SRB) of the UE 1*f*-01. For example, a new indicator indicating bearer configuration information, DPC PDCP configuration information or RLC configuration information for each bearer identifier or each logical channel identifier may be defined in the RRCReconfiguration message, and the BS may indicate, by using the new identifier, an efficient handover message for each bearer or logical channel identifier to the UE 1*f*-01. When the BS configures the DAPS handover method to the UE 1*f*-01, the BS also indicates other handover methods (e.g., a conditional handover method (configurations of a plurality of target cells and a plurality of conditions are configured to the UE 1*f*-01, and when the UE 1*f*-01 satisfies the conditions in a cell selection procedure or a cell reselection procedure, the UE 1*f*-01 performs a handover procedure on one target cell) or a handover method without a random access procedure), thereby preventing data loss or a transmission delay which may occur in handover.

When the UE 1f-01 receives the RRCReconfiguration message, the UE 1f-01 discontinues or continues data transmission and reception to and from the source gNB 1f-02 by using the configured handover method, and starts T304 timer in operations 1f-25. When the UE 1f-01 cannot succeed in handover to the target gNB 1f-03 for a preset time (e.g., when T304 timer is expired), in response to the expired T304 timer, the UE 1f-01 returns to its default configuration and transitions to an RRC idle state. In addition, the UE 1f-01 can trigger an RRC connection re-establishment procedure, and when an efficient handover method is configured and a link to the source gNB 1f-02 is active, the UE 1f-01 may fall back and report its handover failure to the source gNB 1f-02. The source gNB 1f-02 provides a sequence number (SN) status of UL/DL data for each bearer (e.g., for each RLC UM bearer or each RLC AM bearer), and when DL data or UL data is present, the source gNB 1f-02 transmits the DL data or the UL data to the target gNB 1f-03 in operations 1f-30 and 1f-35. The UE 1f-01 attempts a random access to a target cell indicated by the source gNB 1f-02 in operation 1f-40. The UE 1f-01 performs the random access to notify switching of the UE 1f-01 to the target cell via the handover and simultaneously to match UL synchronization. For the random access, the UE 1f-01 transmits, to the target cell, a preamble that corresponds to a preamble ID provided by the source gNB 1f-02 or corresponds to a randomly-selected preamble. After transmission of the preamble and after an elapse of a time period corresponding to a particular number of subframes, the UE 1f-01 monitors whether a Random Access Response (RAR) message is transmitted from the target cell. A time interval for monitoring the RAR message is called a RAR window. When the RAR message is received during the RAR window in operation 1f-45, the UE 1f-01 transmits a handover complete message in an RRC Reconfiguration Complete message to the target gNB 1f-03 in operation 1f-55. When the UE 1f-01 successfully receives the RAR message from the target gNB 1f-03, the UE 1f-01 ends T304 timer in operation 1f-50.

In order to switch a path of bearers which is configured for the source gNB 1f-02, the target gNB 1f-03 requests a core network 1f-04 (e.g., MME/S-GW/AMF) for a path switch of the bearers in operations 1f-60 and 1f-65, and indicates the source gNB 1f-02 to discard UE context of the UE 1f-01 in operation 1f-70. The target gNB 1f-03 may transmit an RRC message (e.g., an RRCReconfiguration message in operation 1f-71 to the UE 1f-01 and may indicate, by using an indicator, the UE 1f-01 to release a link to the source gNB 1f-02. As another method, the target gNB 1f-03 may transmit MAC control information, RLC control information, or PDCP control information to the UE 1f-01 and thus may indicate the UE 1f-01 to release a link to the source gNB 1f-02. The UE 1f-01 attempts, at a start point of the RAR window, to receive data from the target gNB 1f-03, and after the RAR message is received, the UE 1f-01 transmits the RRC Reconfiguration Complete message and receives a DL transport resource or a UL transport resource, thereby starting data transmission and reception to and from the target gNB 1f-03.

According to an embodiment of the disclosure, when the BS configures or indicates Embodiment 2 (the DAPS handover method), which is proposed in the disclosure, to the UE 1f-01 by using the handover command message or the RRC message (e.g., the RRCReconfiguration message), the BS may apply methods as below. In the disclosure, when the BS configures the DAPS handover method to the UE 1f-01 or the UE 1f-01 receives, from the BS, the handover command message in which the DAPS handover method is configured, one method from among methods below or a combination of various methods from among the methods may be performed.

Method 1-1: When the BS (the source gNB 1f-02, the target gNB 1f-03, a LTE BS, or a NR BS) indicates or configures to the UE 1f-01, the BS may add mobility Control Info or Reconfiguration With Sync configuration information to the RRCReconfiguration message. The BS may define an indicator in SRB-ToAddMod or DRB-ToAddMod of SRB-ToAddModList or DRB-ToAddModList in bearer configuration information (Radio Resource Config Dedicated or Radio Bearer Config) of the RRCReconfiguration message, and may indicate the DAPS handover method for each of bearers (each of SRB or DRB) by using the defined indicator. In addition, the BS may indicate the DAPS handover method for each bearer by defining an indicator in pdcp-config in SRB-ToAddMod or DRB-ToAddMod. In a case where the LTE BS indicates or configures handover to the UE 1f-01 by using a LTE RRCReconfiguration message, because pdcp-config is not defined in SRB-ToAddMod but the use of default PDCP layer configuration is defined therein in LTE, the LTE BS may configure the DAPS handover method for each bearer by defining an indicator in SRB-ToAddMod with respect to a SRB, and may configure the DAPS handover method for each bearer by defining an indicator in pdcp-config in DRB-ToAddMod.

According to configuration indicated in the received handover command message (the RRCReconfiguration message), for each of bearers, the UE 1f-01 may perform the DAPS handover method on a bearer configured with the DAPS handover method, and may perform a general handover method on a bearer not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1f-01 is included in mobility Control Info or Reconfiguration With Sync configuration information of the handover command message, and the DAPS handover method is configured for each bearer, when the UE 1f-01 performs a handover procedure for each bearer, the UE 1f-01 may preferentially apply the DAPS handover method, compared to other handover method type. For example, according to configuration and for each bearer, the UE 1f-01 may perform the DAPS handover method on a bearer configured with the DAPS handover method, and may perform a handover method on a bearer not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1f-01 in mobility Control Info or Reconfiguration With Sync configuration information of the handover command message. In addition, in order to decrease complexity of implementation of the UE 1f-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1f-01.

In addition, when the UE 1f-01 receives the handover command message (the RRCReconfiguration message), in a case where the DAPS handover method is configured for at least one bearer or a certain bearer with respect to each bearer in the handover command message (the RRCReconfiguration message), the UE 1f-01 may apply a processing method of an RRC layer, a SDAP layer, a MAC layer, a PHY layer, or a SRB so as to perform the DAPS handover method proposed in the disclosure, and for each bearer configured with the DAPS handover method, the UE 1f-01 may apply a processing method of a PDCP layer or a RLC layer so as to perform the DAPS handover method proposed in the disclosure.

Method 1-2: When the BS (the source gNB 1f-02, the target gNB 1f-03, a LTE BS, or a NR BS) indicates or configures to the UE 1f-01, the BS may add mobility Control Info or Reconfiguration With Sync configuration information to the RRCReconfiguration message. The BS may define an indicator in DRB-ToAddMod of DRB-ToAddModList in bearer configuration information (Radio Resource Config Dedicated or Radio Bearer Config) of the RRCReconfiguration message, and may indicate the DAPS handover method for each of bearers (each DRB) by using the defined indicator, and may not introduce a separate indicator for configuration of the DAPS handover method for SRBs. For example, when the DAPS handover method is configured for at least one bearer (DRB) or a certain bearer (DRB) with respect to each bearer in the received handover command message (the RRCReconfiguration message), the UE 1f-01 may apply a SRB processing method to perform the DAPS handover method proposed in the disclosure. In addition, the BS may indicate the DAPS handover method for each bearer by defining an indicator in pdcp-config in DRB-ToAddMod.

According to configuration indicated in the received handover command message (the RRCReconfiguration message), for each of bearers, the UE 1f-01 may perform the DAPS handover method on a bearer configured with the DAPS handover method, and may perform a general handover method on a bearer not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1f-01 is included in mobility Control Info or Reconfiguration With Sync configuration information of the handover command message, and the DAPS handover method is configured for each bearer, when the UE 1f-01 performs a handover procedure for each bearer, the UE 1f-01 may preferentially apply the DAPS handover method, compared to other handover method type. For example, according to configuration and for each bearer, the UE 1f-01 may perform the DAPS handover method on a bearer configured with the DAPS handover method, and may perform a handover method on a bearer not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1f-01 in mobility Control Info or Reconfiguration With Sync configuration information of the handover command message. In addition, in order to decrease complexity of implementation of the UE 1f-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1f-01. In addition, when the UE 1f-01 receives the handover command message (the RRCReconfiguration message), in a case where the DAPS handover method is configured for at least one bearer or a certain bearer with respect to each bearer in the handover command message (the RRCReconfiguration message), the UE 1f-01 may apply a processing method of an RRC layer, a SDAP layer, a MAC layer, a PHY layer, or a SRB so as to perform the DAPS handover method proposed in the disclosure, and for each bearer configured with the DAPS handover method, the UE 1f-01 may apply a processing method of a PDCP layer or a RLC layer so as to perform the DAPS handover method proposed in the disclosure.

Method 2-1: When the BS (the source gNB 1f-02, the target gNB 1f-03, a LTE BS, or a NR BS) indicates or configures to the UE 1f-01, the BS may add mobility Control Info or Reconfiguration With Sync configuration information to the RRCReconfiguration message. The BS may indicate that the DAPS handover method is configured for at least one bearer or a certain bearer via an indicator, by defining and including the indicator indicating or configuring the DAPS handover method in mobility Control Info or Reconfiguration With Sync. In addition, the BS may define an indicator in SRB-ToAddMod or DRB-ToAddMod of SRB-ToAddModList or DRB-ToAddModList in bearer configuration information (Radio Resource Config Dedicated or Radio Bearer Config) of the RRCReconfiguration message, thereby indicating the DAPS handover method for each of bearers (each of SRB or DRB). In addition, the BS may indicate the DAPS handover method for each bearer by defining an indicator in pdcp-config in SRB-ToAddMod or DRB-ToAddMod. In addition, in a case where the LTE BS indicates or configures handover to the UE 1f-01 by using a LTE RRCRecofiguration message, because pdcp-config is not defined in SRB-ToAddMod but the use of default PDCP layer configuration is defined therein in LTE, the LTE BS may configure the DAPS handover method for each bearer by defining an indicator in SRB-ToAddMod with respect to a SRB, and may configure the DAPS handover method for each bearer by defining an indicator in pdcp-config in DRB-ToAddMod.

According to configuration indicated in the received handover command message (the RRCReconfiguration message), for each of bearers, the UE 1f-01 may perform the DAPS handover method on a bearer configured with the DAPS handover method, and may perform a general handover method on a bearer not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1f-01 is included in mobility Control Info or Reconfiguration With Sync configuration information of the handover command message, and the DAPS handover method is configured for each bearer, when the UE 1f-01 performs a handover procedure for each bearer, the UE 1f-01 may preferentially apply the DAPS handover method, compared to other handover method type. For example, according to configuration and for each bearer, the UE 1f-01 may perform the DAPS handover method on a bearer configured with the DAPS handover method, and may perform a handover method on a bearer not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1f-01 in mobility Control Info or Reconfiguration With Sync configuration information of the handover command message. In addition, in order to decrease complexity of implementation of the UE 1f-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1f-01.

In addition, when the UE 1f-01 receives the handover command message (the RRCReconfiguration message), in a case where the indicator indicating or configuring the DAPS handover method is included (or configured) in mobility Control Info of Reconfiguration With Sync in the handover command message (the RRCReconfiguration message), the UE 1f-01 may apply a processing method of an RRC layer, a SDAP layer, a MAC layer, a PHY layer, or a SRB so as to perform the DAPS handover method proposed in the disclosure, and for each bearer configured with the DAPS handover method, the UE 1f-01 may apply a processing method of a PDCP layer or a RLC layer so as to perform the DAPS handover method proposed in the disclosure.

Method 2-2: When the BS (the source gNB 1f-02, the target gNB 1f-03, a LTE BS, or a NR BS) indicates or configures to the UE 1f-01, the BS may add mobility Control Info or Reconfiguration With Sync configuration information to the RRCReconfiguration message. The BS may indicate that the DAPS handover method is configured for at least one bearer or a certain bearer via an indicator, by defining and including the indicator indicating or configuring the DAPS handover method in mobility Control Info or Reconfiguration With Sync. In addition, the BS may indicate the DAPS handover method for each of bearers (each DRB) by defining an indicator in DRB-ToAddMod of DRB-ToAddModList in bearer configuration information (Radio Resource Config Dedicated or Radio Bearer Config) of the RRCReconfiguration message, and may not introduce a separate indicator for configuration of the DAPS handover method for SRBs. For example, when the UE 1f-01 receives the handover command message (the RRCReconfiguration message), in a case where the DAPS handover method is configured for at least one bearer (DRB) or a certain bearer (DRB) with respect to each bearer in the received handover command message (the RRCReconfiguration message), the UE 1f-01 may apply a SRB processing method to perform the DAPS handover method proposed in the disclosure. In addition, the BS may indicate the DAPS handover method for each bearer by defining an indicator in pdcp-config in DRB-ToAddMod.

According to configuration indicated in the received handover command message (the RRCReconfiguration message), for each of bearers, the UE 1f-01 may perform the DAPS handover method on a bearer configured with the DAPS handover method, and may perform a general handover method on a bearer not configured with the DAPS handover method. In a case where the indicator indicating or configuring a handover method type (e.g., MakeBefore-Break handover, Rach-skip handover, RACH-less handover, or Conditional handover CHO) with respect to the UE 1f-01 is included in mobility Control Info or Reconfiguration With Sync configuration information of the handover command message, and the DAPS handover method is configured for each bearer, when the UE 1f-01 performs a handover procedure for each bearer, the UE 1f-01 may preferentially apply the DAPS handover method, compared to other handover method type. For example, according to configuration and for each bearer, the UE 1f-01 may perform the DAPS handover method on a bearer configured with the DAPS handover method, and may perform a handover method on a bearer not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1f-01 in mobility Control Info or Reconfiguration With Sync configuration information of the handover command message. In addition, in order to decrease complexity of implementation of the UE 1f-01, when the DAPS handover method is configured for at least one bearer or a certain bearer, mobility Control Info or Reconfiguration With Sync configuration information of the handover command message may be configured to not indicate or configure a different handover method type (e.g., MakeBefore-Break handover, Rach-skip handover, RACH-less handover, or Conditional handover CHO) with respect to the UE 1f-01.

In addition, when the UE 1f-01 receives the handover command message (the RRCReconfiguration message), in a case where the indicator indicating or configuring the DAPS handover method is included (or configured) in mobility Control Info of Reconfiguration With Sync in the handover command message (the RRCReconfiguration message), the UE 1f-01 may apply a processing method of an RRC layer, a SDAP layer, a MAC layer, a PHY layer, or a SRB so as to perform the DAPS handover method proposed in the disclosure, and for each bearer configured with the DAPS handover method, the UE 1f-01 may apply a processing method of a PDCP layer or a RLC layer so as to perform the DAPS handover method proposed in the disclosure.

Method 3-1: When the BS (the source gNB 1f-02, the target gNB 1f-03, a LTE BS, or a NR BS) indicates or configures to the UE 1f-01, the BS may add mobility Control Info or Reconfiguration With Sync configuration information to the RRCReconfiguration message. The BS may indicate that the DAPS handover method is configured for at least one bearer or a certain bearer via an indicator, by defining and including the indicator indicating or configuring the DAPS handover method in mobility Control Info or Reconfiguration With Sync. In addition, the BS may configure a list of bearers configured with the DAPS handover method and include the list in mobility Control Info or Reconfiguration With Sync, and may include identifiers (SRB or DRB) of the bearers configured with the DAPS handover method in the list of bearers, thereby indicating whether the DAPS handover method is configured for each bearer. In addition, the BS may configure a list of bearers not configured with the DAPS handover method and include the list in mobility Control Info or Reconfiguration With Sync, and may include identifiers (SRB or DRB) of the bearers not configured with the DAPS handover method in the list of bearers, thereby indicating whether the DAPS handover method is configured for each bearer.

According to configuration indicated in the received handover command message (the RRCReconfiguration message), for each of bearers, the UE 1f-01 may perform the DAPS handover method on a bearer configured with the DAPS handover method, a bearer whose identifier is included in the list of bearers configured with the DAPS handover method, or a bearer whose identifier is not included in the list of bearers not configured with the DAPS handover method, and may perform a general handover method on a bearer not configured with the DAPS handover method, a bearer whose identifier is not included in the list of bearers configured with the DAPS handover method, or a bearer whose identifier is included in the list of bearers not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1f-01 is included in mobility Control Info or Reconfiguration With Sync configuration information of the handover command message, and the DAPS handover method is configured for each bearer, when the UE 1f-01 performs a handover procedure for each bearer, the UE 1f-01 may preferentially apply the DAPS handover method, compared to other handover method type. For example, according to configuration, for each of bearers, the UE 1f-01 may perform the DAPS handover method on a bearer configured with the DAPS handover method, a bearer whose identifier is included in the list of bearers configured with the DAPS handover method, or a bearer whose identifier is not included in the list of bearers not configured with the DAPS handover method, and may perform a handover method on a bearer not configured with the DAPS handover method, a bearer whose identifier is not included in the list of bearers configured with the DAPS handover method, or a bearer whose identifier is included in the list of bearers not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1f-01 in mobility Control Info or Reconfiguration With Sync configuration information of the handover command message. In addition, in order to decrease complexity of implementation of the UE 1f-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1f-01. In addition, when the UE 1f-01 receives the handover command message (the RRCReconfiguration message), in a case where the indicator indicating or configuring the DAPS handover method is included (or configured) in mobility Control Info of Reconfiguration With Sync of the handover command message (the RRCReconfiguration message), the UE 1f-01 may apply a processing method of an RRC layer, a SDAP layer, a MAC layer, a PHY layer, or a SRB so as to perform the DAPS handover method proposed in the disclosure, and for each bearer, the UE 1f-01 may apply a processing method of a PDCP layer or a RLC layer so as to perform the DAPS handover method proposed in the disclosure to the bearer configured with the DAPS handover method, the bearer whose identifier is included in the list of bearers configured with the DAPS handover method, or the bearer whose identifier is not included in the list of bearers not configured with the DAPS handover method.

Method 3-2: When the BS (the source gNB 1f-02, the target gNB 1f-03, a LTE BS, or a NR BS) indicates or configures to the UE 1f-01, the BS may add mobility Control Info or Reconfiguration With Sync configuration information to the RRCReconfiguration message. The BS may indicate that the DAPS handover method is configured for at least one bearer or a certain bearer via an indicator, by defining and including the indicator indicating or configuring the DAPS handover method in mobility Control Info or Reconfiguration With Sync. In addition, the BS may configure a list of bearers configured with the DAPS handover method and include the list in mobility Control Info or Reconfiguration With Sync, and may include identifiers (SRB or DRB) of the bearers configured with the DAPS handover method in the list of bearers, thereby indicating whether the DAPS handover method is configured for each bearer. In addition, the BS may configure a list of bearers not configured with the DAPS handover method and include the list in mobility Control Info or Reconfiguration With Sync, and may include identifiers (SRB or DRB) of the bearers not configured with the DAPS handover method in the list of bearers, thereby indicating whether the DAPS handover method is configured for each bearer. In addition, for SRBs, a separate indicator for configuration of the DAPS handover method may not be introduced. For example, when the UE 1f-01 receives the handover command message (the RRCReconfiguration message), in a case where the DAPS handover method is configured for at least one bearer (DRB) or a certain bearer (DRB) with respect to each bearer in the received handover command message (the RRCReconfiguration message), the UE 1f-01 may apply a SRB processing method to perform the DAPS handover method proposed in the disclosure.

According to configuration indicated in the received handover command message (the RRCReconfiguration message), for each of bearers, the UE 1f-01 may perform the DAPS handover method on a bearer configured with the DAPS handover method, a bearer whose identifier is included in the list of bearers configured with the DAPS handover method, or a bearer whose identifier is not included in the list of bearers not configured with the DAPS handover method, and may perform a general handover method on a bearer not configured with the DAPS handover method, a bearer whose identifier is not included in the list of bearers configured with the DAPS handover method, or a bearer whose identifier is included in the list of bearers not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1f-01 is included in mobility Control Info or Reconfiguration With Sync configuration information of the handover command message, and the DAPS handover method is configured for each bearer, when the UE 1f-01 performs a handover procedure for each bearer, the UE 1f-01 may preferentially apply the DAPS handover method, compared to other handover method type. For example, according to configuration, for each of bearers, the UE 1f-01 may perform the DAPS handover method on a bearer configured with the DAPS handover method, a bearer whose identifier is included in the list of bearers configured with the DAPS handover method, or a bearer whose identifier is not included in the list of bearers not configured with the DAPS handover method, and may perform a handover method on a bearer not configured with the DAPS handover method, a bearer whose identifier is not included in the list of bearers configured with the DAPS handover method, or a bearer whose identifier is included in the list of bearers not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1*f*-01 in mobility Control Info or Reconfiguration With Sync configuration information of the handover command message. In addition, in order to decrease complexity of implementation of the UE 1*f*-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1*f*-01. In addition, when the indicator indicating or configuring the DAPS handover method is included (or configured) in mobility Control Info of Reconfiguration With Sync in the received handover command message (the RRCReconfiguration message), the UE 1*f*-01 may apply a processing method of an RRC layer, a SDAP layer, a MAC layer, a PHY layer, or a SRB so as to perform the DAPS handover method proposed in the disclosure, and for each bearer, the UE 1*f*-01 may apply a processing method of a PDCP layer or a RLC layer so as to perform the DAPS handover method proposed in the disclosure to the bearer configured with the DAPS handover method, the bearer whose identifier is included in the list of bearers configured with the DAPS handover method, or the bearer whose identifier is not included in the list of bearers not configured with the DAPS handover method.

Hereinafter, the disclosure proposes non-interruptive handover methods capable of allowing a data interruption time to be 0 ms or minimizing the data interruption time due to handover in a next-generation mobile communication system.

The UE 1*f*-01 may configure a plurality of first bearers with the source BS 1*f*-02 and may perform data transmission and reception (UL or DL data transmission and reception) by using protocol layers (a PHY layer, a MAC layer, a RLC layer, a PDCP layer or the like) for each of the plurality of first bearers, and in the disclosure, for convenience of descriptions, it is assumed, in drawings and descriptions, that the UE 1*f*-01 has one bearer.

Figure 1G:
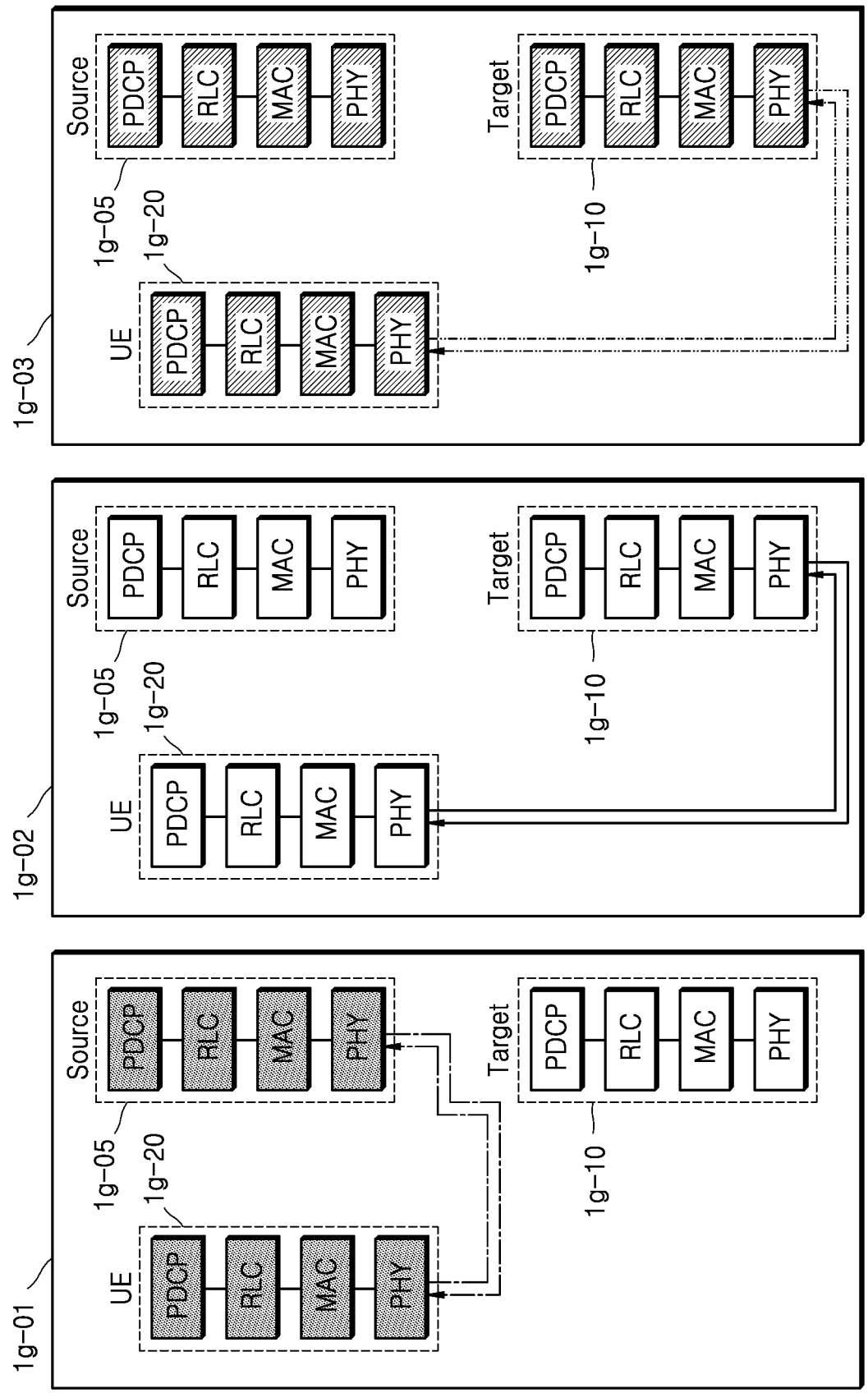
FIG. 1G illustrates particular operations of Embodiment 1 of an efficient handover method for minimizing a data interruption time due to handover according to an embodiment of the disclosure.

FIG. 1G illustrates particular operations of Embodiment 1 of an efficient handover method for minimizing a data interruption time due to handover according to an embodiment of the disclosure.

Referring to FIG. 1G, according to an embodiment of the disclosure, in Embodiment 1 of the efficient handover method, when a UE 1*g*-20 transmits or receives data to or from a source BS 1*g*-05 in first operation 1*g*-01 and then receives a handover command message, the UE 1*g*-20, based on a handover method indicated by the handover command message (e.g., an RRCReconfiguration message), may release a link to the source BS 1*g*-05, may perform a random access procedure on a target BS 1*g*-10, and may perform a handover procedure. As another method, to minimize a data interruption time occurring in handover based on the indicated handover method, the UE 1*g*-20 may continuously transmit and receive data to and from the source BS 1*g*-05.

According to an embodiment of the disclosure, in second operation 1*g*-02, when the UE 1*g*-20 performs the random access procedure on the target BS 1*g*-10 by using the handover method indicated by the handover command message received from the source BS 1*g*-05, transmits a preamble to the target BS 1*g*-10, or initially transmits data in a UL transport resource by using a PUCCH or PUSCH transport resource, the UE 1*g*-20 may discontinue data transmission and reception (UL data transmission and DL data reception) to and from the source BS 1*g*-05.

According to an embodiment of the disclosure, in third operation 1*g*-03, the UE 1*g*-20 may complete the random access procedure with respect to the target BS 1*g*-10, may transmit a handover complete message to the target BS 1*g*-10, and may start data transmission and reception (UL data transmission and DL data reception) to and from the target BS 1*g*-10.

According to an embodiment of the disclosure, in Embodiment 1 of the efficient handover method of the disclosure, a handover method of the disclosure performed when the DAPS handover method is not configured may be described.

Figure 1H:
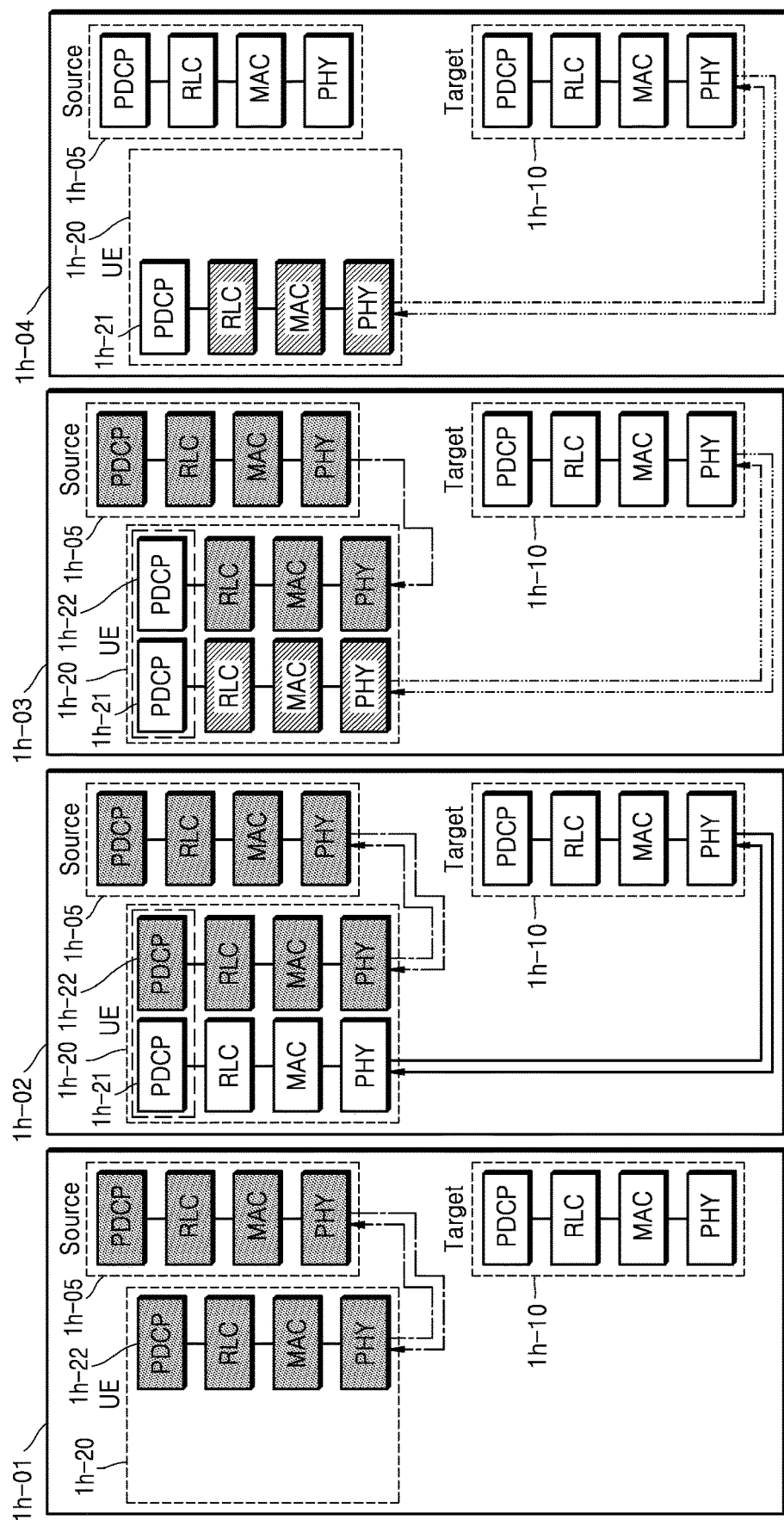
FIG. 1H illustrates particular operations of Embodiment 2 of an efficient handover method for minimizing a data interruption time due to handover according to an embodiment of the disclosure.

FIG. 1H illustrates particular operations of Embodiment 2 of an efficient handover method for minimizing a data interruption time due to handover according to an embodiment of the disclosure.

Referring to FIG. 1H, according to an embodiment of the disclosure, in Embodiment 2 of the efficient handover method, in first operation 1*h*-01, a UE 1*h*-20 may receive a handover command message from a source BS 1*h*-05 when the UE 1*h*-20 transmits or receives data with the source BS 1*h*-05. When the source BS 1*h*-05 indicates, in the handover command message, a handover method (e.g., a DAPS handover method) according to Embodiment 2 of the efficient handover method proposed in the disclosure, or indicates handover for each bearer, even when the UE 1*h*-20 has received the handover command message, the UE 1*h*-20 may continuously transmit and receive data to and from the source BS 1*h*-05 by using protocol layers 1*h*-22 for a first bearer so as to minimize a data interruption time occurring in handover.

In addition, when an RRC layer of the UE 1*h*-20 identifies, in the handover command message, an indication with respect to the handover method (e.g., the DAPS handover method) according to Embodiment 2 of the efficient handover method proposed in the disclosure, or identifies an identifier with respect to the DAPS handover method for each bearer, the RRC layer may transmit the indicator to a PDCP layer corresponding to each bearer or a bearer for which the DAPS handover method is indicated. When the PDCP layer receives the indicator, the PDCP layer may switch from a first PDCP layer architecture 1*i*-11 or 1*i*-12 (see FIG. 1I) to a second PDCP layer architecture 1*i*-20 (see FIG. 1I).

First operation 1*h*-01 of FIG. 1H may be described as operation in which the UE 1*h*-20 receives a handover command message (an RRCReconfiguration message) from a BS. When the UE 1*h*-20 transits to the second PDCP layer architecture 1*i*-20 according to configuration included in the received handover command message, the UE 1*h*-20 may pre-configure or pre-set up protocol layers (a PHY layer, a MAC layer, a RLC layer or a PDCP layer) 1*h*-21 of a second bearer for a target BS 1*h*-10, may derive and update a security key for the target BS 1*h*-10, and may configure header (or data) compression context for the target BS 1*h*-10. In addition, the UE 1*h*-20 may receive the handover command message from the source BS 1*h*-05, and in the handover command message, when the source BS 1h-05 indicates the DAPS handover method proposed in the disclosure, when the source BS 1h-05 indicates the DAPS handover method for particular bearers, or when a PDCP realignment timer value is newly configured, the UE 1h-20 may switch the first PDCP layer architecture or function 1i-11 or 1i-12 of FIG. 1I to the second PDCP layer architecture or function 1i-20 of FIG. 1I proposed in the disclosure with respect to each bearer or a bearer for which the DAPS handover method is indicated. When the UE 1h-20 switches the first PDCP layer architecture or function 1i-11 or 1i-12 of FIG. 1I to the second PDCP layer architecture or function 1i-20 of FIG. 1I proposed in the disclosure, the UE 1h-20 may update a variable for realignment to a PDCP SN or a COUNT value which is predicted to be received next time, may stop a realignment timer, and may restart the realignment timer.

In addition, in the aforementioned situation, when the UE 1h-20 receives the handover command message (e.g., the RRCReconfiguration message), an RRC layer (not shown) of the UE 1h-20 may start a first timer (e.g., T304). The first timer may stop when the UE 1h-20 performs a random access procedure on the target BS 1h-10 so as to perform handover and then the random access procedure is successfully completed (e.g., when a first condition proposed in the disclosure is satisfied). In a case where the handover fails and thus the first timer is expired, when a link to the source BS 1h-05 is active, the UE 1h-20 may fall back and report its handover failure to the source BS 1h-05 and may attempt link recovery, and when a link to the source BS 1h-05 is inactive, the UE 1h-20 may perform an RRC connection re-establishment procedure.

The handover command message the UE 1h-20 receives from the source BS 1h-05 may include information by which a second bearer is configured to have a same identifier as a first bearer and is established, such that a data interruption time does not occur in each bearer. In Embodiment 2 of the disclosure, a PDCP layer for a first bearer and a PDCP layer for a second bearer may logically operate as one PDCP layer, and detailed descriptions about the operation will now be provided with reference to FIG. 1I.

In Embodiment 2 of the disclosure, when the UE 1h-20 is configured to transmit UL data to both the source BS 1h-05 and the target BS 1h-10, to avoid a coverage lessening problem due to insufficient transmission power of the UE 1h-20 or to prevent link selection by which, when the UE 1h-20 transmits UL data, the UE 1h-20 has to determine to which BS the UE 1h-20 has to request a transport resource and to transmit the UL data, the UE 1h-20 in Embodiment 2 of the disclosure may transmit the UL data to only one of the source BS 1h-05 and the target BS 1h-10. More specifically, in Embodiment 2 of the disclosure, when the UE 1h-20 does not have a capability (dual uplink transmission) of simultaneously transmitting UL data to different BSs at different frequencies or a same frequency, the UE 1h-20 may transmit the UL data to only one BS from among the source BS 1h-05 and the target BS 1h-10 within one time unit. Therefore, the UE 1h-20 may perform a scheduling request to only one BS from among the source BS 1h-05 and the target BS 1h-10, may transmit a report (e.g., a buffer status report) about a size of a plurality of items of data to be transmitted by the PDCP layer to only one BS from among the source BS 1h-05 and the target BS 1h-10, may receive a UL transport resource, and thus may transmit UL data to only one BS. In addition, even when the UE 1h-20 receives a handover command message from the source BS 1h-05, the UE 1h-20 may not reset a MAC layer for a first bearer so as to prevent data loss by continuing data transmission and reception by retransmitting HARQ. In addition, an RLC layer in an AM mode may continuously perform RCL retransmission.

As another method, when the handover command message indicates, for each bearer, Embodiment 2 (the DAPS handover method) of the efficient handover method proposed in the disclosure, the UE 1h-20 may continuously transmit or receive data to or from the source BS 1h-05 with respect to only a PDCP layer, a RLC layer, or a MAC layer, which corresponds to a bearer or a logical channel identifier for which Embodiment 2 (the DAPS handover method) is indicated in the handover command message, or with respect to only data corresponding to the bearer or the logical channel identifier. In addition, when the first condition proposed in the disclosure is satisfied (e.g., when UL data transmission is switched to the target BS 1h-10), the UE 1h-20 may continuously transmit or receive RLC control data (a RLC status report), PDCP control data (a ROHC feedback or a PDCP status report), or HARQ retransmission to or from the source BS 1h-05 with respect to only the PDCP layer, the RLC layer, or the MAC layer, which corresponds to the bearer or the logical channel identifier for which Embodiment 2 (the DAPS handover method) is indicated in the handover command message. In addition, when the handover command message indicates, for each bearer, Embodiment 2 (the DAPS handover method) of the efficient handover method proposed in the disclosure, the UE 1h-20 may discontinue transmission or reception of data to or from the source BS 1h-05 with respect to a PDCP layer, a RLC layer, or a MAC layer, which corresponds to a bearer or a logical channel identifier for which Embodiment 2 (the DAPS handover method) is not indicated in the handover command message.

Thereafter, the UE 1h-20 may receive the handover command message. According to an embodiment of the disclosure, when the handover command message indicates the DAPS handover method proposed in the disclosure, indicates the DAPS handover method for particular bearers, configures the DAPS handover method for at least one bearer, configures the DAPS handover method for a certain bearer, or newly configures QoS flow and bearer mapping information, the UE 1h-20 may switch a first SDAP layer architecture or function 1j-10 and 1j-12 to a second SDAP layer architecture or function 1j-20 proposed in the disclosure with respect to each bearer or a bearer for which the DAPS handover method is indicated.

In addition, the second SDAP layer architecture may be configured in such a manner that an existing first QoS flow and existing bearer mapping information for the source BS are maintained to process UL data to be transmitted to the source BS and DL data to be received from the source BS. A second QoS flow and the bearer mapping information that are newly configured in the handover command message may be configured for the target BS, and may be used to process UL data to be transmitted to the target BS S and DL data to be received from the target BS. For example, in the second SDAP layer architecture proposed in the disclosure, the first QoS flow and the bearer mapping information for the source BS or the second QoS flow and the bearer mapping information for the target BS are maintained such that data for the source BS and data for the target BS may be separately processed.

According to an embodiment of the disclosure, a SDAP layer in the second SDAP layer architecture may identify whether data received from a lower layer is data received from the source BS or data received from the target BS, by using a 1-bit indicator of a SDAP header, a 1-bit indicator of a PDCP header, or information indicated by the PDCP layer. When the BS indicates the DAPS handover method with respect to each bearer to the UE by using a handover command message, the BS may always indicate the DAPS handover method with respect to a default bearer (default DRB). By doing so, when data occurs in a new QoS flow that does not correspond to a QoS flow and bearer mapping information when a DAPS handover procedure is performed, the BS may indicate the UE to always transmit UL data via the default bearer.

When the DAPS handover method is not configured for the default bearer, UL data transmission with respect to the new QoS flow occurred in handover is unavailable such that a data interruption time may occur. As another method, when the UE receives a handover command message (e.g., an RRCReconfiguration message), Embodiment 2 (the DAPS handover method) is indicated, and SDAP layer configuration information or a second QoS flow and bearer mapping information for the target BS are configured in the RRC message, the UE may apply the SDAP layer configuration information or the second QoS flow and the bearer mapping information when the first condition proposed in the disclosure is satisfied. In addition, in the aforementioned situation, when the handover command message indicates Embodiment 2 (the DAPS handover method) for each bearer, the UE may maintain and apply only a first QoS flow and bearer mapping information which correspond to a bearer for which Embodiment 2 is indicated when the UE maintains the first QoS flow and the bearer mapping information for the source BS, and the UE may release or does not apply a first QoS flow and bearer mapping information which correspond to a bearer for which Embodiment 2 is not indicated, and when the SDAP layer configuration information or the second QoS flow and the bearer mapping information for the target BS are configured in the RRC message, the UE may apply the SDAP layer configuration information or the second QoS flow and the bearer mapping information to data transmission or reception to or from the target BS when the first condition proposed in the disclosure is satisfied.

According to an embodiment of the disclosure, in Embodiment 2 of the efficient handover method of FIG. 1H, in second operation 1h-02, the UE 1h-20 may perform a random access procedure on the target BS 1h-10 by using the protocol layers for the second bearer, the target BS 1h-10 being indicated in the handover command message. When performing the random access procedure by using the protocol layers for the second bearer, the UE 1h-20 may continue data transmission or reception (UL data transmission or DL data reception) to or from the source BS 1h-05 by using the protocol layers for the first bearer. Second operation 1h-02 may be described as an operation in which the UE 1h-20 performs a cell selection procedure or a cell reselection procedure, and performs a random access procedure on a target cell indicated by a handover command message (an RRCReconfiguration message) received from the source BS 1h-05.

According to an embodiment of the disclosure, in Embodiment 2 of the efficient handover method of FIG. 1H, when the first condition to be described below is satisfied in third operation 1h-03, the UE 1h-20 may discontinue UL data transmission to the source BS 1h-05 by using the protocol layers 1h-22 for the first bearer from among bearers for which the DAPS handover method is configured, and may transmit the UL data to the target BS 1h-10 by using the protocol layers 1h-21 for the second bearer. In this regard, the UE 1h-20 may continuously receive DL data from the source BS 1h-05 and the target BS 1h-10 by using the protocol layers for the first and second bearers. Third operation 1h-03 may be an operation in which the UE 1h-20 satisfies the first condition and thus switches UL transmission from the source BS 1h-05 to the target BS 1h-10. More specifically, in the operation, the UE 1h-20 transmits UL data to the source BS 1h-05 via the first bearer until the UE 1h-20 satisfies the first condition, and when the UE 1h-20 satisfies the first condition, the UE 1h-20 discontinues transmission of the UL data to the source BS 1h-05 via the first bearer, and starts transmission of the UL data to the target BS 1h-10 via the second bearer.

More specifically, in the second PDCP layer architecture proposed with respect to the bearer for which the DAPS handover method is configured in the disclosure, in a case where the PDCP layer transmits UL data via the first bearer and satisfies the first condition and thus receives an indicator from a lower layer (when the MAC layer succeeds in a random access procedure on the target BS 1h-10) or an upper layer (when a first timer is expired in the RRC layer), the PDCP layer may discontinue transmission of the UL data via the first bearer, may perform switching, and may start transmission of the UL data via the second bearer. In addition, as in the PDCP layer structure proposed with reference to FIG. 1I, a reception PDCP layer 1h-21 for the second bearer and a reception PDCP layer 1h-22 for the first bearer may operate as one entity, and the reception PDCP layer 1h-21 may continuously receive data from the source BS 1h-05 or the target BS 1h-10 without interruption by using stored transceived data, SN information, or information, such as header compression and decompression context. The first condition may be one of conditions below. The first conditions below propose a UL data transmission switching time point at which a transport resource may be maximally and efficiently used, and a data interruption time may be minimized.

It may be determined that the first condition is satisfied in a case where the UE 1h-20 successfully completes a random access procedure on the target BS 1h-10 by using the layers (e.g., a MAC layer) for the second bearer, a case where the UE successfully completes the random access procedure on the target BS 1h-10 by using the layers (e.g., the MAC layer) for the second bearer and receives allocation of a first UL transport resource from the target BS 1h-10, or a case where a UL transport resource is first indicated to the UE 1h-20.

For example, in a case where the UE 1h-20 receives a handover command message from the source BS 1h-05 and receives an indication of a random access to the target BS 1h-10, when the indicated random access is a contention free random access (CFRA) (e.g., when a predefined preamble or a UE-cell identifier (e.g., cell-radio network temporary identifier (C-RNTI) is allocated), it may be determined that the random access procedure is successfully completed when the UE 1h-20 transmits the predefined preamble to a cell of the target BS and receives a RAR message. Therefore, when the UE 1h-20 receives (is allocated) a first UL transport resource allocated (or included or indicated) in the RAR message, it may be determined that the first condition is satisfied. As another method, when the UE 1h-20 first receives a UL transport resource after the UE 1h-20 receives the RAR message, it may be determined that the first condition is satisfied.

In a case where the UE 1*h*-20 receives a handover command message from the source BS 1*h*-05 and receives an indication of a random access to the target BS 1*h*-10, when the indicated random access is a contention-based random access (CBRA) (e.g., when a predefined preamble or a UE-cell identifier (e.g., C-RNTI) is not allocated), it may be determined that the random access procedure on the target BS 1*h*-10 is successfully completed when the UE 1*h*-20 transmits a preamble (e.g., a random preamble) to a cell of the target BS 1*h*-10 and receives a RAR message, transmits a message3 (e.g., a handover complete message) to the target BS 1*h*-10 by using a UL transport resource allocated (or included or indicated) in the RAR message, and receives, from the target BS 1*h*-10 and via a message4, a Contention resolution MAC CE indicating resolution of contention or receives a UL transport resource via a PDCCH corresponding to a C-RNTI of the UE 1*h*-20. Therefore, when the UE 1*h*-20 monitors the PDCCH and first receives (or is first indicated with) the UL transport resource via the PDCCH corresponding to the C-RNTI of the UE 1*h*-20, it may be determined that the first condition is satisfied. As another method, when a size of the UL transport resource allocated in the RAR message is sufficient and thus the UE 1*h*-20 can transmit the message3 and additionally transmit UL data, the UE 1*h*-20 may determine that the UE 1*h*-20 first receives a UL transport resource and thus may determine that the first condition is satisfied. For example, when the UE 1*h*-20 receives a RAR message, the UE 1*h*-20 may determine that the UE 1*h*-20 first receives the UL transport resource and thus may determine that the first condition is satisfied.

When a handover method (RACH-less handover) that does not request a random access procedure is also indicated in the handover command message received by the UE 1*h*-20, when the handover command message includes a UL transport resource with respect to the target BS 1*h*-10, the UE 1*h*-20 transmits a message3 (e.g., a handover complete message or a RRCReconfigurationComplete message) by using the UL transport resource with respect to the target BS 1*h*-10, and when the UE 1*h*-20 receives, from the target BS 1*h*-10, a UE Identity Confirmation MAC CE via a message4, or receives a UL transport resource via a PDCCH corresponding to a C-RNTI of the UE 1*h*-20, it may be determined that a random access procedure is successfully completed and the first condition is satisfied. As another method, after the random access procedure is successfully completed, the UE 1*h*-20 performs PDCCH monitoring and receives a first UL transport resource via the PDCCH corresponding to the C-RNTI of the UE 1*h*-20, it may be determined that the first condition is satisfied.

When the handover command message does not include the UL transport resource with respect to the target BS 1*h*-10, the UE 1*h*-20 performs PDCCH monitoring on the target BS 1*h*-10 (or a cell) and when the UE 1*h*-20 receives a UL transport resource via the PDCCH corresponding to the C-RNTI of the UE, or transmits a message3 (e.g., a handover complete message or a RRCReconfigurationComplete message) by using the UL transport resource, and receives a UE Identity Confirmation MAC CE from the target BS 1*h*-10 or receives a UL transport resource via the PDCCH corresponding to the C-RNTI of the UE 1*h*-20, it may be determined that a random access procedure is successfully completed and the first condition is satisfied As another method, after the random access procedure is successfully completed, when the UE 1*h*-20 performs PDCCH monitoring and receives a first UL transport resource via the PDCCH corresponding to the C-RNTI of the UE 1*h*-20, it may be determined that the first condition is satisfied.

Hereinafter, provided is a method of efficiently switching UL data from the source BS 1*h*-05 to the target BS 1*h*-10, the method being performed when the DAPS handover method proposed in the disclosure is performed. A MAC layer or an RRC layer for a second bearer corresponding to the target BS 1*h*-10 may determine or identify whether the first condition is satisfied, according to one or a combination of methods to be described below.

First method: For example, when an RRCReconfiguration message received by the UE 1*h*-20 indicates DAPS handover, the UE 1*h*-20 may configure the MAC layer for the second bearer corresponding to the target BS 1*h*-10, and the MAC layer for the target BS 1*h*-10 may perform a random access procedure and may identify whether the first condition is satisfied. When the first condition is satisfied, the MAC layer for the target BS 1*h*-10 may indicate, by using an indicator, an upper layer (e.g., a PDCP layer) for a bearer for which the DAPS handover method is configured to switch UL data transmission from the source BS 1*h*-05 via a first bearer to the target BS 1*h*-10 via the second bearer in the DAPS handover method proposed in the disclosure.

Second method: As another method, for example, when an RRCReconfiguration message received by the UE 1*h*-20 indicates DAPS handover, the UE 1*h*-20 may configure the MAC layer for the second bearer corresponding to the target BS 1*h*-10, and the MAC layer for the target BS 1*h*-10 may perform a random access procedure and may identify whether the first condition is satisfied. When the first condition is satisfied, the MAC layer for the target BS 1*h*-10 may indicate, to an upper layer (e.g., an RRC layer), that the first condition is satisfied. In addition, the upper layer (e.g., the RRC layer) may indicate, by using an indicator, a lower layer (e.g., the PDCP layer) for a bearer for which the DAPS handover method is configured to switch UL data transmission from the source BS 1*h*-05 via the first bearer to the target BS 1*h*-10 via the second bearer in the DAPS handover method proposed in the disclosure. When the first condition proposed in the disclosure is satisfied or a random access procedure on the target BS 1*h*-10 is successfully performed, the upper layer (e.g., the RRC layer) may stop a first timer, and when the first timer stops, the RRC layer may indicate, by using an indicator, the PDCP layer for the bearer for which the DAPS handover method is configured to switch the UL data transmission.

Third method: When an RRCReconfiguration message received by the UE 1*h*-20 indicates DAPS handover, the UE 1*h*-20 may configure the MAC layer for the second bearer corresponding to the target BS 1*h*-10, and when the RRC layer of the UE 1*h*-20 indicates, by using an indicator, a lower layer (e.g., the MAC layer) to perform the DAPS handover, the MAC layer for the target BS 1*h*-10 may perform a random access procedure and may determine whether the first condition is satisfied. When the first condition is satisfied, the MAC layer for the target BS 1h-10 may indicate, by using an indicator, an upper layer (e.g., the PDCP layer) for a bearer for which the DAPS handover method is configured to switch UL data transmission from the source BS 1h-05 via the first bearer to the target BS 1h-10 via the second bearer in the DAPS handover method proposed in the disclosure.

Fourth method: As another method, when an RRCReconfiguration message received by the UE 1h-20 indicates DAPS handover, the UE 1h-20 may configure the MAC layer for the second bearer corresponding to the target BS 1h-10, and when the RRC layer of the UE 1h-20 indicates, by using an indicator, a lower layer (e.g., the MAC layer) to perform the DAPS handover, the MAC layer for the target BS 1h-10 may perform a random access procedure and may determine whether the first condition is satisfied. When the first condition is satisfied, the MAC layer may indicate, to an upper layer (e.g., the RRC layer), that the first condition is satisfied. In a case where the indicator is identified, the upper layer (e.g., the RRC layer) may stop the first timer when the first condition proposed in the disclosure is satisfied or the random access procedure on the target BS 1h-10 is successfully performed. In addition, the upper layer (e.g., the RRC layer) may indicate, by using an indicator, a lower layer (e.g., the PDCP layer) for a bearer for which the DAPS handover method is configured to switch UL data transmission from the source BS 1h-05 via the first bearer to the target BS 1h-10 via the second bearer in the DAPS handover method proposed in the disclosure.

When the PDCP layer receives (e.g., when the DAPS handover method is indicated) an indicator indicating that the first condition is satisfied or an indicator indicating switching UL data transmission from the source BS 1h-05 to the target BS 1h-10, from the upper layer (e.g., the RRC layer) or the lower layer (e.g., the MAC layer) according to the first method, the second method, the third method, or the fourth method, the PDCP layer may perform a protocol layer operation proposed below so as to efficiently perform switching of UL data transmission, and may perform one or more operations from among operations below so as to prevent data loss due to the UL data transmission.

The operations below may be applied to the PDCP layer connected to an AM DRB or an UM DRB (an RLC layer operating in an AM mode or an RLC layer operating in a UM mode). Before the first condition is satisfied or before the indicator indicating that the first condition is satisfied is received, the PDCP layer may indicate, to the MAC layer for the first bearer corresponding to the source BS 1h-05, that there is data to be transmitted by indicating a size or amount (e.g., a PDCP data volume) of the data to be transmitted when a buffer stores the data to be transmitted, and may perform UL data transmission to the source BS 1h-05. Thereafter, the MAC layer for the first bearer corresponding to the source BS 1h-05 may perform a scheduling request or a buffer status report procedure to receive allocation of a UL transport resource from the source BS 1h-05. When the first condition is satisfied or the indicator indicating that the first condition is satisfied is received, switching of UL data transmission to the target BS 1h-10 may be performed on a bearer for which the DAPS handover method is configured.

The UE 1h-20 may not reset but changelessly use UL or DL ROHC context for the source BS 1h-05, may reset UL or DL ROHC context for the target BS 1h-10, and may start in an initial state (e.g., a IR state in U mode).

In order to switch UL data transmission from the first bearer for the source BS 1h-05 to the second bearer for the target BS 1h-10, the PDCP layer may indicate, to the MAC layer for the first bearer corresponding to the source BS 1h-05, that a size or amount of data to be transmitted is 0 (or none). For example, the PDCP layer may indicate, to the MAC layer for the first bearer, that a data volume (a PDCP data volume) of the PDCP layer is 0, thereby indicating that there is no more data to be transmitted (even when the buffer actually stores a plurality of items of data to be transmitted, in order to switch UL data transmission, the PDCP layer may indicate, to the MAC layer for the first bearer corresponding to the source BS 1h-05, that there is no more data to be transmitted).

However, in a case where the handover method (the DAPS handover method) of Embodiment 2 as proposed in the disclosure is indicated, the handover method (the DAPS handover method) of Embodiment 2 as proposed in the disclosure is indicated for a bearer, or the first condition is satisfied, when RLC control data (RLC status report) or PDCP control data (PDCP status report or ROHC feedback) with respect to the source BS 1h-05 is generated, a PDCP layer for the bearer may indicate a data volume corresponding to the RLC control data or the PDCP control data to the MAC layer for the source BS 1h-05, and may perform data transmission to the source BS 1h-05 or a RLC layer for the source BS 1h-05. However, in a case where the handover method (the DAPS handover method) of Embodiment 2 as proposed in the disclosure is indicated, the handover method (the DAPS handover method) of Embodiment 2 as proposed in the disclosure is indicated for a bearer, or the first condition is satisfied, when RLC control data (RLC status report) or PDCP control data (PDCP status report or ROHC feedback) with respect to the target BS 1h-10 is generated, a PDCP layer for the bearer may indicate a data volume corresponding to the RLC control data or the PDCP control data to a MAC layer for the target BS 1h-10, and may perform data transmission to the target BS 1h-10 or a RLC layer for the target BS 1h-10. When the first condition is not satisfied, the PDCP layer may indicate the data volume corresponding to the generated data (PDCP data PDU or PDCP control PDU) to the MAC layer for the source BS 1h-05, and may perform data transmission to the source BS 1h-05 or the RLC layer for the source BS 1h-05. Accordingly, in the second PDCP layer architecture proposed for the bearer configured with the DAPS handover method, when an indicator indicating that the first condition is satisfied is received and thus the second PDCP layer indicates a data volume to the MAC layer for the target BS 1h-10, the second PDCP layer may indicate the data volume to the MAC layer for the target BS 1h-10, wherein the data volume excludes PDCP control data or RLC control data to be transmitted to the bearer corresponding to the source BS 1h-05 or the MAC layer for the source BS 1h-05, or a data size.

The PDCP layer connected to an AM DRB (that is a RLC layer operating in an AM mode) (all pre-stored PDCP PDUs are discarded (e.g., PDCP SDUs are not discarded to prevent loss of original data)) may perform, based on header context for the target BS 1h-10, a new header compression procedure on a plurality of items of data (the PDCP SDUs of the buffer) in ascending order of COUNT values (or PDCP SNs) allocated before the first condition is satisfied or the indicator indicating that the first condition is satisfied is received, the ascending order starting from first data (e.g., a PDCP SDU) for which successful delivery is not acknowledged by lower layers (e.g., the RLC layer for the first bearer corresponding to the source BS 1h-05). The PDCP layer may re-perform an integrity procedure (e.g., integrity protection or verification procedure) or a ciphering procedure by applying security keys for the target BS 1h-10, may configure a PDCP header, and may transfer the PDCP header to its lower layer (the RLC layer for the second bearer corresponding to the target BS 1h-10), thereby performing retransmission or transmission. For example, the PDCP layer may perform accumulated retransmission on data starting from first data for which successful delivery is not acknowledged. As another method, when the PDCP layer performs retransmission, the PDCP layer may perform retransmission only on a plurality of items of data for which successful delivery is not acknowledged by lower layers (e.g., the RLC layers for the first bearer corresponding to the source BS 1h-05). More specifically, the PDCP layer connected to the AM DRB (or the RLC layer operating in the AM mode) (may discard all of stored PDCP PDUs to be transmitted to the source BS 1h-05 by using a first protocol layer previously connected to the PDCP layer (e.g., PDCP SDUs may not be discarded to prevent loss of original data)) may perform, by applying header compression (or data compression) protocol context or security key corresponding to the target BS 1h-10, a new header or data compression procedure on a plurality of items of data (e.g., the PDCP SDUs) for which successful delivery is not acknowledged by lower layers (e.g., the RLC layers) that are the first protocol layer for the source BS 1h-05, based on COUNT values (or PDCP SNs) allocated before the first condition is satisfied or the indicator indicating that the first condition is satisfied is received. The PDCP layer may re-perform an integrity procedure (e.g., integrity protection or verification procedure) or a ciphering procedure, may configure a PDCP header, and may transfer the PDCP header to its lower layer that is a second protocol layer for transmission to the target BS 1h-10, thereby performing retransmission or transmission. For example, to prevent waste of transport resources, the PDCP layer may perform selective retransmission only on the plurality of items of data for which successful delivery is not acknowledged. As another method, the transmission or the retransmission may be performed after lower layers (e.g., transmission or reception RLC layer or MAC layer) that are the first protocol layer for transmitting data to the source BS 1h-05 are released. When the transmission or retransmission procedure is extended to a UM DRB, the PDCP layer connected to a RLC layer operating in a UM mode may regard data that is not transmitted to a lower layer yet, data for which PDCP discard timer is not expired, or a plurality of items of data to which PDCP SNs (or COUNT values) are already allocated, as a plurality of items of data received or newly received from an upper layer, may not restart a PDCP discard timer with respect to each data, and may perform header (or data) compression on the plurality of items of data by using header (or data) compression context or a security key for the target BS 1h-10. Alternatively, the PDCP layer may perform ciphering or an integrity protection procedure, may generate and combine a PDCP header with the plurality of items of data, and then may perform transmission or retransmission, and may process data in ascending order of COUNT values allocated before the procedure is triggered and then may perform transmission or retransmission. A window state variable of the PDCP layer connected to the UM DRB or the AM DRB may not be reset and may be maintained and used.

When the buffer stores data to be transmitted, the PDCP layer may indicate, to the MAC layer for the second bearer corresponding to the target BS 1h-10, that there is the data to be transmitted by indicating a size or volume (e.g., a PDCP data volume) of the data to be transmitted, and may perform switching of UL data transmission to the target BS 1h-10. Thereafter, the MAC layer for the second bearer corresponding to the target BS 1h-10 may perform a scheduling request or a buffer status report procedure to receive allocation of a UL transport resource from the target BS 1h-10.

According to Embodiment 2 of the efficient handover method (e.g., the DAPS handover method) proposed in the disclosure, even after the UE 1h-20 receives a handover command message (e.g., an RRCReconfiguration message), the UE 1h-20 may continuously receive DL data from the source BS 1h-05 or the target BS 1h-10 by using the protocol layers for the first bearer corresponding to the source BS 1h-05 or the second bearer corresponding to the target BS 1h-10. In an embodiment of the disclosure, to allow the UE 1h-20 to smoothly receive DL data from the source BS 1h-05 (or the target BS 1h-10) or to allow the source BS 1h-05 (or the target BS 1h-10) to smoothly transmit DL data to the UE 1h-20, for AM bearers, the UE 1h-20 may be allowed to continuously perform UL transmission of a RLC status report, not data, on the source BS 1h-05 (or the target BS 1h-10) by using the protocol layers for the first bearer (or the second bearer). For example, even when the first condition is satisfied and thus the UE switches UL data transmission to the target BS 1h-10, when the UE 1h-20 has to transmit the RLC status report, HARQ ACK or NACK, or PDCP control data (a PDCP ROHC feedback or a PDCP status report) to the source BS 1h-05, the UE 1h-20 may be allowed to perform data transmission via the first bearer for the source BS 1h-05. In a case of the AM bearers, when data is transmitted to a transmitting end and then successful delivery is not indicated by using an RLC status report (i.e., when the RLC status report is not received), data cannot be continuously transmitted thereafter. More specifically, when the first condition is satisfied in third operation 1h-03 in Embodiment 2 of the efficient handover method of FIG. 1H, the UE 1h-20 discontinues UL data transmission to the source BS 1h-05 by using the protocol layers 1h-22 for the first bearer, performs switching, and then starts UL data transmission to the target BS 1h-10 by using the protocol layers 1h-21 for the second bearer, the UE 1h-20 may continuously transmit HARQ ACK or HARQ NACK information, a RLC status report (ACK or NACK information), or PDCP control data (e.g., a PDCP status report or PDCP ROHC feedback information) by using the protocol layers for the first bearer (or the second bearer) so as to smoothly receive DL data from the source BS 1h-05 (or the target BS 1h-10) or to allow the source BS 1h-05 (or the target BS 1h-10) to smoothly transmit DL data.

More specifically, in third operation 1h-03 in Embodiment 2 of the efficient handover method of FIG. 1H, even when the first condition is satisfied and thus the UE 1h-20 discontinues UL data transmission to the source BS 1h-05 by using the protocol layers 1h-22 for the first bearer, performs switching, and then starts UL data transmission to the target BS 1*h*-10 by using the protocol layers 1*h*-21 for the second bearer, the UE 1*h*-20 may continuously perform data transmission due to HARQ retransmission by the MAC layer or data transmission due to retransmission by the RLC layer in the AM mode so as to prevent loss of data to the source BS 1*h*-05. More specifically, in third operation 1*h*-03 in Embodiment 2 of the efficient handover method of FIG. 1H, when the first condition is satisfied and thus the UE 1*h*-20 discontinues UL data transmission to the source BS 1*h*-05 by using the protocol layers 1*h*-22 for the first bearer, performs switching, and then starts UL data transmission to the target BS 1*h*-10 by using the protocol layers 1*h*-21 for the second bearer, the source BS 1*h*-05 or the target BS 1*h*-10 may divide a time and may allocate a transport resource to the UE 1*h*-20 so as to prevent collision between a UL transport resource to the target BS 1*h*-10 and a UL transport resource to the source BS 1*h*-05. When the UL transport resource to the target BS 1*h*-10 collides with and thus overlaps the UL transport resource to the source BS 1*h*-05, the UE 1*h*-20 may perform data transmission to the source BS 1*h*-05 by giving priority to the UL transport resource to the source BS 1*h*-05 so as to maintain transmission of DL data or continuously receive the DL data from the source BS 1*h*-05 without a problem. As another method, when a UL transport resource to the target BS 1*h*-10 collides with and thus overlaps a UL transport resource to the source BS 1*h*-05, the UE 1*h*-20 may perform data transmission to the target BS 1*h*-10 by giving priority to the UL transport resource to the target BS 1*h*-10 so as to maintain transmission of DL data from the target BS 1*h*-10.

More specifically, when the UE 1*h*-20 receives a handover command message in which handover (the DAPS handover method) corresponding to Embodiment 2 of the disclosure is indicated or is indicated for each bearer, the UE 1*h*-20 or the bearer for which the DAPS handover is indicated may perform a scheduling request via a first protocol layer, may receive a UL transport resource by transmitting a buffer status report to the source BS 1*h*-05 and may transmit UL data until the first condition is satisfied. Thereafter, the UE 1*h*-20 may receive DL data from the source BS 1*h*-05. However, when the first condition is satisfied, the UE 1*h*-20 does not transmit data to the source BS 1*h*-05 anymore, may perform a scheduling request by using a second protocol layer by switching a UL, may receive a UL transport resource by transmitting a buffer status report to the target BS 1*h*-10, and may transmit UL data to the target BS 1*h*-10. However, the UE 1*h*-20 may continuously receive DL data from the source BS 1*h*-05, and, even after UL transmission switching, the UE 1*h*-20 may continuously transmit HARQ ACK or HARQ NACK, a RLC status report, or PDCP control data (e.g., a PDCP status report or ROHC feedback information) which corresponds to the DL data. In addition, the UE 1*h*-20 may continuously receive DL data from the source BS 1*h*-05 or the target BS 1*h*-10 even when the first condition is satisfied.

In Embodiment 2 of the efficient handover method of FIG. 1H, when a second condition is satisfied in fourth operation 1*h*-04, the UE 1*h*-20 may discontinue DL data reception from the source BS 1*h*-05 by using the protocol layers 1*h*-22 for the first bearer or may release a link to the source BS 1*h*-05. The second condition may be one of conditions below. In addition, the PDCP layer 1*h*-21 for the second bearer may continuously perform data transmission or reception without interruption to or from the target BS 1*h*-10 by using data to be transmitted or data to be received, SN information, or header compression and decompression context, which is stored in the PDCP layer 1*h*-22 for the first bearer.

When the UE 1*h*-20 performs a random access procedure on the target BS 1*h*-10 by using layers 1*h*-21 for the second bearer and receives a RAR message, the UE 1*h*-20 may determine that the second condition is satisfied.

When the UE 1*h*-20 performs a random access procedure on the target BS 1*h*-10 by using the layers 1*h*-21 for the second bearer, receives a RAR message, and configures and transmits a handover complete message to the target BS 1*h*-10, the UE 1*h*-20 may determine that the second condition is satisfied.

When the UE 1*h*-20 performs a random access procedure on the target BS 1*h*-10 by using the layers 1*h*-21 for the second bearer, and first transmits data by using a PUCCH or a PUCCH UL transport resource or first receives the PUCCH or the PUCCH UL transport resource, the UE 1*h*-20 may determine that the second condition is satisfied.

When a BS configures a separate timer to the UE 1*h*-20 by using an RRC message, and the separate timer is expired, the UE 1*h*-20 may determine that the second condition is satisfied.

The separate timer may start when the UE 1*h*-20 receives a handover command message from the source BS 1*h*-05, the UE 1*h*-20 starts a random access (transmits a preamble) to the target BS 1*h*-10, the UE 1*h*-20 receives a RAR message from the target BS 1*h*-10, the UE 1*h*-20 transmits a handover complete message to the target BS 1*h*-10, or the UE 1*h*-20 first transmits data by using a PUCCH or a PUCCH UL transport resource.

When the UE 1*h*-20 performs a random access procedure on the target BS 1*h*-10 by using protocol layers for a second bearer, receives a RAR message, configures and transmits a handover complete message to the target BS 1*h*-10, and then receives acknowledgement with respect to successful delivery of the handover complete message by using a MAC layer (HARQ ACK) or a RLC layer (RLC ACK), the UE 1*h*-20 may determine that the second condition is satisfied.

When the UE 1*h*-20 performs a random access procedure on the target BS 1*h*-10 by using the protocol layers for the second bearer, receives a RAR message or configures and transmits a handover complete message to the target BS 1*h*-10 and then first receives allocation of a UL transport resource from the target BS 1*h*-10 or first receives an indication of the UL transport resource, the UE 1*h*-20 may determine that the second condition is satisfied.

When the source BS 1*h*-05 performs efficient handover proposed in the disclosure, the source BS 1*h*-05 may determine when to discontinue transmission of DL data to the UE 1*h*-20 or when to release a link to the UE 1*h*-20. For example, the source BS 1*h*-05 may determine based on a certain method (e.g., when a certain timer is expired (the timer can start after handover is indicated) or the source BS 1*h*-05 receives, from the target BS 1*h*-10, an indication indicating that the UE 1*h*-20 has successfully performed handover to the target BS 1*h*-10). When the UE 1*h*-20 does not receive DL data from the source BS 1*h*-05 for a certain time period, the UE 1*h*-20 may determine that the second condition is satisfied, and may determine that a link to the source BS 1h-05 is released and thus may release the link.

When the UE 1h-20 receives, from the target BS 1h-10, an indication (e.g., an RRC message (e.g., an RRCReconfiguration message)) indicating to release a link to the source BS, a MAC CE, a RLC control PDU, or a PDCP control PDU, the UE 1h-20 may determine that the second condition is satisfied.

When the UE 1h-20 receives, from the source BS 1h-05, an indication (e.g., an RRC message (e.g., an RRCReconfiguration message)) indicating to release the link to the source BS 1h-05, a MAC CE, a RLC control PDU, or a PDCP control PDU, the UE 1h-20 may determine that the second condition is satisfied.

When the UE 1h-20 does not receive DL data from the source BS 1h-05 for a certain time period, the UE 1h-20 may determine that the second condition is satisfied.

When the UE 1h-20 successfully completes a random access procedure on the target BS 1h-10 by using the layers (e.g., the MAC layer) for the second bearer, the UE 1h-20 successfully completes the random access procedure on the target BS 1h-10 by using the layers for the second bearer and then receives allocation of a first UL transport resource from the target BS 1h-10, or the UE 1h-20 first receives an indication of a UL transport resource, the UE 1h-20 may determine that the second condition is satisfied.

For example, more particularly, in a case where the UE 1h-20 receives a handover command message from the source BS 1h-05 and receives an indication of a random access to the target BS 1h-10, when the indicated random access is a CFRA (e.g., when a predefined preamble or a UE-cell identifier (e.g., C-RNTI is allocated), it may be determined that the random access procedure is successfully completed when the UE 1h-20 transmits the predefined preamble to a cell of the target BS 1h-10 and receives a RAR message, and therefore, when the UE 1h-20 receives a first UL transport resource that is allocated, included or indicated in the RAR message, the UE 1h-20 may determine that the second condition is satisfied. As another method, when the UE 1h-20 first receives a UL transport resource after the UE receives the RAR message, the UE 1h-20 may determine that the second condition is satisfied.

In a case where the UE 1h-20 receives a handover command message from the source BS 1h-05 and receives an indication of a random access to the target BS 1h-10, when the indicated random access is a CBRA (e.g., when a predefined preamble or a UE-cell identifier (e.g., C-RNTI) is not allocated), the UE 1h-20 may determine that the random access procedure on the target BS 1h-10 is successfully completed when the UE 1h-20 transmits a preamble (e.g., a random preamble) to a cell of the target BS 1h-10 and receives a RAR message, transmits a message3 (e.g., a handover complete message) by using a UL transport resource allocated (or included or indicated) in the RAR message, and receives, from the target BS 1h-10 and via a message4, a Contention resolution MAC CE indicating resolution of contention or receives a UL transport resource by using a PDCCH corresponding to a C-RNTI of the UE 1h-20. Therefore, when the UE 1h-20 monitors the PDCCH and first receives or is first indicated with the UL transport resource by using the PDCCH corresponding to the C-RNTI of the UE 1h-20, the UE 1h-20 may determine that the second condition is satisfied. As another method, when a size of the UL transport resource allocated in the RAR message is sufficient and thus the UE 1h-20 can transmit the message3 and additionally transmit UL data, the UE 1h-20 may determine that the UE 1h-20 first receives a UL transport resource and thus may determine that the second condition is satisfied. For example, when the UE 1h-20 receives a RAR message, the UE 1h-20 may determine that the UE 1h-20 first receives the UL transport resource and thus may determine that the second condition is satisfied.

When a handover method (RACH-less handover) that does not request a random access procedure is also indicated in the handover command message received by the UE 1h-20, When the handover command message includes a UL transport resource with respect to the target BS 1h-10, the UE 1h-20 transmits a message3 (e.g., a handover complete message or a RRCReconfigurationComplete message) by using the UL transport resource with respect to the target BS 1-10, and when the UE 1h-20 receives, from the target BS 1h-10, a UE Identity Confirmation MAC CE via a message4, or receives a UL transport resource by using a PDCCH corresponding to a C-RNTI of the UE 1h-20, the UE 1h-20 may determine that a random access procedure is successfully completed. Thereafter, the UE 1h-20 may determine that the second condition is satisfied. As another method, after the random access procedure is successfully completed, when the UE 1h-20 performs PDCCH monitoring and thus receives a first UL transport resource by using the PDCCH corresponding to the C-RNTI of the UE 1h-20, the UE 1h-20 may determine that the second condition is satisfied.

When the handover command message does not include the UL transport resource with respect to the target BS 1h-10, the UE 1h-20 performs PDCCH monitoring on the target BS 1h-10 (or a cell) and when the UE 1h-20 receives a UL transport resource by using the PDCCH corresponding to the C-RNTI of the UE 1h-20, or transmits a message3 (e.g., a handover complete message or a RRCReconfigurationComplete message) by using the UL transport resource, and receives a UE Identity Confirmation MAC CE from the target BS 1h-10 or receives a UL transport resource by using the PDCCH corresponding to the C-RNTI of the UE 1h-20, the UE 1h-20 may determine that a random access procedure is successfully completed and the second condition is satisfied. As another method, after the random access procedure is successfully completed, when the UE 1h-20 performs PDCCH monitoring and thus receives a first UL transport resource by using the PDCCH corresponding to the C-RNTI of the UE 1h-20, the UE 1h-20 may determine that the second condition is satisfied.

In a case where the UE 1h-20 performs Embodiment 2 of the efficient handover method (e.g., the DAPS handover method) proposed in the disclosure, when it is identified that the RRC layer, the MAC layer, or the RLC layer of the UE 1h-20 for the first bearer corresponding to the source BS, and the RRC layer, the MAC layer, or the RLC layer of the UE 1h-20 for the second bearer corresponding to the target BS 1h-10 satisfy the second condition proposed in the disclosure, an indicator indicating that the second condition is satisfied may be indicated to a PDCP layer of the UE 1h-20 or a bearer which performs the DAPS handover method. When the second condition is satisfied or the PDCP layer of the UE 1h-20 receives, from a lower layer or an upper layer, the indicator indicating that the second condition is satisfied, one or more procedures below may be performed on the bearer or the UE 1h-20, which is configured with the DAPS handover method, and thus Embodiment 2 of the efficient handover method proposed in the disclosure may be successfully completed.

The UE 1h-20 may release the first bearer for the source BS 1h-05 and may release a link to the source BS 1h-05. Thereafter, before the UE 1h-20 releases the first bearer for the source BS 1h-05, the UE 1h-20 may perform a RLC re-establishment procedure on the RLC layer corresponding to the first bearer for the source BS 1h-05 (e.g., when a realignment timer is running, the UE 1h-20 may stop or reset the timer, and when received data is stored in a buffer, the UE 1h-20 may process and provide the stored data to the upper layer. In addition, when data to be transmitted is present in the buffer, the UE 1h-20 may discard the data) or may reset the MAC layer.

When the UE 1h-20 releases a link to the source BS 1h-05, in order to report, to the target BS 1h-10, a reception status of a plurality of items of DL data received from the source BS 1h-05, the UE 1h-20 may trigger a PDCP status report procedure, may configure a PDCP status report, and may transmit the PDCP status report to the target BS 1h-10.

When the second condition is satisfied, the UE 1h-20 may switch the second PDCP layer architecture or function 1i-20 to the first PDCP layer architecture or function 1i-11 or 1i-12 proposed in the disclosure with respect to each bearer or a bearer for which the DAPS handover method is indicated, may reset a variable for realignment, may stop and reset the realignment timer, may perform a deciphering procedure or header (or data) decompression by applying a security key or header decompression context for the source BS 1h-05 to a plurality of items of data (e.g., a plurality of items of data received from the source BS 1h-05) stored for reordering in the buffer, and may discard the security key or the header decompression context for the source BS 1h-05. Thereafter, the UE 1h-20 may provide the plurality of items of processed data to the upper layer in ascending order. For example, when the second condition is satisfied, the UE 1h-20 may perform the deciphering procedure or header (or data) decompression by applying the security key or header decompression context for the source BS 1h-05 to the plurality of items of data (e.g., the plurality of items of data received from the source BS 1h-05) stored for reordering in the buffer, and then may discard the security key or the header decompression context for the source BS 1h-05. As another method, when the second condition is satisfied, the UE 1h-20 may switch the second PDCP layer architecture or function 1i-20 to a third PDCP layer architecture or function 1i-30 proposed in the disclosure with respect to each bearer or a bearer for which the DAPS handover method is indicated. Thereafter, the UE 1h-20 may not stop nor reset but may continuously use the variable for realignment and the realignment timer. However, the UE 1h-20 may perform the deciphering procedure or header (or data) decompression by applying the security key or header decompression context for the source BS 1h-05 to the plurality of items of data (e.g., the plurality of items of data received from the source BS 1h-05) stored for reordering in the buffer, and then may discard the security key or the header decompression context for the source BS 1h-05. In addition, the UE 1h-20 may provide the plurality of items of processed data to the upper layer in ascending order. For example, when the second condition is satisfied, the UE 1h-20 may perform the deciphering procedure or header (or data) decompression by applying the security key or header decompression context for the source BS 1h-05 to the plurality of items of data (e.g., the plurality of items of data received from the source BS 1h-05) stored for reordering in the buffer, and then may discard the security key or the header decompression context for the source BS 1h-05. The UE 1h-20 may release QoS mapping information of the SDAP layer, security key information of the PDCP layer for the source BS 1h-05, header (or data) compression context information for the source BS 1h-05, or the RLC layer or the MAC layer for the source BS 1h-05.

When the second condition proposed in the disclosure is satisfied when the UE 1h-20 performs the DAPS handover method, the UE 1h-20 may release first bearers for the source BS 1h-05 with respect to the second SDAP layer architecture and function 1j-20 that have been applied to each bearer or a bearer for which the DAPS handover method is indicated, and may switch the second SDAP layer architecture and function 1j-20 to the first SDAP layer architecture or function 1j-10 and 1j-12 and apply the first SDAP layer architecture or function 1j-10 and 1j-12. In addition, when the second condition is satisfied, the UE 1h-20 may switch the second SDAP layer architecture and function 1j-20 to the first SDAP layer architecture or function 1j-10 and 1j-12 proposed in the disclosure with respect to each bearer or a bearer for which the DAPS handover method is indicated. Here, the UE 1h-20 may maintain the second bearer or the second QoS flow and the bearer mapping information for the target BS 1h-10. Before the UE 1h-20 releases the first bearer or the first QoS flow and the bearer mapping information for the source BS 1h-05, the UE 1h-20 may complete data processing by applying the first QoS flow and the bearer mapping information to a plurality of items of data received from the source BS 1h-05 (e.g., all data received from the source BS 1h-05), and then may release the first QoS flow and the bearer mapping information or the first bearer. Thereafter, the UE 1h-20 may provide the plurality of items of processed data to the upper layer in ascending order. For example, when the second condition is satisfied, the UE 1h-20 may process data (e.g., a procedure of reading SDAP header information and updating mapping information or configuring a SDAP header, or routing or providing the processed data to an upper layer or a lower layer which is appropriate based on the first QoS flow and the bearer mapping information) by applying the first QoS flow and the bearer mapping information for the source BS 1h-05 to a plurality of items of data stored in the buffer (e.g., a plurality of items of data received from the source BS 1h-05), and then may discard the first QoS flow and the bearer mapping information for the source BS 1h-05. The SDAP layer may define and apply information indicated by a 1-bit indicator of a new SDAP header, a 1-bit indicator of a new PDCP header, SDAP control data (e.g., DL End marker), or the PDCP layer. Thereafter, the SDAP layer may identify which data is most recently received from the source BS 1h-05, based on the information. Therefore, the SDAP layer may perform data processing on the data by applying the first QoS flow and the bearer mapping information for the source BS 1h-05, the data being most recently received from the source BS 1h-05, and then may discard the first QoS flow and the bearer mapping information for the source BS 1h-05. In addition, the SDAP layer may continuously maintain the second QoS flow and the bearer mapping information, and may process UL data or DL data with respect to the target BS 1h-10, based on the second QoS flow and the bearer mapping information.

When the UE 1h-20 resets the MAC layer for the source BS 1h-05 and switches the second PDCP layer architecture for the bearer configured with the DAPS handover method to the first PDCP layer architecture, the UE 1h-20 may perform a RLC layer re-establishment procedure or a RLC layer release procedure on the RLC layer for the source BS 1h-05 in the second PDCP layer architecture.

A reception PDCP layer may process received data or store data due to a re-establishment procedure of a lower layer (e.g., the RLC layer), and a header decompression procedure may be performed, based on ROHC or ethernet header compression (EHC) (for the source BS 1h-05), on a plurality of pieces of stored data or all stored data (received from the source BS 1h-05) with respect to UM DRBs.

The reception PDCP layer may process received data or store data due to a re-establishment procedure of a lower layer (e.g., the RLC layer), and a header decompression procedure may be performed, based on ROHC or EHC (for the source BS 1h-05), on a plurality of pieces of stored data or all stored data (received from the source BS 1h-05) with respect to AM DRBs.

As another method, the reception PDCP layer may process received data or store data due to a re-establishment procedure of a lower layer (e.g., the RLC layer), and when an indicator (drb-Continue ROHC or drb-Continue EHC) indicating to keep using header compression context is not configured for UM DRBs or AM DRBs, a header decompression procedure may be performed, based on ROHC or EHC, on a plurality of pieces of stored data or all stored data (received from the source BS 1h-05).

After the procedure is performed, a transmission PDCP layer or the reception PDCP layer may discard or release the security key or header compression contexts for the source BS 1h-05.

When a BS referring to FIG. 1F of the disclosure transmits the handover command message to a UE in operation 1f-20, the BS may define indicators related to embodiments of the disclosure in the handover command message (e.g., an RRCReconfiguration message), and may indicate, to the UE, which handover procedure corresponding to which embodiment is to be triggered. Thereafter, the UE may perform a handover procedure according to a handover method indicated in the handover command message. For example, the UE may perform Embodiment 2 (the DAPS handover method) of the efficient handover method proposed in the disclosure, thereby performing handover to the target BS 1h-10 while minimizing a data interruption time. As another method, the handover command message may define indicators for respective bearers, the indicators being related to embodiments of the disclosure, in the handover command message, and may further particularly indicate which embodiment is to be applied to which bearer in handover. For example, Embodiment 2 of the disclosure may be indicated to be applied only to the AM bearer for which the RLC layer operating in the AM mode is active, or may be extensively applied to the UM bearer for which the RLC layer operating in the UM mode is active. It is assumed that embodiments of the disclosure are applied to a DRB. However, when required (e.g., in a case where the UE maintains a SRB for the source BS 1h-05 and fails to perform handover to the target BS 1h-10, and thus the UE can report a handover failure message via the SRB for the source BS 1h-05 or can recover a link), embodiments of the disclosure may be extensively applied to the SRB.

In embodiments of the disclosure, when the UE 1h-20 performs data transmission and reception to and from the source BS 1h-05 by using the protocol layers for the first bearer and performs data transmission and reception to and from the target BS 1h-10 by using the protocol layers for the second bearer, the MAC layer for the first bearer and the MAC layer for the second bearer may each operate a discontinuous reception (DRX) period, thereby reducing battery consumption in the UE 1h-20. For example, even after the UE 1h-20 receives the handover command message, the UE 1h-20 may continuously apply the DRX period of the MAC layer that was applied when transmitting and receiving data by using the protocol layers for the first bearer. The UE 1h-20 may discontinue the DRX period according to the first condition or the second condition. In addition, the UE 1h-20 may manage, in response to indication from the target BS 1h-10, whether to separately apply the DRX period to the MAC layer for the second bearer.

In the disclosure, the meaning that the UE 1h-20 discontinues UL transmission to the source BS 1h-05 by using the protocol layers for the first bearer and discontinues DL data reception from the source BS 1h-05 may mean that the UE 1h-20 re-establishes, resets, or releases the protocol layers (the PHY layer, the MAC layer, the RLC layer, or the PDCP layer) for the first bearer.

In embodiments of the disclosure, for convenience of description, it is described that the UE 1h-20 configures the first bearer for the source BS 1h-05 or the second bearer for the target BS 1h-10, and embodiments of the disclosure may be easily extended and equally applied to a case in which the UE 1h-20 configures a plurality of first bearers for the source BS 1h-05 or a plurality of second bearers for the target BS 1h-10. In addition, embodiments of the disclosure may be extended and equally applied to a case in which a plurality of bearers for a plurality of target BS s 1h-10 are configured. For example, the UE 1h-20 may configure second bearers while performing a handover procedure on the first target BS 1h-10, and when handover fails, the UE 1h-20 configures second bearers while performing a handover procedure on the second target BS 1h-10, such that the UE 1h-20 may autonomously detect and determine cells satisfying a certain condition (e.g., a signal whose strength being equal to or greater than a certain value) from among a plurality of cells, may determine one cell and then may perform a handover procedure on the cell.

Figure 1I:
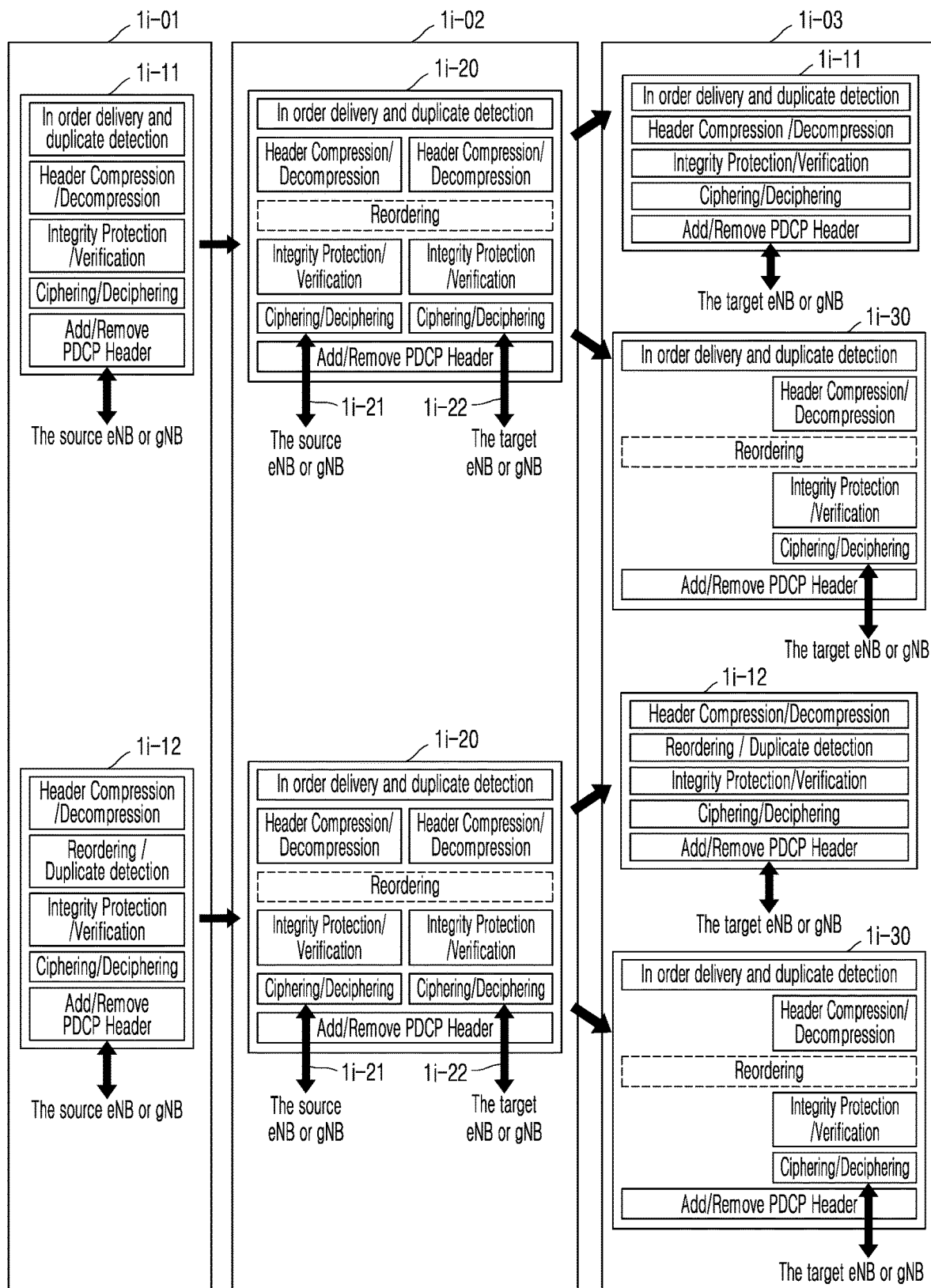
FIG. 1I illustrates architectures of an efficient packet data convergence protocol (PDCP) layer which are to be applied to a dual active protocol stack (DAPS) handover method that is Embodiment 2 of an efficient handover method, and a method of applying architectures according to an embodiment of the disclosure.

FIG. 1I illustrates architectures of an efficient PDCP layer which are to be applied to the DAPS handover method that is Embodiment 2 of an efficient handover method, and a method of applying architectures according to an embodiment of the disclosure.

Referring to FIG. 1I, the disclosure proposes particular architectures and functions of the efficient PDCP layer which are to be applied to the DAPS handover method that is Embodiment 2 of the efficient handover method proposed in the disclosure, and the architectures of the PDCP layer to be proposed below are characterized in that, when a DAPS handover procedure is performed, different PDCP layer architectures may be applied to respective bearers at different time points.

For example, before the UE receives a handover command message from a BS, the UE may process and transmit or receive data by applying the first PDCP layer architecture and functions 1*i*-11 or 1*i*-12 proposed in the disclosure to each bearer in operation 1*i*-01.

However, when the UE receives a handover command message from the BS, and the handover command message indicates the DAPS handover method proposed in the disclosure or indicates the DAPS handover method for particular bearers, the UE may process and transmit or receive data by applying the second PDCP layer architecture and function 1*i*-20 proposed in the disclosure to each bearer or bearers for which the DAPS handover method is indicated in operation 1*i*-02. For example, when the UE receives the handover command message from the BS, and the handover command message indicates the DAPS handover method proposed in the disclosure or indicates the DAPS handover method for particular bearers, the UE may switch the first PDCP layer architecture or function 1*i*-11 or 1*i*-12, which is used for each bearer, to the second PDCP layer architecture or function 1*i*-20 proposed in the disclosure with respect to each bearer or a bearer for which the DAPS handover method is indicated.

As another method, when the first condition proposed in the disclosure is satisfied, the UE may switch the first PDCP layer architecture or function 1*i*-11 or 1*i*-12, which is used for each bearer, to the second PDCP layer architecture or function 1*i*-20 proposed in the disclosure with respect to each bearer or a bearer for which the DAPS handover method is indicated in operation 1*i*-02. In addition, in a case where the UE receives the handover command message from the BS, and the handover command message indicates the DAPS handover method proposed in the disclosure or indicates the DAPS handover method for particular bearers, or a PDCP realignment timer value is newly set, when the UE switches the first PDCP layer architecture or function 1*i*-11 or 1*i*-12 to the second PDCP layer architecture or function 1*i*-20 proposed in the disclosure with respect to each bearer or a bearer for which the DAPS handover method is indicated, the UE may update a variable for realignment to a PDCP SN or a COUNT value, which is predicted to be received next, and may stop and restart a realignment timer.

When the second condition proposed in the disclosure is satisfied when the UE performs the DAPS handover method proposed in the disclosure, the UE may release, from first bearers for the source BS, the second PDCP layer architecture and function 1*i*-20 applied to each bearer or a bearer for which the DAPS handover method is indicated, and may switch back to the first PDCP layer architecture and function 1*i*-11 or 1*i*-12 and may apply the first PDCP layer architecture and function 1*i*-11 or 1*i*-12. When the second condition is satisfied, and the UE switches the second PDCP layer architecture or function 1*i*-20 to the first PDCP layer architecture or function 1*i*-11 or 1*i*-12 proposed in the disclosure with respect to each bearer or a bearer for which the DAPS handover method is indicated, the UE may reset the variable for realignment, and may stop and reset the realignment timer. Thereafter, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. In addition, the UE may provide the plurality of items of processed data to the upper layer in ascending order. For example, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS.

As another method, when the second condition proposed in the disclosure is satisfied when the UE performs the DAPS handover method proposed in the disclosure, the UE may release, from bearers for the source BS, the second PDCP layer architecture and function 1*i*-20 applied to each bearer or a bearer for which the DAPS handover method is indicated, and may switch to the third PDCP layer architecture or function 1*i*-30 and may apply the third PDCP layer architecture or function 1*i*-30. When the second condition is satisfied and thus the UE switches the second PDCP layer architecture or function 1*i*-20 to the third PDCP layer architecture or function 1*i*-30 proposed in the disclosure with respect to each bearer or a bearer for which the DAPS handover method is indicated, the UE may not stop nor reset but may continuously use the variable for realignment and the realignment timer. However, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS. Afterward, the UE may provide the plurality of items of processed data to the upper layer in ascending order. For example, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS.

Referring to FIG. 1I of the disclosure, when the UE performs handover by applying, to respective bearers, the first PDCP layer architecture or function 1*i*-11 or 1*i*-12, the second PDCP layer architecture or function 1*i*-20, or the third PDCP layer architecture or function 1*i*-30, which are different from each other, at different time points, the UE may prevent data loss and may minimize a data interruption time.

The first PDCP layer architecture 1*i*-11 or 1*i*-12 proposed in FIG. 1I may have a 1-1 PDCP layer architecture, a 1-2 PDCP layer architecture, a 1-3 PDCP layer architecture, or a 1-4 PDCP layer architecture, which are proposed in the disclosure, and an embodiment of the disclosure may have characteristics to be described below.

1> (When it is the 1-1 PDCP layer architecture,) for example, when the UE applies the first PDCP layer architecture and function 1*i*-11 to a PDCP layer (e.g., E-UTRA PDCP layer or LTE PDCP layer) connected to an AM RLC layer (e.g., E-UTRA AM RLC layer), the PDCP layer may have characteristics below.

2> The reception PDCP layer may first perform detection of out-of-window data or duplicate data on a plurality of items of received data. (Retransmission may occur in RLC AM, and sizes of LTE RLC SN and PDCP SN may be different, such that the duplicate data or the out-of-window data may be received. In the above, window indicates a range of PDCP SNs or COUNT values, in which valid data is received.)

3> Before the UE discards the out-of-window data or the duplicate data, the UE performs a deciphering procedure and a header decompression procedure and then performs a discard operation. (Because the data may include useful information (e.g., initialization and refresh (IR)) packet or header compression information) for the header decompression procedure, the UE may determine and then discard the data.)

2> The UE may immediately decipher a plurality of items of data without ordering, the data being received without being discarded, and may perform a header decompression procedure. This is because the E-UTRA AM RLC layer performs ordering on the plurality of items of data and provides the plurality of items of data to the PDCP layer.

2> Thereafter, the plurality of items of data are provided to an upper layer in ascending order of COUNT values.

1> (When it is the 1-2 PDCP layer architecture,) for example, when the UE applies the first PDCP layer architecture and function 1i-11 to the PDCP layer (e.g., the E-UTRA PDCP layer or the LTE PDCP layer) connected to an UM RLC layer (e.g., E-UTRA UM RLC layer), an embodiment of the disclosure may have characteristics below.

2> The PDCP layer may be configured to not perform a procedure of detecting out-of-window data or duplicate data. This is because the UM E-UTRA RLC layer does not perform a retransmission procedure.

2> Thereafter, the PDCP layer may be configured to immediately perform a deciphering procedure and then a header decompression procedure on the plurality of items of received data.

2> Thereafter, the PDCP layer may perform a reordering procedure and then may provide the plurality of items of data (e.g., in ascending order) to its immediate upper layer.

1> (When it is the 1-3 PDCP layer architecture,) for example, when the UE applies the first PDCP layer architecture 1i-11 to the PDCP layer (e.g., the E-UTRA PDCP layer or the LTE PDCP layer) configured for a split bearer, a packet duplication bearer, or a LTE WLAN aggregation (LWA) bearer, an embodiment of the disclosure may always apply a reordering procedure and a realignment timer and the PDCP layer may have characteristics below.

2> The PDCP layer may be configured to first perform detection of out-of-window data or duplicate data on a plurality of items of received data. (Retransmission may occur in RLC AM, data may be received at different time points from different RLC layers, and sizes of LTE RLC SN and PDCP SN may be different, such that the out-of-window data or the duplicate data may be received.)

3> The PDCP layer performs a deciphering procedure. However, the PDCP layer is configured to not perform a header decompression procedure. (It is because the E-UTRA PDCP layer cannot configure a header compression protocol for the split bearer or the LWA bearer).

3> When an integrity protection or verification procedure has been performed, the PDCP layer may perform the integrity protection verification procedure and then may discard data. When the integrity verification procedure fails, the PDCP layer may discard the data and may report the failure to its upper layer.

3> The PDCP layer discards the out-of-window data or the duplicate data.

2> When the data is not discarded, the PDCP layer may be configured to immediately perform a deciphering procedure without reordering on a plurality of items of received data. Afterward, when the integrity protection or verification procedure is configured, the PDCP layer may perform integrity verification. When the integrity protection or verification procedure is performed, the PDCP layer may discard data after the integrity protection or verification procedure. When the integrity verification procedure fails, the PDCP layer may discard the data and may report the failure to the upper layer.

2> Afterward, the PDCP layer may perform reordering on a plurality of items of received data, and when PDCP SNs or COUNT values are sequentially aligned in ascending order without a gap therebetween, the PDCP layer may perform a header compression procedure (when the header compression procedure or a header decompression procedure is configured) and may provide the data to the upper layer in ascending order.

2> In a case where a realignment timer is running,

3> when data is provided to the upper layer, the data corresponding to COUNT value having the same value as a value obtained by subtracting 1 from a value a variable for realignment maintains, or when the plurality of items of data are all provided to the upper layer without a gap between PDCP SNs (COUNT values), 4> the PDCP layer stops and resets the realignment timer.

2> In a case where the realignment timer is not running,

3> when a buffer stores data that is not provided to the upper layer, or when there is a gap between PDCP SNs (COUNT values), 4> the PDCP layer starts the realignment timer.

4> Thereafter, the PDCP layer updates the variable for realignment to a PDCP SN or a COUNT value which is predicted to be received next time.

2> In a case where the realignment timer is expired,

3> when a header decompression procedure is configured to values of a plurality of items of stored data, the values being smaller than the variable for realignment, in ascending order of PDCP SNs or COUNT values, the PDCP layer performs the header decompression procedure and provides the data to the upper layer.

3> When a header decompression procedure is configured to values of a plurality of items of stored data, the values being equal to or greater than the variable for realignment, in ascending order of PDCP SNs or COUNT values, the PDCP layer performs the header decompression procedure and provides the data to the upper layer.

3> Thereafter, the PDCP layer updates a variable value of data, which is most recently provided to the upper layer, to a PDCP SN or a COUNT value of the data most recently provided to the upper layer.

3> When a buffer stores data that is not provided to the upper layer, or when there is a gap between PDCP SNs (COUNT values),
4> the PDCP layer starts the realignment timer.
4> Thereafter, the PDCP layer updates the variable for realignment to a PDCP SN or a COUNT value which is predicted to be received next time.
1> (When it is the 1-4 PDCP layer architecture) for example, when the UE applies the first PDCP layer architecture and function 1$i$-12 to a NR PDCP layer, the UE may always apply a reordering procedure and a realignment timer, and the NR PDCP layer may have characteristics below.
2> The NR PDCP layer may first perform a deciphering procedure on a plurality of items of received data.
2> When an integrity protection or verification procedure is configured, the NR PDCP layer may perform the integrity protection or verification procedure on the received data, and when the integrity verification procedure fails, the NR PDCP layer may discard the data and may report the failure to its upper layer.
2> The NR PDCP layer performs detection of out-of-window data or duplicate data on the received data. (The disclosure may be characterized in that the deciphering procedure is first performed and then the detection of out-of-window data or duplicate data is performed. As another method, in a case where the deciphering procedure is performed only when the integrity protection or verification procedure is configured, and then the detection of out-of-window data or duplicate data is performed but the integrity protection or verification procedure is not configured, the deciphering procedure may be performed only on a plurality of items of data on which the detection of out-of-window data or duplicate data is performed and that are not discarded.)
3> The NR PDCP layer discards the out-of-window data or the duplicate data.
2> When the data is not discarded, the NR PDCP layer may perform reordering on a plurality of items of received data, and when PDCP SNs or COUNT values are sequentially aligned in ascending order without a gap therebetween, the NR PDCP layer may perform a header compression procedure (when the header compression procedure or a header decompression procedure is configured) and may provide the data to the upper layer in ascending order.
2> Thereafter, the NR PDCP layer provides the data to the upper layer, in ascending order of COUNT values.
2> In a case where a realignment timer is running,
3> when data is provided to the upper layer, the data corresponding to COUNT value having the same value as a value obtained by subtracting 1 from a value a variable for realignment maintains, when the plurality of items of data are all provided to the upper layer without a gap between PDCP SNs (COUNT values), or when a value of a variable storing a PDCP SN or a COUNT value of data to be provided to the upper layer is equal to or greater than a value of a variable for realignment,
4> the NR PDCP layer stops and resets the realignment timer.
2> In a case where the realignment timer is not running,
3> when a buffer stores data that is not provided to the upper layer, when there is a gap between PDCP SNs (COUNT values), or when a value of a variable storing a COUNT value of first data that is not provided to the upper layer is smaller than a value of a variable for realignment,
4> the NR PDCP layer updates the variable for realignment to a PDCP SN or a COUNT value which is predicted to be received next time.
4> The NR PDCP layer starts the realignment timer.
2> In a case where the realignment timer is expired,
3> when a header decompression procedure is configured to values of a plurality of items of stored data, the values being smaller than the variable for realignment, in ascending order of PDCP SNs or COUNT values, the NR PDCP layer performs the header decompression procedure and provides the data to the upper layer.
3> When a header decompression procedure is configured to values of a plurality of items of stored data, the values being equal to or greater than the variable for realignment, in ascending order of PDCP SNs or COUNT values, the NR PDCP layer performs the header decompression procedure and provides the data to the upper layer.
3> Thereafter, the NR PDCP layer updates a variable value of first data, which is not provided to the upper layer, to a PDCP SN or a COUNT value of the first data that is not provided to the upper layer.
3> When a buffer stores data that is not provided to the upper layer, or when there is a gap between PDCP SNs (COUNT values), or when a value of a variable storing the COUNT value of the first data that is not provided to the upper layer is smaller than the value of the variable for realignment,
4> the NR PDCP layer updates the variable for realignment to a PDCP SN or a COUNT value which is predicted to be received next time.
4> The NR PDCP layer starts the realignment timer.

The second PDCP layer architecture or function 1$i$-20 proposed in FIG. 1I may have a 2-1 PDCP layer architecture or a 2-2 PDCP layer architecture, which are proposed in the disclosure, and may have characteristics to be described below.

The disclosure proposes the second PDCP layer architecture 1$i$-20 which is efficient in handover. The second PDCP layer architecture may be applied to Embodiment 2 of the efficient handover method for minimizing a data interruption time, which is proposed in the disclosure.

In the second PDCP layer architecture, the UE may perform data transmission or reception from or to a source BS 1$i$-21 by using protocol layers (e.g., a SDAP layer, a PDCP layer, an RLC layer, or a MAC layer) for a first bearer.

In an embodiment of the disclosure, a PDCP layer function for the source BS may include a transmission PDCP layer function for the source BS or a reception PDCP layer function for the source BS.

In an embodiment of the disclosure, a PDCP layer function 1$i$-21 may indicate a lower function of the transmission PDCP layer function for the source BS.

In an embodiment of the disclosure, the PDCP layer function 1$i$-21 may indicate a lower function of the reception PDCP layer function for the source BS.

According to an embodiment of the disclosure, reference numeral 1$j$-21 or 1$v$-21 may indicate the same object as that of 1$i$-21. The UE may perform data transmission or reception from or to a target BS 1$i$-22 by using protocol layers (e.g., a SDAP layer, a PDCP layer, an RLC layer, or a MAC layer) for a second bearer.

In an embodiment of the disclosure, a PDCP layer function for the target BS may include a transmission PDCP layer function for the target BS or a reception PDCP layer function for the target BS.

In an embodiment of the disclosure, a PDCP layer function 1*i*-22 may indicate a lower function of the transmission PDCP layer function for the target BS.

In an embodiment of the disclosure, the PDCP layer function 1*i*-22 may indicate a lower function of the reception PDCP layer function for the target BS.

According to an embodiment of the disclosure, reference numeral 1*j*-22 or 1*v*-22 may indicate the same object as that of 1*i*-22.

The PDCP layer for the first bearer and the PDCP layer for the second bearer may each be configured in the UE but may logically operate as one PDCP layer as shown in 1*i*-20. More specifically, by distinguishing between functions of a PDCP layer, one PDCP layer may be implemented as functions (e.g., an SN allocation function, a realignment function, an in-sequence delivery function, or a duplicate detection function) of an upper PDCP layer and functions (e.g., a deciphering or ciphering function, a header (or data) compression or decompression function, an integrity protection or verification function, or a duplicate detection function) of two lower PDCP layers respectively for the source BS and the target BS. In addition, as proposed above, when the DAPS handover method is performed, the UE may transmit UL data transmission to the source BS, and when the first condition is satisfied, the UE may switch to the target BS and may continuously receive DL data from the source BS and the target BS. Therefore, only one header (or data) compression protocol context for the source BS or the target BS may be maintained and applied to a UL, and two contexts for the source BS or the target BS may be maintained and applied to a DL.

The 2-1 PDCP layer architecture (e.g., an E-UTRA PDCP layer for the DAPS handover method) proposed in the disclosure, based on the second PDCP layer architecture, may have characteristics below.

An upper function of the transmission PDCP layer function may serve to allocate PDCP SNs to a plurality of items of data received from an upper layer. Two lower function of the transmission PDCP layer functions 1*i*-21 and 1*i*-22 respectively for the source BS and the target BS may serve to apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data) compression procedure when the header (or data) compression procedure is configured. When integrity protection is configured, the lower function of the transmission PDCP layer functions 1*i*-21 and 1*i*-22 may serve to apply a ciphering procedure by applying an integrity protection procedure to a PDCP header and data (PDCP SDU), may provide the data to be transmitted to the source BS to a transmission RLC layer for the first bearer, and may provide the data to be transmitted to the target BS to a transmission RLC layer for the second bearer, thereby performing transmission. In order to accelerate a data processing speed, the two lower function of the transmission PDCP layer functions 1*i*-21 and 1*i*-22 may serve to perform parallel processing of header compression, integrity protection, or a ciphering procedure. In addition, the two lower function of the transmission PDCP layer functions 1*i*-21 and 1*i*-22 may serve to perform the integrity protection or the ciphering procedure by using different security keys. In addition, compression, integrity protection, or a ciphering procedure on a plurality of items of different data may be performed by applying different compression contexts, different security keys, or different security algorithms in a logically-one transmission PDCP layer.

In the aforementioned situation, a reception PDCP layer function that is the lower function of the reception PDCP layer functions 1*i*-21 and 1*i*-22 for the source BS or the target BS may each independently serve to perform an out-of-window data detection or duplicate detection procedure on a plurality of items of data received from each of RLC layers, based on PDCP SNs or COUNT values, with respect to a plurality of items of data received from each of lower layers, in particular, with respect to a plurality of items of data received from two RLC layers for each of the source BS and the target BS. As another method, for convenience of implementation, the out-of-window data detection or duplicate detection procedure may be performed on all received data, based on PDCP SNs or COUNT values, without distinguishing between the RLC layers. As another method, for more accurate duplicate detection, the out-of-window data detection may be performed on all received data, based on PDCP SNs or COUNT values, without distinguishing between the RLC layers, and the duplicate detection procedure may be separately performed on a plurality of items of data received from each of the RLC layers. As another method, when a plurality of items of data received from different BSs are overlapped each other, in order to prevent data loss for a header compression protocol, the out-of-window data detection may be performed on all received data, based on PDCP SNs or COUNT values, without distinguishing between the RLC layers. In addition, the duplicate detection procedure may be performed on all data after a deciphering procedure, an integrity protection procedure, or a header (or data) decompression procedure is received with respect to a plurality of items of data received from each of the RLC layers.

Sub-functions of the reception PDCP layer may serve to immediately apply a deciphering procedure to a plurality of items of received data, by using separate header (or data) compression context or security key separately configured with the source BS and the target BS. When integrity protection is configured, the sub-functions of the reception PDCP layer may serve to apply an integrity verification procedure to the PDCP header and the data (PDCP SDU).

In the 2-1 PDCP layer architecture, a header (or data) decompression procedure may be immediately performed, without reordering, on a plurality of items of data received from RLC layers for the first bearer corresponding to the source BS, and a header (or data) decompression procedure may be immediately performed, without reordering, on a plurality of items of data received from RLC layers for the second bearer corresponding to the target BS. In addition, to distinguish between the data received from the RLC layers for the first bearer corresponding to the source BS and the data received from the RLC layers for the second bearer corresponding to the target BS, an indicator is defined for each data, such that the PDCP layer may identify whether the data is received from the source BS or the target BS. As another method, a 1-bit indicator is defined in a PDCP header, a SDAP header, or an RLC header, such that the PDCP layer may identify whether the data is received from the source BS or the target BS. In addition, the duplicate detection procedure (a procedure in which only one data (including pre-received data or data provided to the upper layer) is allocated for each PDCP SN or each COUNT value and the others are all discarded) may be performed, based on a PDCP SN or a COUNT value, on all of the plurality of items of data received from RLC layers for the first bearer corresponding to the source BS and the plurality of items of data received from RLC layers for the second bearer corresponding to the target BS, wherein the header (or data) compression procedure has been completed with respect to the plurality of items of data. Thereafter, a realignment procedure may be performed on all of the plurality of items of data received from RLC layers for the first bearer corresponding to the source BS and the plurality of items of data received from RLC layers for the second bearer corresponding to the target BS, in ascending order based on PDCP SNs or COUNT values, and the plurality of items of data may be sequentially provided to the upper layer. Because the PDCP layer can receive data in no order from different BSs, i.e., from the first bearer or the second bearer, the PDCP layer may have to always perform the realignment procedure.

In order to accelerate a data processing speed, the two lower function of the reception PDCP layer functions may serve to perform parallel processing of header compression, integrity protection, or a ciphering procedure, based on each PDCP SN or each COUNT value. The integrity protection, the ciphering procedure, or the header decompression procedure may be performed by using different header (or data) compression contexts or different security keys. The integrity protection, the ciphering procedure, or the decompression procedure may be performed on a plurality of items of different data by applying different header (or data) compression contexts, different security keys, or different security algorithms in logically-one transmission PDCP layer. In addition, the lower function of the reception PDCP layer functions may serve to perform out-of-sequence deciphering or integrity verification procedure on each of a plurality of items of data received without relation to order of PDCP SNs or COUNT values.

When a PDCP layer distinguishes layers for the first bearer from layers for the second bearer, the PDCP layer may distinguish the layers (or a first RLC layer) for the first bearer from the layers (or a second RLC layer) for the second bearer, in consideration that the layer for the first bearer and the layer for the second bearer are connected to different MAC layers, have different logical channel identifiers, are different RLC layers connected to different MAC layers, or use different ciphering keys, and by doing so, a ciphering procedure or a deciphering procedure may be performed on UL data and DL data by using different security keys, and the UL data and the DL data may be compressed or decompressed by using different compression protocol contexts.

The 2-2 PDCP layer architecture (e.g., an NR PDCP layer for the DAPS handover method) proposed in the disclosure, based on the second PDCP layer architecture, may have characteristics below.

An upper function of the transmission PDCP layer function may serve to allocate PDCP SNs to a plurality of items of data received from its upper layer. The two lower function of the transmission PDCP layer functions 1$i$-21 and 1$i$-22 respectively for the source BS and the target BS may serve to apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data) compression procedure when the header (or data) compression procedure is configured, and when integrity protection is configured, the lower function of the transmission PDCP layer functions 1$i$-21 and 1$i$-22 may serve to apply a ciphering procedure by applying an integrity protection procedure to a PDCP header and data (PDCP SDU), may provide the data to be transmitted to the source BS to a transmission RLC layer for the first bearer, and may provide the data to be transmitted to the target BS to a transmission RLC layer for the second bearer, thereby performing transmission.

In order to accelerate a data processing speed, the two lower function of the transmission PDCP layer functions 1$i$-21 and 1$i$-22 may serve to perform parallel processing of header compression, integrity protection, or a ciphering procedure. In addition, the two lower function of the transmission PDCP layer functions 1$i$-21 and 1$i$-22 may serve to perform the integrity protection or the ciphering procedure by using different security keys. In addition, compression, integrity protection, or a ciphering procedure on a plurality of items of different data by applying different compression contexts, different security keys, or different security algorithms may be performed in logically-one transmission PDCP layer.

In the aforementioned situation, a reception PDCP layer function that is the lower function of the reception PDCP layer functions 1$i$-21 and 1$i$-22 for the source BS or the target BS may each independently serve to perform an out-of-window data detection or duplicate detection procedure on a plurality of items of data received from each of RLC layers, based on PDCP SNs or COUNT values, with respect to a plurality of items of data received from each of lower layers, in particular, with respect to a plurality of items of data received from two RLC layers for each of the source BS and the target BS. As another method, for convenience of implementation, the out-of-window data detection or duplicate detection procedure based on PDCP SNs or COUNT values may be performed on all received data, without distinguishing between the RLC layers. As another method, for more accurate duplicate detection, the reception PDCP layer function may serve to perform the out-of-window data detection based on PDCP SNs or COUNT values on all received data, without distinguishing between the RLC layers, and separately perform the duplicate detection procedure on a plurality of items of data received from each of the RLC layers. As another method, when a plurality of items of data received from different BSs are overlapped with each other, in order to prevent data loss for a header compression protocol, the reception PDCP layer function may serve to perform the out-of-window data detection based on PDCP SNs or COUNT values on all received data without distinguishing between the RLC layers, and may perform the duplicate detection procedure on all data after a deciphering procedure, an integrity protection procedure, or a header (or data) decompression procedure is received with respect to a plurality of items of data received from each of the RLC layers.

Sub-functions of the reception PDCP layer may serve to immediately apply a deciphering procedure to a plurality of items of received data, by using separate header (or data) compression context or security key separately configured with the source BS and the target BS, and when integrity protection is configured, the sub-functions of the reception PDCP layer may serve to apply an integrity verification procedure to the PDCP header and the data (PDCP SDU).

In the 2-2 PDCP layer architecture, a reordering procedure may be performed on a plurality of items of data received from RLC layers for the first bearer corresponding to the source BS and a plurality of items of data received from RLC layers for the second bearer corresponding to the target BS, and may perform a header (or data) decompression procedure on the plurality of items of data received from each BS (the source BS or the target BS) in ascending order of PDCP SNs or COUNT values, by applying header (or data) compression context of each BS (the source BS or the target BS). In addition, to distinguish between the data received from the RLC layers for the first bearer corresponding to the source BS and the data received from the RLC layers for the second bearer corresponding to the target BS, an indicator is defined for each data, such that the PDCP layer may identify whether the data is received from the source BS or the target BS.

As another method, a 1-bit indicator is defined in a PDCP header, a SDAP header, or an RLC header, such that the PDCP layer may identify whether the data is received from the source BS or the target BS. In addition, the duplicate detection procedure based on a PDCP SN or a COUNT value (a procedure in which only one data (including pre-received data or data provided to the upper layer) is allocated for each PDCP SN or each COUNT value and the others are all discarded) may be performed on all of the plurality of items of data received from RLC layers for the first bearer corresponding to the source BS and the plurality of items of data received from RLC layers for the second bearer corresponding to the target BS, wherein the header (or data) compression procedure has been completed with respect to the plurality of items of data. Thereafter, all of the plurality of items of data received from RLC layers for the first bearer corresponding to the source BS and the plurality of items of data received from RLC layers for the second bearer corresponding to the target BS may be sequentially provided to the upper layer, in ascending order based on PDCP SNs or COUNT values. Because the PDCP layer can receive data in no order from different BSs, i.e., from the first bearer or the second bearer, the PDCP layer may have to always perform the realignment procedure.

In order to accelerate a data processing speed, the two lower function of the reception PDCP layer functions may serve to perform parallel processing of header compression, integrity protection, or a ciphering procedure, based on each PDCP SN or each COUNT value. In addition, the two lower function of the reception PDCP layer functions may serve to perform the integrity protection, the ciphering procedure, or the header decompression procedure by using different header (or data) compression contexts or different security keys. The integrity protection, the ciphering procedure, or the decompression procedure may be performed on a plurality of items of different data by applying different header (or data) compression contexts, different security keys, or different security algorithms in logically-one transmission PDCP layer. In addition, the lower function of the reception PDCP layer functions may serve to perform out-of-sequence deciphering or integrity verification procedure on each of a plurality of items of data received without relation to order of PDCP SNs or COUNT values.

When a PDCP layer distinguishes layers for the first bearer from layers for the second bearer, the PDCP layer may distinguish the layers (or a first RLC layer) for the first bearer from the layers (or a second RLC layer) for the second bearer, in consideration that the layer for the first bearer and the layer for the second bearer are connected to different MAC layers, have different logical channel identifiers, are different RLC layers connected to different MAC layers, or use different ciphering keys, and by doing so, a ciphering procedure or a deciphering procedure may be performed on UL data and DL data by using different security keys, and the UL data and the DL data may be compressed or decompressed by using different compression protocol contexts.

In the disclosure, provided is a third PDCP layer architecture 1$i$-30 which is efficient in handover. The third PDCP layer architecture may be applied to Embodiment 2 of the efficient handover method for minimizing a data interruption time, which is proposed in the disclosure. A PDCP layer function in the third PDCP layer architecture proposed in the disclosure may be equal to the second PDCP layer architecture proposed in the disclosure. However, the third PDCP layer architecture may correspond to architecture from which the first bearer for the source BS in the second PDCP layer architecture is released. More specifically, the third PDCP layer architecture proposed in the disclosure may have same functions as those of the second PDCP layer architecture but may have architecture from which the first bearer (e.g., the SDAP layer, the PDCP layer, the RLC layer, or the MAC layer) for the source BS is released. Therefore, the third PDCP layer architecture may release QoS mapping information of the SDAP layer for the source BS, security key information for the PDCP layer for the source BS, header (or data) compression context information for the source BS, or the RLC layer or the MAC layer for the source BS.

Figure 1J:
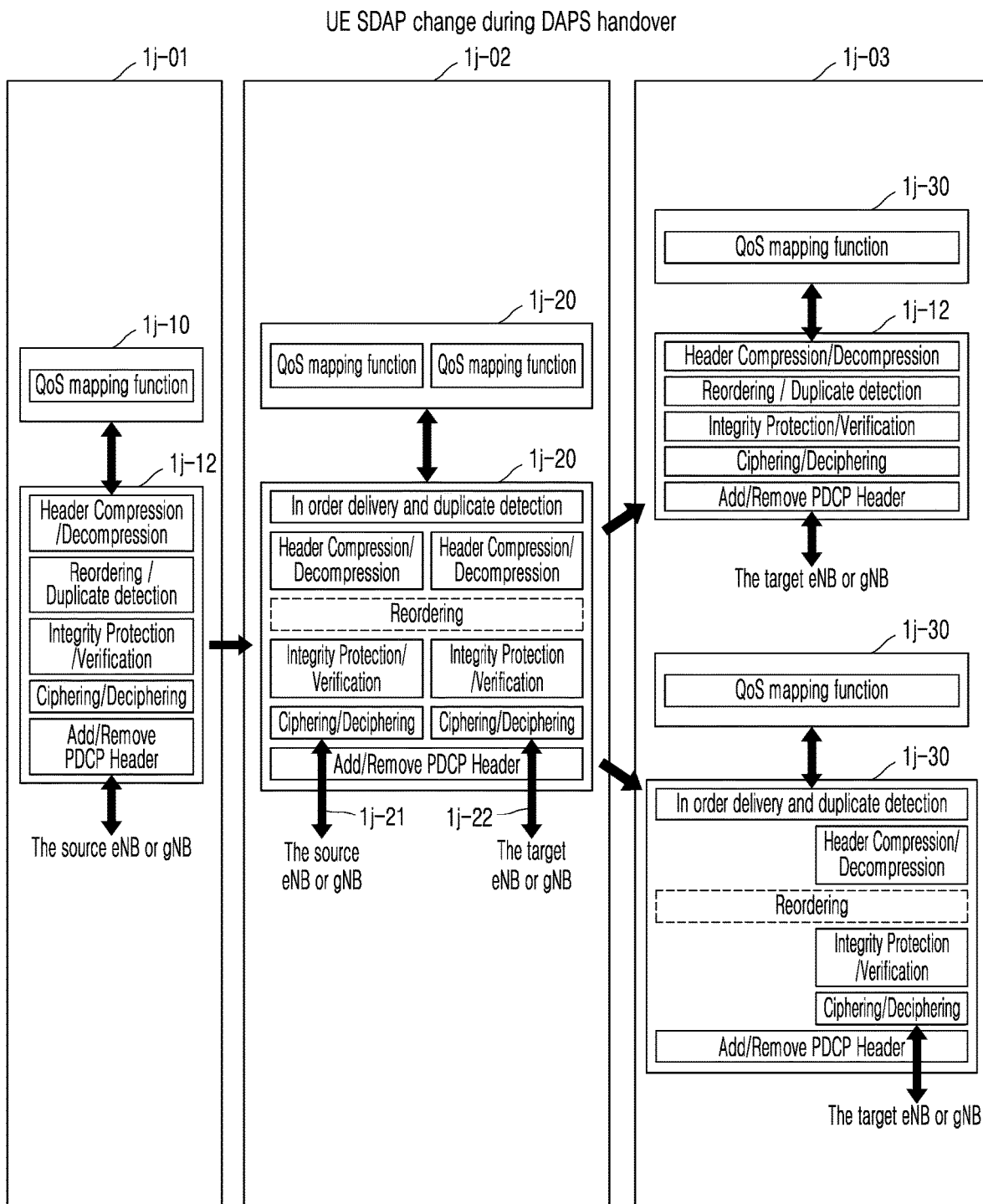
FIG. 1J illustrates architectures of an efficient service data adaptation protocol (SDAP) layer which are to be applied to a DAPS handover method that is Embodiment 2 of an efficient handover method, and a method of applying architectures according to an embodiment of the disclosure.

FIG. 1J illustrates architectures of an efficient SDAP layer which are to be applied to a DAPS handover method that is Embodiment 2 of an efficient handover method, and a method of applying architectures according to an embodiment of the disclosure.

Referring to FIG. 1J, the disclosure proposes particular architectures and functions of the efficient SDAP layer which are to be applied to the DAPS handover method that is Embodiment 2 of the efficient handover method proposed in the disclosure, and the architectures of the SDAP layer to be proposed below are characterized in that, when a DAPS handover procedure is performed, different SDAP layer architectures may be applied to each bearer at different time points.

For example, before a UE receives a handover command message from a BS, the UE may process and transmit or receive data by applying the first SDAP layer architecture and functions 1$j$-10 and 1$j$-12 proposed in the disclosure to each bearer in operation 1$j$-01. In the first SDAP layer architecture, the SDAP layer may perform data processing (e.g., a procedure of reading SDAP header information and updating mapping information or configuring a SDAP header, or routing or providing the processed data to an upper layer or a lower layer which is appropriate based on the first QoS flow and the bearer mapping information) on a plurality of items of UL data to be transmitted or a plurality of items of received DL data (e.g., a plurality of items of data received from the source BS) by maintaining and applying a first QoS flow and bearer mapping information for the source BS.

However, when the UE receives a handover command message from the BS, and the DAPS handover method proposed in the disclosure is indicated in the handover command message or the DAPS handover method is indicated for particular bearers, the UE may process and transmit or receive data by applying the second PDCP layer architecture and function 1$j$-20 proposed in the disclosure to each bearer or bearers for which the DAPS handover method is indicated in operation 1$j$-02. For example, when the UE receives the handover command message from the BS, and the handover command message indicates the DAPS handover method proposed in the disclosure, indicates the DAPS handover method for particular bearers, configures the DAPS handover method for at least one bearer, or configures the DAPS handover method for a certain bearer, the UE may switch the first SDAP layer architecture or function 1*j*-10 and 1*j*-12, which is used for each bearer, to the second SDAP layer architecture or function 1*j*-20 proposed in the disclosure with respect to each bearer or a bearer for which the DAPS handover method is indicated.

As another method, when the first condition proposed in the disclosure is satisfied (e.g., when a random access procedure on the target BS is completed or the first timer stops), the UE may switch the first SDAP layer architecture or function 1*j*-10 and 1*j*-12, which is used for each bearer, to the second SDAP layer architecture or function 1*j*-20 proposed in the disclosure with respect to each bearer or a bearer for which the DAPS handover method is indicated in operation 1*j*-02. In addition, when the UE receives the handover command message from the BS, and the handover command message indicates the DAPS handover method proposed in the disclosure, indicates the DAPS handover method for particular bearers, or newly configures a QoS flow and bearer mapping information, the UE may switch the first SDAP layer architecture or function 1*j*-10 and 1*j*-12 to the second SDAP layer architecture or function 1*j*-20 proposed in the disclosure with respect to each bearer or a bearer for which the DAPS handover method is indicated.

In addition, the second SDAP layer architecture may be configured in such a manner that an existing first QoS flow and existing bearer mapping information for the source BS are maintained to process UL data to be transmitted to the source BS and DL data to be received from the source BS. A second QoS flow and the bearer mapping information that are newly configured in the handover command message may be configured for the target BS, and the UE may use the configured information to process UL data to be transmitted to the target BS S and DL data to be received from the target BS. For example, in the second SDAP layer architecture proposed in the disclosure, the first QoS flow and the bearer mapping information for the source BS or the second QoS flow and the bearer mapping information for the target BS are maintained such that data for the source BS and data for the target BS may be separately processed.

In addition, when the first condition proposed in the disclosure is satisfied, UL data transmission with respect to bearers configured with the DAPS handover method has to be switched to the target BS, and thus, a procedure of changing, switching, or reconfiguring the first QoS flow and the bearer mapping information about the source BS to the second QoS flow and the bearer mapping information about the target BS may be performed on a UL. Because mapping information is changed from the first QoS flow and the bearer mapping information to the second QoS flow and the bearer mapping information as described above, the UE may transmit SDAP control data generated for each of changed QoS flows (e.g., an end marker indicating last data with respect to the changed QoS flow) to the target BS, and thus, when the target BS receives UL data from the UE, the target BS may perform data processing by reflecting the change in the QoS flow and the bearer mapping information by the UE. In the second SDAP layer architecture, a SDAP layer may identify whether data received from a lower layer is data received from the source BS or data received from the target BS, by using a 1-bit indicator of a SDAP header, a 1-bit indicator of a PDCP header, or information indicated by the PDCP layer. When the BS indicates the DAPS handover method with respect to each bearer to the UE by using the handover command message, the BS may always indicate the DAPS handover method with respect to a default DRB, and thus, when data occurs in a new QoS flow that does not correspond to the QoS flow and the bearer mapping information when a DAPS handover procedure is performed, the BS may indicate the UE to always transmit UL data via the default bearer. When the DAPS handover method is not configured for the default bearer, UL data transmission with respect to the new QoS flow occurred in handover is unavailable such that a data interruption time may occur.

When the second condition proposed in the disclosure is satisfied when the UE 1*h*-20 performs the DAPS handover method, the UE 1*h*-20 may release first bearers for the source BS 1*h*-05 with respect to the second SDAP layer architecture and function 1*j*-20 that have been applied to each bearer or a bearer for which the DAPS handover method is indicated, and may switch the second SDAP layer architecture and function 1*j*-20 to the first SDAP layer architecture or function 1*j*-10 and 1*j*-12 and apply the first SDAP layer architecture or function 1*j*-10 and 1*j*-12. In addition, when the second condition is satisfied, the UE may switch the second SDAP layer architecture and function 1*j*-20 to the first SDAP layer architecture or function 1*j*-10 and 1*j*-12 proposed in the disclosure with respect to each bearer or a bearer for which the DAPS handover method is indicated. Here, the UE may maintain the second bearer or the second QoS flow and the bearer mapping information for the target BS. Before the UE releases the first bearer or the first QoS flow and the bearer mapping information for the source BS, the UE may complete data processing by applying the first QoS flow and the bearer mapping information to a plurality of items of data received from the source BS (e.g., all data received from the source BS), and then may release the first QoS flow and the bearer mapping information or the first bearer. Thereafter, the UE may provide the plurality of items of processed data to the upper layer in ascending order. For example, when the second condition is satisfied, the UE may process data (e.g., a procedure of reading SDAP header information and updating mapping information or configuring a SDAP header, or routing or providing the processed data to an upper layer or a lower layer which is appropriate based on the first QoS flow and the bearer mapping information) by applying the first QoS flow and the bearer mapping information for the source BS to a plurality of items of data stored in the buffer (e.g., a plurality of items of data received from the source BS), and then may discard the first QoS flow and the bearer mapping information for the source BS.

The SDAP layer may define and apply information indicated by a 1-bit indicator of a new SDAP header, a 1-bit indicator of a new PDCP header, SDAP control data (e.g., DL End marker), or the PDCP layer. Thereafter, the SDAP layer may identify which data is most recently received from the source BS, based on the information. Therefore, the SDAP layer may perform data processing on the data by applying the first QoS flow and the bearer mapping information for the source BS, the data being most recently received from the source BS, and then may discard the first QoS flow and the bearer mapping information for the source BS. In addition, the SDAP layer may continuously maintain the second QoS flow and the bearer mapping information, and may process UL data or DL data with respect to the target BS, based on the second QoS flow and the bearer mapping information in operation 1*j*-03.

Hereinafter, provided is a method of applying bearer configuration information using different schemes according to a type of handover indicated in a handover command message, when the UE receives the handover command message and applies the bearer configuration information included in the handover command message referring to FIG. 1F according to an embodiment of the disclosure.

In a case where the UE receives the handover command message, when ReconfigWithSync information or MobilityControlInfo indicates a first handover method (e.g., Embodiment 1 of the disclosure or a normal handover method), Embodiment 2 (the DAPS handover method) proposed in the disclosure is not configured, or any bearer is not configured in bearer configuration information in Embodiment 2 (the DAPS handover method) proposed in the disclosure, when a default bearer is configured in SDAP layer configuration information configured in the handover command message, the UE may configure a default bearer for a source BS as the default bearer for a target BS which is indicated in the configuration information.

When a second QoS flow and bearer mapping information are configured in the SDAP layer configuration information configured in the handover command message, the UE may release a first QoS flow and bearer mapping information applied for the source BS and may apply the second QoS flow and the bearer mapping information. As another method, the UE may replace the first QoS flow and bearer mapping information applied for the source BS with the second QoS flow and the bearer mapping information.

When a data discard timer value is configured in PDCP layer configuration information configured in the handover command message, the UE may apply the discard timer value to a PDCP layer corresponding to a bearer identifier of the configuration information.

When drb-ContinueROHC indicator is configured as False in the PDCP layer configuration information configured in the handover command message, the UE may reset context of header compression or decompression protocol in a PDCP layer corresponding to a bearer identifier of the configuration information. When drb-ContinueROHC indicator is configured as True, the UE does not reset the context of header compression or decompression protocol in the PDCP layer corresponding to the bearer identifier of the configuration information.

When a realignment timer value is configured in the PDCP layer configuration information configured in the handover command message, the UE may apply the realignment timer value to the PDCP layer corresponding to the bearer identifier of the configuration information.

When the UE receives the handover command message, the UE may re-establish a PDCP layer. For example, the UE may reset window state variables with respect to a SRB and may discard a plurality of items of stored data (PDCP SDU or PDCP PDU), may reset window state variables with respect to a UM DRB, may perform, in ascending order of COUNT values, compression, ciphering, or integrity protection on a plurality of items of data that are not transmitted to a lower layer yet or for which a PDCP discard timer is not expired, based on header (or data) compression context or security key of the target BS, and then may transmit or retransmit the data, and when a realignment timer is running, the UE may stop and reset the realignment timer, may process the plurality of items of received data (PDCP SDU or PDCP PDU) in order, and may provide the data to an upper layer, and the UE does not reset window state variables with respect to an AM DRB, may perform, based on header (or data) compression context or security key of the target BS, compression, ciphering, or integrity protection on data starting from first data (PDCP SDU or PDCP PDU) for which successful delivery is not acknowledged by a lower layer, in ascending order of PDCP SNs or COUNT values.

When security key configuration information or security algorithm is configured in security configuration information configured in the handover command message, the UE may derive a new security key or new security configuration information by using the configuration information, may release an existing security key or existing security configuration information, or may replace the existing security key or the existing security configuration information with the new security key or the new security configuration information.

When a new logical channel identifier is configured in RLC layer configuration information configured in the handover command message, the UE may release an existing logical channel identifier corresponding to a bearer identifier indicated in the RLC layer configuration information, or may replace the existing logical channel identifier with the new logical channel identifier.

When an RLC re-establishment procedure is configured in the RLC layer configuration information configured in the handover command message, the UE may perform the RLC re-establishment procedure on an RLC layer corresponding to a bearer identifier indicated in the RLC layer configuration information. For example, the UE may perform the RLC re-establishment procedure such that a transmission RLC layer may perform a procedure of discarding all stored data. In addition, when a realignment timer is running, a reception RLC layer of the UE may stop and reset the realignment timer, may process all stored data and then may provide the data to its upper layer. In addition, the UE may reset a MAC layer. In addition, the UE may reset the MAC layer for the source BS and may use the MAC layer for the target BS.

When the RLC layer configuration information configured in the handover command message is newly configured, the UE may perform the RLC re-establishment procedure on an RLC layer corresponding to a bearer identifier indicated in the RLC layer configuration information.

When a second priority with respect to a logical channel is newly configured in MAC layer configuration information configured in the handover command message, the UE may release a first priority corresponding to an identifier of the logical channel indicated in the configuration information, or may replace the first priority corresponding to the logical channel identifier with the newly configured second priority.

When a second prioritisedBitRate (PBR) with respect to a logical channel is newly configured in the MAC layer configuration information configured in the handover command message, the UE may release first prioritisedBitRate (PBR) corresponding to an identifier of the logical channel indicated in the configuration information, or may replace the first prioritisedBitRate (PBR) corresponding to the identifier of the logical channel with the newly configured second prioritisedBitRate (PBR). The prioritisedBitRate refers to a value that increases with respect to each logical channel at preset time intervals (e.g., at every TTI). When the UE receives a UL transport resource, the UE may perform a logical channel prioritization (LCP) procedure, and may transmit data with respect to the logical channel, based on a priority and the prioritisedBitRate. In this regard, the higher the priority is, or the greater the value of the prioritisedBitRate is, more data may be transmitted.

When second bucketSizeDuration with respect to a logical channel is newly configured in the MAC layer configuration information configured in the handover command message, the UE may release first bucketSizeDuration corresponding to an identifier of the logical channel indicated in the configuration information or may perform configuration by replacing the first bucketSizeDuration corresponding to the identifier of the logical channel with the newly configured second bucketSizeDuration. In the descriptions above, the bucket size indicates a maximum value a value of prioritisedBitRate can have when the prioritisedBitRate is accumulated.

When second available SCell information, available subcarrier spacing information, maximum PUSCH duration, or logical channel group configuration information is configured in the MAC layer configuration information configured in the handover command message, the UE may release pre-configured first available SCell information, pre-configured available subcarrier spacing information, pre-configured maximum PUSCH duration, or pre-configured logical channel group configuration information, or may perform configuration by replacing the pre-configured first available SCell information, the pre-configured available subcarrier spacing information, the pre-configured maximum PUSCH duration, or the pre-configured logical channel group configuration information with the newly-configured second available SCell information, the newly-configured available subcarrier spacing information, the newly-configured maximum PUSCH duration, or the newly-configured logical channel group configuration information.

When the UE receives the handover command message, when the handover command message or ReconfigWithSync information or mobilityControlInfo information indicates or configures the second handover method (e.g., Embodiment 2 or the DAPS handover method of the disclosure), when the DAPS handover method is indicated or configured for each bearer identifier, when Embodiment 2 (the DAPS handover method) proposed in the disclosure is configured for a certain bearer in bearer configuration information, or when Embodiment 2 (the DAPS handover method) proposed in the disclosure is configured for at least one bearer in bearer configuration information, when a default bearer is configured in SDAP layer configuration information configured in the handover command message, the UE may perform the DAPS handover method proposed in the disclosure, may maintain an existing default bearer for the source BS by applying the second SDAP layer architecture 1j-20, and may configure default bearer information indicated in the configuration information as a default bearer for the target BS. As another method, when the first condition proposed in the disclosure is satisfied, the UE may switch the existing default bearer for the source BS to the default bearer for the target BS which is indicated in the configuration information.

When a second QoS flow and bearer mapping information are configured in the SDAP layer configuration information configured in the handover command message, the UE may perform the DAPS handover method proposed in the disclosure, may maintain a first QoS flow and bearer mapping information for the source BS by applying the second SDAP layer architecture 1j-20, and may apply the second QoS flow and the bearer mapping information to data for the target BS. In addition, when the first condition proposed in the disclosure is satisfied, the UE may apply the second QoS flow and the bearer mapping information for the target BS.

When a data discard timer value is configured in PDCP layer configuration information configured in the handover command message, the UE may perform the DAPS handover method proposed in the disclosure and may apply, by applying the second PDCP layer architecture, the discard timer value to a PDCP layer corresponding to a bearer identifier of the configuration information.

When the handover command message indicates or configures the DAPS handover method, the PDCP layer may not be re-established and procedures below may be performed. For example, the UE may reset window state variables with respect to an SRB (variable resetting may be skipped to perform fallback when DAPS handover fails) or may discard a plurality of items of stored data (PDCP SDU or PDCP PDU): may not reset window state variables with respect to an UM DRB, and may continuously perform, to or from the source BS, data transmission or reception on plurality of items of data that are not transmitted to a lower layer yet or for which a PDCP discard timer is not expired: and may not reset window state variables with respect to an AM DRB, and may continuously perform data transmission or reception to or from the source BS.

When the handover command message does not indicate nor configure the DAPS handover method, the UE may re-establish the PDCP layer. For example, the UE may reset window state variables with respect to a SRB and may discard a plurality of items of stored data (PDCP SDU or PDCP PDU), may reset window state variables with respect to a UM DRB, may perform, in ascending order of COUNT values, compression, ciphering, or integrity protection on a plurality of items of data that are not transmitted to a lower layer yet or for which a PDCP discard timer is not expired, based on header (or data) compression context or security key of the target BS, and then may transmit or retransmit the data, and when a realignment timer is running, the UE may stop and reset the realignment timer, may process the plurality of items of received data (PDCP SDU or PDCP PDU) in order, and may provide the data to an upper layer, and the UE does not reset window state variables with respect to an AM DRB, may perform, based on header (or data) compression context or security key of the target BS, compression, ciphering, or integrity protection on data starting from first data (PDCP SDU or PDCP PDU) for which successful delivery is not acknowledged by a lower layer, in ascending order of PDCP SNs or COUNT values. In addition, the UE may perform a re-establishment procedure on an RLC layer.

When drb-ContinueROHC indicator is configured as False in configuration information of the PDCP layer for which the DAPS handover method is indicated or configured by the handover command message, the UE may perform the DAPS handover method proposed in the disclosure, and may, by applying the second PDCP layer architecture, changelessly use header compression or decompression protocol context for the source BS in a PDCP layer corresponding to a bearer identifier of the configuration information, reset header compression or decompression protocol context for the target BS, and start in an initial state (e.g., an IR state). When drb-ContinueROHC indicator is configured as True, the UE may perform the DAPS handover method proposed in the disclosure, and may, by applying the second PDCP layer architecture, changelessly use header compression or decompression protocol context for the source BS in a PDCP layer corresponding to a bearer identifier of the configuration information, and may equally apply header compression or decompression protocol context for the target BS as the header compression or decompression protocol context for the source BS. For example, the UE may copy and changelessly apply the header compression or decompression protocol context for the source BS to the header compression or decompression protocol context for the target BS. As another method, the UE may apply same header compression or decompression protocol context to the target BS or the source BS.

When a realignment timer value is configured as False in configuration information of the PDCP layer for which the DAPS handover method is indicated or configured by the handover command message, the UE may perform the DAPS handover method proposed in the disclosure, and may apply the realignment timer value to the PDCP layer corresponding to the bearer identifier of the configuration information, by applying the second PDCP layer architecture.

When security key configuration information or security algorithm is configured in security configuration information for which the DAPS handover method is indicated or configured by the handover command message, or when an indicator indicating a new procedure is included in the PDCP layer configuration information, the UE may derive a new security key or new security configuration information by using the configuration information and may perform the DAPS handover method proposed in the disclosure: and may maintain an existing security key or existing security configuration information for the source BS by applying the second PDCP layer architecture, and may configure a security key or security configuration information for the target BS as the new security key or the new security configuration information.

In configuration information of an RLC layer for a bearer for which the DAPS handover method is indicated or configured by the handover command message, the UE may not perform an RLC re-establishment procedure on the RLC layer for the source BS. More specifically, the RLC re-establishment procedure may not be performed, a transmission RLC layer may continuously transmit a plurality of pieces of stored data, and a reception RLC layer may continuously process a plurality of pieces of stored data along with a plurality of pieces of received data, such that a data interruption time may not occur. However, when the first condition proposed in the disclosure is satisfied, the PDCP layer configured with the DAPS handover method may transmit a data discard indicator for PDCP user data (PDCP Data PDU) so as to indicate for the RLC layer for the source BS to discard data (PDCP Data PDU) with respect to an AM bearer or a UM bearer. Therefore, the RLC layer for the source BS may discard PDCP Data PDU but may not discard and transmit PDCP control PDU.

An RLC re-establishment procedure may be performed on an RLC layer for a bearer for which the DAPS handover method is not indicated nor configured by the handover command message, or when the RLC re-establishment procedure is configured, the RLC re-establishment procedure may be performed. For example, in particular, the transmission RLC layer may perform the RLC re-establishment procedure, thereby performing a procedure of discarding all stored data (PDCP Data PDU or PDCP control PDU). In addition, when a realignment timer is running, the reception RLC layer may stop and reset the realignment timer, may process all stored data, and may transmit the processed data to its upper layer.

When a new logical channel identifier is configured in configuration information of the RLC layer for the bearer for which the DAPS handover method is indicated or configured by the handover command message, the UE may perform the DAPS handover method proposed in the disclosure, may, by applying the second PDCP layer architecture, maintain an existing logical channel identifier for a RLC layer or a MAC layer for a first bearer for the source BS which corresponds to a bearer identifier indicated in the RLC layer configuration information, and may configure the new logical channel identifier, which is indicated in the configuration, for a RLC layer or a MAC layer for a second bearer corresponding to the target BS.

When configuration information of the RLC layer for the bearer for which the DAPS handover method is indicated or configured by the handover command message is newly configured, the UE may perform the DAPS handover method proposed in the disclosure, may, by applying the second PDCP layer architecture, maintain existing RLC configuration information for a RLC layer for a first bearer for the source BS which corresponds to a bearer identifier indicated in the RLC layer configuration information, and may configure the new configuration information of the RLC layer, which is indicated in the configuration, for a RLC layer for a second bearer corresponding to the target BS.

Figure 1K:
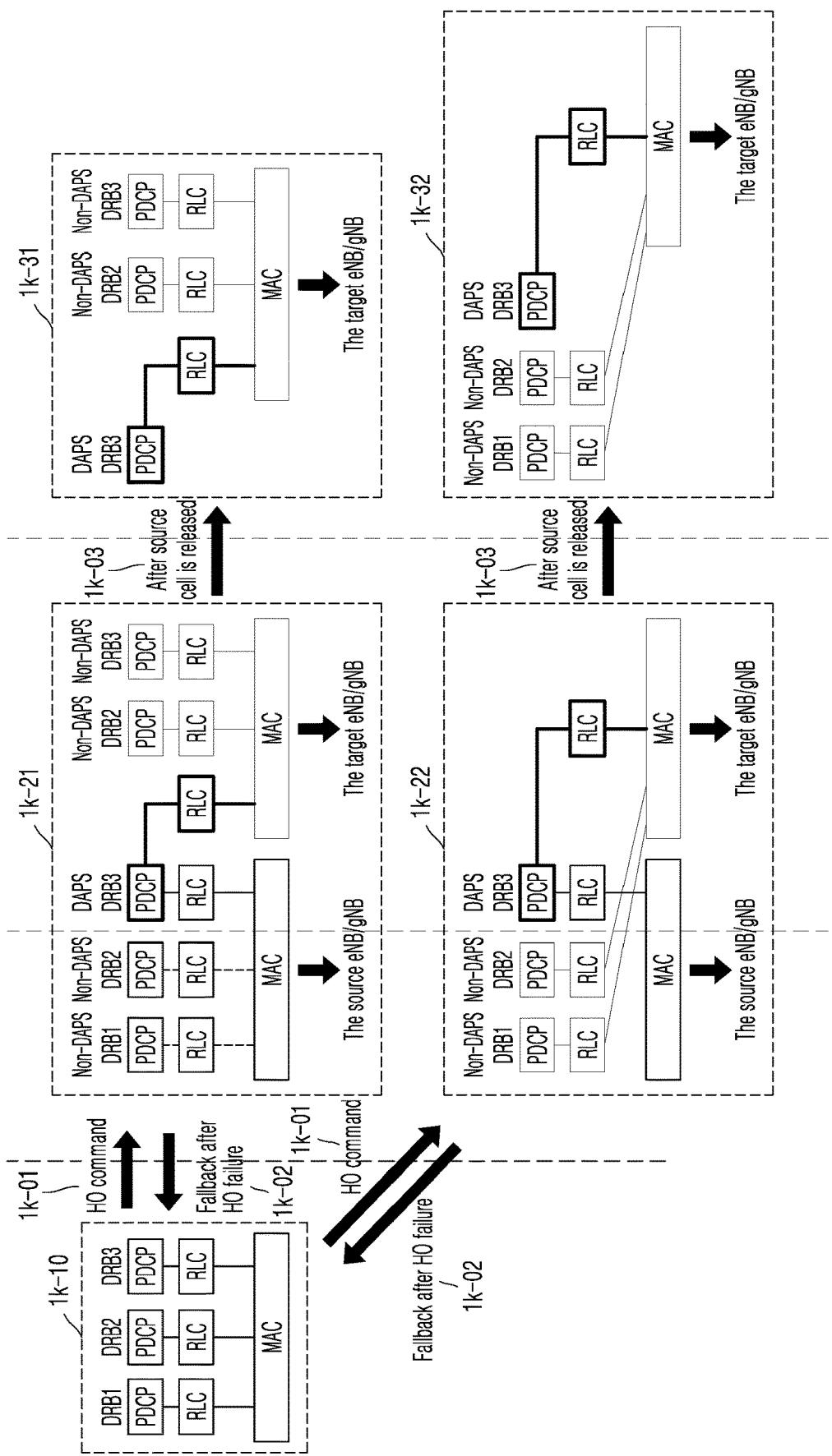
FIG. 1K is a diagram illustrating a method of applying configuration information to each bearer when a DAPS handover method according to an embodiment of the disclosure.

Method 1, Method 2, or Method 3 of configuring a MAC layer which are proposed with reference to FIG. 1K of the disclosure may be performed.

Method 1, Method 2, or Method 3 of processing an SRB layer which are proposed with reference to FIG. 1K of the disclosure may be performed.

When a second priority with respect to a logical channel is newly configured in MAC layer configuration information configured in the handover command message, the UE may perform the DAPS handover method proposed in the disclosure and may apply the second PDCP layer architecture. In this regard, the UE may maintain existing configuration information with respect to the MAC layer for the first bearer for the source BS which corresponds to a bearer identifier indicated above, and may configure a new logical channel identifier, which is indicated in the configuration information, to the MAC layer for the second bearer corresponding to the target BS. The UE may configure a newly-configured second priority corresponding to the logical channel identifier indicated in the configuration information. As another method, when the first condition proposed in the disclosure is satisfied, the UE may apply the priority order to the MAC layer for the second bearer corresponding to the target BS according to each logical channel identifier.

When a second prioritisedBitRate (PBR) with respect to a logical channel is newly configured in the MAC layer configuration information configured in the handover command message, the UE may perform the DAPS handover method proposed in the disclosure. In this regard, the UE may apply the second PDCP layer architecture and maintain existing configuration information with respect to the MAC layer for the first bearer for the source BS which corresponds to a bearer identifier indicated above, and may configure a new logical channel identifier with respect to the MAC layer for the second bearer corresponding to the target BS, the new logical channel identifier being indicated in the configuration information. The UE may configure a newly configured second prioritisedBitRate (PBR) corresponding to the new logical channel identifier indicated in the configuration information. As another method, the UE may start applying the second prioritisedBitRate to the new logical channel identifier in the MAC layer for the second bearer corresponding to the target BS after the first condition proposed in the disclosure is satisfied (by doing so, when different handover methods are indicated for respective bearers, UL transport resources may be fairly distributed). The prioritisedBitRate refers to a value that increases with respect to each logical channel at preset time intervals (e.g., at every TTI) when the prioritisedBitRate is applied to each logical channel identifier. When the UE receives a UL transport resource, the UE may perform an LCP procedure, and may transmit data with respect to the logical channel, based on a priority and the prioritisedBitRate. In this regard, the higher the priority is, or the greater the value of the prioritisedBitRate is, more data may be transmitted.

In a case where the DAPS handover method is applied in the above descriptions, when the UE has to transmit UL data via the first bearer for the source BS because the first condition proposed in the disclosure is not satisfied yet, the UE may select the MAC layer for the first bearer as a target for the LCP procedure with respect to only a bearer or logical channel identifiers for which the DAPS handover method (or a handover method by which data can be continuously transmitted to the source BS even after a handover command message is received) is indicated, and may perform the LCP procedure. This is because, when the UE receives a handover command message with respect to bearers or a logical channel identifier to which the DAPS handover method is not applied, the UE cannot transmit UL data to the source BS, the UE should not select the bearers or the logical channel identifier as a target for the LCP procedure.

When second bucketSizeDuration with respect to a logical channel is newly configured in the MAC layer configuration information configured in the handover command message, the UE may perform the DAPS handover method proposed in the disclosure. In this regard, the UE may apply the second PDCP layer architecture and maintain existing configuration information with respect to the MAC layer for the first bearer for the source BS which corresponds to a bearer identifier indicated above, may configure a new logical channel identifier with respect to the MAC layer for the second bearer corresponding to the target BS, the new logical channel identifier being indicated in the configuration information, and may configure newly configured second bucketSizeDuration corresponding to the new logical channel identifier indicated in the configuration information. As another method, the UE may start applying the second bucketSizeDuration to the new logical channel identifier in the MAC layer for the second bearer corresponding to the target BS after the first condition proposed in the disclosure is satisfied (by doing so, when different handover methods are indicated for respective bearers, UL transport resources may be fairly distributed). In the descriptions above, a bucket size indicates a maximum value a value of prioritisedBitRate can have when the prioritisedBitRate is accumulated.

When second available SCell information, available subcarrier spacing information, maximum PUSCH duration, or logical channel group configuration information is configured in the MAC layer configuration information configured in the handover command message, the UE may perform the DAPS handover method proposed in the disclosure, and may apply the second PDCP layer architecture and maintain existing configuration information with respect to the MAC layer for the first bearer for the source BS which corresponds to a bearer identifier indicated above, and may configure the second available SCell information, the available subcarrier spacing information, the maximum PUSCH duration, or the logical channel group configuration information with respect to the MAC layer for the second bearer corresponding to the target BS.

FIG. 1K is a diagram illustrating a method of applying configuration information to each bearer when a DAPS handover method according to an embodiment of the disclosure.

Referring to FIG. 1K, in a case where the UE receives the handover command message in operation 1k-01 as proposed in the disclosure, when reconfigWithSync information indicates the second handover method (e.g., Embodiment 2 or the DAPS handover method of the disclosure), when the DAPS handover method is indicated for each bearer identifier or each logical channel identifier, when the DAPS handover method is configured for at least one bearer, or when the DAPS handover method is configured for a certain bearer, the UE may generate or establish the MAC layer for the target BS (or a target cell) at a point of time when the UE receives the handover command message. The UE may continuously perform data transmission or reception to or from the source BS with respect to only bearers (AM bearer or UM bearer) for which the DAPS handover method is indicated via the MAC layer for the source BS (or a source cell) after the UE receives the handover command message and then until the first condition proposed in the disclosure is satisfied. When the first condition is satisfied, the UE may switch UL data to the target BS, and may receive DL data from the source BS until a link to the source BS is released. However, for bearers for which the DAPS handover method is not indicated, the UE cannot perform data transmission or reception to or from the source BS in a continuous manner or after the UE receives the handover command message and then until the first condition proposed in the disclosure is satisfied. Therefore, in order to allow the UE to perform operations proposed in the disclosure, one or more methods to be described below may be applied, and may be modeled referring to FIG. 1K-21 or FIG. 1K-22. When the second condition proposed in the disclosure is satisfied and thus the source BS is released, one or more methods may be modeled referring to FIG. 1K-31 or FIG. 1K-32.

Method 1: As proposed in the disclosure, in a case where the UE receives the handover command message, when the ReconfigWithSync information indicates the second handover method (e.g., Embodiment 2 or the DAPS handover method of the disclosure), indicates the DAPS handover method for each bearer identifier or each logical channel identifier, indicates the DAPS handover method for at least one bearer, or indicates the DAPS handover method for a certain bearer, the UE may suspend SRBs configured for the MAC layer. For example, when the MAC layer for the source BS performs the LCP procedure to transmit data from when the UE receives the handover command message, the MAC layer for the source BS may select, as a candidate group, only logical channel identifiers corresponding to a bearer for which the DAPS handover method is indicated, and may perform the LCP procedure. In addition, the MAC layer of the UE for the source BS may maintain only logical channel identifiers for which the DAPS handover method is indicated or a prioritisedBitRate or bucket size duration corresponding to the logical channel identifiers, and may release, may not use, or may not apply logical channel identifiers or a prioritisedBitRate or bucket size duration corresponding to the logical channel identifiers, the logical channel identifiers corresponding to a bearer for which the DAPS handover method is not indicated. In addition, the UE may perform a PDCP re-establishment procedure or a RLC re-establishment procedure on a bearer for which the DAPS handover method is not indicated, may suspend a bearer to which PDCP configuration information or RLC configuration information which is indicated in the handover message is applied, may suspend a bearer from the MAC layer for the source BS, or may configure the bearer for the MAC layer for the target BS (when the first condition is satisfied, the bearer may be configured for the MAC layer for the target BS), may apply bearer configuration information, such as a logical channel identifier, a prioritisedBitRate or bucket size duration, which is configured for the target BS, to the MAC layer for the target BS with respect to the bearer for which the DAPS handover method is not indicated in the handover message, and may switch a link to a PDCP layer or a RLC layer, which corresponds to the bearer for which the DAPS handover method is not indicated, from the MAC layer for the source BS to the MAC layer for the target BS. For example, the UE may release, from the MAC layer for the source BS, configuration information of a PDCP layer, a RLC layer, or a MAC layer for the bearer for which the DAPS handover method is not indicated, and may perform application or connection to the MAC layer for the target BS, according to bearer configuration for the target BS. In addition, the UE may perform data transmission or reception to or from the source BS until the first condition proposed in the disclosure is satisfied, may reset a prioritisedBitRate with respect to a logical channel identifier in the MAC layer for the source BS, the logical channel identifier corresponding to the bearer for which the DAPS handover method is not indicated, may release or suspend the bearer without applying a prioritisedBitRate accumulation calculation procedure, and may continuously maintain, in the MAC layer for the source BS, a prioritisedBitRate with respect to a logical channel identifier corresponding to the bearer for which the DAPS handover method is indicated and may perform an accumulation calculation procedure. —When the first condition is satisfied, the UE may perform switching on data transmission to the target BS, and may reset, in the MAC layer for the target BS, a prioritisedBitRate with respect to newly-configured logical channel identifiers or may start accumulation calculation (as another method, when the UE receives a handover command message with respect to the MAC layer for the target BS, the UE may reset a prioritisedBitRate and may start accumulation calculation). In addition, when the bearers for which the DAPS handover method is not indicated are configured or suspended, the UE may resume the bearers, may start data transmission or reception to or from the target BS, and may reset a prioritisedBitRate or start accumulation calculation. When the first condition is satisfied, the UE may reset a prioritisedBitRate with respect to logical channel identifiers configured in the MAC layer for the source BS, and may stop accumulation calculation. In addition, the UE may perform data reception from the source BS or the target BS until the second condition proposed in the disclosure is satisfied. When the second condition is satisfied in operation 1k-03, the UE may reset the MAC layer for the source BS, and may release, from the MAC layer for the source BS, the RLC layer, the PDCP layer or the bearer configuration information which is connected with the MAC layer for the source BS and which corresponds to the bearer for which the DAPS handover method is not indicated. The UE may release, from the second PDCP layer architecture or the MAC layer for the source BS, the RLC layer or bearer configuration information which corresponds to the bearer for which the DAPS handover method is indicated in operations 1k-31 or 1k-32. As will be proposed below in the disclosure, when the UE fails in a handover procedure and a link to the source BS is active, the UE may perform a fallback procedure on the source BS in operation 1k-02, may resume a SRB configured for the MAC layer of the source BS and may report a handover failure, may re-apply previous bearer configuration information of the source BS before the handover command message is received, may apply original configuration information of the MAC layer, and may resume, for each bearer, data transmission or reception to or from the source BS in operation 1k-10. As another method, in the aforementioned situation, an upper layer (e.g., an RRC layer) of the UE may indicate an RLC re-establishment procedure for a bearer configured with the DAPS handover method or a bearer not configured with the DAPS handover method.

Method 2: As proposed in the disclosure, in a case where the UE receives the handover command message, when the ReconfigWithSync information indicates the second handover method (e.g., Embodiment 2 or the DAPS handover method of the disclosure), indicates the DAPS handover method for each bearer identifier or each logical channel identifier, indicates the DAPS handover method for at least one bearer, or indicates the DAPS handover method for a certain bearer, the UE may suspend SRBs configured for the MAC layer, and the upper layer (e.g., the RRC layer) of the UE may indicate the MAC layer for the source BS to perform MAC reconfiguration by using configuration information of a current MAC layer, the configuration information excluding configuration information related to the bearer for which the DAPS handover method is not indicated. As another method, the upper layer (e.g., the RRC layer) of the UE may indicate the MAC layer for the source BS to perform MAC reconfiguration by using configuration information of a current MAC layer, the configuration information only including configuration information related to the bearer for which the DAPS handover method is indicated. When the UE reconfigures the MAC layer for the source BS, the MAC layer of the UE for the source BS may maintain only logical channel identifiers for which the DAPS handover method is indicated or a prioritisedBitRate or bucket size duration corresponding to the logical channel identifiers, and may release, may not use, or may not apply logical channel identifiers or a prioritisedBitRate or bucket size duration corresponding to the logical channel identifiers, the logical channel identifiers corresponding to a bearer for which the DAPS handover method is not indicated. In addition, the upper layer (e.g., the RRC layer) of the UE may perform a PDCP re-establishment procedure or a RLC re-establishment procedure on the bearer for which the DAPS handover method is not indicated, and may suspend the bearer to which PDCP configuration information or RLC configuration information which is indicated in the handover message is applied. Alternatively, the upper layer of the UE may suspend the bearer from the MAC layer for the source BS, or may configure the bearer for the MAC layer for the target BS (when the first condition is satisfied, the bearer may be configured for the MAC layer for the target BS), and may indicate the MAC layer for the target BS to configure or apply bearer configuration information, such as a logical channel identifier, a prioritisedBitRate or bucket size duration, which is configured for the target BS, to the MAC layer for the target BS with respect to the bearer for which the DAPS handover method is not indicated in the handover message. Alternatively, the upper layer of the UE may switch a link to a PDCP layer or a RLC layer, which corresponds to the bearer for which the DAPS handover method is not indicated, from the MAC layer for the source BS to the MAC layer for the target BS. In this case, when the MAC layer for the source BS performs the LCP procedure to transmit data from when the UE receives the handover command message, the MAC layer for the source BS may select, as a candidate group, only logical channel identifiers corresponding to a bearer for which the DAPS handover method is indicated, and may perform the LCP procedure. In the aforementioned situation, a procedure of reconfiguring the MAC layer for the source BS, the procedure performed by the upper layer (e.g., the RRC layer), may include a procedure in which the MAC layer for the source BS is partially MAC reset and thus performs a same procedure. For example, configuration information of the MAC layer for the bearer for which the DAPS handover method is not indicated may be reset, may be suspended, or may not be applied. —In addition, data transmission or reception to or from the source BS may be performed until the first condition proposed in the disclosure is satisfied. The UE may reset a prioritisedBitRate with respect to a logical channel identifier in the MAC layer for the source BS, the logical channel identifier corresponding to the bearer for which the DAPS handover method is not indicated, may release or suspend the bearer without applying a prioritisedBitRate accumulation calculation procedure. In addition, the UE may continuously maintain, in the MAC layer for the source BS, a prioritisedBitRate with respect to a logical channel identifier corresponding to the bearer for which the DAPS handover method is indicated and may perform an accumulation calculation procedure. When the first condition is satisfied, the UE may perform switching on data transmission to the target BS, and may reset, in the MAC layer for the target BS, a prioritisedBitRate with respect to newly-configured logical channel identifiers (logical channel identifiers corresponding to the bearer configured with the DAPS handover method or the bearer not configured with the DAPS handover method), or may start accumulation calculation (as another method, when the UE receives a handover command message with respect to the MAC layer for the target BS, the UE may initialize a prioritisedBitRate and may start accumulation calculation). In addition, when the bearers for which the DAPS handover method is not indicated are configured or suspended, the UE may configure or resume the bearers, may start data transmission or reception to or from the target BS, and may reset a prioritisedBitRate or start accumulation calculation. In addition, the UE may perform data reception from the source BS or the target BS until the second condition proposed in the disclosure is satisfied, when the second condition is satisfied in operation 1*k*-03, the UE may reset the MAC layer for the source BS, may release, from the MAC layer for the source BS, the RLC layer, the PDCP layer or the bearer configuration information which is connected with the MAC layer for the source BS and which corresponds to the bearer for which the DAPS handover method is not indicated, and may release, from the second PDCP layer architecture or the MAC layer for the source BS, the RLC layer or bearer configuration information which corresponds to the bearer for which the DAPS handover method is indicated in operations 1*k*-31 or 1*k*-32. As will be proposed below in the disclosure, when the UE fails in a handover procedure and a link to the source BS is active, the UE may perform a fallback procedure on the source BS in operation 1*k*-02, may resume a SRB configured for the MAC layer of the source BS and may report a handover failure, may re-apply previous bearer configuration information of the source BS before the handover command message is received, may apply original configuration information of the MAC layer (e.g., the RRC layer may reconfigure configuration of the MAC layer as MAC layer configuration information that was used before the handover command message is received), and may resume, for each bearer, data transmission or reception to or from the source BS in operation 1k-10. As another method, in the aforementioned situation, an upper layer (e.g., an RRC layer) of the UE may indicate an RLC re-establishment procedure for a bearer configured with the DAPS handover method or a bearer not configured with the DAPS handover method. As another method, the configuration information of the MAC layer for the source BS which is to be applied when the source BS performs the DAPS handover method may be configured through an RRC message.

Method 3: As proposed in the disclosure, in a case where the UE receives the handover command message, when the ReconfigWithSync information indicates the second handover method (e.g., Embodiment 2 or the DAPS handover method of the disclosure), indicates the DAPS handover method for each bearer identifier or each logical channel identifier, indicates the DAPS handover method for at least one bearer, or indicates the DAPS handover method for a certain bearer, the UE may suspend SRBs configured for the MAC layer. For example, when the MAC layer of the UE for the source BS performs the LCP procedure to transmit data from when the UE receives the handover command message, the UE may indicate, to the MAC layer for the source BS, that a PDCP layer corresponding to the bearer for which the DAPS handover method is not indicated does not have data to be transmitted in a buffer or a PDCP data volume is 0, such that the LCP procedure may be performed only on logical channel identifiers corresponding to the bearer for which the DAPS handover method is indicated. Therefore, the MAC layer for the source BS may determine that there is no data to be transmitted with respect to the bearer for which the DAPS handover method is not indicated, and may not perform the LCP procedure on logical channel identifiers corresponding to the bearer for which the DAPS handover method is not indicated. In addition, the UE may perform a PDCP re-establishment procedure or a RLC re-establishment procedure on a bearer for which the DAPS handover method is not indicated, may suspend a bearer to which PDCP configuration information or RLC configuration information which is indicated in the handover message is applied, may suspend a bearer from the MAC layer for the source BS, or may configure the bearer for the MAC layer for the target BS (when the first condition is satisfied, the bearer may be configured for the MAC layer for the target BS), may apply bearer configuration information, such as a logical channel identifier, a prioritisedBitRate or bucket size duration, which is configured for the target BS, to the MAC layer for the target BS with respect to the bearer for which the DAPS handover method is not indicated in the handover message, and may switch a link to a PDCP layer or a RLC layer, which corresponds to the bearer for which the DAPS handover method is not indicated, from the MAC layer for the source BS to the MAC layer for the target BS. For example, the UE may release, from the MAC layer for the source BS, configuration information of a PDCP layer, a RLC layer, or a MAC layer for the bearer for which the DAPS handover method is not indicated, and may perform application or connection to the MAC layer for the target BS, according to bearer configuration for the target BS. In addition, the UE may perform data transmission or reception to or from the source BS until the first condition proposed in the disclosure is satisfied, may reset a prioritisedBitRate with respect to a logical channel identifier in the MAC layer for the source BS, the logical channel identifier corresponding to the bearer for which the DAPS handover method is not indicated, may release or suspend the bearer without applying a prioritisedBitRate accumulation calculation procedure, and may continuously maintain, in the MAC layer for the source BS, a prioritisedBitRate with respect to a logical channel identifier corresponding to the bearer for which the DAPS handover method is indicated and may perform an accumulation calculation procedure. When the first condition is satisfied, the UE may perform switching on data transmission to the target BS, and may reset, in the MAC layer for the target BS, a prioritisedBitRate with respect to newly-configured logical channel identifiers or may start accumulation calculation (as another method, when the UE receives a handover command message with respect to the MAC layer for the target BS, the UE may reset a prioritisedBitRate and may start accumulation calculation). In addition, when the bearers for which the DAPS handover method is not indicated are suspended, the UE may resume the bearers, may start data transmission or reception to or from the target BS, and may reset a prioritisedBitRate or start accumulation calculation. When the first condition is satisfied, the UE may reset a prioritisedBitRate with respect to logical channel identifiers configured in the MAC layer for the source BS, and may stop accumulation calculation. In addition, the UE may perform data reception from the source BS or the target BS until the second condition proposed in the disclosure is satisfied, may reset the MAC layer for the source BS when the second condition is satisfied, and may release, from the MAC layer for the source BS, the RLC layer, the PDCP layer or the bearer configuration information which is connected with the MAC layer for the source BS and which corresponds to the bearer for which the DAPS handover method is not indicated, and may release, from the second PDCP layer architecture or the MAC layer for the source BS, the RLC layer or bearer configuration information which corresponds to the bearer for which the DAPS handover method is indicated in operations 1k-31 or 1k-32. As will be proposed below in the disclosure, when the UE fails in a handover procedure and a link to the source BS is active, the UE may perform a fallback procedure on the source BS in operation 1k-02, may resume a SRB configured for the MAC layer of the source BS and may report a handover failure, may re-apply previous bearer configuration information of the source BS before the handover command message is received, may apply original configuration information of the MAC layer, and may resume, for each bearer, data transmission or reception to or from the source BS in operation 1k-10. As another method, in the aforementioned situation, an upper layer (e.g., an RRC layer) of the UE may indicate an RLC re-establishment procedure for a bearer configured with the DAPS handover method or a bearer not configured with the DAPS handover method.

In a case where the UE receives the handover command message in the methods proposed in the disclosure, when reconfigWithSync information indicates the second handover method (e.g., Embodiment 2 or the DAPS handover method of the disclosure), when the DAPS handover method is indicated for each bearer identifier or each logical channel identifier, when the DAPS handover method is configured for at least one bearer, or when the DAPS handover method is configured for a certain bearer, SRBs configured for a MAC layer for the source BS may be applied based on various applications of one or more methods below.

In a case where the UE receives the handover command message, when reconfigWithSync information indicates the second handover method (e.g., Embodiment 2 or the DAPS handover method of the disclosure), when the DAPS handover method is indicated for each bearer identifier or each logical channel identifier, when the DAPS handover method is configured for at least one bearer, or when the DAPS handover method is configured for a certain bearer, Method 1: a SRB may be suspended from the MAC layer for the source BS. Alternatively, window state variables may be reset by performing a RLC layer re-establishment procedure or a PDCP layer re-establishment procedure for the SRBs, and a plurality of items of stored data (PDCP SDU, PDCP PDU, RLC SDU, or RLC PDU) may be discarded. Alternatively, SRBs may be configured for a MAC layer for the target BS, according to configuration in the received handover command message. As another method, SRBs for the MAC layer for the source BS may be configured according to configuration in the received handover command message, and may be switched to be connected with the MAC layer for the target BS. When the UE fails to perform a handover procedure and thus performs a fallback procedure, the UE may resume the SRBs suspended from the MAC layer for the source BS or may reconfigure the SRBs configured for the target BS to previous configuration for the source BS, and may switch and connect the SRBs to the MAC layer for the source BS, thereby resuming the SRBs.

Method 2: an SRB may be suspended from the MAC layer for the source BS. Alternatively, an RLC layer re-establishment procedure or a PDCP layer re-establishment procedure for the SRBs may not be performed and may be stopped. Alternatively, SRBs may be configured for a MAC layer for the target BS, according to configuration in the received handover command message. As another method, SRBs for the MAC layer for the source BS may be configured according to configuration in the received handover command message, and may be switched to be connected with the MAC layer for the target BS. When the UE fails to perform a handover procedure and thus performs a fallback procedure, the UE may resume the SRBs suspended from the MAC layer for the source BS or may reconfigure the SRBs configured for the target BS to previous configuration for the source BS, and may switch and connect the SRBs to the MAC layer for the source BS, thereby resuming the SRBs.

Method 3: a SRB may be suspended from the MAC layer for the source BS. Alternatively, a RLC layer re-establishment procedure or a PDCP layer re-establishment procedure for the SRBs may not be performed, and window state variables may not be reset, but a plurality of items of stored data (PDCP SDU, PDCP PDU, RLC SDU, or RLC PDU) may be discarded (this is to prevent that RRC messages that are not transmitted are unnecessarily transmitted at a later time). Alternatively, SRBs may be configured for a MAC layer for the target BS, according to configuration in the received handover command message. As another method, the UE may configure SRBs for the MAC layer for the source BS according to configuration in the received handover command message, and may switch the SRBs to connect the SRBs with the MAC layer for the target BS. When the UE fails to perform a handover procedure and thus performs a fallback procedure, the UE may resume the SRBs suspended from the MAC layer for the source BS or may reconfigure the SRBs configured for the target BS to previous configuration for the source BS, and may switch and connect the SRBs to the MAC layer for the source BS, thereby resuming the SRBs.

According to the disclosure, hereinafter, proposed is a method by which, when the UE performs Embodiment 2 (the DAPS handover method) of the efficient handover method proposed in the disclosure and fails to perform handover, the UE reconfigures a link by rapidly falling back to the source BS by using features of the DAPS handover method proposed above. The features of the DAPS handover method proposed in the disclosure may particularly mean that, even when the UE performs a handover procedure, the UE maintains a link to the source BS and thus performs data transmission or reception. That the UE falls back to the source BS by using a radio link established with the source BS when the UE fails to perform handover is proposed below in the disclosure.

Referring to FIG. 1H of the disclosure, according to Embodiment 2 (the DAPS handover method) of the efficient handover method proposed in the disclosure, even when the UE receives a handover command message from the source BS, as proposed in 1h-02, the UE may perform a handover procedure on the target BS while the UE maintains data transmission or reception to or from the source BS. In addition, the disclosure proposes a procedure in which the UE falls back to the source BS when the UE fails to perform the handover procedure on the target BS.

As proposed above, when the UE fails to perform the handover procedure on the target BS and thus attempts to fall back to the source BS, there has to be a method by which the UE can identify whether a radio link to the source BS is active. When the UE fails to perform the handover and performs a fallback procedure on the source BS even when a radio link to the source BS is not active, the UE fails to perform the fallback procedure on the source BS such that a long data interruption time occurs and therefore significant data interruption occurs. In addition, when a radio link to the source BS is active, an SRB configured between the UE and the source BS has to be maintained.

First, the disclosure proposes new timers applicable to the handover method, and proposes detailed operations of each of the timers. In addition, according to the disclosure, the detailed operations of each timer may include different operations according to types of a handover method indicated in a handover command message from a BS. In addition, provided is a method of releasing or maintaining a link to the source BS or configuration of an SRB according to the handover method.

In order to efficiently perform a handover procedure, the disclosure may introduce a first timer (e.g., T304), a second timer (e.g., T310), a third timer (e.g., T312), or a fourth timer (e.g., a timer for fallback), and the timers may be run and applied to the handover procedure. The first timer (e.g., T304), the second timer (e.g., T310), the third timer (e.g., T312), or the fourth timer (e.g., the timer for fallback) proposed in the disclosure may perform different operations below according to the types of the handover method. For example, the first timer (e.g., T304) is a timer configured to determine whether handover has been successfully performed. In addition, the second timer (e.g., T310) is a timer configured to determine whether a radio link is active. In addition, the third timer (e.g., T312) is an auxiliary timer configured to determine whether a radio link is active, to trigger a frequency measurement procedure, and to report a frequency measurement report. When the UE performs Embodiment 2 (the DAPS handover method) of the efficient handover method proposed in the disclosure and then fails to perform handover, the UE performs a fallback procedure on the source BS and thus transmits a message indicating failure of handover to the source BS. In this regard, the fourth timer (e.g., the timer for fallback) is a timer configured to determine whether the fallback procedure has been successfully performed or has failed.

Detailed operations of the first timer (e.g., T304), the second timer (e.g., T310), the third timer (e.g., T312), or the fourth timer (e.g., the timer for fallback) proposed in the disclosure so as to support the efficient handover method are proposed below according to the indicated types of the handover method.

1> When the UE receives an indicator indicating out-of-synchronization (out-of-sync indication) of a radio link signal from a lower layer (e.g., a MAC layer or a PHY layer) a preset number of times (e.g., the preset number of times may be set by a BS) and thus detects a problem of the PHY layer, the UE may start the second timer (e.g., T310) in a case where the first timer (e.g., T304) is not running Thereafter, the UE receives an indicator indicating in-synchronization (in-sync indication) of a radio link signal from the lower layer a preset number of times (e.g., the preset number of times may be set by the BS), a handover procedure is triggered (is started), or an RRC connection re-establishment procedure is started, the UE stops the second timer. When the second timer is expired, the UE triggers or starts the RRC connection re-establishment procedure. Alternatively, the UE transitions to an RRC inactive mode, and triggers or starts the RRC connection re-establishment procedure.

1> The UE starts the third timer when a frequency measurement procedure is triggered for a frequency measurement identifier configured for the third timer while the second time is running Thereafter, when the UE receives an indicator indicating in-synchronization (in-sync indication) of a radio link signal from the lower layer a preset number of times (e.g., the preset number of times may be set by the BS), a handover procedure is triggered (is started), or an RRC connection re-establishment procedure is started, the UE stops the third timer. When the third timer is expired, the UE triggers or starts the RRC connection re-establishment procedure. Alternatively, the UE transitions to an RRC inactive mode, and triggers or starts the RRC connection re-establishment procedure.

1> When the UE receives a handover command message (an RRCReconfiguration message including mobility indication (MobilityControl info or Reconfiguration-WithSync) or handover indication) from the BS and the handover command message indicates a first handover method (e.g., Embodiment 1 or a general handover method), when Embodiment 2 (the DAPS handover method) proposed in the disclosure is not configured, or when Embodiment 2 (the DAPS handover method) proposed in the disclosure is not configured for any bearer in bearer information, 2> according to the disclosure, when the UE receives the handover command message (the RRCReconfiguration message including mobility indication (MobilityControl info or ReconfigurationWithSync) or handover indication), the UE may trigger a handover procedure and may start the first timer.

2> When the UE triggers the handover procedure, the UE releases an SRB (e.g., SRB1) configured for the source BS, and configures the SRB (e.g., SRB1) for the target BS, based on configuration information configured in the handover command message.

2> When the UE triggers the handover procedure, the UE may stop the second timer if the second timer is running. While the first timer is running, even when the condition (the indicator indicating out-of-synchronization of a radio link signal is received the preset number of times from the lower layer) for starting the second timer is satisfied, the second timer may not be started. For example, when the first timer is running, the second timer may not be used.

2> When the UE triggers the handover procedure, the UE may stop the third timer if the third timer is running Thereafter, only while the second timer is running, the UE may start the third timer when the condition (when the frequency measurement procedure is triggered for the frequency measurement identifier configured for the third timer) for starting the third timer is satisfied. For example, because the second timer is not used while the first timer is running, the third timer may not be used either.

2> When the UE successfully performs the handover procedure on the target BS or successfully completes a random access procedure with respect to the target BS, the UE stops the first timer.

2> When the first timer is expired (e.g., the handover procedure with respect to the target BS fails), the UE performs an RRC connection re-establishment procedure (the UE may release a link to the BS, and may perform an RRC connection procedure from the start, i.e., may perform a cell selection or reselection procedure, perform a random access procedure, and transmit an RRC connection re-establishment request message).

1> When the UE receives a handover command message (an RRCReconfiguration message including mobility indication (MobilityControl info or Reconfiguration-WithSync) or handover indication) from the BS and the handover command message indicates a second handover method (e.g., Embodiment 2 or the DAPS handover method) (or this may be extensively applied to a case where a conditional handover method is also indicated), when the UE receives the handover command message and the handover command message or ReconfigWithSync information or MobilityControlInfo indicates Embodiment 2 (the DAPS handover method) proposed in the disclosure, when Embodiment 2 (the DAPS handover method) proposed in the disclosure is configured for a certain bearer in bearer information, or when Embodiment 2 (the DAPS handover method) proposed in the disclosure is configured for at least one bearer in bearer information, 2> according to the disclosure, when the UE receives the handover command message (the RRCReconfiguration message including mobility indication (MobilityControl info or ReconfigurationWithSync) or handover indication), the UE may trigger a handover procedure and may start the first timer. When the conditional handover method is also indicated, the UE may start the first timer when the UE selects a cell from among a plurality of target cells and starts a handover procedure or performs a random access procedure.

2> In a case where the UE triggers the handover procedure, when the UE starts the DAPS handover method, the UE maintains or suspends a SRB (e.g., SRB1) configured for the source BS, and configures the SRB (e.g., SRB1) for the target BS, based on configuration information configured in the handover command message. As another method, in a case where the UE triggers the handover procedure, when the UE starts the DAPS handover method, the UE may maintain or suspend a SRB (e.g., SRB1) configured for the source BS, may reset window state variables by re-establishing a PDCP layer or a RLC layer for the SRB corresponding to the source BS, may stop a timer, may indicate a plurality of items of stored data (PDCP SDU or PDCP PDU) to be discarded (this may be performed when a fallback procedure proposed in the disclosure is triggered), and may configure the SRB (e.g., SRB1) for the target BS, based on configuration information configured in the handover command message. As another method, the UE may apply the second PDCP layer architecture proposed in the disclosure to the SRB, thereby configuring a first bearer for the source BS and configuring a second bearer for the target BS. As another method, when the UE applies the second PDCP layer architecture to the SRB, the UE may reset window state variables by re-establishing a PDCP layer or a RLC layer for the first bearer, may stop a timer, and may indicate a plurality of items of stored data (PDCP SDU or PDCP PDU) to be discarded (this may be performed when a fallback procedure proposed in the disclosure is triggered).

2> In a case where the UE triggers the handover procedure, when the UE starts the DAPS handover method, the UE may not stop the second timer for the source BS even when the second timer is running. When the first timer is running (or even when the first timer is not running), when the condition (the indicator indicating out-of-synchronization of a radio link signal is received the preset number of times from the lower layer) for starting the second timer is satisfied, the second timer may be started. The second timer may be operated with respect to a radio link between the UE and the source BS. As another method, two second timers may be operated, such that one second timer may be operated with respect to a radio link between the UE and the source BS, and the other second timer may be operated with respect to a radio link between the UE and the target BS. For example, even when the first timer is running, the second timer may be used with respect to a radio link to the source BS or the target BS. However, even when the second timer is expired, if the first timer is not expired but is running, the UE may not trigger an RRC connection re-establishment procedure. For example, even when the second timer for the source BS is expired or a RLF occurs, if the first timer is not expired but is running, the random access procedure is being performed on the target BS, or the handover procedure is being performed on the target BS, the UE may not trigger the RRC connection re-establishment procedure and may release the radio link to the source BS.

In addition, the UE may not release RRC configuration information (e.g., bearer configuration information, or the like) configured by the source BS and may reuse it when the RRC connection re-establishment procedure is triggered at a later time. In addition, when the first timer is not expired but is running even when the second timer is expired, the UE may not trigger the RRC connection re-establishment procedure and the source BS may report source link failure to the target BS, or the UE may release a link to the source BS (e.g., the UE may release first bearers for the source BS) or may suspend the first bearers for the source BS. However, when the second timer is expired, if the first timer is expired, is stopped, or is not running because the first timer is not started, the UE may trigger the RRC connection re-establishment procedure. The reason why the second timer is operated even when the handover procedure is performed is to allow the UE to perform a fallback procedure when a radio link to the source BS or the target BS is active when handover failure occurs while the UE monitors the radio link to the source BS or the target BS. When the second timer for the target BS is expired or a radio link to the target BS fails, if the first timer is expired, is stopped, or is not running because the first timer is not started, or the random access procedure to the target BS has been successfully performed, the RRC connection re-establishment procedure may be triggered.

2> In a case where the UE triggers the handover procedure, when the UE triggers the DAPS handover method, the UE may not stop the third timer for the source BS even when the third timer is running Thereafter, only while the second timer is running, the UE may start the third timer when the condition (when the frequency measurement procedure is triggered for the frequency measurement identifier configured for the third timer) for starting the third timer is satisfied. For example, because the UE uses the second timer even when the first timer is running, the UE may also use the third timer. The third timer may be operated with respect to a radio link between the UE and the source BS. As another method, two third timers may be operated, such that one third timer may be operated with respect to a radio link between the UE and the source BS, and the other third timer may be operated with respect to a radio link between the UE and the target BS. For example, even when the first timer is running, the third timer may be used with respect to a radio link to the source BS or the target BS. However, even when the third timer is expired, if the first timer is not expired but is running, the UE may not trigger an RRC connection re-establishment procedure. In addition, when the first timer is not expired but is running even when the third timer is expired, the UE may not trigger the RRC connection re-establishment procedure and the source BS may report source link failure to the target BS, or the UE may release a link to the source BS (e.g., the UE may release first bearers for the source BS) or may suspend the first bearers for the source BS. However, when the third timer is expired, if the first timer is expired, is stopped, or is not running because the first timer is not started, the UE may trigger the RRC connection re-establishment procedure. The reason why the third timer is operated even when the handover procedure is performed is to allow the UE to perform a fallback procedure and to report a frequency measurement result in the fallback procedure when a radio link to the source BS is active when handover failure occurs while the UE monitors the radio link to the source BS.

2> When the UE successfully performs the handover procedure on the target BS, the UE stops the first timer.

2> When the first timer is expired (e.g., when the handover procedure to the target BS fails), when a maximum re-transmission number of times for a RLC layer with respect to the target BS exceeds, when the UE receives the handover command message but configuration information of the handover command message exceeds capability of the UE, when an error occurs in application of the configuration information such that the handover fails, when a problem occurs in a random access to the target BS and the UE continuously attempts a random access procedure but the first timer is expired and thus the UE fails to perform the handover procedure, when the UE runs the second timer or the third timer for the target BS but the second timer or the third timer is expired before the handover procedure is completed, or when a T304 timer stops or is expired and the UE determines the handover procedure to have failed, 3> when the second timer or the third timer for a radio link between the UE and the source BS is not expired (or when the second timer or the third timer for a radio link between the UE and the source BS is not started or is running) or when a radio link between the UE and the source BS is active, 4> the UE may determine that the radio link between the UE and the source BS is active, and may perform a fallback procedure proposed in the disclosure.

4> When the UE starts the fallback procedure, if a SRB (e.g., SRB1 or a MAC layer, a RLC layer, or a PDCP layer for SRB1) configured for the source BS has been released, the UE may reconfigure or newly configure the SRB, and may perform the fallback procedure on the SRB (e.g., SRB1). As another method, when the second PDCP layer architecture proposed in the disclosure is applied to the SRB, the UE may perform the fallback procedure through the first bearer for the source BS and may release the second bearer for the target BS. For example, the UE may switch UL data transmission to the first bearer for the source BS, may indicate a RLC layer or a MAC layer for the first bearer of existence of data to be transmitted, and may transmit a handover failure report message for the fallback procedure via the first bearer.

4> In the situation above, the fallback procedure refers to a procedure in which the UE configures a message reporting handover failure and reports the handover failure to the source BS via the SRB (e.g., SRB1) configured for the source BS. When the UE transmits the message reporting handover failure to the source BS, the UE may also report a result of frequency measured by the UE and thus may support a fast recovery of a link to the source BS. As another method, the UE may define and transmit MAC control information (e.g., the UE may indicate existence of data to be transmitted or may define and indicate a special value in new MAC control information or a buffer status report, thereby indicating the handover failure), RLC control information, or PDCP control information, and thus, may indicate the handover failure to the source BS. As another method, the UE may transmit an RRC connection re-establishment request message to the SRB (e.g., SRB0 or SRB1) for the source BS. As another method, in the situation above, the fallback procedure may refer to a procedure in which, when the handover fails, the UE releases the second bearer for the target BS in the second PDCP layer architecture of each bearer or a bearer configured with the DAPS handover method, or switches to the first PDCP layer architecture, and then resumes data transmission or reception via the first bearer for the source BS, and the UE may indicate the MAC layer for the first bearer of existence of data to be transmitted, may request scheduling or report data to be transmitted (e.g., the buffer status report) to the source BS or may transmit a new MAC CE, RLC control data, or PDCP control data to the source BS, thereby indicating, to the source BS, that the UE is to fall back to the source BS and resume data transmission. Thereafter, the UE may newly configure or resume an SRB for the source BS. In the fallback procedure, because each bearer or bearers not configured with the DAPS handover method do not have the second PDCP layer architecture, when the handover fails, the UE may release, from the MAC layer for the target BS, a PDCP layer, a RLC layer, bearer configuration information, or logical channel identifier information, which is previously configured and then is reconfigured in configuration information of a handover command message, or may switch to and configure the MAC layer for the source BS, and may resume data transmission or reception to or from the source BS via each bearer. When the UE received the handover command message, the UE may apply the bearer configuration information configured in the handover command message to the MAC layer for the bearer corresponding to the target BS, the bearer not being configured with the DAPS handover method, and may switch a link of the PDCP layer or the RLC layer for the bearer not configured with the DAPS handover method from the MAC layer for the source BS to the MAC layer for the target BS. For example, when the UE receives the handover command message, the upper layer (e.g., the RRC layer) of the UE may indicate the MAC layer for the source BS to perform MAC reconfiguration by using configuration information of a current MAC layer, the configuration information excluding configuration information related to the bearer for which the DAPS handover method is not indicated, or the upper layer (e.g., the RRC layer) of the UE may indicate the MAC layer for the source BS to perform MAC reconfiguration by using configuration information of a current MAC layer, the configuration information only including configuration information related to the bearer for which the DAPS handover method is indicated. For example, because, when the UE receives the handover command message, the UE can release configuration information of the PDCP layer, the RLC layer, or the MAC layer for the bearer not configured with the DAPS handover method from the MAC layer for the source BS, and can apply the configuration information to the MAC layer for the target BS or perform connection according to bearer configuration for the target BS, and therefore, if the UE performs the fallback procedure, the UE has to reconfigure the bearer not configured with the DAPS handover method to the MAC layer for the source BS. For example, when the UE performs the fallback procedure, the upper layer (e.g., the RRC layer) of the UE may indicate the MAC layer for the source BS to perform MAC reconfiguration by using configuration information of a current MAC layer, the configuration information including configuration information related to the bearer for which the DAPS handover method is not indicated and configuration information related to the bearer for which the DAPS handover method is indicated, or when the fallback procedure is performed, the UE may reconfigure or recover bearer configuration (e.g., PDCP layer configuration information, RLC layer configuration information, MAC layer configuration information, or PHY layer configuration information) prior to reception of the handover command message, and may apply them to bearers (PDCP layer configuration information, RLC layer configuration information, MAC layer configuration information, or PHY layer configuration information for SRB, AM DRB, or UM DRB) for the source BS.

4> In the fallback procedure, when the UE transmits the handover failure report message (e.g., the RRC message, the MAC CE, the RLC control data, or the PDCP control data proposed above) to the source BS, the UE may start the fourth timer. When the UE receives an indication or a message from the source BS, in response to the handover failure report message transmitted by the UE, the UE may stop the fourth timer. However, when the fourth timer is expired or a response message is not received until the fourth timer is expired, the UE performs an RRC connection re-establishment procedure (the UE may release a link to the BS, and may perform an RRC connection procedure from the start, i.e., may perform a cell selection or reselection procedure, perform a random access procedure, and transmit an RRC connection re-establishment request message). When the UE triggers the RRC connection re-establishment procedure due to expiration of the fourth timer, the UE may stop the second timer or the third timer if the second timer or the third timer is running 3> when the second timer or the third timer for a radio link between the UE and the source BS or the target BS is expired or a radio link between the UE and the source BS or the target BS is not active, 4> the UE performs an RRC connection re-establishment procedure (the UE may release a link to the BS, and may perform an RRC connection procedure from the start, i.e., may perform a cell selection or reselection procedure, perform a random access procedure, and transmit an RRC connection re-establishment request message).

2> When the UE performs the DAPS handover procedure, if the second condition proposed in the disclosure is satisfied, the UE may release a link to the source BS, or may release a SRB for the source BS and may stop and reset the second timer or the third timer for the source BS if the second timer or the third timer is running Only when the UE stops the second timer or the third timer, the UE can prevent an unnecessary RRC connection re-establishment procedure due to expiration of the second timer or the third timer. Because that the second condition is satisfied may mean that the handover procedure is successfully performed, expiration of the second timer or the third timer due to stop of the first timer may trigger the unnecessary RRC connection re-establishment procedure. As another method, when the first condition proposed in the disclosure is satisfied or the handover procedure is successfully performed, the UE may release the SRB for the source BS, or may stop and reset the second timer or the third timer for the source BS if the second timer or the third timer is running Only when the UE stops the second timer or the third timer, the UE can prevent an unnecessary RRC connection re-establishment procedure due to expiration of the second timer or the third timer. Because that the first condition is satisfied may mean that the handover procedure is successfully performed, expiration of the second timer or the third timer due to stop of the first timer may trigger the unnecessary RRC connection re-establishment procedure.

When the UE determines occurrence of the handover failure according to the method proposed in the disclosure and performs the fallback procedure as the condition proposed in the disclosure is satisfied, the UE adds information indicating the occurrence of the handover failure to an RRC message (e.g., a ULInformationTransferMRDC message or a FailureInformation message) and transmits the RRC message to SRB1 to which the second PDCP layer architecture is applied or SRB1, thereby allowing the source BS to identify the handover failure of the UE. When the source BS detects the handover failure of the UE, the source BS may configure and transmit an RRC message (e.g., an RRCReconfiguration message or an RRCRelease message) to the UE, in response to the handover failure, and when the UE receives the RRCReconfiguration message (the RRC message received via SRB1 to which the second PDCP layer architecture is applied or SRB1) as the RRC message in response to the handover failure report, the UE may apply and complete configuration information thereof and may transmit, in response to the message from the source BS, an RRCReconfigurationComplete message to the source BS via SRB1 to which the second PDCP layer architecture is applied or SRB1, and if the RRCReconfiguration message indicates handover or access to another cell, the UE may complete a random access procedure with respect to the cell and may transmit an RRCReconfigurationComplete message via SRB1. However, when the UE receives the RRCRelease message as the RRC message in response to the handover failure report, the UE may transition to an RRC idle mode or may transition to an RRC inactive mode according to configuration information indicated by the RRCRelease, and may not transmit, to the BS, an additional RRC message in response to the RRC message.

Figure 1L:
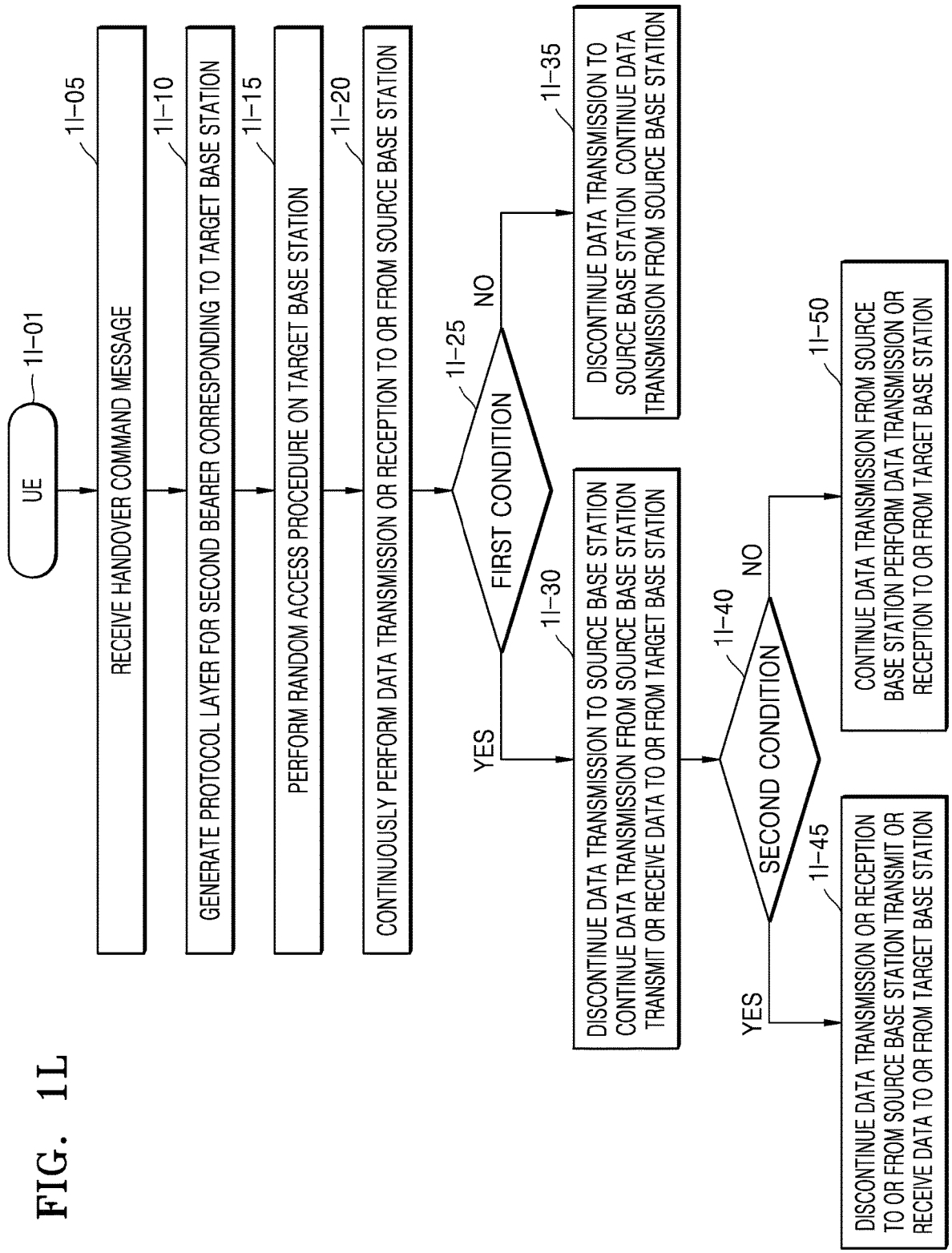
FIG. 1L is a diagram illustrating UE operations according to an embodiment of the disclosure.

FIG. 1L is a diagram illustrating UE operations that are applicable according to an embodiment in the disclosure.

Referring to FIG. 1L, a UE 1*l*-01 may perform data transmission or reception to or from a source BS via each bearer by using a first PDCP layer architecture. When a handover command message received in operation 1*l*-05 by the UE 1*l*-01 indicates the DAPS handover method of Embodiment 2 proposed in the disclosure or indicates the DAPS handover method for each bearer, the UE 1*l*-01 may switch to a second PDCP layer architecture for each bearer or bearers for which the DAPS handover method is indicated, with respect to a target BS indicated in the handover command message, and may configure and establish protocol layers for a second bearer. When the UE 1*l*-01 performs a random access procedure on the target BS in operations 1*l*-10 and 1*l*-15, the UE 1*l*-01 may continuously perform data transmission or reception (UL data transmission and DL data reception) to or from the source BS by using protocol layers for a first bearer in operation 1*l*-20.

When the first condition of the disclosure is satisfied in operation 1*l*-25, the UE 1*l*-01 may discontinue UL data transmission to the source BS by using the protocol layers for the first bearer, and may switch the UL data transmission and thus may transmit UL data to the target BS by using the protocol layers for the second bearer. The UE 1/-01 may continuously receive DL data from the source BS and the target BS by using the protocol layers for the first and second bearers in operation 1/-30. In addition, a PDCP layer for the second bearer may continuously perform data transmission or reception to or from the target BS without interruption by using data to be transmitted or received, SN information, or information, such as header compression and decompression context, which is stored in a PDCP layer for the first bearer. When the first condition is not satisfied, the UE 1/-01 may continuously determine the first condition while continuously performing an ongoing procedure in operation 1/-35.

When the second condition is satisfied in operation 1/-40, the UE 1/-01 may discontinue DL data reception from the source BS by using the protocol layers for the first bearer in operation 1/-45. In addition, the PDCP layer for the second bearer may continuously perform data transmission or reception to or from the target BS without interruption by using data to be transmitted or received, SN information, or information, such as header compression and decompression context, which is stored in a PDCP layer for the first bearer.

When the second condition is not satisfied, the UE 1/-01 may continuously determine the second condition while continuously performing an ongoing procedure in operation 1/-50.

According to an embodiment of the disclosure, a PDCP layer proposed in the disclosure may perform different procedures according to types of handover indicated in a handover command message received by a UE.

When a handover type indicated in the handover command message the UE receives from a source BS is handover of Embodiment 1 (e.g., a normal handover method), or the UE receives the handover command message, when ReconfigWithSync information or MobilityControlInfo indicates a first handover method (e.g., Embodiment 1 of the disclosure or a normal handover method), Embodiment 2 (the DAPS handover method) proposed in the disclosure is not configured, or any bearer is not configured in bearer configuration information in Embodiment 2 (the DAPS handover method) proposed in the disclosure, or with respect to a bearer for which Embodiment 2 (the DAPS handover method) proposed in the disclosure is not configured in its bearer configuration information, the UE may perform a PDCP re-establishment procedure on the PDCP layer according to each bearer. For example, the UE may reset window state variables with respect to a SRB and may discard a plurality of items of stored data (PDCP SDU or PDCP PDU), may reset window state variables with respect to a UM DRB, may perform, in ascending order of COUNT values, compression, ciphering, or integrity protection on a plurality of items of data that are not transmitted to a lower layer yet or for which a PDCP discard timer is not expired, based on header (or data) compression context or security key of the target BS, and then may transmit or retransmit the data. When a realignment timer is running, the UE may stop and reset the realignment timer, may process the plurality of items of received data (PDCP SDU or PDCP PDU) in order, and may provide the data to an upper layer, and the UE does not reset window state variables with respect to an AM DRB, and may perform, based on header (or data) compression context or security key of the target BS, compression, ciphering, or integrity protection on data starting from first data (PDCP SDU or PDCP PDU) for which successful delivery is not acknowledged by a lower layer, in ascending order of PDCP SNs or COUNT values. As another method, the reception PDCP layer may process received data or store data due to a re-establishment procedure of a lower layer (e.g., the RLC layer), and when an indicator (drb-Continue ROHC) indicating to keep using header compression context is not configured for AM DRBs, the reception PDCP layer may perform a header decompression procedure on a plurality of pieces of stored data, based on header compression context (ROHC). In addition, the reception PDCP layer may process received data or store data due to the re-establishment procedure of the lower layer (e.g., the RLC layer), and may perform a header decompression procedure on a plurality of pieces of stored data with respect to AM DRBs, based on EHC. As another method, the reception PDCP layer may process received data or store data due to a re-establishment procedure of a lower layer (e.g., the RLC layer), and when an indicator (drb-Continue EHC) indicating to keep using header compression context is not configured for AM DRBs, the reception PDCP layer may perform a header decompression procedure on a plurality of pieces of stored data, based on header compression context (EHC).

When a handover type indicated in the handover command message the UE receives from the source BS is handover of Embodiment 2 (or is indicated for each bearer), or in a case where the UE receives the handover command message, when the handover command message or ReconfigWithSync information or mobilityControlInfo information configures Embodiment 2 (the DAPS handover method) proposed in the disclosure, when bearer configuration information configures Embodiment 2 (the DAPS handover method) proposed in the disclosure for a certain bearer, when bearer configuration information configures Embodiment 2 (the DAPS handover method) proposed in the disclosure for at least one bearer, or with respect to a bearer for which Embodiment 2 (the DAPS handover method) proposed in the disclosure is configured in bearer configuration information, when the UE receives the handover command message indicating the DAPS handover method for the PDCP layer, the PDCP layer for which the DAPS handover method is indicated may not perform a PDCP re-establishment procedure and may perform procedures below. For example, the UE may reset window state variables with respect to an SRB (variable resetting may be skipped to perform fallback when DAPS handover fails) or may discard a plurality of items of stored data (PDCP SDU or PDCP PDU): may not reset window state variables with respect to an UM DRB, and may continuously perform, to or from the source BS, data transmission or reception on plurality of items of data that are not transmitted to a lower layer yet or for which a PDCP discard timer is not expired: and may not reset window state variables with respect to an AM DRB, and may continuously perform data transmission or reception to or from the source BS. The UE may not reset but changelessly use UL or DL ROHC context for the source BS, may reset UL or DL ROHC context for the target BS, and may start in an initial state (e.g., an IR state in U mode). As another method, the UE may reset UL or DL ROHC context for the source BS, may start an initial state (e.g., a IR state in U mode), may reset UL or DL ROHC context for the target BS, and may start in an initial state (e.g., a IR state in U mode).

The UE may perform procedures on each bearer (or a bearer for which Embodiment 2 is indicated), the procedures being proposed in the disclosure on condition that the first condition is satisfied.

The UE may perform procedures on each bearer (or a bearer for which Embodiment 2 is indicated), the procedures being proposed in the disclosure on condition that the second condition is satisfied.

When the source BS indicates, to the UE, handover to which embodiments proposed in the disclosure are applied, the source BS may start data forwarding to the target BS when a third condition below is satisfied. The third condition may mean that one or more conditions below are satisfied.

In a case where the source BS receives, from the target BS, an indication indicating that the UE successfully completed handover.

In a case where the source BS transmits a handover command message to the UE

In a case where the source BS transmits the handover command message to the UE and identifies successful delivery (HARQ ACK or NACK or RLC ACK or NACK) of the handover command message In a case where the source BS receives, from the UE, an indication (e.g., an RRC message (e.g., an RRCReconfiguration message)) indicating that a link to the source BS is to be released, or receives a MAC CE, an RLC control PDU, or PDCP control PDU from the UE In a case where the source BS transmits the handover command message to the UE and starts a certain timer, and then the timer is expired In a case where acknowledgement (HARQ ACK or NACK or RLC ACK or NACK) with respect to successful delivery of DL data is not received from the UE for a certain time Hereinafter, UE operations of particularly performing technologies proposed above in the disclosure will now be proposed.

1> When the UE receives a handover command message (e.g., a RRCReconfiguration message) or receives ReconfigWithSync information (in the case of NR BS) or MobilityControlInfo information (in the case of LTE BS) in the RRCReconfiguration message, the UE may perform one or more operations among operations below.

2> The UE performs the first timer proposed in the disclosure.

2> When the second handover method (e.g., Embodiment 2 or the DAPS handover method of the disclosure) is not indicated, when the DAPS handover method is not indicated for each bearer identifier or each logical channel identifier, when the DAPS handover method is not configured for at least one bearer, or when the DAPS handover method is not configured for any bearer, 3> the UE may stop the second timer if the second timer for the source BS proposed in the disclosure is running 2> When the second handover method (e.g., Embodiment 2 or the DAPS handover method of the disclosure) is indicated, when the DAPS handover method is indicated for each bearer identifier or each logical channel identifier, when the DAPS handover method is configured for at least one bearer, or when the DAPS handover method is configured for a certain bearer, the UE may perform one or more operations among operations below on a bearer for which the DAPS handover method is configured.

3> The UE does not stop the second timer even when the second timer for the source BS proposed in the disclosure is running 3> The UE suspends SRBs for the source BS.

3> The UE may generate or establish a MAC layer for the target BS.

3> The UE may apply a new UE identifier (e.g., C-RNTI) for the target BS or for the MAC layer or a PHY layer for the target BS.

3> The UE may configure the target BS for lower layers (e.g., a SDAP layer, a PDCP layer, or an RLC layer, or the MAC layer or the PHY layer for the target BS) with a plurality of pieces of configuration information which are configured in the handover command message.

3> The UE may regard SCells configured by the source BS as being in an inactive state.

3> The UE may generate or establish RLC layers for the target BS or for the MAC layer for the target BS, based on the configuration information of the RLC layer which is received from the handover command message.

3> The UE may generate or establish, based on the configuration information of the MAC layer which is received from the handover command message, a logical channel identifier or its related configuration information (e.g., priority, prioritizedBiteRate, BucketSizeDuration, or the like) for the target BS or the MAC layer for the target BS.

3> The UE may reconfigure a lower layer (e.g., the MAC layer) with configuration information (the logical channel identifier, priority, prioritizedBiteRate, BucketSizeDuration, or the like) excluding configuration information of the MAC layer related to bearers for which the DAPS handover method is not configured in the handover command message, the configuration information being excluded from current, previous, or existing configuration information (e.g., MAC layer configuration information) about the source BS. As another method, the UE may reconfigure a lower layer (e.g., the MAC layer) with only configuration information of the MAC layer related to bearers for which the DAPS handover method is configured in the handover command message, the configuration information being included in current, previous, or existing configuration information (e.g., MAC layer configuration information (the logical channel identifier, priority, prioritizedBiteRate, BucketSizeDuration, or the like)) about the source BS. More specifically, for the MAC layer for the source BS, the UE may maintain or configure the MAC layer configuration information (the logical channel identifier, priority, prioritizedBiteRate, BucketSizeDuration, or the like) for a bearer for which the DAPS handover method is configured, and may release the MAC layer configuration information for a bearer for which the DAPS handover method is not configured. As another method, by using an RRC message, configuration information of the MAC layer for the source BS which is to be applied to when the source BS performs the DAPS handover method may be configured.

3> The UE may generate or establish a PDCP layer corresponding to a SRB or a SRB identifier for the target BS or the MAC layer for the target BS, and may configure the PDCP layer with security keys for the target BS which are received from the handover command message and a ciphering or deciphering algorithm or an integrity protection or integrity verification algorithm. When a ciphering function or an integrity function is configured in or is not released from the PDCP layer, the PDCP layer may be configured with the ciphering function or an integrity protection function by applying the security key or the algorithm thereto.

3> When PDCP layer configuration information about the SRB or the SRB identifier exists, the PDCP layer configuration information may be applied, and when the PDCP layer configuration information does not exist, default configuration information may be applied.

3> A PDCP re-establishment procedure indicator may be configured to be constantly False for the bearer (a SRB or a DRB) for which the DAPS handover method is configured, thereby preventing triggering of a PDCP re-establishment procedure. This is because a data interruption time may occur in the DAPS handover method when the PDCP re-establishment procedure is performed. As another method, the PDCP re-establishment procedure may be indicated for an SRB, and the PDCP re-establishment procedure may not be indicated for a DRB. This is because an SRB for the source BS and an SRB for the target BS may be independently configured.

3> The bearer (a SRB or a DRB) for which the DAPS handover method is configured may be reconfigured from the first PDCP layer architecture to the second PDCP layer architecture.

3> When configuration information (e.g., QoS and bearer mapping information) of a SDAP layer is included, the configuration information of the SDAP layer may be configured for the target BS. Current configuration information of a SDAP layer for the source BS may be maintained, and may be released when a link to the source BS is released.

3> When whole configuration information is newly configured (full configuration), the UE may apply and operate a default value of the first timer or the second timer for the target BS, may apply default configuration information to the PHY layer or the MAC layer, and may apply default configuration information to SRBs. The UE changelessly maintains and applies configuration information with respect to a current BS or the source BS.

2> Otherwise, (e.g., when the second handover method (e.g., Embodiment 2 or the DAPS handover method of the disclosure) is not indicated, when the DAPS handover method is not indicated for each bearer identifier or each logical channel identifier, when the DAPS handover method is not configured for at least one bearer, when the DAPS handover method is not configured for any bearer, or for a bearer not configured with DAPS handover), the UE may perform one or more operations among operations below.

3> The UE may reset a MAC layer for the source BS or the current BS.

3> The UE may regard SCells configured by the source BS as being in an inactive state.

3> The UE may apply a new UE identifier (e.g., C-RNTI) for the source BS, for the current BS, or for the MAC layer or a PHY layer for the current BS.

3> When a RLC re-establishment procedure is indicated, the UE may perform the RLC re-establishment procedure.

3> When a PDCP re-establishment procedure is indicated, the UE may perform the PDCP re-establishment procedure.

3> The UE may reconfigure lower layers (e.g., a SDAP layer, a PDCP layer, or an RLC layer, or the MAC layer or the PHY layer for the current BS or a cell group) with a plurality of pieces of configuration information for the target BS which are configured in the handover command message.

3> When configuration information (e.g., QoS and bearer mapping information) of a SDAP layer is included, configuration information of a current SDAP layer may be reconfigured as the configuration information of the SDAP layer.

3> When whole configuration information is newly configured (full configuration), the UE releases all of configuration information (configuration information of the SDAP layer, the PDCP layer, the RLC layer, the MAC layer, or the PHY layer) with respect to the current BS or the source BS. Thereafter, the UE may apply and operate a default value of the first timer or the second timer for the current BS or the source BS, may apply default configuration information to the PHY layer or the MAC layer, and may apply default configuration information to SRBs.

1> When the first timer proposed in the disclosure is expired (e.g., a handover procedure fails), 2> when the first timer for the source BS is expired 3> the UE releases designated preamble information when it is configured in random access related configuration information.

3> When the second handover method (e.g., Embodiment 2 or the DAPS handover method of the disclosure) is indicated above, when the DAPS handover method is indicated for each bearer identifier or each logical channel identifier, when the DAPS handover method is configured for at least one bearer, when the DAPS handover method is configured for a certain bearer, when a radio link between the source BS and the UE does not fail, or when a radio link does not fail (when the second timer or the third timer is not expired), 4> the UE resumes suspended SRBs configured for the source BS or the MAC layer for the source BS (or the target BS).

4> The UE may configure a handover failure message and may transmit it to the source BS via the resumed SRBs. Alternatively, the UE may resume DRBs and may resume data transmission or reception.

3> Otherwise (e.g., if the DAPS handover method is not configured or if the DAPS handover method is configured but a radio link to the source BS fails), 4> the UE may return configuration information of the UE to previous configuration information used for the source BS.

4> The UE may trigger and perform an RRC connection re-establishment procedure.

1> When the UE detects a radio link problem in a physical layer,

2> when the second handover method (e.g., Embodiment 2 or the DAPS handover method of the disclosure) is indicated, when the DAPS handover method is indicated for each bearer identifier or each logical channel identifier, when the DAPS handover method is configured for at least one bearer, when the DAPS handover method is configured for a certain bearer, and when the first timer is running, the UE receives an indicator indicating out-of-synchronization (out-of-sync indication) of a radio link signal from a lower layer (e.g., the MAC layer or the PHY layer) a preset number of times and thus detects a problem of the PHY layer, 3> the UE may start the second timer (e.g., T310).

2> When the UE receives the indicator indicating out-of-synchronization (out-of-sync indication) of the radio link signal from the lower layer (e.g., the MAC layer or the PHY layer) a preset number of times and thus detects a problem of the PHY layer, if the first timer, a T300 timer, a T301 timer, a T304 timer, a T311 timer, or a T319 timer is not running, 3> the UE may start the second timer (e.g., T310). For example, if the DAPS handover method is not configured but the first timer is running, even when the UE detects the physical layer problem, the UE does not start the second timer.

1> When the RRC layer of the UE receives the handover command message (e.g., the RRCReconfiguration message) or receives ReconfigWithSync information (in the case of NR BS) or MobilityControlInfo information (in the case of LTE BS) in the RRCReconfiguration message, or successfully performs a random access procedure triggered by the MAC layer of the target BS or the certain cell group, 2> the UE releases the first timer for the source BS, the target BS, or the cell group.

2> When the second timer for the source BS is running (during handover), the UE releases the second timer. This is because an unnecessary RRC connection re-establishment procedure may be triggered when the second timer is expired.

2> As another method, when the second handover method (e.g., Embodiment 2 or the DAPS handover method of the disclosure) is configured or the DAPS handover method is configured for each bearer identifier or each logical channel identifier, 3> if the second timer for the source BS is running, the UE releases the second timer. This is because an unnecessary RRC connection re-establishment procedure may be triggered when the second timer is expired.

2> The UE releases the third timer for the source BS, the target BS, or the cell group.

1> When the UE detects a radio link problem in a lower layer (a PHY layer (out-of-synchronization signal detection indication) or an RLC layer (an excess of a maximum number of retransmission)), 2> when the second handover method (e.g., Embodiment 2 or the DAPS handover method of the disclosure) is indicated, when the DAPS handover method is indicated for each bearer identifier or each logical channel identifier, when the DAPS handover method is configured for at least one bearer, and when radio link failure with respect to the source BS is detected (e.g., the second timer or the third timer (for the source BS) is expired) or the first timer is running, 3> the UE determines occurrence of radio link failure with respect to the source BS.

3> The UE resets the MAC layer for the source BS.

3> The UE releases a bearer or configuration information (e.g., a PHY layer, a MAC layer, an RLC layer, a PDCP layer, or a SDAP layer) for the source BS.

3> The UE may release RLC layers or logical channels for the source BS from bearers configured with the DAPS handover method employing the second PDCP layer architecture, and may reconfigure the bearers with the first PDCP layer architecture or the third PDCP layer architecture. By doing such procedure, even when a radio link to the source BS fails, when the UE successfully performs handover to the target BS, the bearer may normally operate with the first PDCP layer architecture or the third PDCP layer architecture.

Figure 1M:
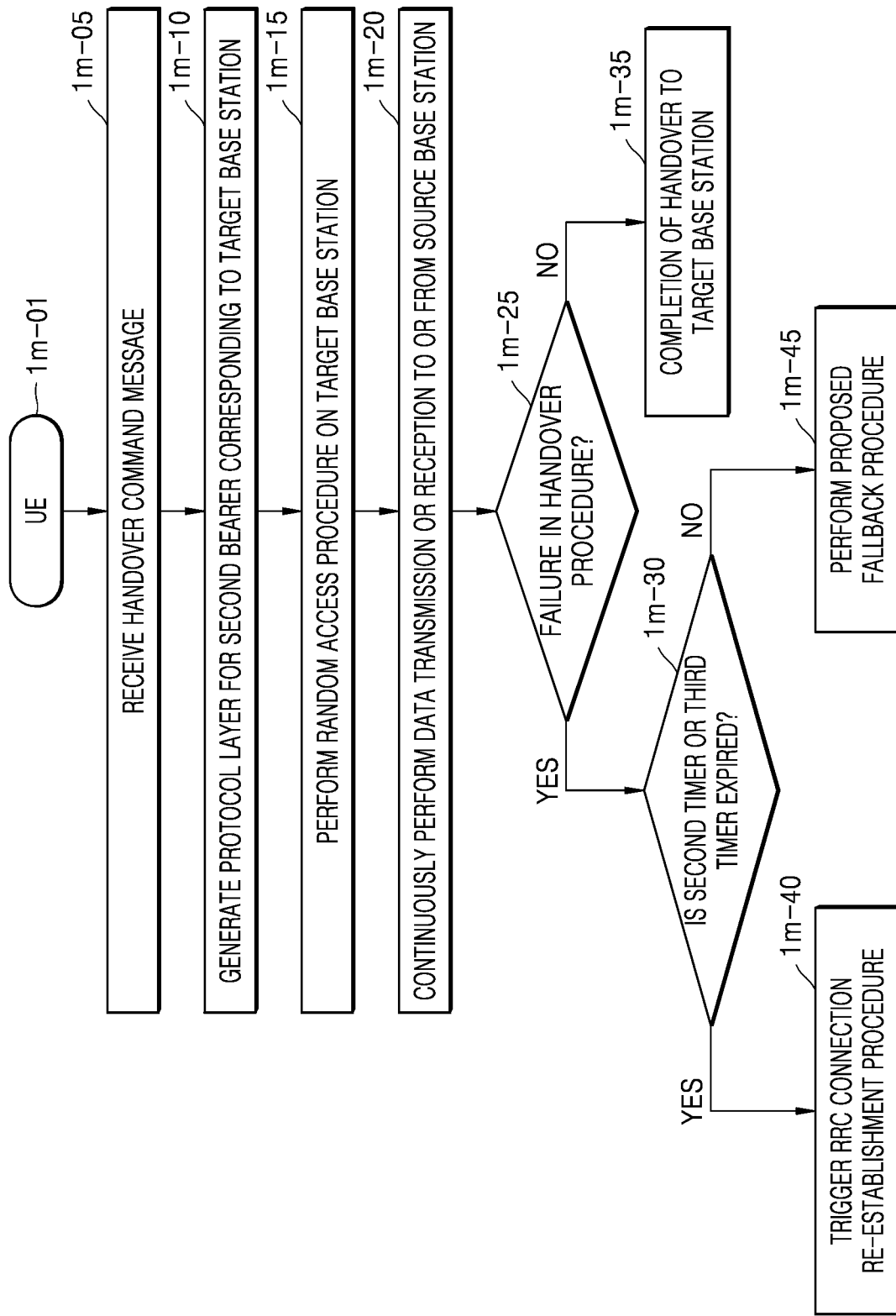
FIG. 1M is a diagram illustrating operations of a UE that performs a fallback procedure when handover fails in a DAPs handover method according to an embodiment of the disclosure.

FIG. 1M is a diagram illustrating operations of a UE 1*m*-01 that performs a fallback procedure when handover fails in a DAPs handover method according to an embodiment of the disclosure.

Referring to FIG. 1M, the UE 1*m*-01 may perform data transmission or reception to or from a source BS via each bearer by using the first PDCP layer architecture. When a handover command message received in operation 1*m*-05 by the UE 1*m*-01 indicates the DAPS handover method of Embodiment 2 proposed in the disclosure or indicates the DAPS handover method for each bearer, the UE 1*m*-01 may switch to a second PDCP layer architecture for each bearer or bearers for which the DAPS handover method is indicated, with respect to a target BS indicated in the handover command message, and may configure and establish protocol layers for a second bearer. When the UE 1*m*-01 performs a random access procedure on the target BS in operation 1*m*-10 and 1*m*-15, the UE 1*m*-01 may continuously perform data transmission or reception (UL data transmission and DL data reception) to or from the source BS by using protocol layers for a first bearer in operation 1*m*-20.

When the UE 1*m*-01 successfully completes a handover procedure in operation 1*m*-25, the UE 1*m*-01 ends the handover procedure according to Embodiment 2 (the DAPS handover method) of the handover method proposed in the disclosure in operation 1*m*-35.

However, when the UE 1*m*-01 fails in the handover procedure in operation 1*m*-25 (e.g., when the first timer is expired in the situation above (e.g., the handover procedure to the target BS fails), when a maximum number of retransmission exceeds in a RLC layer, when the UE 1*m*-01 receives the handover command message but configuration information of the handover command message exceeds capability of the UE 1*m*-01, when an error occurs in application of the configuration information such that the handover is failed, when a problem occurs in a random access to the target BS such that the handover procedure fails, or when the second timer or the third timer is running for the target BS and then the second timer or the third timer is expired before the handover procedure is completed such that the UE releases or expires a T304 timer and determines failure of the handover procedure), when the second timer or the third timer for a radio link between the UE 1*m*-01 and the source BS is not expired (alternatively, when the second timer or the third timer for a radio link between the UE 1*m*-01 and the source BS is not started or is running) in operation 1*m*-40, or when a radio link between the UE 1*m*-01 and the source BS is active, the UE may determine that the radio link between the UE 1*m*-01 and the source BS is active and may perform a fallback procedure proposed in the disclosure in operation 1*m*-45. When the second timer or the third timer for the radio link between the UE 1*m*-01 and the source BS is expired or a radio link between the UE 1*m*-01 and the source BS is not active in operation 1*m*-30, the UE 1*m*-01 performs an RRC connection re-establishment procedure (the UE 1*m*-01 may release a link to the BS, and may perform an RRC connection procedure from the start, i.e., may perform a cell selection or reselection procedure, perform a random access procedure, and transmit an RRC connection re-establishment request message) in operation 1*m*-45.

The disclosure relates to a method and an apparatus for controlling a procedure of a PDCP layer related to the DAPS handover method of the next-generation mobile communication system in a wireless communication system.

The disclosure relates to a method and an apparatus for efficiently performing handover without interruption of data transmission or reception during the handover in the next-generation mobile communication system.

The disclosure relates to a method and an apparatus for performing handover in the wireless communication system, in which a UE according to an embodiment of the disclosure may transmit or receive data to or from a source BS, may receive a handover command from the source BS, may generate a protocol layer for a bearer corresponding to a target BS, and may perform a random access procedure on the target BS. The data being exchanged with the source BS may be transmitted or received based on a predetermined condition even when the random access procedure is being performed.

Figure 1N:
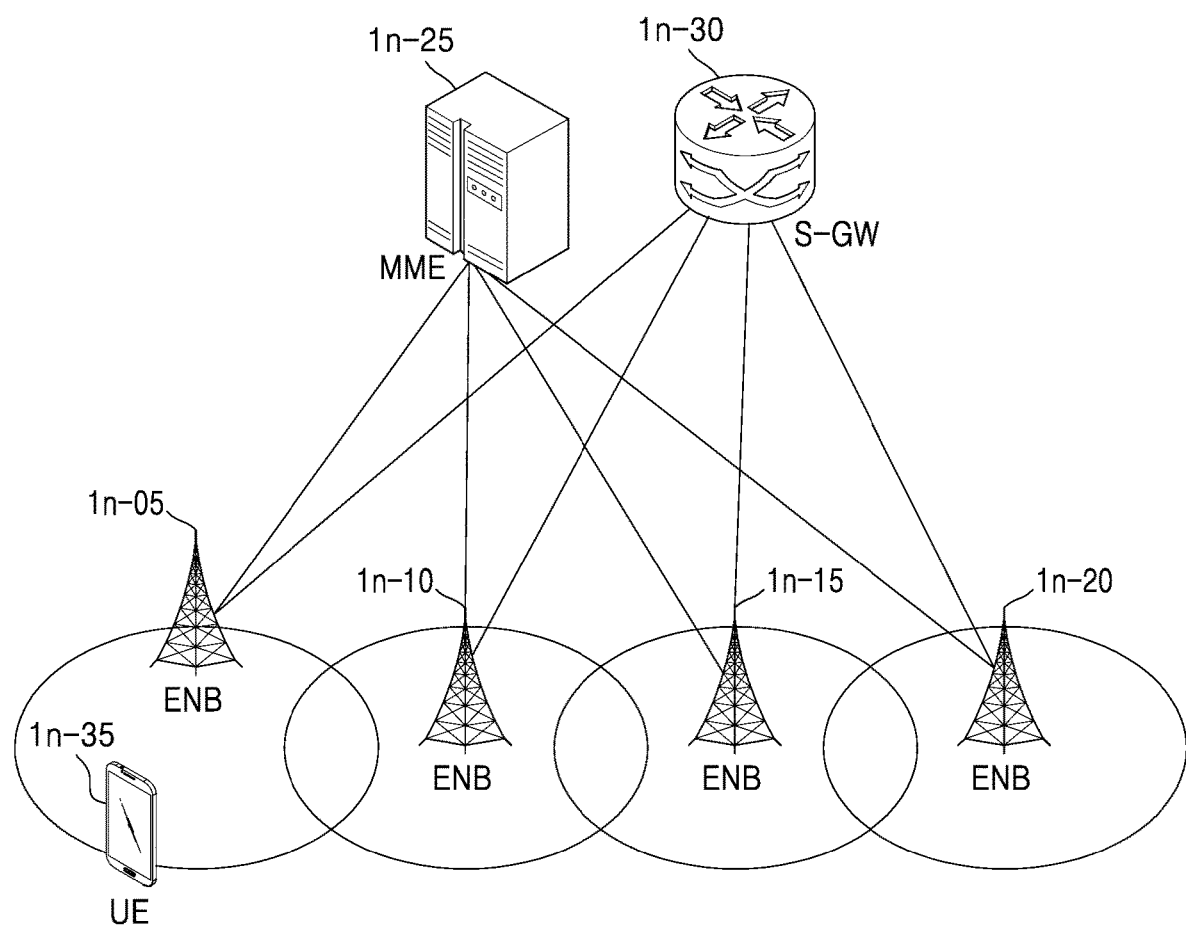
FIG. 1N is a diagram illustrating a configuration of an LTE system according to an embodiment of the disclosure.
Figure 10:
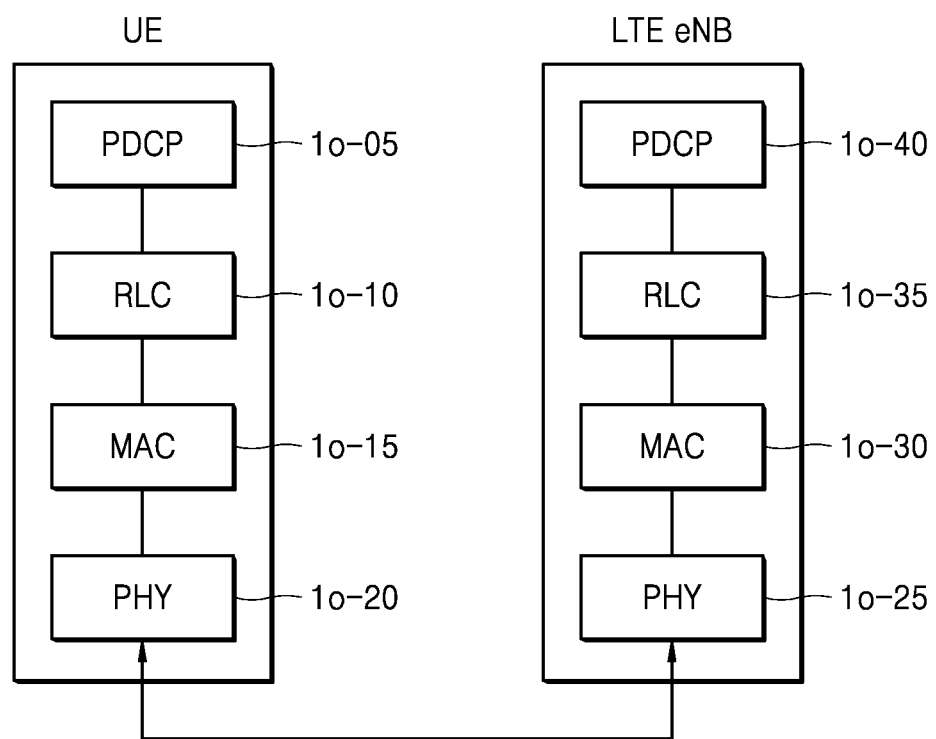

FIG. 1N is a diagram illustrating a configuration of an LTE system according to an embodiment of the disclosure.

Referring to FIG. 1N, a RAN of the LTE system includes a plurality of eNBs (or nodes B or BSs) 1$n$-05, 1$n$-10, 1$n$-15, and 1$n$-20, an MME 1$n$-25, and an S-GW 1$n$-30. A UE (or a terminal) 1$n$-35 may access an external network via the eNB 1$n$-05, 1$n$-10, 1$n$-15, or 1$n$-20 and the S-GW 1$n$-30.

Referring to FIG. 1N, the eNB 1$n$-05, 1$n$-10, 1$n$-15, or 1$n$-20 may correspond to an existing node B of a UMTS. The eNB 1$n$-05, 1$n$-10, 1$n$-15, or 1$n$-20 may be connected to the UE 1$n$-35 through wireless channels and may perform complex functions compared to the existing node B. All user traffic data including real-time services, such as VoIP may be serviced through shared channels in the LTE system, and thus an entity for collating status information, e.g., buffer status information, available transmission power status information, and channel state information, of UEs and performing scheduling may be required and the eNB 1$n$-05, 1$n$-10, 1$n$-15, or 1$n$-20 may operate as such an entity. One eNB generally controls a plurality of cells. For example, the LTE system may use radio access technology, such as OFDM at a bandwidth of 20 MHz to achieve a data rate of 100 Mbps. AMC may be used to determine a modulation scheme and a channel coding rate in accordance with a channel state of a UE. The S-GW 1$n$-30 is an entity for providing data bearers and may establish and release the data bearers by the control of the MME 1$n$-25. The MME 1$n$-25 is an entity for performing a mobility management function and various control functions on the UE 1$n$-35 and is connected to the plurality of eNBs 1$n$-05, 1$n$-10, 1$n$-15, and 1$n$-20.

FIG. 1O is a diagram illustrating a radio protocol architecture of an LTE system according to an embodiment of the disclosure.

Referring to FIG. 1O, the radio protocol architecture of the LTE system may include PDCP layers 1$o$-05 and 1$o$-40, RLC layers 1$o$-10 and 1$o$-35, and MAC layers 1$o$-15 and 1$o$-30 respectively for a UE and an eNB. The PDCP layer 1$o$-05 or 1$o$-40 may perform, for example, IP header compression/decompression. Main functions of the PDCP layer 1$o$-05 or 1$o$-40 are summarized as shown below.

Header compression and decompression: robust header compression (ROHC) only
    Transfer of user data
    In-sequence delivery of upper layer packet data units (PDUs) at PDCP re-establishment procedure for RLC acknowledged mode (AM)
    For split bearers in DC (only support for RLC AM): PDCP PDU routing for transmission and PDCP PDU reordering for reception
    Duplicate detection of lower layer service data units (SDUs) at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in uplink The RLC layer 1$o$-10 or 1$o$-35 may perform an ARQ operation by reconfiguring PDCP PDUs to appropriate sizes. Main functions of the RLC layer 1$o$-10 or 1$o$-35 may be summarized as shown below.

Transfer of upper layer PDUs
    Error correction through ARQ (only for AM data transfer)
    Concatenation, segmentation and reassembly of RLC SDUs (only for unacknowledged mode (UM) and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MAC layer 1$o$-15 or 1$o$-30 may be connected to a plurality of RLC layers configured for one UE and may multiplex RLC PDUs into a MAC PDU and may demultiplex the RLC PDUs from the MAC PDU. Main functions of the MAC layer 1$o$-15 or 1$o$-30 may be summarized as shown below.

Mapping between logical channels and transport channels
    Multiplexing/demultiplexing of MAC SDUs belonging to one or different logical channels into/from transport blocks (TBs) delivered to/from the physical layer on transport channels
    Scheduling information reporting
    Error correction through hybrid ARQ (HARQ)
    Priority handling between logical channels of one UE
    Priority handling between UEs by means of dynamic scheduling
    Multimedia broadcast/multicast service (MBMS) service identification
    Transport format selection
    Padding A PHY layer 1$o$-20 or 1$o$-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 1P:
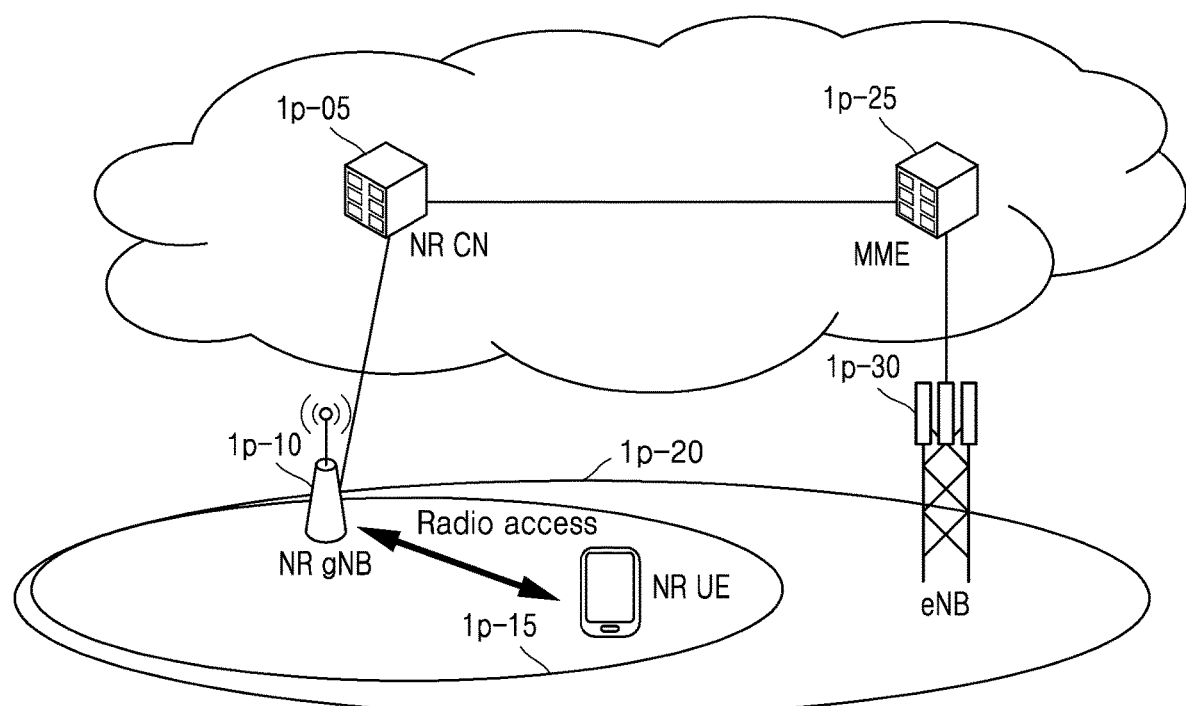
FIG. 1P is a diagram illustrating a next-generation mobile communication system according to an embodiment of the disclosure.

FIG. 1P is a diagram illustrating a next-generation mobile communication system according to an embodiment of the disclosure.

Referring to FIG. 1P, as illustrated, a radio access network of the next-generation mobile communication system (hereinafter, referred to as the NR or 5G communication system) includes a new radio node B (NR gNB, NR NB, or gNB) 1$p$-10 and a new radio core network (NR CN) 1$p$-05. A NR UE (or terminal) 1$p$-15 accesses an external network via the NR gNB 1$p$-10 and the NR CN 1$p$-05.

Referring to FIG. 1P, the NR gNB 1$p$-10 corresponds to an eNB of a legacy LTE system. The NR gNB 1$p$-10 may be connected to the NR UE 1$p$-15 located in region 1$p$-20 through wireless channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 1p-10 may operate as such an entity. One NR gNB generally controls a plurality of cells. The NR or 5G communication system may have a bandwidth greater than the maximum bandwidth of the existing LTE system so as to achieve an ultrahigh data rate, compared to the existing LTE system, and may use OFDM as a radio access technology and may additionally use a beamforming technology. In addition, the NR gNB 1p-10 uses AMC to determine a modulation scheme and a channel coding rate in accordance with a channel state of the NR UE 1p-15. The NR CN 1p-05 performs functions, such as mobility support, bearer configuration, and QoS configuration. The NR CN 1p-05 is an entity for performing a mobility management function and various control functions on the NR UE 1p-15 and is connected to a plurality of base stations. The NR or 5G mobile communication system may cooperate with the existing LTE system, and the NR CN 1p-05 may be connected to an MME 1p-25 through a network interface. The MME 1p-25 is connected to an eNB 1p-30 that is a legacy base station.

Figure 1Q:
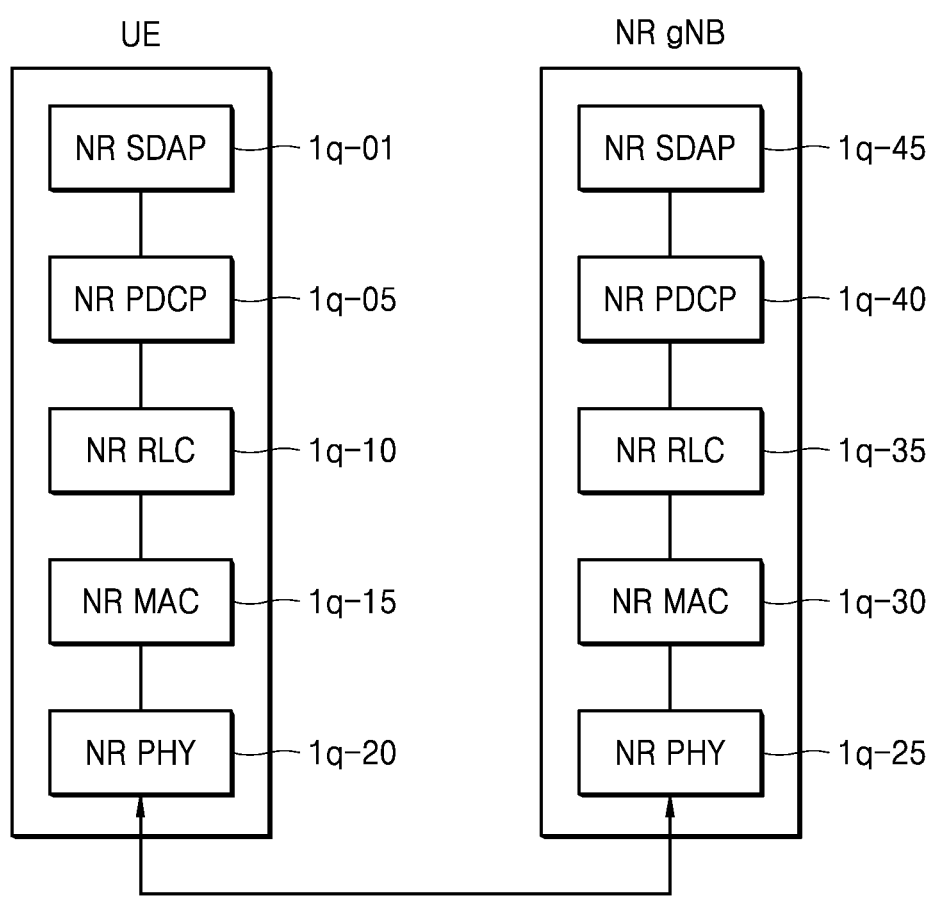
FIG. 1Q is a diagram illustrating a radio protocol architecture of a NR or 5G mobile communication system according to an embodiment of the disclosure.

FIG. 1Q is a diagram illustrating a radio protocol architecture of a NR or 5G mobile communication system according to an embodiment of the disclosure is applicable.

Referring to FIG. 1Q, the radio protocol architecture of the NR or 5G mobile communication system may include NR SDAP layers 1q-01 and 1q-45, NR PDCP layers 1q-05 and 1q-40, NR RLC layers 1q-10 and 1q-35, and NR MAC layers 1q-15 and 1q-30 respectively for a UE and an NR gNB.

Main functions of the NR SDAP layer 1q-01 or 1q-45 may include some of the following functions.

Transfer of user plane data

Mapping between a QoS flow and a DRB for both DL and UL

Marking QoS flow ID in both DL and UL packets

Reflective QoS flow to DRB mapping for the UL SDAP PDUs

With regard to an SDAP layer, the UE may be configured, through an RRC message, whether to use a header of the SDAP layer or to use functions of the SDAP layer per PDCP layer, per bearer, or per logical channel. When the SDAP header is configured, a 1-bit NAS reflective QoS indicator and a 1-bit AS reflective QoS indicator of the SDAP header may indicate the UE to update or reconfigure UL and DL QoS flow and data bearer mapping information. The SDAP header may include QoS flow ID information indicating QoS. The QoS information may be used as data processing priority information or scheduling information for appropriately supporting a service.

Main functions of the NR PDCP layer 1q-05 or 1q-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

The reordering function of the NR PDCP layer 1q-05 or 1q-40 may indicate a function of reordering PDCP PDUs received from a lower layer, on a PDCP SN basis. The reordering function may include a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

Main functions of the NR RLC layer 1q-10 or 1q-35 may include some of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC layer 1q-10 or 1q-35 may indicate a function of delivering RLC SDUs received from a lower layer, to an upper layer in order. The in-sequence delivery function may include a function of reassembling the RLC SDUs and delivering the reassembled RLC SDU when a plurality of RLC SDUs segmented from one RLC SDU are received, a function of reordering received RLC PDUs on a RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received up to a current time, to an upper layer in order when a certain timer expires, even when a missing RLC SDU exists. The NR RLC layer 1q-10 or 1q-35 may process the RLC PDUs in order of reception and deliver the RLC PDUs to the NR PDCP layer 1q-05 or 1q-40 regardless of SNs (out-of-sequence delivery), and when a segment is received, the NR RLC layer 1q-10 or 1q-35 may reassemble the segment with other segments stored in a buffer or subsequently received, into a whole RLC PDU and may deliver the RLC PDU to the NR PDCP layer 1q-05 or 1q-40. The NR RLC layer 1q-10 or 1q-35 may not have a concatenation function, and the concatenation function may be performed by the NR MAC layer 1q-15 or 1q-30 or be replaced with a multiplexing function of the NR MAC layer 1q-15 or 1q-30.

The out-of-sequence delivery function of the NR RLC layer 1q-10 or 1q-35 may include a function of directly delivering RLC SDUs received from a lower layer, to an upper layer out of order, a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

The NR MAC layer 1q-15 or 1q-30 may be connected to a plurality of NR RLC layers configured for one UE, and main functions of the NR MAC layer 1q-15 or 1q-30 may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1q-20 or 1q-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

FIG. 1R is a diagram illustrating procedures in which a UE switches an RRC idle mode to an RRC connected mode and establishes connection with a network according to an embodiment of the disclosure.

Referring to FIG. 1R, when the UE configured to transmit and receive data in an RRC connected mode does not transmit or receive data due to a predefined reason or for a predefined time, a gNB may transmit an RRCConnectionRelease message to the UE so as to allow the UE to transit to an RRC idle mode in operation 1r-01. Afterward, when the UE that is not currently configured for a link (hereinafter, also referred to as the idle-mode UE) has data to be transmitted, the UE may perform an RRC connection establishment procedure on the gNB. The UE establishes inverse direction transmission synchronization with the gNB through a random access procedure, and transmits an RRCConnectionRequest message to the gNB in operation 1r-05. The RRCConnectionRequest message may include an identifier of the UE, an establishment cause or the like. The gNB transmits an RRCConnectionSetup message to allow the UE to establish RRC connection in operation 1r-10.

The RRCConnectionSetup message includes configuration information for each service/bearer/RLC layer or each logical channel or each bearer, and PDCP layer configuration information (pdcp-config) may include information about whether to use ROHC for each bearer/logical channel, ROHC configuration information (e.g., a ROHC version, initial information, and the like), statusReportRequired information (information with which a BS indicates a PDCP Status report to a UE), and drb-ContinueROHC information (configuration information indicating to continue and changelessly use ROHC configuration information) and may be transmitted. In addition, the RRCConnectionSetup may include RRC connection configuration information. A bearer for RRC connection is called an SRB and is used in transmission and reception of an RRC message that is a control message between the UE and the gNB.

The UE that established the RRC connection transmits an RRCConnectionSetupComplete message to the gNB in operation 1r-15. The RRCConnectionSetupComplete message may include a control message, such as a SERVICE REQUEST message for requesting, by the UE, an MME or an AMF to configure a bearer for a certain service. The gNB transmits the SERVICE REQUEST message included in the RRCConnectionSetupComplete message to the MME or the AMF in operation 1r-20, and the MME or the AMF may determine whether to provide the service requested by the UE. As a result of the determination, when the service requested by the UE is to be provided, the MME or the AMF transmits an INITIAL CONTEXT SETUP REQUEST message to the gNB in operation 1r-25. The INITIAL CONTEXT SETUP REQUEST message may include QoS information to be applied in configuring a DRB, security information (e.g., a security key, a security algorithm, or the like) to be applied to the DRB, or the like.

When the gNB does not receive UE capability information from the MME or the AMF, the gNB may transmit a UE capability information request message to the UE so as to determine the UE capability information in operation 1r-26. When the UE receives the UE capability information request message, the UE may configure, generate, and report a UE capability information message to the gNB in operation 1r-27. The UE capability information may include information about which types of handover methods are supported by the UE. For example, the UE may report information about a UE capability to the gNB via an indicator, the information indicating whether or not the UE supports an efficient handover method (i.e., a DAPS handover method) proposed in the disclosure. When the gNB determines the UE capability information, the gNB may indicate handover to the UE by defining an indicator indicating which handover type is indicated in a handover command message, according to each of handover methods. For example, the gNB may indicate the efficient handover method (the DAPS handover method) proposed in the disclosure to the UE, or may configure the DAPS handover method to the UE according to each bearer (DRB or SRB). When the gNB configures the DAPS handover method to the UE, the gNB also indicates other handover methods (e.g., a conditional handover method (configurations of a plurality of target cells and a plurality of conditions are configured to the UE, and when the UE satisfies the conditions in a cell selection procedure or a cell reselection procedure, the UE performs a handover procedure on one target cell) or a handover method without a random access procedure), thereby preventing data loss or a transmission delay which may occur in handover. The UE may perform a handover procedure on a target gNB according to the handover method indicated in the handover command message.

To configure security with the UE, the gNB exchanges a SecurityModeCommand message in operation 1r-30 and a SecurityModeComplete message in operation 1r-35. When security configuration is complete, the gNB transmits an RRCConnectionReconfiguration message to the UE in operation 1r-40.

The RRCConnectionReconfiguration message includes configuration information for each service/bearer/RLC layer or each logical channel or each bearer, and PDCP layer configuration information (pdcp-config) may include information about whether to use ROHC for each bearer/logical channel, ROHC configuration information (e.g., a ROHC version, initial information, and the like), statusReportRequired information (information with which a BS indicates a PDCP Status report to a UE), and drb-ContinueROHC information (configuration information indicating to continue and changelessly use ROHC configuration information) and may be transmitted. In addition, the RRCConnectionReconfiguration may include RRC connection configuration information. A bearer for RRC connection is called an SRB and is used in transmission and reception of an RRC message that is a control message between the UE and the gNB.

The RRCConnectionReconfiguration message includes configuration information of a DRB in which user data is to be processed, and the UE configures the DRB by using the configuration information of the DRB and transmits an RRCConnectionReconfigurationComplete message to the gNB in operation 1r-45. When configuration of the DRB with respect to the UE is complete, the gNB transmits an INITIAL CONTEXT SETUP COMPLETE message to the MME or the AMF in operation 1r-50, and upon reception, the MME or the AMF may exchange an S1 BEARER SETUP message and an S1 BEARER SETUP RESPONSE message with an S-GW to configure an S1 bearer in operations 1r-55 and 1r-60. The S1 bearer refers to a link for data transmission, which is configured between the S-GW and the eNB, and corresponds to the DRB in a one-to-one manner After the above procedures are completed, the UE may transmit or receive data to or from the gNB through the S-GW in operations 1r-65 and 1r-70. As such, general data transmission processes largely include three operations of RRC connection establishment, security setting, and DRB configuration. In addition, the gNB may transmit, to the UE, an RRCConnectionReconfiguration message to renew, add, or change the configuration for a certain reason in operation 1r-75.

In the disclosure, a bearer may include an SRB and a DRB where the SRB stands for a signaling radio bearer and the DRB stands for a data radio bearer. The SRB is mainly used to transmit and receive an RRC message of an RRC layer, and the DRB is mainly used to transmit and receive a plurality of items of user plane data. An UM DRB indicates a DRB configured to use an RLC layer operating in an unacknowledged mode (UM), and an acknowledged mode (AM) DRB indicates a DRB configured to use an RLC layer operating in an AM.

In the disclosure, a bearer configured with the DAPS handover method may refer to or indicate a bearer whose identifier is included in a list of bearers configured with the DAPS handover method, a bearer whose identifier is not included in a list of bearers not configured with the DAPS handover method, a bearer whose bearer configuration information includes a DAPS handover method configuration indicator, or at least one bearer from among bearers with a DAPS handover method configuration indicator configured in PDCP layer configuration information.

In the disclosure, a bearer not configured with the DAPS handover method may refer to or indicate a bearer whose identifier is not included in a list of bearers configured with the DAPS handover method, a bearer whose identifier is included in a list of bearers not configured with the DAPS handover method, a bearer whose bearer configuration information does not include a DAPS handover method configuration indicator, or at least one bearer from among bearers with a DAPS handover method configuration indicator not configured in PDCP layer configuration information.

In the disclosure, the source BS may be interpreted as a source cell (PCell, SpCell, or SCell) or a source cell group (cell group or master cell group), and the target BS may be interpreted as a target cell (PCell, SpCell, or SCell) or a target cell group (cell group or master cell group).

Figure 1S:
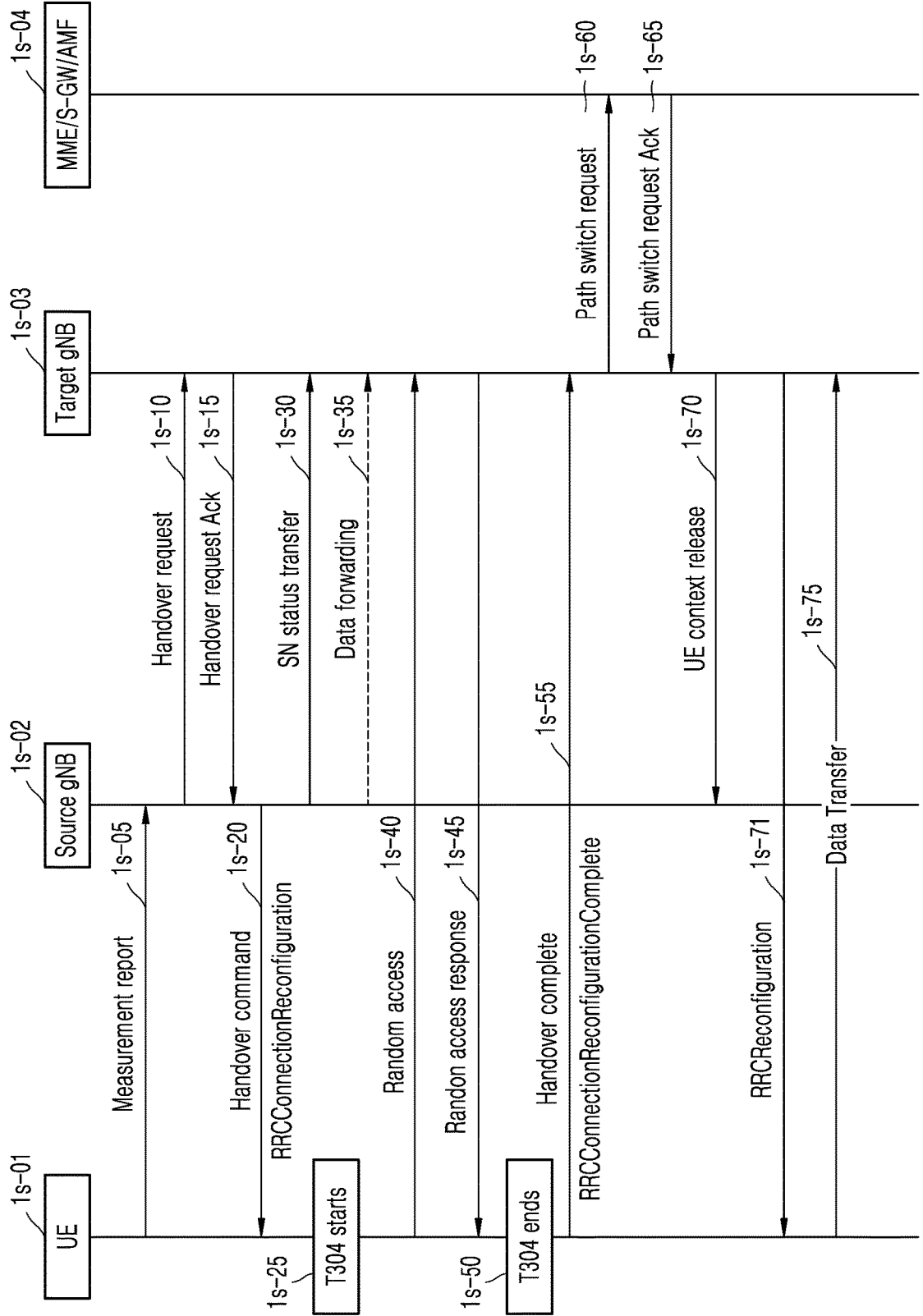
FIG. 1S is a diagram illustrating signaling procedures in which a handover is performed in a next-generation mobile communication system according to an embodiment of the disclosure.

FIG. 1S is a diagram illustrating signaling procedures in which a handover is performed in a next-generation mobile communication system according to an embodiment of the disclosure.

Referring to FIG. 1S, a UE 1s-01 in an RRC connected mode status reports a cell measurement report to a current source gNB 1s-02 in a periodic manner or when a particular event is satisfied in operation 1s-05. The source gNB 1s-02 determines, based on the cell measurement report, whether the UE 1s-01 is to perform handover to an adjacent cell. The handover refers to a technology of switching a source BS to another BS (or another cell in a same BS), the source gNB 1s-02 providing a service to the UE 1s-01 in a connected mode state. When the source gNB 1s-02 determines handover, the source gNB 1s-02 requests the handover by transmitting a handover request message (e.g., a handover preparation information message) to a target gNB 1s-03 that is a new BS to provide a service to the UE 1s-01 in operation 1s-10. When the target gNB 1s-03 accepts the handover request, the target gNB 1s-03 transmits a handover request acknowledgement (Ack) message (e.g., a handover command message) to the source gNB 1s-02 in operation 1s-15. Upon receiving the message, the source gNB 1s-02 transmits, to the UE 1s-01, the handover command message (an RRCReconfiguration message included in a dedicated control channel (DCCH) of the handover request Ack message) in operation 1s-20. The source gNB 1s-02 extracts the handover command message from a message received from the target gNB 1s-03 and transmits the handover command message to the UE 1s-01 by using an RRC Connection Reconfiguration message in operation 1s-20.

In the disclosure, provided is a method of determining an efficient DAPS handover method by using two messages (i.e., a handover preparation information message in operation 1s-10 and a handover command message in operation 1s-15) when the source gNB 1s-02 transmits the handover preparation information message in operation 1s-10, and in response thereto, the target gNB 1s-03 transmits the handover command message in operation 1s-15 to the source gNB 1s-02.

Embodiment 1 of determining the efficient DAPS handover method, which is provided in the disclosure, will now be described.

In Embodiment 1 of the disclosure, an entity for determining the DAPS handover method may be the source gNB 1s-02. In addition, in Embodiment 1 of the disclosure, in a case where the source gNB 1s-02 requests the target gNB 1s-03 for the DAPS handover method, the target gNB 1s-03 may always indicate or perform the DAPS handover method.

The source gNB 1s-02 may indicate, to the target gNB 1s-03 and by defining a new indicator in the handover preparation information message, that the source gNB 1s-02 is to perform the DAPS handover method proposed in the disclosure, and may request the DAPS handover method. The handover preparation information message may include current bearer configuration information of the UE 1s-01, security key information, cell group configuration information, capability information of the UE 1s-01, or the like. The source gNB 1s-02 is configured to pre-share a capability of the target gNB 1s-03 and thus may know in advance whether the target BS supports the DAPS handover method. The source gNB 1s-02 may indicate, to the target gNB 1s-03, that the source gNB 1s-02 is to perform the DAPS handover method, may indicate, to the target gNB 1s-03, that the source gNB 1s-02 may perform early data forwarding fast or in advance, and may indicate the target gNB 1s-03 to prepare to receive data forwarding and perform processing. The source gNB 1s-02 may request each bearer (DRB or SRB) for a request for the DAPS handover method.

In a case where the target BS 1s-03 receives the handover preparation information message and identifies that an indicator requesting the DAPS handover method is included therein, when the target BS 1s-03 configures an RRCReconfiguration message to indicate handover to the UE 1s-01, the target BS 1s-03 may add, to the RRCReconfiguration message, an indicator indicating the DAPS handover method, bearer configuration information required for the UE 1s-01 to perform the DAPS handover method, bearer configuration information, security key information, cell group configuration information, or system information. In addition, the target BS 1s-03 may add the RRCReconfiguration message to a DL-DCCH message of a handover command message and may transmit the handover command message to the source BS 1s-02. The target BS 1s-03 may perform indication of the DAPS handover method with respect to each bearer (DRB or SRB).

When the source BS 1s-02 receives the handover command message, the source BS 1s-02 may extract the RRCReconfiguration message included in the handover command message, may transmit the RRCReconfiguration message to the UE 1s-01, and thus may indicate handover. The source BS 1s-02 may identify the indicated DAPS handover method for each bearer, and may perform the DAPS handover method for each bearer (DRB or SRB).

Embodiment 2 of determining an efficient DAPS handover method, which is provided in the disclosure, will now be described.

In Embodiment 2 of the disclosure, an entity for determining a DAPS handover method may be the target BS 1s-03. In addition, in Embodiment 2 of the disclosure, in a case where the source BS 1s-02 requests the target BS 1s-03 for the DAPS handover method, the target BS 1s-03 may reject or accept the request from the source BS 1s-02 or may indicate another handover method to the source BS 1s-02 via a handover command message indicating the other handover method.

The source BS 1s-02 may indicate, to the target BS 1s-03 and by defining a new indicator in the handover preparation information message, that the source BS 1s-02 is to perform the DAPS handover method proposed in the disclosure, and may request the DAPS handover method. The handover preparation information message may include current bearer configuration information of the UE 1s-01, security key information, cell group configuration information, capability information of the UE 1s-01, or the like. The source BS 1s-02 is configured to pre-share a capability of the target BS 1s-03 and thus may know in advance whether the target BS 1s-03 supports the DAPS handover method. The source BS 1s-02 may indicate, to the target BS 1s-03, that the source BS 1s-02 is to perform the DAPS handover method, may indicate, to the target BS 1s-03, that the source BS 1s-02 may perform early data forwarding, and may indicate the target BS 1s-03 to prepare to receive data forwarding and perform processing. The source BS 1s-02 may request the DAPS handover method with respect to each bearer (DRB or SRB).

In a case where the target BS 1s-03 receives the handover preparation information message and identifies that an indicator requesting the DAPS handover method is included therein, the target BS 1s-03 may reject or accept the request for the DAPS handover method from the source BS 1s-02 or may indicate another handover method to the source BS 1s-02, based on whether the target BS 1s-03 can support the DAPS handover method, an amount of current transport resources, or scheduling. —The target BS 1s-03 may add, to a handover command message, an indicator to reject the request for the DAPS handover method, an indicator to accept the request for the DAPS handover method, or an indicator to indicate the other handover method, and may transmit the handover command message. In a case where the target BS 1s-03 configures an RRCReconfiguration message to indicate handover to the UE 1s-01, the target BS 1s-03 may configure the RRCReconfiguration message in such a manner that the RRCReconfiguration message includes the indicator indicating the DAPS handover method when the DAPS handover request is accepted or the RRCReconfiguration message includes the indicator indicating the other handover method when the DAPS handover request is rejected, and the RRCReconfiguration message includes bearer configuration information necessary for the UE 1s-01 to perform the DAPS handover method or the other handover method, bearer configuration information, security key information, cell group configuration information, or system information. In addition, the target BS 1s-03 may add the RRCReconfiguration message to a DL-DCCH message of a handover command message and may transmit the handover command message to the source BS 1s-02. The target BS 1s-03 may perform indication of the DAPS handover method with respect to each bearer (DRB or SRB).

When the source BS 1s-02 receives the handover command message, the source BS 1s-02 may determine an indicator included in the handover command message and thus may identify whether the request for the DAPS handover method is accepted or rejected. When the request for the DAPS handover method is accepted, the source BS 1s-02 may perform the DAPS handover method, may extract the RRCReconfiguration message included in the handover command message, may transmit the RRCReconfiguration message to the UE 1s-01, and thus may indicate handover. When the source BS 1s-02 determines the indicator included in the handover command message, when the request for the DAPS handover method is rejected or the other handover message is indicated, the source BS 1s-02 may perform the other handover method indicated by the target BS 1s-03. In addition, the source BS 1s-02 may extract the RRCReconfiguration message included in the handover command message, may transmit the RRCReconfiguration message to the UE 1s-01, and thus may indicate handover. As another method, when a separate indicator is not included in the handover command message, the source BS 1s-02 may determine a type of a handover message indicated by the target BS 1s-03 by reading the RRCReconfiguration message included in the handover command message, and may identify whether the request for the DAPS handover method is accepted or rejected. The source BS 1s-02 may perform a handover method (e.g., the DAPS handover method or another handover method) indicated in the RRCReconfiguration message. The source BS 1s-02 may identify the indicated DAPS handover method for each bearer, and may perform the DAPS handover method for each bearer (DRB or SRB).

Embodiment 3 of determining an efficient DAPS handover method, which is provided in the disclosure, will now be described.

In Embodiment 3 of the disclosure, an entity for determining a DAPS handover method may be a target BS. In addition, in Embodiment 3 of the disclosure, the target BS 1s-03 may determine capability of the UE 1s-01, and may determine a handover method (e.g., a DAPS handover method) based on whether the target BS can support the DAPS handover method, an amount of current transport resources, or scheduling.

The source BS 1s-02 may add, to a handover preparation information message, current bearer configuration information of the UE 1s-01, security key information, cell group configuration information, capability information of the UE 1s-01, or the like, and may transmit the handover preparation information message to request the target BS 1s-03 for handover. The source BS 1s-02 is configured to pre-share a capability of the target BS 1s-03 and thus may know in advance whether the target BS 1s-03 supports the DAPS handover method. When the target BS 1s-03 indicates to perform the DAPS handover method, the source BS 1s-02 may perform early data forwarding fast or in advance.

The target BS 1s-03 may receive the handover preparation information message, and may determine the handover method (e.g., the DAPS handover method) based on capability information of the UE 1s-01, whether the target BS 1s-03 can support the DAPS handover method, an amount of current transport resources, or scheduling. When the target BS 1s-03 determines the DAPS handover method, the target BS 1s-03 may add, to the handover command message, an indicator indicating the DAPS handover method, and may transmit the handover command message to the UE 1s-01. In a case where the target BS 1s-03 configures an RRCReconfiguration message to indicate handover to the UE 1s-01, the target BS 1s-03 may configure the RRCReconfiguration message in such a manner that the RRCReconfiguration message includes the indicator indicating the DAPS handover method when the DAPS handover request is determined or the RRCReconfiguration message includes the indicator indicating the other handover method when the DAPS handover request is determined, and the RRCReconfiguration message includes bearer configuration information necessary for the UE 1s-01 to perform the DAPS handover method or the other handover method, bearer configuration information, security key information, cell group configuration information, or system information. In addition, the target BS 1s-03 may add the RRCReconfiguration message to a DL-DCCH message of a handover command message and may transmit the handover command message to the source BS 1s-02. The target BS 1s-03 may perform indication of the DAPS handover method with respect to each bearer (DRB or SRB).

When the source BS 1s-02 receives the handover command message, the source BS 1s-02 may determine an indicator included in the handover command message and thus may identify whether the DAPS handover method is determined. When the DAPS handover method is indicated, the source BS 1s-02 may perform the DAPS handover method, may extract the RRCReconfiguration message included in the handover command message, may transmit the RRCReconfiguration message to the UE 1s-01, and thus may indicate handover. When the source BS 1s-02 determines the indicator included in the handover command message, when the DAPS handover method is not determined or the other handover message is indicated, the source BS 1s-02 may perform the other handover method indicated by the target BS 1s-03. In addition, the source BS 1s-02 may extract the RRCReconfiguration message included in the handover command message, may transmit the RRCReconfiguration message to the UE 1s-01, and thus may indicate handover. As another method, when a separate indicator is not included in the handover command message, the source BS 1s-02 may determine a type of a handover message indicated by the target BS 1s-03 by reading the RRCReconfiguration message included in the handover command message, and may identify whether the DAPS handover method is determined. When the other handover method is indicated, the source BS 1s-02 may perform the indicated other handover method. The source BS 1s-02 may identify the indicated DAPS handover method for each bearer, and may perform the DAPS handover method for each bearer (DRB or SRB).

A new embodiment may be derived by combining methods of Embodiment 1, Embodiment 2, or Embodiment 3 of determining an efficient DAPS handover method.

According to an embodiment of the disclosure, a BS may indicate, via the RRCReconfiguration message, an efficient handover method (the DAPS handover method) proposed in the disclosure to the UE 1s-01, or in another method, the BS may configure the DAPS handover method for each bearer (DRB or SRB) of the UE 1s-01. For example, a new indicator indicating bearer configuration information, DPC PDCP configuration information or RLC configuration information for each bearer identifier or each logical channel identifier may be defined in the RRCReconfiguration message, and the BS may indicate, by using the new identifier, an efficient handover message for each bearer or logical channel identifier to the UE 1s-01. When the BS configures the DAPS handover method to the UE 1s-01, the BS also indicates other handover methods (e.g., a conditional handover method (configurations of a plurality of target cells and a plurality of conditions are configured to the UE 1s-01, and when the UE 1s-01 satisfies the conditions in a cell selection procedure or a cell reselection procedure, the UE 1s-01 performs a handover procedure on one target cell) or a handover method without a random access procedure), thereby preventing data loss or a transmission delay which may occur in handover.

When the UE 1s-01 receives the RRCReconfiguration message, the UE 1s-01 discontinues or continues data transmission and reception to and from the source gNB 1s-02 by using the configured handover method, and starts T304 timer in operation 1s-25. When the UE 1s-01 cannot succeed in handover to the target gNB 1s-03 for a preset time (e.g., when T304 timer is expired), T304 timer allows the UE 1s-01 to return to default configuration of the UE 1s-01 and to transition to an RRC idle state. In addition, the UE 1s-01 can trigger an RRC connection re-establishment procedure, and when an efficient handover method is configured and a link to the source gNB 1s-02 is active, the UE 1s-01 may fall back and report its handover failure to the source gNB 1s-02, and may reconfigure its link. The source gNB 1s-02 provides a sequence number (SN) status of UL/DL data for each bearer (e.g., for each RLC UM bearer or each RLC AM bearer), and when DL data or UL data is present, the source gNB 1s-02 transmits the DL data or the UL data to the target gNB 1s-03 in operations 1s-30 and 1s-35. The UE 1s-01 attempts a random access to a target cell indicated by the source gNB 1s-02 in operation 1s-40. The UE 1s-01 performs the random access to notify switching of the UE 1s-01 to the target cell via the handover and simultaneously to match UL synchronization. For the random access, the UE 1s-01 transmits, to the target cell, a preamble that corresponds to a preamble ID provided by the source gNB 1s-02 or corresponds to a randomly-selected preamble. After transmission of the preamble and after an elapse of a time period corresponding to a particular number of subframes, the UE 1s-01 monitors whether a RAR message is transmitted from the target cell. A time interval for monitoring the RAR message is called a RAR window. When the RAR message is received during the RAR window in operation 1s-45, the UE 1s-01 transmits a handover complete message in an RRC Reconfiguration Complete message to the target gNB 1s-03 in operation 1s-55. When the UE 1s-01 successfully receives the RAR message from the target gNB 1s-03, the UE 1s-01 ends T304 timer in operation 1s-50.

In order to switch a path of bearers which is configured for the source gNB 1s-02, the target gNB 1s-03 requests a core network 1s-04 (e.g., MME/S-GW/AMF) for a path switch of the bearers in operations 1s-60 and 1s-65, and indicates the source gNB 1s-02 to discard UE context of the UE 1s-01 in operation 1s-70. The target gNB 1s-03 may transmit an RRC message (e.g., an RRCReconfiguration message in operation 1s-71) to the UE 1s-01 and may indicate, by using an indicator, the UE 1s-01 to release a link to the source gNB 1s-02. As another method, the target gNB 1s-03 may transmit MAC control information, RLC control information, or PDCP control information to the UE 1s-01 and thus may indicate the UE 1s-01 to release a link to the source gNB 1s-02. The UE 1s-01 attempts, at a start point of the RAR window, to receive data from the target gNB 1s-03, and after the RAR message is received, the UE 1s-01 transmits the RRC Reconfiguration Complete message and receives a DL transport resource or a UL transport resource, thereby starting data transmission and reception to and from the target gNB 1s-03.

According to an embodiment of the disclosure, when the BS configures or indicates Embodiment 2 (the DAPS handover method), which is proposed in the disclosure, to the UE 1s-01 by using the handover command message or the RRC message (e.g., the RRCReconfiguration message), the BS may apply methods as below. In the disclosure, when the BS configures the DAPS handover method to the UE 1s-01 or the UE 1s-01 receives, from the BS, the handover command message in which the DAPS handover method is configured, one method from among methods below or a combination of various methods from among the methods may be performed.

Method 1-1: When the BS (the source gNB 1s-02, the target gNB 1s-03, a LTE BS, or a NR BS) indicates or configures to the UE 1s-01, the BS may add mobility Control Info or Reconfiguration With Sync configuration information to the RRCReconfiguration message. The BS may define an indicator in SRB-ToAddMod or DRB-ToAddMod of SRB-ToAddModList or DRB-ToAddModList in bearer configuration information (Radio Resource Config Dedicated or Radio Bearer Config) of the RRCReconfiguration message, and may indicate the DAPS handover method for each of bearers (each of SRB or DRB) by using the defined indicator. In addition, the BS may indicate the DAPS handover method for each bearer by defining an indicator in pdcp-config in SRB-ToAddMod or DRB-ToAddMod. In a case where the LTE BS indicates or configures handover to the UE 1s-01 by using a LTE RRCReconfiguration message, because pdcp-config is not defined in SRB-ToAddMod but the use of default PDCP layer configuration is defined therein in LTE, the LTE BS may configure the DAPS handover method for each bearer by defining an indicator in SRB-ToAddMod with respect to a SRB, and may configure the DAPS handover method for each bearer by defining an indicator in pdcp-config in DRB-ToAddMod. According to configuration indicated in the received handover command message (the RRCReconfiguration message), for each of bearers, the UE 1s-01 may perform the DAPS handover method on a bearer configured with the DAPS handover method, and may perform a general handover method on a bearer not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1s-01 is included in mobility Control Info or Reconfiguration With Sync configuration information of the handover command message, and the DAPS handover method is configured for each bearer, when the UE 1s-01 performs a handover procedure for each bearer, the UE 1s-01 may preferentially apply the DAPS handover method, compared to other handover method type. For example, according to configuration and for each bearer, the UE 1s-01 may perform the DAPS handover method on a bearer configured with the DAPS handover method, and may perform a handover method on a bearer not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1s-01 in mobility Control Info or Reconfiguration With Sync configuration information of the handover command message. In addition, in order to decrease complexity of implementation of the UE 1s-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1s-01.

In addition, when the UE 1s-01 receives the handover command message (the RRCReconfiguration message), in a case where the DAPS handover method is configured for at least one bearer or a certain bearer with respect to each bearer in the handover command message (the RRCReconfiguration message), the UE 1s-01 may apply a processing method of an RRC layer, a SDAP layer, a MAC layer, a PHY layer, or a SRB so as to perform the DAPS handover method proposed in the disclosure, and for each bearer configured with the DAPS handover method, the UE 1s-01 may apply a processing method of a PDCP layer or a RLC layer so as to perform the DAPS handover method proposed in the disclosure.

Method 1-2: When the BS (the source gNB 1s-02, the target gNB 1s-03, a LTE BS, or a NR BS) indicates or configures to the UE 1s-01, the BS may add mobility Control Info or Reconfiguration With Sync configuration information to the RRCReconfiguration message. The BS may define an indicator in DRB-ToAddMod of DRB-ToAddModList in bearer configuration information (Radio Resource Config Dedicated or Radio Bearer Config) of the RRCReconfiguration message, and may indicate the DAPS handover method for each of bearers (each DRB) by using the defined indicator, and may not introduce a separate indicator for configuration of the DAPS handover method for SRBs. For example, when the DAPS handover method is configured for at least one bearer (DRB) or a certain bearer (DRB) with respect to each bearer in the received handover command message (the RRCReconfiguration message), the UE 1s-01 may apply a SRB processing method to perform the DAPS handover method proposed in the disclosure. In addition, the BS may indicate the DAPS handover method for each bearer by defining an indicator in pdcp-config in DRB-ToAddMod. According to configuration indicated in the received handover command message (the RRCReconfiguration message), for each of bearers, the UE 1s-01 may perform the DAPS handover method on a bearer configured with the DAPS handover method, and may perform a general handover method on a bearer not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1s-01 is included in mobility Control Info or Reconfiguration With Sync configuration information of the handover command message, and the DAPS handover method is configured for each bearer, when the UE 1s-01 performs a handover procedure for each bearer, the UE 1s-01 may preferentially apply the DAPS handover method, compared to other handover method type. For example, according to configuration and for each bearer, the UE 1s-01 may perform the DAPS handover method on a bearer configured with the DAPS handover method, and may perform a handover method on a bearer not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1s-01 in mobility Control Info or Reconfiguration With Sync configuration information of the handover command message. In addition, in order to decrease complexity of implementation of the UE 1s-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1s-01. In addition, when the UE 1s-01 receives the handover command message (the RRCReconfiguration message), in a case where the DAPS handover method is configured for at least one bearer or a certain bearer with respect to each bearer in the handover command message (the RRCReconfiguration message), the UE 1s-01 may apply a processing method of an RRC layer, a SDAP layer, a MAC layer, a PHY layer, or a SRB so as to perform the DAPS handover method proposed in the disclosure, and for each bearer configured with the DAPS handover method, the UE 1s-01 may apply a processing method of a PDCP layer or a RLC layer so as to perform the DAPS handover method proposed in the disclosure.

Method 2-1: When the BS (the source gNB 1s-02, the target gNB 1s-03, a LTE BS, or a NR BS) indicates or configures to the UE 1s-01, the BS may add mobility Control Info or Reconfiguration With Sync configuration information to the RRCReconfiguration message. The BS may indicate that the DAPS handover method is configured for at least one bearer or a certain bearer via an indicator, by defining and including the indicator indicating or configuring the DAPS handover method in mobility Control Info or Reconfiguration With Sync. In addition, the BS may define an indicator in SRB-ToAddMod or DRB-ToAddMod of SRB-ToAddModList or DRB-ToAddModList in bearer configuration information (Radio Resource Config Dedicated or Radio Bearer Config) of the RRCReconfiguration message, thereby indicating the DAPS handover method for each of bearers (each of SRB or DRB). In addition, the BS may indicate the DAPS handover method for each bearer by defining an indicator in pdcp-config in SRB-ToAddMod or DRB-ToAddMod. In addition, in a case where the LTE BS indicates or configures handover to the UE 1s-01 by using a LTE RRCRecofiguration message, because pdcp-config is not defined in SRB-ToAddMod but the use of default PDCP layer configuration is defined therein in LTE, the LTE BS may configure the DAPS handover method for each bearer by defining an indicator in SRB-ToAddMod with respect to a SRB, and may configure the DAPS handover method for each bearer by defining an indicator in pdcp-config in DRB-ToAddMod. According to configuration indicated in the received handover command message (the RRCReconfiguration message), for each of bearers, the UE 1s-01 may perform the DAPS handover method on a bearer configured with the DAPS handover method, and may perform a general handover method on a bearer not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1s-01 is included in mobility Control Info or Reconfiguration With Sync configuration information of the handover command message, and the DAPS handover method is configured for each bearer, when the UE 1s-01 performs a handover procedure for each bearer, the UE 1s-01 may preferentially apply the DAPS handover method, compared to other handover method type. For example, according to configuration and for each bearer, the UE 1s-01 may perform the DAPS handover method on a bearer configured with the DAPS handover method, and may perform a handover method on a bearer not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1s-01 in mobility Control Info or Reconfiguration With Sync configuration information of the handover command message. In addition, in order to decrease complexity of implementation of the UE 1s-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1s-01.

In addition, when the UE 1s-01 receives the handover command message (the RRCReconfiguration message), in a case where the indicator indicating or configuring the DAPS handover method is included (or configured) in mobility Control Info of Reconfiguration With Sync in the handover command message (the RRCReconfiguration message), the UE 1s-01 may apply a processing method of an RRC layer, a SDAP layer, a MAC layer, a PHY layer, or a SRB so as to perform the DAPS handover method proposed in the disclosure, and for each bearer configured with the DAPS handover method, the UE 1s-01 may apply a processing method of a PDCP layer or a RLC layer so as to perform the DAPS handover method proposed in the disclosure.

Method 2-2: When the BS (the source gNB 1s-02, the target gNB 1s-03, a LTE BS, or a NR BS) indicates or configures to the UE 1s-01, the BS may add mobility Control Info or Reconfiguration With Sync configuration information to the RRCReconfiguration message. The BS may indicate that the DAPS handover method is configured for at least one bearer or a certain bearer via an indicator, by defining and including the indicator indicating or configuring the DAPS handover method in mobility Control Info or Reconfiguration With Sync. In addition, the BS may indicate the DAPS handover method for each of bearers (each DRB) by defining an indicator in DRB-ToAddMod of DRB-ToAddModList in bearer configuration information (Radio Resource Config Dedicated or Radio Bearer Config) of the RRCReconfiguration message, and may not introduce a separate indicator for configuration of the DAPS handover method for SRBs. For example, when the UE 1s-01 receives the handover command message (the RRCReconfiguration message), in a case where the DAPS handover method is configured for at least one bearer (DRB) or a certain bearer (DRB) with respect to each bearer in the received handover command message (the RRCReconfiguration message), the UE 1s-01 may apply a SRB processing method to perform the DAPS handover method proposed in the disclosure. In addition, the BS 1s-03 may indicate the DAPS handover method for each bearer by defining an indicator in pdcp-config in DRB-ToAddMod. According to configuration indicated in the received handover command message (the RRCReconfiguration message), for each of bearers, the UE 1s-01 may perform the DAPS handover method on a bearer configured with the DAPS handover method, and may perform a general handover method on a bearer not configured with the DAPS handover method. In a case where the indicator indicating or configuring a handover method type (e.g., MakeBeforeBreak handover, Rach-skip handover, RACH-less handover, or Conditional handover CHO) with respect to the UE 1s-01 is included in mobility Control Info or Reconfiguration With Sync configuration information of the handover command message, and the DAPS handover method is configured for each bearer, when the UE 1s-01 performs a handover procedure for each bearer, the UE 1s-01 may preferentially apply the DAPS handover method, compared to other handover method type. For example, according to configuration and for each bearer, the UE 1s-01 may perform the DAPS handover method on a bearer configured with the DAPS handover method, and may perform a handover method on a bearer not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1s-01 in mobility Control Info or Reconfiguration With Sync configuration information of the handover command message. In addition, in order to decrease complexity of implementation of the UE 1s-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1s-01. In addition, when the UE 1s-01 receives the handover command message (the RRCReconfiguration message), in a case where the indicator indicating or configuring the DAPS handover method is included (or configured) in mobility Control Info of Reconfiguration With Sync in the handover command message (the RRCReconfiguration message), the UE 1s-01 may apply a processing method of an RRC layer, a SDAP layer, a MAC layer, a PHY layer, or a SRB so as to perform the DAPS handover method proposed in the disclosure, and for each bearer configured with the DAPS handover method, the UE 1s-01 may apply a processing method of a PDCP layer or a RLC layer so as to perform the DAPS handover method proposed in the disclosure.

Method 3-1: When the BS (the source gNB 1s-02, the target gNB 1s-03, a LTE BS, or a NR BS) indicates or configures to the UE 1s-01, the BS may add mobility Control Info or Reconfiguration With Sync configuration information to the RRCReconfiguration message. The BS may indicate that the DAPS handover method is configured for at least one bearer or a certain bearer via an indicator, by defining and including the indicator indicating or configuring the DAPS handover method in mobility Control Info or Reconfiguration With Sync. In addition, the BS may configure a list of bearers configured with the DAPS handover method and include the list in mobility Control Info or Reconfiguration With Sync, and may include identifiers (SRB or DRB) of the bearers configured with the DAPS handover method in the list of bearers, thereby indicating whether the DAPS handover method is configured for each bearer. In addition, the BS may configure a list of bearers not configured with the DAPS handover method and include the list in mobility Control Info or Reconfiguration With Sync, and may include identifiers (SRB or DRB) of the bearers not configured with the DAPS handover method in the list of bearers, thereby indicating whether the DAPS handover method is configured for each bearer. According to configuration indicated in the received handover command message (the RRCReconfiguration message), for each of bearers, the UE 1s-01 may perform the DAPS handover method on a bearer configured with the DAPS handover method, a bearer whose identifier is included in the list of bearers configured with the DAPS handover method, or a bearer whose identifier is not included in the list of bearers not configured with the DAPS handover method, and may perform a general handover method on a bearer not configured with the DAPS handover method, a bearer whose identifier is not included in the list of bearers configured with the DAPS handover method, or a bearer whose identifier is included in the list of bearers not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1s-01 is included in mobility Control Info or Reconfiguration With Sync configuration information of the handover command message, and the DAPS handover method is configured for each bearer, when the UE 1s-01 performs a handover procedure for each bearer, the UE 1s-01 may preferentially apply the DAPS handover method, compared to other handover method type. For example, according to configuration, for each of bearers, the UE 1s-01 may perform the DAPS handover method on a bearer configured with the DAPS handover method, a bearer whose identifier is included in the list of bearers configured with the DAPS handover method, or a bearer whose identifier is not included in the list of bearers not configured with the DAPS handover method, and may perform a handover method on a bearer not configured with the DAPS handover method, a bearer whose identifier is not included in the list of bearers configured with the DAPS handover method, or a bearer whose identifier is included in the list of bearers not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1s-01 in mobility Control Info or Reconfiguration With Sync configuration information of the handover command message. In addition, in order to decrease complexity of implementation of the UE 1s-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1s-01. In addition, when the UE 1s-01 receives the handover command message (the RRCReconfiguration message), in a case where the indicator indicating or configuring the DAPS handover method is included (or configured) in mobility Control Info of Reconfiguration With Sync of the handover command message (the RRCReconfiguration message), the UE 1s-01 may apply a processing method of an RRC layer, a SDAP layer, a MAC layer, a PHY layer, or a SRB so as to perform the DAPS handover method proposed in the disclosure, and for each bearer, the UE 1s-01 may apply a processing method of a PDCP layer or a RLC layer so as to perform the DAPS handover method proposed in the disclosure to the bearer configured with the DAPS handover method, the bearer whose identifier is included in the list of bearers configured with the DAPS handover method, or the bearer whose identifier is not included in the list of bearers not configured with the DAPS handover method.

Method 3-2: When the BS (the source gNB 1s-02, the target gNB 1s-03, a LTE BS, or a NR BS) indicates or configures to the UE 1s-01, the BS may add mobility Control Info or Reconfiguration With Sync configuration information to the RRCReconfiguration message. The BS may indicate that the DAPS handover method is configured for at least one bearer or a certain bearer via an indicator, by defining and including the indicator indicating or configuring the DAPS handover method in mobility Control Info or Reconfiguration With Sync. In addition, the BS may configure a list of bearers configured with the DAPS handover method and include the list in mobility Control Info or Reconfiguration With Sync, and may include identifiers (SRB or DRB) of the bearers configured with the DAPS handover method in the list of bearers, thereby indicating whether the DAPS handover method is configured for each bearer. In addition, the BS may configure a list of bearers not configured with the DAPS handover method and include the list in mobility Control Info or Reconfiguration With Sync, and may include identifiers (SRB or DRB) of the bearers not configured with the DAPS handover method in the list of bearers, thereby indicating whether the DAPS handover method is configured for each bearer. In addition, for SRBs, a separate indicator for configuration of the DAPS handover method may not be introduced. For example, when the UE 1s-01 receives the handover command message (the RRCReconfiguration message), in a case where the DAPS handover method is configured for at least one bearer (DRB) or a certain bearer (DRB) with respect to each bearer in the received handover command message (the RRCReconfiguration message), the UE 1s-01 may apply a SRB processing method to perform the DAPS handover method proposed in the disclosure. According to configuration indicated in the received handover command message (the RRCReconfiguration message), for each of bearers, the UE 1s-01 may perform the DAPS handover method on a bearer configured with the DAPS handover method, a bearer whose identifier is included in the list of bearers configured with the DAPS handover method, or a bearer whose identifier is not included in the list of bearers not configured with the DAPS handover method, and may perform a general handover method on a bearer not configured with the DAPS handover method, a bearer whose identifier is not included in the list of bearers configured with the DAPS handover method, or a bearer whose identifier is included in the list of bearers not configured with the DAPS handover method. In addition, in a case where the indicator indicating or configuring a handover method type (e.g., MakeBeforeBreak handover, Rach-skip handover, RACH-less handover, or Conditional handover CHO) with respect to the UE 1s-01 is included in mobility Control Info or Reconfiguration With Sync configuration information of the handover command message, and the DAPS handover method is configured for each bearer, when the UE 1s-01 performs a handover procedure for each bearer, the UE 1s-01 may preferentially apply the DAPS handover method, compared to other handover method type. For example, according to configuration, for each of bearers, the UE 1s-01 may perform the DAPS handover method on a bearer configured with the DAPS handover method, a bearer whose identifier is included in the list of bearers configured with the DAPS handover method, or a bearer whose identifier is not included in the list of bearers not configured with the DAPS handover method, and may perform a handover method on a bearer not configured with the DAPS handover method, a bearer whose identifier is not included in the list of bearers configured with the DAPS handover method, or a bearer whose identifier is included in the list of bearers not configured with the DAPS handover method, the handover method being configured based on the indicator indicating or configuring the handover method type (e.g., MakeBeforeBreak handover, Rach-skip handover, RACH-less handover, or Conditional handover CHO) with respect to the UE 1s-01 in mobility Control Info or Reconfiguration With Sync configuration information of the handover command message. In addition, in order to decrease complexity of implementation of the UE 1s-01, when the DAPS handover method is configured for at least one bearer or a certain bearer, mobility Control Info or Reconfiguration With Sync configuration information of the handover command message may be configured to not indicate or configure a different handover method type (e.g., MakeBeforeBreak handover, Rach-skip handover, RACH-less handover, or Conditional handover CHO) with respect to the UE 1s-01. In addition, when the indicator indicating or configuring the DAPS handover method is included (or configured) in mobility Control Info of Reconfiguration With Sync in the received handover command message (the RRCReconfiguration message), the UE 1s-01 may apply a processing method of an RRC layer, a SDAP layer, a MAC layer, a PHY layer, or a SRB so as to perform the DAPS handover method proposed in the disclosure, and for each bearer, the UE 1s-01 may apply a processing method of a PDCP layer or a RLC layer so as to perform the DAPS handover method proposed in the disclosure to the bearer configured with the DAPS handover method, the bearer whose identifier is included in the list of bearers configured with the DAPS handover method, or the bearer whose identifier is not included in the list of bearers not configured with the DAPS handover method.

Hereinafter, the disclosure proposes non-interruptive handover methods capable of allowing a data interruption time to be 0 ms or minimizing the data interruption time due to handover in a next-generation mobile communication system.

The UE 1s-01 may configure a plurality of first bearers with the source BS 1s-02 and may perform data transmission and reception (UL or DL data transmission and reception) by using protocol layers (a PHY layer, a MAC layer, a RLC layer, a PDCP layer or the like) for each of the plurality of first bearers, and in the disclosure, for convenience of descriptions, it is assumed, in drawings and descriptions, that the UE 1s-01 has one bearer.

Figure 1T:
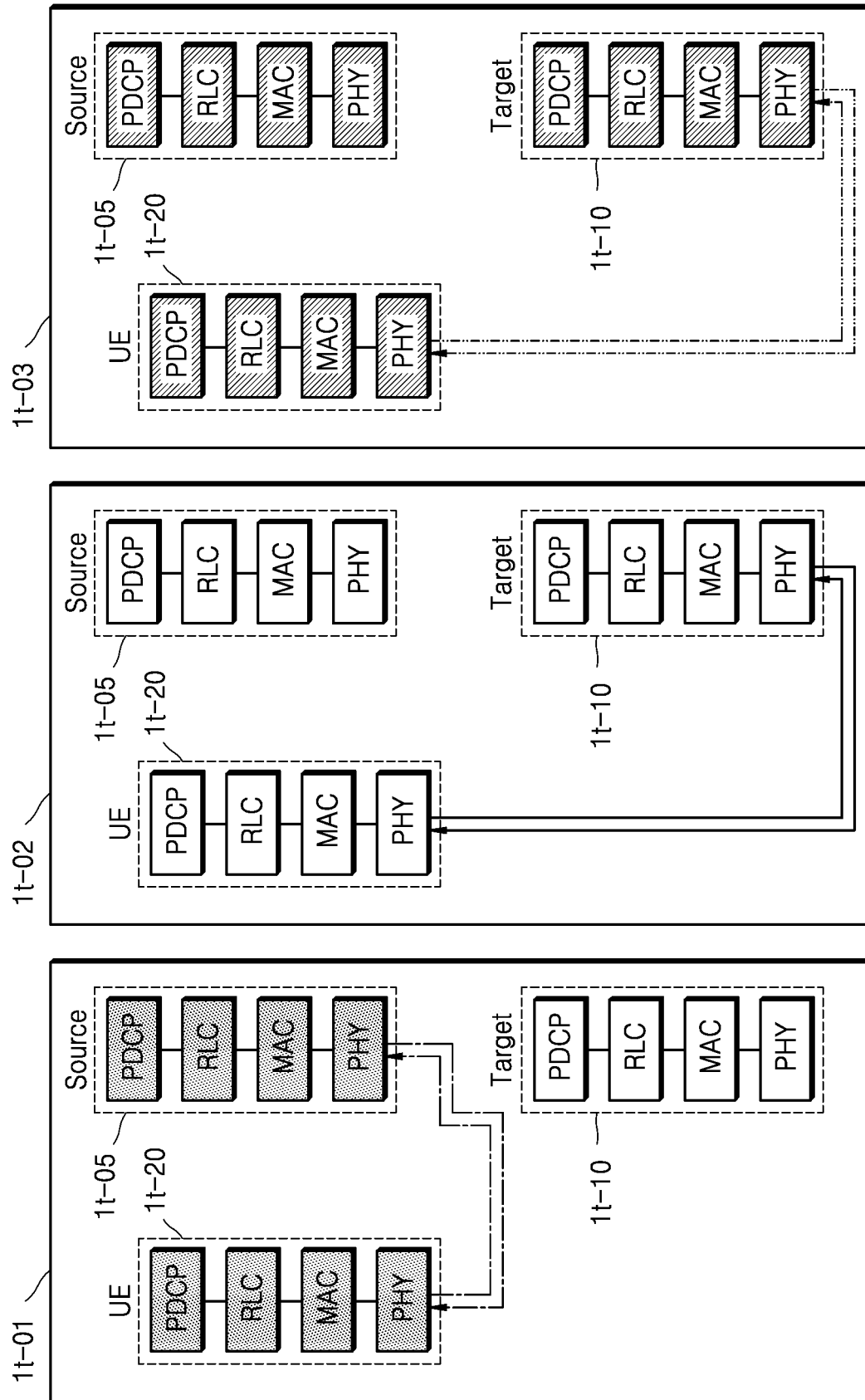
FIG. 1T illustrates particular operations of Embodiment 1 of an efficient handover method for minimizing a data interruption time due to handover according to an embodiment of the disclosure.

FIG. 1T illustrates particular operations of Embodiment 1 of an efficient handover method for minimizing a data interruption time due to handover according to an embodiment of the disclosure.

Referring to FIG. 1T, according to an embodiment of the disclosure, in Embodiment 1 of the efficient handover method, when a UE 1t-20 transmits or receives data to or from a source BS 1t-05 in first operation 1t-01 and then receives a handover command message, the UE 1t-20, based on a handover method indicated by the handover command message (e.g., an RRCReconfiguration message), may release a link to the source BS 1t-05, may perform a random access procedure on a target BS 1t-10, and may perform a handover procedure. As another method, to minimize a data interruption time occurring in handover based on the indicated handover method, the UE 1t-20 may continuously transmit and receive data to and from the source BS 1t-05.

According to an embodiment of the disclosure, in second operation 1t-02, when the UE 1t-20 performs the random access procedure on the target BS 1t-10 by using the handover method indicated by the handover command message received from the source BS 1t-05, transmits a preamble to the target BS 1t-10, or initially transmits data in a UL transport resource by using a PUCCH or PUSCH transport resource, the UE 1t-20 may discontinue data transmission and reception (UL data transmission and DL data reception) to and from the source BS 1t-05.

According to an embodiment of the disclosure, in third operation 1t-03, the UE 1t-20 may complete the random access procedure with respect to the target BS 1t-10, may transmit a handover complete message to the target BS 1t-10, and may start data transmission and reception (UL data transmission and DL data reception) to and from the target BS 1t-10.

According to an embodiment of the disclosure, in Embodiment 1 of the efficient handover method of the disclosure, a handover method of the disclosure performed when the DAPS handover method is not configured may be described.

Figure 1U:
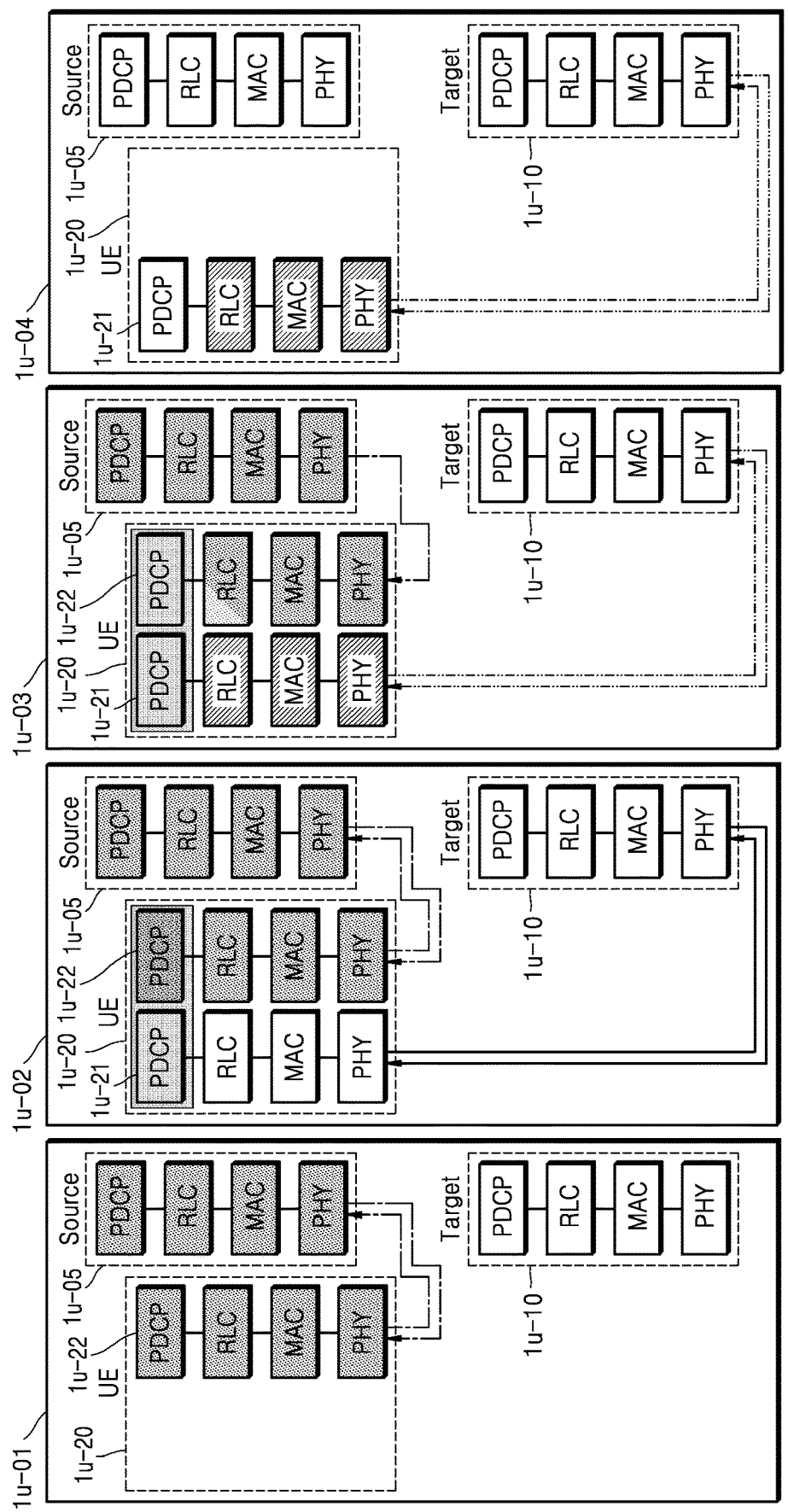
FIG. 1U illustrates particular operations of Embodiment 2 of an efficient handover method for minimizing a data interruption time due to handover according to an embodiment of the disclosure.

FIG. 1U illustrates particular operations of Embodiment 2 of an efficient handover method for minimizing a data interruption time due to handover according to an embodiment of the disclosure.

Referring to FIG. 1U, according to an embodiment of the disclosure, in Embodiment 2 of the efficient handover method, in first operation 1u-01, a UE 1u-20 may receive a handover command message from a source BS 1u-05 when the UE 1u-20 transmits or receives data with the source BS 1u-05. When the source BS 1u-05 indicates, in the handover command message, a handover method (e.g., a DAPS handover method) according to Embodiment 2 of the efficient handover method proposed in the disclosure, or indicates handover for each bearer, even when the UE 1u-20 has received the handover command message, the UE 1u-20 may continuously transmit and receive data to and from the source BS 1u-05 by using protocol layers 1u-22 for a first bearer so as to minimize a data interruption time occurring in handover.

In addition, when an RRC layer of the UE 1u-20 identifies, in the handover command message, an indication with respect to the handover method (e.g., the DAPS handover method) according to Embodiment 2 of the efficient handover method proposed in the disclosure, or identifies an identifier with respect to the DAPS handover method for each bearer, the RRC layer may transmit the indicator to a PDCP layer corresponding to each bearer or a bearer for which the DAPS handover method is indicated. When the PDCP layer receives the indicator, the PDCP layer may switch from a first PDCP layer architecture 1v-11 or 1v-12 (see FIG. 1V) to a second PDCP layer architecture 1v-20 (see FIG. 1V).

First operation 1u-01 of FIG. 1U may be described as operation in which the UE 1u-20 receives a handover command message (an RRCReconfiguration message) from a BS. When the UE 1u-20 transits to the second PDCP layer architecture 1v-20 according to configuration included in the received handover command message, the UE 1u-20 may pre-configure or pre-set up protocol layers (a PHY layer, a MAC layer, a RLC layer or a PDCP layer) 1u-21 of a second bearer for a target BS 1u-10, may derive and update a security key for the target BS 1u-10, and may configure header (or data) compression context for the target BS 1u-10. In addition, the UE 1u-20 may receive the handover command message from the source BS 1u-05, and in the handover command message, when the source BS 1u-05 indicates the DAPS handover method proposed in the disclosure, when the source BS 1u-05 indicates the DAPS handover method for particular bearers, or when a PDCP realignment timer value is newly configured, the UE 1u-20 may switch the first PDCP layer architecture or function 1v-11 or 1v-12 of FIG. 1V to the second PDCP layer architecture or function 1v-20 of FIG. 1V proposed in the disclosure with respect to each bearer or a bearer for which the DAPS handover method is indicated. When the UE 1u-20 switches the first PDCP layer architecture or function 1v-11 or 1v-12 of FIG. 1V to the second PDCP layer architecture or function 1v-20 of FIG. 1V proposed in the disclosure, the UE 1u-20 may update a variable for realignment to a PDCP SN or a COUNT value which is predicted to be received next time, may stop a realignment timer, and may restart the realignment timer.

In addition, in the aforementioned situation, when the UE 1u-20 receives the handover command message (e.g., the RRCReconfiguration message), an RRC layer (not shown) of the UE 1u-20 may start a first timer (e.g., T304). The first timer may stop when the UE 1u-20 performs a random access procedure on the target BS 1u-10 so as to perform handover and then the random access procedure is successfully completed (e.g., when a first condition proposed in the disclosure is satisfied). In a case where the handover fails and thus the first timer is expired, when a link to the source BS 1u-05 is active, the UE 1u-20 may fall back and report its handover failure to the source BS 1u-05 and may attempt link recovery, and when a link to the source BS 1u-05 is inactive, the UE 1u-20 may perform an RRC connection re-establishment procedure.

The handover command message the UE 1u-20 receives from the source BS 1u-05 may include information by which a second bearer is configured to have a same identifier as a first bearer and is established, such that a data interruption time does not occur in each bearer. In Embodiment 2 of the disclosure, a PDCP layer for a first bearer and a PDCP layer for a second bearer may logically operate as one PDCP layer, and detailed descriptions about the operation will now be provided with reference to FIG. 1V.

In Embodiment 2 of the disclosure, when the UE 1u-20 is configured to transmit UL data to both the source BS 1u-05 and the target BS 1u-10, to avoid a coverage lessening problem due to insufficient transmission power of the UE 1u-20 or to prevent link selection by which, when the UE 1u-20 transmits UL data, the UE 1u-20 has to determine to which BS the UE 1u-20 has to request a transport resource and to transmit the UL data, the UE 1u-20 in Embodiment 2 of the disclosure may transmit the UL data to only one of the source BS 1u-05 and the target BS 1u-10. More specifically, in Embodiment 2 of the disclosure, when the UE 1u-20 does not have a capability (dual uplink transmission) of simultaneously transmitting UL data to different BSs at different frequencies or a same frequency, the UE 1u-20 may transmit the UL data to only one BS from among the source BS 1u-05 and the target BS 1u-10 within one time unit. Therefore, the UE 1u-20 may perform a scheduling request to only one BS from among the source BS 1u-05 and the target BS 1u-10, may transmit a report (e.g., a buffer status report) about a size of a plurality of items of data to be transmitted by the PDCP layer to only one BS from among the source BS 1u-05 and the target BS 1u-10, may receive a UL transport resource, and thus may transmit UL data to only one BS. In addition, even when the UE 1u-20 receives a handover command message from the source BS 1u-05, the UE 1u-20 may not reset a MAC layer for a first bearer so as to prevent data loss by continuing data transmission and reception by retransmitting HARQ. In addition, an RLC layer in an AM mode may continuously perform RCL retransmission.

As another method, when the handover command message indicates, for each bearer, Embodiment 2 (the DAPS handover method) of the efficient handover method proposed in the disclosure, the UE 1u-20 may continuously transmit or receive data to or from the source BS 1u-05 with respect to only a PDCP layer, a RLC layer, or a MAC layer, which corresponds to a bearer or a logical channel identifier for which Embodiment 2 (the DAPS handover method) is indicated in the handover command message, or with respect to only data corresponding to the bearer or the logical channel identifier. In addition, when the first condition proposed in the disclosure is satisfied (e.g., when UL data transmission is switched to the target BS 1u-10), the UE 1u-20 may continuously transmit or receive RLC control data (a RLC status report), PDCP control data (a ROHC feedback or a PDCP status report), or HARQ retransmission to or from the source BS 1u-05 with respect to only the PDCP layer, the RLC layer, or the MAC layer, which corresponds to the bearer or the logical channel identifier for which Embodiment 2 (the DAPS handover method) is indicated in the handover command message. In addition, when the handover command message indicates, for each bearer, Embodiment 2 (the DAPS handover method) of the efficient handover method proposed in the disclosure, the UE 1u-20 may discontinue transmission or reception of data to or from the source BS 1u-05 with respect to a PDCP layer, a RLC layer, or a MAC layer, which corresponds to a bearer or a logical channel identifier for which Embodiment 2 (the DAPS handover method) is not indicated in the handover command message.

According to an embodiment of the disclosure, in Embodiment 2 of the efficient handover method of FIG. 1U, in second operation 1u-02, the UE 1u-20 may perform a random access procedure on the target BS 1u-10 by using the protocol layers for the second bearer, the target BS 1u-10 being indicated in the handover command message. When performing the random access procedure by using the protocol layers for the second bearer, the UE 1u-20 may continue data transmission or reception (UL data transmission or DL data reception) to or from the source BS 1u-05 by using the protocol layers for the first bearer. Second operation 1u-02 may be described as an operation in which the UE 1u-20 performs a cell selection procedure or a cell reselection procedure, and performs a random access procedure on a target cell indicated by a handover command message (an RRCReconfiguration message) received from the source BS 1u-05.

According to an embodiment of the disclosure, in Embodiment 2 of the efficient handover method of FIG. 1U, when the first condition to be described below is satisfied in third operation 1u-03, the UE 1u-20 may discontinue UL data transmission to the source BS 1u-05 by using the protocol layers 1u-22 for the first bearer from among bearers for which the DAPS handover method is configured, and may transmit the UL data to the target BS 1u-10 by using the protocol layers 1u-21 for the second bearer. In this regard, the UE 1u-20 may continuously receive DL data from the source BS 1u-05 and the target BS 1u-10 by using the protocol layers for the first and second bearers. Third operation 1u-03 may be an operation in which the UE 1u-20 satisfies the first condition and thus switches UL transmission from the source BS 1u-05 to the target BS 1u-10. More specifically, in the operation, the UE 1u-20 transmits UL data to the source BS 1u-05 via the first bearer until the UE 1u-20 satisfies the first condition, and when the UE 1u-20 satisfies the first condition, the UE 1u-20 discontinues transmission of the UL data to the source BS 1u-05 via the first bearer, and starts transmission of the UL data to the target BS 1u-10 via the second bearer.

More specifically, in the second PDCP layer architecture proposed with respect to the bearer for which the DAPS handover method is configured in the disclosure, in a case where the PDCP layer transmits UL data via the first bearer and satisfies the first condition and thus receives an indicator from its lower layer (when the MAC layer succeeds in a random access procedure on the target BS 1u-10) or an upper layer (when a first timer is expired in the RRC layer), the PDCP layer may discontinue transmission of the UL data via the first bearer, may perform switching, and may start transmission of the UL data via the second bearer. In addition, as in the PDCP layer structure proposed with reference to FIG. 1V, a reception PDCP layer 1u-21 for the second bearer and a reception PDCP layer 1u-22 for the first bearer may operate as one entity, and the reception PDCP layer 1u-21 may continuously receive data from the source BS 1u-05 or the target BS 1u-10 without interruption by using stored transceived data, SN information, or information, such as header compression and decompression context. The first condition may be one of conditions below. The first conditions below propose a UL data transmission switching time point at which a transport resource may be maximally and efficiently used, and a data interruption time may be minimized.

- It may be determined that the first condition is satisfied in a case where the UE 1u-20 successfully completes a random access procedure on the target BS 1u-10 by using the layers (e.g., a MAC layer) for the second bearer, a case where the UE successfully completes the random access procedure on the target BS 1u-10 by using the layers (e.g., the MAC layer) for the second bearer and receives allocation of a first UL transport resource from the target BS 1u-10, or a case where a UL transport resource is first indicated to the UE 1u-20.
  - For example, in a case where the UE 1u-20 receives a handover command message from the source BS 1u-05 and receives an indication of a random access to the target BS 1u-10, when the indicated random access is a CFRA (e.g., when a predefined preamble or a UE-cell identifier (e.g., C-RNTI is allocated), it may be determined that the random access procedure is successfully completed when the UE 1u-20 transmits the predefined preamble to a cell of the target BS 1u-10 and receives a RAR message. Therefore, when the UE 1u-20 receives (is allocated) a first UL transport resource allocated (or included or indicated) in the RAR message, it may be determined that the first condition is satisfied. As another method, when the UE 1u-20 first receives a UL transport resource after the UE 1u-20 receives the RAR message, it may be determined that the first condition is satisfied.
  - In a case where the UE 1u-20 receives a handover command message from the source BS 1u-05 and receives an indication of a random access to the target BS 1u-10, when the indicated random access is a CBRA (e.g., when a predefined preamble or a UE-cell identifier (e.g., C-RNTI) is not allocated), it may be determined that the random access procedure on the target BS 1u-10 is successfully completed when the UE 1u-20 transmits a preamble (e.g., a random preamble) to a cell of the target BS 1u-10 and receives a RAR message, transmits a message3 (e.g., a handover complete message) to the target BS 1u-10 by using a UL transport resource allocated (or included or indicated) in the RAR message, and receives, from the target BS 1u-10 and via a message4, a Contention resolution MAC CE indicating resolution of contention or receives a UL transport resource via a PDCCH corresponding to a C-RNTI of the UE 1u-20. Therefore, when the UE 1u-20 monitors the PDCCH and first receives (or is first indicated with) the UL transport resource via the PDCCH corresponding to the C-RNTI of the UE 1u-20, it may be determined that the first condition is satisfied. As another method, when a size of the UL transport resource allocated in the RAR message is sufficient and thus the UE 1u-20 can transmit the message3 and additionally transmit UL data, the UE 1u-20 may determine that the UE 1u-20 first receives a UL transport resource and thus may determine that the first condition is satisfied. For example, when the UE 1u-20 receives a RAR message, the UE 1u-20 may determine that the UE 1u-20 first receives the UL transport resource and thus may determine that the first condition is satisfied.
- When a handover method (RACH-less handover) that does not request a random access procedure is also indicated in the handover command message received by the UE 1u-20,
- when the handover command message includes a UL transport resource with respect to the target BS 1u-10, the UE 1u-20 transmits a message3 (e.g., a handover complete message or a RRCReconfigurationComplete message) by using the UL transport resource with respect to the target BS 1u-10, and when the UE 1u-20 receives, from the target BS 1u-10, a UE Identity Confirmation MAC CE via a message4, or receives a UL transport resource via a PDCCH corresponding to a C-RNTI of the UE 1u-20, it may be determined that a random access procedure is successfully completed and the first condition is satisfied. As another method, after the random access procedure is successfully completed, the UE 1u-20 performs PDCCH monitoring and receives a first UL transport resource via the PDCCH corresponding to the C-RNTI of the UE 1u-20, it may be determined that the first condition is satisfied.
- When the handover command message does not include the UL transport resource with respect to the target BS 1u-10,
- the UE 1u-20 performs PDCCH monitoring on the target BS 1u-10 (or a cell) and when the UE 1u-20 receives a UL transport resource via the PDCCH corresponding to the C-RNTI of the UE, or transmits a message3 (e.g., a handover complete message or a RRCReconfigurationComplete message) by using the UL transport resource, and receives a UE Identity Confirmation MAC CE from the target BS 1u-10 or receives a UL transport resource via the PDCCH corresponding to the C-RNTI of the UE 1u-20, it may be determined that a random access procedure is successfully completed and the first condition is satisfied As another method, after the random access procedure is successfully completed, when the UE 1u-20 performs PDCCH monitoring and receives a first UL transport resource via the PDCCH corresponding to the C-RNTI of the UE 1u-20, it may be determined that the first condition is satisfied.

Hereinafter, provided is a method of efficiently switching UL data from the source BS 1u-05 to the target BS 1u-10, the method being performed when the DAPS handover method proposed in the disclosure is performed. A MAC layer or an RRC layer for a second bearer corresponding to the target BS 1u-10 may determine or identify whether the first condition is satisfied, according to one or a combination of methods to be described below.

First method: For example, when an RRCReconfiguration message received by the UE 1u-20 indicates DAPS handover, the UE 1u-20 may configure the MAC layer for the second bearer corresponding to the target BS 1u-10, and the MAC layer for the target BS 1u-10 may perform a random access procedure and may identify whether the first condition is satisfied. When the first condition is satisfied, the MAC layer for the target BS 1u-10 may indicate, by using an indicator, an upper layer (e.g., a PDCP layer) for a bearer for which the DAPS handover method is configured to switch UL data transmission from the source BS 1u-05 via a first bearer to the target BS 1u-10 via the second bearer in the DAPS handover method proposed in the disclosure.

Second method: As another method, for example, when an RRCReconfiguration message received by the UE 1u-20 indicates DAPS handover, the UE 1u-20 may configure the MAC layer for the second bearer corresponding to the target BS 1u-10, and the MAC layer for the target BS 1u-10 may perform a random access procedure and may identify whether the first condition is satisfied. When the first condition is satisfied, the MAC layer for the target BS 1u-10 may indicate, to an upper layer (e.g., an RRC layer), that the first condition is satisfied. In addition, the upper layer (e.g., the RRC layer) may indicate, by using an indicator, a lower layer (e.g., the PDCP layer) for a bearer for which the DAPS handover method is configured to switch UL data transmission from the source BS 1u-05 via the first bearer to the target BS 1u-10 via the second bearer in the DAPS handover method proposed in the disclosure. When the first condition proposed in the disclosure is satisfied or a random access procedure on the target BS 1u-10 is successfully performed, the upper layer (e.g., the RRC layer) may stop a first timer, and when the first timer stops, the RRC layer may indicate, by using an indicator, the PDCP layer for the bearer for which the DAPS handover method is configured to switch the UL data transmission.

Third method: When an RRCReconfiguration message received by the UE 1u-20 indicates DAPS handover, the UE 1u-20 may configure the MAC layer for the second bearer corresponding to the target BS 1u-10, and when the RRC layer of the UE 1u-20 indicates, by using an indicator, a lower layer (e.g., the MAC layer) to perform the DAPS handover, the MAC layer for the target BS 1u-10 may perform a random access procedure and may determine whether the first condition is satisfied. When the first condition is satisfied, the MAC layer for the target BS 1u-10 may indicate, by using an indicator, an upper layer (e.g., the PDCP layer) for a bearer for which the DAPS handover method is configured to switch UL data transmission from the source BS 1u-05 via the first bearer to the target BS 1u-10 via the second bearer in the DAPS handover method proposed in the disclosure.

Fourth method: As another method, when an RRCReconfiguration message received by the UE 1u-20 indicates DAPS handover, the UE 1u-20 may configure the MAC layer for the second bearer corresponding to the target BS 1u-10, and when the RRC layer of the UE 1u-20 indicates, by using an indicator, a lower layer (e.g., the MAC layer) to perform the DAPS handover, the MAC layer for the target BS 1u-10 may perform a random access procedure and may determine whether the first condition is satisfied. When the first condition is satisfied, the MAC layer may indicate, to an upper layer (e.g., the RRC layer), that the first condition is satisfied. In a case where the indicator is identified, the upper layer (e.g., the RRC layer) may stop the first timer when the first condition proposed in the disclosure is satisfied or the random access procedure on the target BS 1u-10 is successfully performed. In addition, the upper layer (e.g., the RRC layer) may indicate, by using an indicator, a lower layer (e.g., the PDCP layer) for a bearer for which the DAPS handover method is configured to switch UL data transmission from the source BS 1u-05 via the first bearer to the target BS 1u-10 via the second bearer in the DAPS handover method proposed in the disclosure.

When the PDCP layer receives (e.g., when the DAPS handover method is indicated) an indicator indicating that the first condition is satisfied or an indicator indicating switching UL data transmission from the source BS 1u-05 to the target BS 1u-10, from the upper layer (e.g., the RRC layer) or the lower layer (e.g., the MAC layer) according to the first method, the second method, the third method, or the fourth method, the PDCP layer may perform a protocol layer operation proposed below so as to efficiently perform switching of UL data transmission, and may perform one or more operations from among operations below so as to prevent data loss due to the UL data transmission.

The operations below may be applied to the PDCP layer connected to an AM DRB or an UM DRB (an RLC layer operating in an AM mode or an RLC layer operating in an UM mode). Before the first condition is satisfied or before the indicator indicating that the first condition is satisfied is received, the PDCP layer may indicate, to the MAC layer for the first bearer corresponding to the source BS 1u-05, that there is data to be transmitted by indicating a size or amount (e.g., a PDCP data volume) of the data to be transmitted when a buffer stores the data to be transmitted, and may perform UL data transmission to the source BS 1u-05. Thereafter, the MAC layer for the first bearer corresponding to the source BS 1u-05 may perform a scheduling request or a buffer status report procedure to receive allocation of a UL transport resource from the source BS 1u-05. When the first condition is satisfied or the indicator indicating that the first condition is satisfied is received, switching of UL data transmission to the target BS 1u-10 may be performed on a bearer for which the DAPS handover method is configured.

The UE 1u-20 may not reset but changelessly use UL or DL ROHC context for the source BS 1u-05, may reset UL or DL ROHC context for the target BS 1u-10, and may start in an initial state (e.g., an IR state in U mode).

In order to switch UL data transmission from the first bearer for the source BS 1u-05 to the second bearer for the target BS 1u-10, the PDCP layer may indicate, to the MAC layer for the first bearer corresponding to the source BS 1u-05, that a size or amount of data to be transmitted is 0 (or none). For example, the PDCP layer may indicate, to the MAC layer for the first bearer, that a data volume (a PDCP data volume) of the PDCP layer is 0, thereby indicating that there is no more data to be transmitted (even when the buffer actually stores a plurality of items of data to be transmitted, in order to switch UL data transmission, the PDCP layer may indicate, to the MAC layer for the first bearer corresponding to the source BS 1*u*-05, that there is no more data to be transmitted). However, in a case where the handover method (the DAPS handover method) of Embodiment 2 as proposed in the disclosure is indicated, the handover method (the DAPS handover method) of Embodiment 2 as proposed in the disclosure is indicated for a bearer, or the first condition is satisfied, when RLC control data (RLC status report) or PDCP control data (PDCP status report or ROHC feedback) with respect to the source BS 1*u*-05 is generated, a PDCP layer for the bearer may indicate a data volume corresponding to the RLC control data or the PDCP control data to the MAC layer for the source BS 1*u*-05, and may perform data transmission to the source BS 1*u*-05 or a RLC layer for the source BS 1*u*-05. However, in a case where the handover method (the DAPS handover method) of Embodiment 2 as proposed in the disclosure is indicated, the handover method (the DAPS handover method) of Embodiment 2 as proposed in the disclosure is indicated for a bearer, or the first condition is satisfied, when RLC control data (RLC status report) or PDCP control data (PDCP status report or ROHC feedback) with respect to the target BS 1*u*-10 is generated, a PDCP layer for the bearer may indicate a data volume corresponding to the RLC control data or the PDCP control data to a MAC layer for the target BS 1*u*-10, and may perform data transmission to the target BS 1*u*-10 or a RLC layer for the target BS 1*u*-10. When the first condition is not satisfied, the PDCP layer may indicate the data volume corresponding to the generated data (PDCP data PDU or PDCP control PDU) to the MAC layer for the source BS 1*u*-05, and may perform data transmission to the source BS 1*u*-05 or the RLC layer for the source BS 1*u*-05. Accordingly, in the second PDCP layer architecture proposed for the bearer configured with the DAPS handover method, when an indicator indicating that the first condition is satisfied is received and thus the second PDCP layer indicates a data volume to the MAC layer for the target BS 1*u*-10, the second PDCP layer may indicate the data volume to the MAC layer for the target BS 1*u*-10, wherein the data volume excludes PDCP control data or RLC control data to be transmitted to the bearer corresponding to the source BS 1*u*-05 or the MAC layer for the source BS 1*u*-05, or a data size.

The PDCP layer connected to an AM DRB (that is a RLC layer operating in an AM mode) (all pre-stored PDCP PDUs are discarded (e.g., PDCP SDUs are not discarded to prevent loss of original data)) may perform, based on header context for the target BS 1*u*-10, a new header compression procedure on a plurality of items of data (the PDCP SDUs of the buffer) in ascending order of COUNT values (or PDCP SNs) allocated before the first condition is satisfied or the indicator indicating that the first condition is satisfied is received, the ascending order starting from first data (e.g., a PDCP SDU) for which successful delivery is not acknowledged by lower layers (e.g., the RLC layer for the first bearer corresponding to the source BS 1*u*-05). The PDCP layer may re-perform, by applying security keys for the target BS 1*u*-10, an integrity procedure (e.g., integrity protection or verification procedure) or a ciphering procedure on the plurality of items of data on which new header compression procedure has been performed, may configure a PDCP header, and may transfer the PDCP header to a lower layer (the RLC layer for the second bearer corresponding to the target BS 1*u*-10), thereby performing retransmission or transmission. For example, the PDCP layer may perform accumulated retransmission on data starting from first data for which successful delivery is not acknowledged. As another method, when the PDCP layer performs retransmission, the PDCP layer may perform retransmission only on a plurality of items of data for which successful delivery is not acknowledged by lower layers (e.g., the RLC layers for the first bearer corresponding to the source BS 1*u*-05). More specifically, the PDCP layer connected to the AM DRB (or the RLC layer operating in the AM mode) (may discard all of stored PDCP PDUs to be transmitted to the source BS 1*u*-05 by using a first protocol layer previously connected to the PDCP layer (e.g., PDCP SDUs may not be discarded to prevent loss of original data)) may perform, by applying header compression (or data compression) protocol context or security key corresponding to the target BS 1*u*-10, a new header or data compression procedure on a plurality of items of data (e.g., the PDCP SDUs) for which successful delivery is not acknowledged by lower layers (e.g., the RLC layers) that are the first protocol layer for the source BS 1*u*-05, based on COUNT values (or PDCP SNs) allocated before the first condition is satisfied or the indicator indicating that the first condition is satisfied is received. The PDCP layer may re-perform an integrity procedure (e.g., integrity protection or verification procedure) or a ciphering procedure on the plurality of items of data on which new header or data compression procedure has been performed, may configure a PDCP header, and may transfer the PDCP header to its lower layer that is a second protocol layer for transmission to the target BS 1*u*-10, thereby performing retransmission or transmission. For example, to prevent waste of transport resources, the PDCP layer may perform selective retransmission only on the plurality of items of data for which successful delivery is not acknowledged. As another method, the transmission or the retransmission may be performed after lower layers (e.g., transmission or reception RLC layer or MAC layer) that are the first protocol layer for transmitting data to the source BS 1*u*-05 are released. When the transmission or retransmission procedure is extended to a UM DRB, the PDCP layer connected to a RLC layer operating in a UM mode may regard data that is not transferred to its lower layer yet, data for which PDCP discard timer is not expired, or a plurality of items of data to which PDCP SNs (or COUNT values) are already allocated, as a plurality of items of data received or newly received from an upper layer. In addition, the PDCP layer may not restart a PDCP discard timer with respect to the data regarded to have been received or newly received from the upper layer, may perform header (or data) compression or ciphering or an integrity protection procedure on the data by using header (or data) compression context or a security key for the target BS 1*u*-10, may generate and combine a PDCP header with the data, and then may perform transmission or retransmission. In addition, the PDCP layer may process data in ascending order of COUNT values allocated before the procedure is triggered and then may perform transmission or retransmission. A window state variable of the PDCP layer connected to the UM DRB or the AM DRB may not be reset and may be maintained and used.

When the buffer stores data to be transmitted, the PDCP layer may indicate, to the MAC layer for the second bearer corresponding to the target BS 1*u*-10, that there is the data to be transmitted by indicating a size or volume (e.g., a PDCP data volume) of the data to be transmitted, and may perform switching of UL data transmission to the target BS 1*u*-10. Thereafter, the MAC layer for the second bearer corresponding to the target BS 1*u*-10 may perform a scheduling request or a buffer status report procedure to receive allocation of a UL transport resource from the target BS 1*u*-10.

When an indicator indicating that the first condition is satisfied is received from an upper layer (an RRC layer) or a lower layer (a MAC layer), a LTE or NR PDCP layer connected to an AM DRB (a RLC layer operating in an AM mode) may switch UL data transmission to the second bearer (e.g., the RLC layer or the MAC layer) for the target BS 1*u*-10, and may transmit an indicator indicating to discard data (e.g., PDCP PDU) to a lower layer (e.g., the RLC layer or the MAC layer) for the first bearer corresponding to the source BS 1*u*-05. Because the UL data transmission is switched to the AM DRB, and retransmission of the plurality of pieces of data for which successful delivery is not acknowledged is performed via the second bearer for the target BS 1*u*-10, if data transmission is continued to the source BS 1*u*-05 via the first bearer, transport resources may be wasted and unnecessary transmission may be performed. When the NR PDCP layer transmits the indicator indicating to discard the data to the lower layer, the NR PDCP layer may transmit the discard indicator with respect to only PDCP user data (a PDCP data PDU) and may not transmit the discard indicator with respect to PDCP control data (a PDCP control PDU, e.g., a PDCP status report or a ROHC feedback). Because the PDCP control data (the PDCP control PDU, e.g., the PDCP status report or the ROHC feedback) is information that has to be transmitted for the UE 1*u*-20 to continuously receive DL data from the source BS 1*u*-05 even after the first condition is satisfied, if the PDCP control data is missing, an error may occur in reception of the DL data. The LTE or NR PDCP layer connected to the AM DRB (the RLC layer operating in the AM mode) may switch UL data transmission to the second bearer (e.g., the RLC layer or the MAC layer) for the target BS 1*u*-10, and may transmit an indicator to the lower layer (e.g., the RLC layer or the MAC layer) for the first bearer corresponding to the source BS 1*u*-05, the indicator indicating to discard all of stored or buffered PDCP user data (PDCP data PDU) excluding the PDCP control data (the PDCP control PDU, e.g., the PDCP status report or the ROHC feedback). As another method, the LTE or NR PDCP layer connected to the AM DRB (the RLC layer operating in the AM mode) may switch UL data transmission to the second bearer (e.g., the RLC layer or the MAC layer) for the target BS 1*u*-10, and may transmit an indicator to the lower layer (e.g., the RLC layer or the MAC layer) for the first bearer corresponding to the source BS 1*u*-05, the indicator indicating to discard PDCP user data (PDCP data PDU) for which successful delivery is not acknowledged, for which PDCP discard timer is not expired, that is stored or that is buffered, except for the PDCP control data (the PDCP control PDU, e.g., the PDCP status report or the ROHC feedback). The NR PDCP layer may be connected to an LTE RLC layer or NR RLC layer and then may perform data transmission or reception, and the LTE PDCP layer may be connected only to the LTE RLC layer and then may perform data transmission or reception. In this regard, particular operations are proposed below.

When the RLC layer receives an indicator indicating to discard data (e.g., the PDCP user data) from the LTE or NR PDCP layer, and the RLC layer having received the discard indicator is the LTE RLC layer, with respect to user data (PDCP PDU, PDCP Data PDU, or RLC SDU) received from an upper layer (the PDCP layer), the LTE RLC layer discards the user data if a segment of the user data is not mapped to RLC user data (RLC data PDU) yet or is not generated as the RLC user data ((When indicated from upper layer (i.e., PDCP) to discard a particular RLC SDU, the transmitting side of an AM RLC entity or the transmitting UM RLC entity shall discard the indicated RLC SDU if no segment of the RLC SDU has been mapped to a RLC data PDU yet). Therefore, if the segment of the user data is already mapped to the RLC user data (RLC data PDU) or is generated as the RLC user data, the LTE RLC layer may not discard the user data and may perform data transmission to the source BS 1*u*-05.

When the RLC layer receives an indicator indicating to discard data (e.g., the PDCP user data) from the LTE or NR PDCP layer, and the RLC layer having received the discard indicator is the NR RLC layer, with respect to user data (PDCP PDU, PDCP Data PDU, or RLC SDU) received from an upper layer (the PDCP layer), the NR RLC layer discards the user data if the user data or a segment of the user data has not been transferred nor transmitted to a lower layer (When indicated from upper layer (i.e., PDCP) to discard a particular RLC SDU, the transmitting side of an AM RLC entity or the transmitting UM RLC entity shall discard the indicated RLC SDU, if neither the RLC SDU nor a segment thereof has been submitted to the lower layers). Therefore, if the user data or the segment of the user data has been transferred or submitted to the lower layer, the NR RLC layer may not discard the user data and may perform data transmission to the source BS 1*u*-05. Accordingly, unlike the LTE RLC layer, even when the user data has been generated as the RLC user data, if the user data is not transferred to the lower layer, the NR RLC layer can discard the data and thus may discard more data, thereby efficiently preventing unnecessary data transmission.

According to an embodiment of the disclosure, the aforementioned procedure in which the LTE or NR PDCP layer connected to the AM DRB transmits the data discard indicator to the lower layer may not be applied to a UM DRB so as to prevent a transmission delay or data loss. This is because a retransmission procedure may not be performed on the UM DRB.

However, as another method, after transmission of UL data is switched, in order to minimize UL data transmission to the source BS 1*u*-05, the procedure in which the LTE or NR PDCP layer connected to the AM DRB transmits the data discard indicator to the lower layer may be extensively applied to the UM DRB. For example, when the indicator indicating that the first condition is satisfied is received from the upper layer (the RRC layer) or the lower layer (the MAC layer), the LTE or NR PDCP layer connected to the UM DRB (the RLC layer operating in the UM mode) may switch UL data transmission to the second bearer (e.g., the RLC layer or the MAC layer) for the target BS 1*u*-10, and may transmit an indicator indicating to discard data (e.g., PDCP data (PDCP PDU)) to the lower layer (the RLC layer or the MAC layer) for the first bearer corresponding to the source BS 1*u*-05. In this manner, when UL data transmission is switched to the UM DRB, and data transmission to the source BS 1*u*-05 via the first bearer is minimized, a transmission delay due to data forwarding from the source BS 1*u*-05 to the target BS 1*u*-10 may be prevented, and waste of transport resources of the source BS 1*u*-05 may be prevented. When the PDCP layer transmits the indicator indicating to discard the data to the lower layer, the PDCP layer may transmit the discard indicator with respect to only the PDCP user data (the PDCP data PDU) and may not transmit the discard indicator with respect to the PDCP control data (the PDCP control PDU, e.g., the PDCP status report or the ROHC feedback). Because the PDCP control data (the PDCP control PDU, e.g., the PDCP status report or the ROHC feedback) is information that has to be transmitted for the UE 1*u*-20 to continuously receive DL data from the source BS 1*u*-05 even after the first condition is satisfied, if the PDCP control data is missing, an error may occur in reception of the DL data. The LTE or NR PDCP layer connected to the UM DRB (the RLC layer operating in the UM mode) may switch UL data transmission to the second bearer (e.g., the RLC layer or the MAC layer) for the target BS 1*u*-10, and may transmit an indicator to the lower layer (e.g., the RLC layer or the MAC layer) for the first bearer corresponding to the source BS 1*u*-05, the indicator indicating to discard all of stored or buffered PDCP user data (PDCP data PDU) excluding the PDCP control data (the PDCP control PDU, e.g., the PDCP status report or the ROHC feedback). As another method, the LTE or NR PDCP layer connected to the UM DRB (the RLC layer operating in the UM mode) may switch UL data transmission to the second bearer (e.g., the RLC layer or the MAC layer) for the target BS 1*u*-10, and may transmit an indicator to the lower layer (e.g., the RLC layer or the MAC layer) for the first bearer corresponding to the source BS 1*u*-05, the indicator indicating to discard PDCP user data (PDCP data PDU) that is transferred to the lower layer from the PDCP layer, that is not actually transmitted by the lower layer, for which PDCP discard timer is not expired, that is stored or that is buffered, except for the PDCP control data (the PDCP control PDU, e.g., the PDCP status report or the ROHC feedback). The NR PDCP layer may be connected to an LTE RLC layer or NR RLC layer and then may perform data transmission or reception, and the LTE PDCP layer may be connected only to the LTE RLC layer and then may perform data transmission or reception. In this regard, particular operations are proposed below.

When the RLC layer receives an indicator indicating to discard data (e.g., the PDCP user data) from the LTE or NR PDCP layer, and the RLC layer having received the discard indicator is the LTE RLC layer, with respect to user data (PDCP PDU, PDCP Data PDU, or RLC SDU) received from an upper layer (the PDCP layer), the LTE RLC layer discards the user data if a segment of the user data is not mapped to RLC user data (RLC data PDU) yet or is not generated as RLC user data ((When indicated from upper layer (i.e., PDCP) to discard a particular RLC SDU, the transmitting side of an AM RLC entity or the transmitting UM RLC entity shall discard the indicated RLC SDU if no segment of the RLC SDU has been mapped to a RLC data PDU yet). Therefore, if the segment of the user data is already mapped to the RLC user data (RLC data PDU) or is generated as the RLC user data, the LTE RLC layer may not discard the user data and may perform data transmission to the source BS 1*u*-05.

When the RLC layer receives an indicator indicating to discard data (e.g., the PDCP user data) from the LTE or NR PDCP layer, and the RLC layer having received the discard indicator is the NR RLC layer, with respect to user data (PDCP PDU, PDCP Data PDU, or RLC SDU) received from an upper layer (the PDCP layer), the NR RLC layer discards the user data if the user data or a segment of the user data has not been transferred nor transmitted to a lower layer (When indicated from upper layer (i.e., PDCP) to discard a particular RLC SDU, the transmitting side of an AM RLC entity or the transmitting UM RLC entity shall discard the indicated RLC SDU, if neither the RLC SDU nor a segment thereof has been submitted to the lower layers). Therefore, if the user data or the segment of the user data has been transferred or submitted to the lower layer, the NR RLC layer may not discard the user data and may perform data transmission to the source BS 1*u*-05. Accordingly, unlike the LTE RLC layer, even when the user data has been generated as the RLC user data, if the user data is not transferred to the lower layer, the NR RLC layer can discard the data and thus may discard more data, thereby efficiently preventing unnecessary data transmission.

According to Embodiment 2 of the efficient handover method (e.g., the DAPS handover method) proposed in the disclosure, even after the UE 1*u*-20 receives a handover command message (e.g., an RRCReconfiguration message), the UE 1*u*-20 may continuously receive DL data from the source BS 1*u*-05 or the target BS 1*u*-10 by using the protocol layers for the first bearer corresponding to the source BS 1*u*-05 or the second bearer corresponding to the target BS 1*u*-10. According to an embodiment of the disclosure, to allow the UE 1*u*-20 to smoothly receive DL data from the source BS 1*u*-05 (or the target BS 1*u*-10) or to allow the source BS 1*u*-05 (or the target BS 1*u*-10) to smoothly transmit DL data to the UE 1*u*-20, for AM bearers, the UE 1*u*-20 may be allowed to continuously perform UL transmission of a RLC status report, not data, on the source BS 1*u*-05 (or the target BS 1*u*-10) by using the protocol layers for the first bearer (or the second bearer). For example, even when the first condition is satisfied and thus the UE switches UL data transmission to the target BS 1*h*-10, when the UE 1*u*-20 has to transmit the RLC status report, HARQ ACK or NACK, or PDCP control data (a PDCP ROHC feedback or a PDCP status report) to the source BS 16-05, the UE 1*h*-20 may be allowed to perform data transmission via the first bearer for the source BS 1*h*-05. In a case of the AM bearers, when data is transmitted to a transmitting end and then successful delivery is not indicated by using an RLC status report (i.e., when the RLC status report is not received), data cannot be continuously transmitted thereafter.

When the first condition is satisfied in third operation 1u-03 in Embodiment 2 of the efficient handover method of FIG. 1U, the UE 1u-20 discontinues UL data transmission to the source BS 1u-05 by using the protocol layers 1u-22 for the first bearer, performs switching, and then starts UL data transmission to the target BS 1u-10 by using the protocol layers 1u-21 for the second bearer, the UE 1u-20 may continuously transmit HARQ ACK or HARQ NACK information, a RLC status report (ACK or NACK information), or PDCP control data (e.g., a PDCP status report or PDCP ROHC feedback information) by using the protocol layers for the first bearer (or the second bearer) so as to smoothly receive DL data from the source BS 1u-05 (or the target BS 1u-10) or to allow the source BS 1u-05 (or the target BS 1u-10) to smoothly transmit DL data.

In third operation 1u-03 in Embodiment 2 of the efficient handover method of FIG. 1U, even when the first condition is satisfied and thus the UE 1u-20 discontinues UL data transmission to the source BS 1u-05 by using the protocol layers 1u-22 for the first bearer, performs switching, and then starts UL data transmission to the target BS 1u-10 by using the protocol layers 1u-21 for the second bearer, the UE 1u-20 may continuously perform data transmission due to HARQ retransmission by the MAC layer or data transmission due to retransmission by the RLC layer in the AM mode so as to prevent loss of data to the source BS 1u-05.

In third operation 1u-03 in Embodiment 2 of the efficient handover method of FIG. 1U, when the first condition is satisfied and thus the UE 1u-20 discontinues UL data transmission to the source BS 1u-05 by using the protocol layers 1u-22 for the first bearer, performs switching, and then starts UL data transmission to the target BS 1u-10 by using the protocol layers 1u-21 for the second bearer, the source BS 1u-05 or the target BS 1u-10 may divide a time and may allocate a transport resource to the UE 1u-20 so as to prevent collision between a UL transport resource to the target BS 1u-10 and a UL transport resource to the source BS 1u-05. When the UL transport resource to the target BS 1u-10 collides with and thus overlaps the UL transport resource to the source BS 1u-05, the UE 1u-20 may perform data transmission to the source BS 1u-05 by giving priority to the UL transport resource to the source BS 1u-05 so as to maintain transmission of DL data or continuously receive the DL data from the source BS 1u-05 without a problem.

As another method, when a UL transport resource to the target BS 1u-10 collides with and thus overlaps a UL transport resource to the source BS 1u-05, the UE 1u-20 may perform data transmission to the target BS 1u-10 by giving priority to the UL transport resource to the target BS 1u-10 so as to maintain transmission of DL data from the target BS 1u-10.

When the UE 1u-20 receives a handover command message in which handover (the DAPS handover method) corresponding to Embodiment 2 of the disclosure is indicated or is indicated for each bearer, the UE 1u-20 or the bearer for which the DAPS handover is indicated may perform a scheduling request via a first protocol layer, may receive a UL transport resource by transmitting a buffer status report to the source BS 1u-05 and may transmit UL data until the first condition is satisfied, and Thereafter, the UE 1u-20 may receive DL data from the source BS 1u-05. However, when the first condition is satisfied, the UE 1u-20 does not transmit data to the source BS 1u-05 anymore, may perform a scheduling request by using a second protocol layer by switching a UL, may receive a UL transport resource by transmitting a buffer status report to the target BS 1u-10, and may transmit UL data to the target BS 1u-10. However, the UE 1u-20 may continuously receive DL data from the source BS 1u-05, and, even after UL transmission switching, the UE 1u-20 may continuously transmit HARQ ACK or HARQ NACK, a RLC status report, or PDCP control data (e.g., a PDCP status report or ROHC feedback information) which corresponds to the DL data. In addition, the UE 1u-20 may continuously receive DL data from the source BS 1u-05 or the target BS 1u-10 even when the first condition is satisfied.

In Embodiment 2 of the efficient handover method of FIG. 1U, when a second condition is satisfied in fourth operation 1u-04, the UE 1u-20 may discontinue DL data reception from the source BS 1u-05 by using the protocol layers 1u-22 for the first bearer or may release a link to the source BS 1u-05. The second condition may be one of conditions below. In addition, the PDCP layer 1u-21 for the second bearer may continuously perform data transmission or reception without interruption to or from the target BS 1u-10 by using data to be transmitted or data to be received, SN information, or header compression and decompression context, which is stored in the PDCP layer 1u-22 for the first bearer.

When the UE 1h-20 performs a random access procedure on the target BS 1h-10 by using layers 1h-21 for the second bearer and receives a RAR message, the UE 1h-20 may determine that the second condition is satisfied.

When the UE 1u-20 performs a random access procedure on the target BS 1u-10 by using the layers 1u-21 for the second bearer, receives a RAR message, and configures and transmits a handover complete message to the target BS 1u-10, the UE 1u-20 may determine that the second condition is satisfied.

When the UE 1u-20 performs a random access procedure on the target BS 1u-10 by using the layers 1u-21 for the second bearer, and first transmits data by using a PUCCH or a PUCCH UL transport resource or first receives the PUCCH or the PUCCH UL transport resource, the UE 1u-20 may determine that the second condition is satisfied.

When a BS configures a separate timer to the UE 1u-20 by using an RRC message, and the separate timer is expired, the UE 1u-20 may determine that the second condition is satisfied. The separate timer may start when the UE 1u-20 receives a handover command message from the source BS 1u-05, the UE 1u-20 starts a random access (transmits a preamble) to the target BS 1u-10, the UE 1u-20 receives a RAR message from the target BS 1u-10, the UE 1u-20 transmits a handover complete message to the target BS 1u-10, or the UE 1u-20 first transmits data by using a PUCCH or a PUCCH UL transport resource.

When the UE 1u-20 performs a random access procedure on the target BS 1u-10 by using protocol layers for a second bearer, receives a RAR message, configures and transmits a handover complete message to the target BS 1u-10, and then receives acknowledgement with respect to successful delivery of the handover complete message by using a MAC layer (HARQ ACK) or a RLC layer (RLC ACK), the UE 1u-20 may determine that the second condition is satisfied.

When the UE 1u-20 performs a random access procedure on the target BS 1u-10 by using the protocol layers for the second bearer, receives a RAR message or configures and transmits a handover complete message to the target BS 1u-10 and then first receives allocation of a UL transport resource from the target BS 1u-10 or first receives an indication of the UL transport resource, the UE 1u-20 may determine that the second condition is satisfied.

When the source BS 1u-05 performs efficient handover proposed in the disclosure, the source BS 1u-05 may determine when to discontinue transmission of DL data to the UE 1u-20 or when to release a link to the UE 1u-20. For example, the source BS 1u-05 may determine to discontinue transmission of DL data or may determine when to release a link to the UE 1u-20, based on a certain method, e.g., when a certain timer is expired (the timer can start after handover is indicated) or the source BS 1u-05 receives, from the target BS 1u-10, an indication indicating that the UE 1u-20 has successfully performed handover to the target BS 1u-10. When the UE 1u-20 does not receive DL data from the source BS 1u-05 for a certain time period, the UE 1u-20 may determine that the second condition is satisfied, and may determine that a link to the source BS 1u-05 is released and thus may release the link.

When the UE 1u-20 receives, from the target BS 1u-10, an indication (e.g., an RRC message (e.g., an RRCReconfiguration message) indicating to release the link to the source BS 1u-05, a MAC CE, a RLC control PDU, or a PDCP control PDU, the UE 1u-20 may determine that the second condition is satisfied.

When the UE 1u-20 receives, from the source BS 1u-05, an indication (e.g., an RRC message (e.g., an RRCReconfiguration message) indicating to release the link to the source BS 1u-05, a MAC CE, a RLC control PDU, or a PDCP control PDU, the UE 1u-20 may determine that the second condition is satisfied.

When the UE 1u-20 does not receive DL data from the source BS 1u-05 for a certain time period, the UE 1u-20 may determine that the second condition is satisfied.

When the UE 1u-20 successfully completes a random access procedure on the target BS 1u-10 by using the layers (e.g., the MAC layer) for the second bearer, the UE 1u-20 successfully completes the random access procedure on the target BS 1u-10 by using the layers for the second bearer and then receives allocation of a first UL transport resource from the target BS 1u-10, or the UE 1u-20 first receives an indication of a UL transport resource, the UE 1u-20 may determine that the second condition is satisfied.

For example, in a case where the UE 1u-20 receives a handover command message from the source BS 1u-05 and receives an indication of a random access to the target BS 1u-10, when the indicated random access is a CFRA (e.g., when a predefined preamble or a UE-cell identifier (e.g., C-RNTI is allocated),
  it may be determined that the random access procedure is successfully completed when the UE 1u-20 transmits the predefined preamble to a cell of the target BS 1u-10 and receives a RAR message. Therefore, when the UE 1u-20 receives a first UL transport resource that is allocated, included or indicated in the RAR message, the UE 1u-20 may determine that the second condition is satisfied. As another method, when the UE 1u-20 first receives a UL transport resource after the UE receives the RAR message, the UE 1u-20 may determine that the second condition is satisfied.

In a case where the UE 1u-20 receives a handover command message from the source BS 1u-05 and receives an indication of a random access to the target BS 1u-10, when the indicated random access is a CBRA (e.g., when a predefined preamble or a UE-cell identifier (e.g., C-RNTI) is not allocated),
  the UE 1u-20 may determine that the random access procedure on the target BS 1u-10 is successfully completed when the UE 1u-20 transmits a preamble (e.g., a random preamble) to a cell of the target BS 1u-10 and receives a RAR message, transmits a message3 (e.g., a handover complete message) by using a UL transport resource allocated (or included or indicated) in the RAR message, and receives, from the target BS 1u-10 and via a message4, a Contention resolution MAC CE indicating resolution of contention or receives a UL transport resource by using a PDCCH corresponding to a C-RNTI of the UE 1u-20. Therefore, when the UE 1u-20 monitors the PDCCH and first receives or is first indicated with the UL transport resource by using the PDCCH corresponding to the C-RNTI of the UE 1u-20, the UE 1u-20 may determine that the second condition is satisfied. As another method, when a size of the UL transport resource allocated in the RAR message is sufficient and thus the UE 1u-20 can transmit the message3 and additionally transmit UL data, the UE 1u-20 may determine that the UE 1u-20 first receives a UL transport resource and thus may determine that the second condition is satisfied. For example, when the UE 1u-20 receives a RAR message, the UE 1u-20 may determine that the UE 1u-20 first receives the UL transport resource and thus may determine that the second condition is satisfied.

When a handover method (RACH-less handover) that does not request a random access procedure is also indicated in the handover command message received by the UE 1u-20, the UE 1u-20 may determine that the second condition is satisfied in cases below.

When the handover command message includes a UL transport resource with respect to the target BS 1u-10,
  the UE 1u-20 transmits a message3 (e.g., a handover complete message or a RRCReconfigurationComplete message) by using the UL transport resource with respect to the target BS 1-10, and when the UE 1u-20 receives, from the target BS 1u-10, a UE Identity Confirmation MAC CE via a message4, or receives a UL transport resource by using a PDCCH corresponding to a C-RNTI of the UE 1u-20, the UE 1u-20 may determine that a random access procedure is successfully completed, and thus may determine that the second condition is satisfied. As another method, after the random access procedure is successfully completed, when the UE 1u-20 performs PDCCH monitoring and thus receives a first UL transport resource by using the PDCCH corresponding to the C-RNTI of the UE 1u-20, the UE 1u-20 may determine that the second condition is satisfied.

When the handover command message does not include the UL transport resource with respect to the target BS 1u-10,
  the UE 1u-20 performs PDCCH monitoring on the target BS 1u-10 (or a cell) and when the UE 1u-20 receives a UL transport resource by using the PDCCH corresponding to the C-RNTI of the UE 1u-20, or transmits a message3 (e.g., a handover complete message or a RRCReconfigurationComplete message) by using the UL transport resource, and receives a UE Identity Confirmation MAC CE from the target BS 1u-10 or receives a UL transport resource by using the PDCCH corresponding to the C-RNTI of the UE 1u-20, the UE 1u-20 may determine that a random access procedure is successfully completed and the second condition is satisfied. As another method, after the random access procedure is successfully completed, when the UE 1u-20 performs PDCCH monitoring and thus receives a first UL transport resource by using the PDCCH corresponding to the C-RNTI of the UE 1u-20, the UE 1u-20 may determine that the second condition is satisfied.

In a case where the UE 1u-20 performs Embodiment 2 of the efficient handover method (e.g., the DAPS handover method) proposed in the disclosure, when it is identified that the RRC layer, the MAC layer, or the RLC layer of the UE 1u-20 for the first bearer corresponding to the source BS, and the RRC layer, the MAC layer, or the RLC layer of the UE 1u-20 for the second bearer corresponding to the target BS 1u-10 satisfy the second condition proposed in the disclosure, an indicator indicating that the second condition is satisfied may be indicated to a PDCP layer of the UE 1u-20 or a bearer which performs the DAPS handover method. When the second condition is satisfied or the PDCP layer of the UE 1u-20 receives, from a lower layer or an upper layer, the indicator indicating that the second condition is satisfied, one or more procedures below may be performed on the bearer or the UE 1u-20, which is configured with the DAPS handover method, and thus Embodiment 2 of the efficient handover method proposed in the disclosure may be successfully completed.

- The UE 1u-20 may release the first bearer for the source BS 1u-05 and may release a link to the source BS 1u-05.
- When the UE 1u-20 releases a link to the source BS 1u-05, in order to report, to the target BS 1u-10, a reception status of a plurality of items of DL data received from the source BS 1u-05, the UE 1u-20 may trigger a PDCP status report procedure, may configure a PDCP status report, and may transmit the PDCP status report to the target BS 1u-10.
- When the second condition is satisfied, the UE 1u-20 may switch the second PDCP layer architecture or function 1v-20 to the first PDCP layer architecture or function 1v-11 or 1v-12 proposed in the disclosure with respect to each bearer or a bearer for which the DAPS handover method is indicated. In addition, the UE 1u-20 may reset a variable for realignment, may stop and reset the realignment timer, may perform a deciphering procedure or header (or data) decompression by applying a security key or header decompression context for the source BS 1u-05 to a plurality of items of data (e.g., a plurality of items of data received from the source BS 1u-05) stored for reordering in the buffer, and may discard the security key or the header decompression context for the source BS 1u-05 Thereafter, the UE 1u-20 may provide the plurality of items of processed data to the upper layer in ascending order. For example, when the second condition is satisfied, the UE 1u-20 may perform the deciphering procedure or header (or data) decompression by applying the security key or header decompression context for the source BS 1u-05 to the plurality of items of data (e.g., the plurality of items of data received from the source BS 1u-05) stored for reordering in the buffer, and then may discard the security key or the header decompression context for the source BS 1u-05. As another method, when the second condition is satisfied, the UE 1u-20 may switch the second PDCP layer architecture or function 1v-20 to a third PDCP layer architecture or function 1v-30 indicated in operation 1v-03 proposed in the disclosure with respect to each bearer or a bearer for which the DAPS handover method is indicated. Thereafter, the UE 1u-20 may not stop nor reset but may continuously use the variable for realignment and the realignment timer. However, the UE 1u-20 may perform the deciphering procedure or header (or data) decompression by applying the security key or header decompression context for the source BS 1u-05 to the plurality of items of data (e.g., the plurality of items of data received from the source BS 1u-05) stored for reordering in the buffer, and then may discard the security key or the header decompression context for the source BS 1u-05. In addition, the UE 1u-20 may provide the plurality of items of processed data to the upper layer in ascending order. For example, when the second condition is satisfied, the UE 1u-20 may perform the deciphering procedure or header (or data) decompression by applying the security key or header decompression context for the source BS 1u-05 to the plurality of items of data (e.g., the plurality of items of data received from the source BS 1u-05) stored for reordering in the buffer, and then may discard the security key or the header decompression context for the source BS 1u-05. The UE 1u-20 may release QoS mapping information of the SDAP layer, security key information of the PDCP layer for the source BS 1u-05, header (or data) compression context information for the source BS 1u-05, or the RLC layer or the MAC layer for the source BS 1u-05.
- When the UE 1u-20 resets the MAC layer for the source BS 1u-05 and switches the second PDCP layer architecture for the bearer configured with the DAPS handover method to the first PDCP layer architecture, the UE 1u-20 may perform a RLC layer re-establishment procedure or a RLC layer release procedure on the RLC layer for the source BS 1u-05 in the second PDCP layer architecture.
- A reception PDCP layer may process received data or store data due to a re-establishment procedure of a lower layer, and a header decompression procedure may be performed, based on ROHC or EHC (for the source BS 1u-05), on a plurality of pieces of stored data or all stored data (received from the source BS 1u-05) with respect to UM DRBs.
- The reception PDCP layer may process received data or store data due to a re-establishment procedure of a lower layer, and a header decompression procedure may be performed, based on ROHC or EHC (for the source BS 1u-05), on a plurality of pieces of stored data or all stored data (received from the source BS 1u-05) with respect to AM DRBs.
- As another method, the reception PDCP layer may process received data or store data due to a re-establishment procedure of a lower layer, and when an indicator (drb-Continue ROHC or drb-Continue EHC) indicating to keep using header compression context is not configured for UM DRBs or AM DRBs, a header decompression procedure may be performed, based on ROHC or EHC, on a plurality of pieces of stored data or all stored data (received from the source BS 1u-05).

After the procedure is performed, a transmission PDCP layer or the reception PDCP layer may discard or release the security key or header compression contexts for the source BS 1u-05.

When the source BS 1s-02 referring to FIG. 1S of the disclosure transmits the handover command message to the UE 1s-01 in operation 1s-20, the source BS 1s-02 may define indicators related to embodiments of the disclosure in the handover command message (e.g., an RRCReconfiguration message), and may indicate, to the UE 1s-01, which handover procedure corresponding to which embodiment is to be triggered. Thereafter, the UE 1s-01 may perform a handover procedure according to a handover method indicated in the handover command message. For example, the UE 1s-01 may perform Embodiment 2 (the DAPS handover method) of the efficient handover method proposed in the disclosure, thereby performing handover to the target BS 1s-03 while minimizing a data interruption time.

As another method, the handover command message may define indicators for respective bearers, the indicators being related to embodiments of the disclosure, in the handover command message, and may further particularly indicate which embodiment is to be applied to which bearer in handover. For example, the source BS 1s-02 may indicate that Embodiment 2 of the disclosure is to be applied only to the AM bearer for which the RLC layer operating in the AM mode is active, or may extensively apply Embodiment 2 of the disclosure to the UM bearer for which the RLC layer operating in the UM mode is active.

It is assumed that embodiments of the disclosure are applied to a DRB. However, when required (e.g., in a case where a UE maintains a SRB for a source BS and fails to perform handover to a target BS, and thus the UE can report a handover failure message via the SRB for the source BS or can recover a link), embodiments of the disclosure may be extensively applied to the SRB.

In embodiments of the disclosure, when the UE performs data transmission and reception to and from the source BS by using the protocol layers for the first bearer and performs data transmission and reception to and from the target BS by using the protocol layers for the second bearer, the MAC layer for the first bearer and the MAC layer for the second bearer may each operate a DRX period, thereby reducing battery consumption in the UE. For example, even after the UE receives the handover command message, the UE may continuously apply the DRX period of the MAC layer that was applied when transmitting and receiving data by using the protocol layers for the first bearer, and may discontinue the DRX period according to the first condition or the second condition. In addition, the UE may manage, in response to indication from the target BS, whether to separately apply the DRX period to the MAC layer for the second bearer.

In the disclosure, the meaning that the UE discontinues UL transmission to the source BS by using the protocol layers for the first bearer and discontinues DL data reception from the source BS may mean that the UE re-establishes, resets, or releases the protocol layers (the PHY layer, the MAC layer, the RLC layer, or the PDCP layer) for the first bearer.

In embodiments of the disclosure, for convenience of description, it is described that the UE configures the first bearer for the source BS or the second bearer for the target BS, and embodiments of the disclosure may be easily extended and equally applied to a case in which the UE configures a plurality of first bearers for the source BS or a plurality of second bearers for the target BS. In addition, embodiments of the disclosure may be extended and equally applied to a case in which a plurality of bearers for a plurality of target BSs are configured. For example, the UE may configure second bearers while performing a handover procedure on the first target BS, and when handover fails, the UE configures second bearers while performing a handover procedure on the second target BS, such that the UE may autonomously detect and determine cells satisfying a certain condition (e.g., a signal whose strength being equal to or greater than a certain value) from among a plurality of target BSs, may determine one cell and then may perform a handover procedure on the cell.

Hereinafter, the disclosure provides that, when the UE referring to FIG. 1S receives a handover command message and applies bearer configuration information included in the handover command message, the UE applies the bearer configuration information by using different methods according to types of handover indicated in the handover command message.

In a case where the UE receives the handover command message, when ReconfigWithSync information or MobilityControlInfo indicates a first handover method (e.g., Embodiment 1 of the disclosure or a normal handover method), Embodiment 2 (the DAPS handover method) proposed in the disclosure is not configured, or any bearer is not configured in bearer configuration information in Embodiment 2 (the DAPS handover method) proposed in the disclosure, when a default bearer is configured in SDAP layer configuration information configured in the handover command message, the UE may configure a default bearer for a source BS as the default bearer for a target BS which is indicated in the configuration information.

When a second QoS flow and bearer mapping information are configured in the SDAP layer configuration information configured in the handover command message, the UE may release a first QoS flow and bearer mapping information applied for the source BS and may apply the second QoS flow and the bearer mapping information. As another method, the UE may replace the first QoS flow and bearer mapping information applied for the source BS with the second QoS flow and the bearer mapping information.

When a data discard timer value is configured in PDCP layer configuration information configured in the handover command message, the UE may apply the discard timer value to a PDCP layer corresponding to a bearer identifier of the configuration information.

When drb-ContinueROHC indicator is configured as False in the PDCP layer configuration information configured in the handover command message, the UE may reset context of header compression or decompression protocol in a PDCP layer corresponding to a bearer identifier of the configuration information. When drb-ContinueROHC indicator is configured as True, the UE does not reset the context of header compression or decompression protocol in the PDCP layer corresponding to the bearer identifier of the configuration information.

When a realignment timer value is configured in the PDCP layer configuration information configured in the handover command message, the UE may apply the realignment timer value to the PDCP layer corresponding to the bearer identifier of the configuration information.

When the UE receives the handover command message, the UE may re-establish a PDCP layer. For example, the UE may reset window state variables with respect to an SRB and may discard a plurality of items of stored data (PDCP SDU or PDCP PDU). The UE may reset window state variables with respect to a UM DRB, may perform, in ascending order of COUNT values, compression, ciphering, or integrity protection on a plurality of items of data that are not transmitted to a lower layer yet or for which a PDCP discard timer is not expired, based on header (or data) compression context or security key of the target BS, and then may transmit or retransmit the data. In addition, when a realignment timer is running, the UE may stop and reset the realignment timer, may process the plurality of items of received data (PDCP SDU or PDCP PDU) in order, and may provide the data to an upper layer. The UE does not reset window state variables with respect to an AM DRB, may perform, based on header (or data) compression context or security key of the target BS, compression, ciphering, or integrity protection on data starting from first data (PDCP SDU or PDCP PDU) for which successful delivery is not acknowledged by a lower layer, in ascending order of PDCP SNs or COUNT values.

When security key configuration information or security algorithm is configured in security configuration information configured in the handover command message, the UE may derive a new security key or new security configuration information by using the configuration information, and may release an existing security key or existing security configuration information. The UE may replace the existing security key or the existing security configuration information with the new security key or the new security configuration information.

When a new logical channel identifier is configured in RLC layer configuration information configured in the handover command message, the UE may release an existing logical channel identifier corresponding to a bearer identifier indicated in the RLC layer configuration information.

The UE may replace the existing logical channel identifier with the new logical channel identifier.

When an RLC re-establishment procedure is configured in the RLC layer configuration information configured in the handover command message, the UE may perform the RLC re-establishment procedure on an RLC layer corresponding to a bearer identifier indicated in the RLC layer configuration information. For example, the UE may perform the RLC re-establishment procedure such that a transmission RLC layer may perform a procedure of discarding all stored data. In addition, when a realignment timer is running, a reception RLC layer may stop and reset the realignment timer, may process all stored data and then may provide the data to its upper layer. In addition, the UE may reset a MAC layer. In addition, the UE may reset the MAC layer for the source BS and may use the MAC layer for the target BS.

When the RLC layer configuration information configured in the handover command message is newly configured, the UE may perform the RLC re-establishment procedure on an RLC layer corresponding to a bearer identifier indicated in the RLC layer configuration information.

When a second priority with respect to a logical channel is newly configured in MAC layer configuration information configured in the handover command message, the UE may release a first priority corresponding to an identifier of the logical channel indicated in the configuration information. The UE may replace the first priority corresponding to the logical channel identifier with the newly configured second priority.

When a second prioritisedBitRate (PBR) with respect to a logical channel is newly configured in the MAC layer configuration information configured in the handover command message, the UE may release first prioritisedBitRate (PBR) corresponding to an identifier of the logical channel indicated in the configuration information. The UE may replace the first prioritisedBitRate (PBR) corresponding to the identifier of the logical channel with the newly configured second prioritisedBitRate (PBR). The prioritisedBitRate refers to a value that increases with respect to each logical channel at preset time intervals (e.g., at every TTI). When the UE receives a UL transport resource, the UE may perform an LCP procedure, and may transmit data with respect to the logical channel, based on a priority and the prioritisedBitRate. The higher the priority is, or the greater the value of the prioritisedBitRate is, more data may be transmitted.

When second bucketSizeDuration with respect to a logical channel is newly configured in the MAC layer configuration information configured in the handover command message, the UE may release first bucketSizeDuration corresponding to an identifier of the logical channel indicated in the configuration information. The UE may perform configuration by replacing the first bucketSizeDuration corresponding to the identifier of the logical channel with the newly configured second bucketSizeDuration. The bucket size indicates a maximum value a value of prioritisedBitRate can have when the prioritisedBitRate is accumulated.

When second available SCell information, available subcarrier spacing information, maximum PUSCH duration, or logical channel group configuration information is configured in the MAC layer configuration information configured in the handover command message, the UE may release pre-configured first available SCell information, pre-configured available subcarrier spacing information, pre-configured maximum PUSCH duration, or pre-configured logical channel group configuration information. The UE may perform configuration by replacing the pre-configured first available SCell information, the pre-configured available subcarrier spacing information, the pre-configured maximum PUSCH duration, or the pre-configured logical channel group configuration information with the newly-configured second available SCell information, the newly-configured available subcarrier spacing information, the newly-configured maximum PUSCH duration, or the newly-configured logical channel group configuration information.

When the UE receives the handover command message, when the handover command message or ReconfigWithSync information or mobilityControlInfo information indicates or configures the second handover method (e.g., Embodiment 2 or the DAPS handover method of the disclosure), when the DAPS handover method is indicated or configured for each bearer identifier, when Embodiment 2 (the DAPS handover method) proposed in the disclosure is configured for a certain bearer in bearer configuration information, or when Embodiment 2 (the DAPS handover method) proposed in the disclosure is configured for at least one bearer in bearer configuration information, when a default bearer is configured in SDAP layer configuration information configured in the handover command message, the UE may perform the DAPS handover method proposed in the disclosure, may maintain an existing default bearer for the source BS by applying the second SDAP layer architecture 1j-20, and may configure default bearer information indicated in the configuration information as a default bearer for the target BS. As another method, when the first condition proposed in the disclosure is satisfied, the UE may switch the existing default bearer for the source BS to the default bearer for the target BS which is indicated in the configuration information.

When a second QoS flow and bearer mapping information are configured in the SDAP layer configuration information configured in the handover command message, the UE may perform the DAPS handover method proposed in the disclosure, may maintain a first QoS flow and bearer mapping information for the source BS by applying the second SDAP layer architecture, and may apply the second QoS flow and the bearer mapping information to data for the target BS. In addition, when the first condition proposed in the disclosure is satisfied, the UE may apply the second QoS flow and the bearer mapping information for the target BS.

When a data discard timer value is configured in PDCP layer configuration information configured in the handover command message, the UE may perform the DAPS handover method proposed in the disclosure and may apply, by applying the second PDCP layer architecture, the discard timer value to a PDCP layer corresponding to a bearer identifier of the configuration information.

When the handover command message indicates or configures the DAPS handover method, the PDCP layer may not be re-established and procedures below may be performed. For example, the PDCP layer may reset window state variables with respect to an SRB (variable resetting may be skipped to perform fallback when DAPS handover fails) or may discard a plurality of items of stored data (PDCP SDU or PDCP PDU). In addition, the PDCP layer may not reset window state variables with respect to an UM DRB, and may continuously perform, to or from the source BS, data transmission or reception on plurality of items of data that are not transmitted to a lower layer yet or for which a PDCP discard timer is not expired. In addition, the PDCP layer may not reset window state variables with respect to an AM DRB, and may continuously perform data transmission or reception to or from the source BS.

When the handover command message does not indicate nor configure the DAPS handover method, the UE may re-establish the PDCP layer. For example, the PDCP layer may reset window state variables with respect to an SRB and may discard a plurality of items of stored data (PDCP SDU or PDCP PDU). In addition, the PDCP layer may reset window state variables with respect to a UM DRB, may perform, in ascending order of COUNT values, compression, ciphering, or integrity protection on a plurality of items of data that are not transmitted to its lower layer yet or for which a PDCP discard timer is not expired, based on header (or data) compression context or security key of the target BS, and then may transmit or retransmit the data. In addition, when a realignment timer is running, the PDCP layer may stop and reset the realignment timer, may process the plurality of items of received data (PDCP SDU or PDCP PDU) in order, and may provide the data to an upper layer. In addition, the PDCP layer does not reset window state variables with respect to an AM DRB, may perform, based on header (or data) compression context or security key of the target BS, compression, ciphering, or integrity protection on data starting from first data (PDCP SDU or PDCP PDU) for which successful delivery is not acknowledged by a lower layer, in ascending order of PDCP SNs or COUNT values. In addition, the UE may perform a re-establishment procedure on an RLC layer.

When drb-ContinueROHC indicator is configured as False in configuration information of the PDCP layer for which the DAPS handover method is indicated or configured by the handover command message, the UE may perform the DAPS handover method proposed in the disclosure, and may, by applying the second PDCP layer architecture, changelessly use header compression or decompression protocol context for the source BS in a PDCP layer corresponding to a bearer identifier of the configuration information, reset header compression or decompression protocol context for the target BS, and start in an initial state (e.g., an IR state). When drb-ContinueROHC indicator is configured as True, the UE may perform the DAPS handover method proposed in the disclosure, and may, by applying the second PDCP layer architecture, changelessly use header compression or decompression protocol context for the source BS in a PDCP layer corresponding to a bearer identifier of the configuration information, and may equally apply header compression or decompression protocol context for the target BS as the header compression or decompression protocol context for the source BS. For example, the UE may copy and changelessly apply the header compression or decompression protocol context for the source BS to the header compression or decompression protocol context for the target BS. As another method, the UE may apply same header compression or decompression protocol context to the target BS or the source BS.

When a realignment timer value is configured as False in configuration information of the PDCP layer for which the DAPS handover method is indicated or configured by the handover command message, the UE may perform the DAPS handover method proposed in the disclosure, and may apply the realignment timer value to the PDCP layer corresponding to the bearer identifier of the configuration information, by applying the second PDCP layer architecture. As another method, when an indicator indicating to continuously use ROHC context or an indicator indicating to use same ROHC context (e.g., a drb-ContinueROHC indicator) with respect to the source BS or the target BS, or an indicator indicating to recover data is configured, when a security key is not changed, is not configured, or is not updated, or when an indicator indicating that the security key is not changed is configured, when the UE applies the handover procedure to the bearer for which the DAPS handover method is configured, the UE may apply the second PDCP layer architecture such that a PDCP layer corresponding to a bearer identifier of the configuration information may changelessly use header compression or decompression protocol context for the source BS, and may equally apply header compression or decompression protocol context for the target BS as the header compression or decompression protocol context for the source BS. For example, the UE may copy and changelessly apply the header compression or decompression protocol context for the source BS to the header compression or decompression protocol context for the target BS, or may changelessly apply the same context for the source BS to context for the target BS. As another method, when the first condition (e.g., when the random access procedure is successfully performed on the target BS) proposed in the disclosure is satisfied, the UE may copy and changelessly apply the header compression or decompression protocol context for the source BS to the header compression or decompression protocol context for the target BS, or may changelessly apply the same context for the source BS to context for the target BS. As another method, the UE may apply same header compression or decompression protocol context to the target BS or the source BS. As another method, the UE may operate one header compression or decompression protocol for the target BS or the source BS, and may apply same header compression or decompression protocol context. For example, when an indicator indicating to continuously use ROHC context or an indicator indicating to use same ROHC context (e.g., a drb-ContinueROHC indicator) with respect to the source BS or the target BS, or an indicator indicating to recover data is configured, when a security key is not changed, is not configured, or is not updated, or when an indicator indicating that the security key is not changed is configured, the UE may apply one common header compression protocol (e.g., ROHC protocol) to the target BS and the source BS, and when an indicator indicating to continuously use ROHC context for the source BS, the target BS or an indicator indicating to use same ROHC context (e.g., a drb-ContinueROHC indicator), or an indicator indicating to recover data is not configured, when a security key is changed, is configured, or is updated, or when an indicator indicating that the security key is changed is configured, the UE may apply or use a first header compression protocol (e.g., ROHC protocol) to the source BS, and may set and apply or use a second header compression protocol (e.g., ROHC protocol) to the target BS.

The indicator indicating to continuously use ROHC context or the indicator indicating to use same ROHC context (e.g., a drb-ContinueROHC indicator) with respect to the source BS or the target BS, or the indicator indicating to recover data (e.g., recoverPDCP) may be configured to be always included in configuration information of the bearer configured with the DAPS handover method in the handover command message (e.g., RRCReconfiguration message message), when the security key is not changed, is not configured, or is not updated in DAPS handover.

When security key configuration information or security algorithm is configured in security configuration information for which the DAPS handover method is indicated or configured by the handover command message, or when an indicator indicating a new procedure is included in the PDCP layer configuration information, the UE may derive a new security key or new security configuration information by using the configuration information and may perform the DAPS handover method proposed in the disclosure: and may maintain an existing security key or existing security configuration information for the source BS by applying the second PDCP layer architecture, and may configure a security key or security configuration information for the target BS as the new security key or the new security configuration information.

When a new logical channel identifier is configured in RLC layer configuration information of a bearer for which the DAPS handover method is indicated or configured in the handover command message, the UE may perform the DAPS handover method proposed in the disclosure, may maintain, by applying the second PDCP layer architecture, an existing logical channel identifier for the RLC layer or the MAC layer for the source BS corresponding to the bearer identifier indicated in the RLC layer configuration information, and may configure the RLC layer or the MAC layer for the second bearer corresponding to the target BS with the new logical channel identifier indicated in the configuration information.

In configuration information of an RLC layer for a bearer for which the DAPS handover method is indicated or configured by the handover command message, the UE may not perform an RLC re-establishment procedure on the RLC layer for the source BS. More specifically, the RLC re-establishment procedure may not be performed, a transmission RLC layer may continuously transmit a plurality of pieces of stored data, and a reception RLC layer may continuously process a plurality of pieces of stored data along with a plurality of pieces of received data, such that a data interruption time may not occur. However, when the first condition proposed in the disclosure is satisfied, the PDCP layer configured with the DAPS handover method may transmit a data discard indicator for PDCP user data (PDCP Data PDU) so as to indicate for the RLC layer for the source BS to discard data (PDCP Data PDU) with respect to an AM bearer or a UM bearer. Therefore, the RLC layer for the source BS may discard PDCP Data PDU but may not discard and transmit PDCP control PDU.

An RLC re-establishment procedure may be performed on an RLC layer for a bearer for which the DAPS handover method is not indicated nor configured by the handover command message, or when the RLC re-establishment procedure is configured, the RLC re-establishment procedure may be performed. For example, the transmission RLC layer may perform the RLC re-establishment procedure, thereby performing a procedure of discarding all stored data (PDCP Data PDU or PDCP control PDU). In addition, when a realignment timer is running, the reception RLC layer may stop and reset the realignment timer, may process all stored data, and may transmit the processed data to its upper layer.

When configuration information of the RLC layer for the bearer for which the DAPS handover method is indicated or configured by the handover command message is newly configured, the UE may perform the DAPS handover method proposed in the disclosure, may, by applying the second PDCP layer architecture, maintain existing RLC configuration information for a RLC layer for a first bearer for the source BS which corresponds to a bearer identifier indicated in the RLC layer configuration information, and may configure the new configuration information of the RLC layer, which is indicated in the configuration, for a RLC layer for a second bearer corresponding to the target BS.

Method 1, Method 2, or Method 3 of configuring a MAC layer which are proposed with reference to FIG. 1U of the disclosure may be performed.

Method 1, Method 2, or Method 3 of processing an SRB layer which are proposed with reference to FIG. 1U of the disclosure may be performed.

When a second priority with respect to a logical channel is newly configured in MAC layer configuration information configured in the handover command message, the UE may perform the DAPS handover method proposed in the disclosure, may apply the second PDCP layer architecture, may maintain existing configuration information with respect to the MAC layer for the first bearer for the source BS which corresponds to a bearer identifier indicated above, may configure a new logical channel identifier, which is indicated in the configuration information, to the MAC layer for the second bearer corresponding to the target BS, and may configure a newly-configured second priority corresponding to the logical channel identifier indicated in the configuration information. As another method, when the first condition proposed in the disclosure is satisfied, the UE may apply the priority order to the MAC layer for the second bearer corresponding to the target BS according to each logical channel identifier.

When a second prioritisedBitRate (PBR) with respect to a logical channel is newly configured in the MAC layer configuration information configured in the handover command message, the UE may perform the DAPS handover method proposed in the disclosure, may apply the second PDCP layer architecture and maintain existing configuration information with respect to the MAC layer for the first bearer for the source BS which corresponds to a bearer identifier indicated above, may configure a new logical channel identifier with respect to the MAC layer for the second bearer corresponding to the target BS, the new logical channel identifier being indicated in the configuration information, and may configure a newly configured second prioritisedBitRate (PBR) corresponding to the new logical channel identifier indicated in the configuration information. As another method, the UE may start applying the second prioritisedBitRate to the new logical channel identifier in the MAC layer for the second bearer corresponding to the target BS after the first condition proposed in the disclosure is satisfied (by doing so, when different handover methods are indicated for respective bearers, UL transport resources may be fairly distributed). The prioritisedBitRate refers to a value that increases with respect to each logical channel at preset time intervals (e.g., at every TTI) when the prioritisedBitRate is applied to each logical channel identifier. When the UE receives a UL transport resource, the UE may perform an LCP procedure, and may transmit data with respect to the logical channel, based on a priority and the prioritisedBitRate. The higher the priority is, or the greater the value of the prioritisedBitRate is, more data may be transmitted.

In a case where the DAPS handover method is applied in the above descriptions, when the UE has to transmit UL data via the first bearer for the source BS because the first condition proposed in the disclosure is not satisfied yet, the UE may select the MAC layer for the first bearer as a target for the LCP procedure with respect to only a bearer or logical channel identifiers for which the DAPS handover method (or a handover method by which data can be continuously transmitted to the source BS even after a handover command message is received) is indicated, and may perform the LCP procedure. This is because, when the UE receives a handover command message with respect to bearers or a logical channel identifier to which the DAPS handover method is not applied, the UE cannot transmit UL data to the source BS, the UE should not select the bearers or the logical channel identifier as a target for the LCP procedure.

When second bucketSizeDuration with respect to a logical channel is newly configured in the MAC layer configuration information configured in the handover command message, the UE may perform the DAPS handover method proposed in the disclosure, may apply the second PDCP layer architecture and maintain existing configuration information with respect to the MAC layer for the first bearer for the source BS which corresponds to a bearer identifier indicated above, may configure a new logical channel identifier with respect to the MAC layer for the second bearer corresponding to the target BS, the new logical channel identifier being indicated in the configuration information, and may configure newly configured second bucketSizeDuration corresponding to the new logical channel identifier indicated in the configuration information. As another method, the UE may start applying the second bucketSizeDuration to the new logical channel identifier in the MAC layer for the second bearer corresponding to the target BS after the first condition proposed in the disclosure is satisfied (by doing so, when different handover methods are indicated for respective bearers, UL transport resources may be fairly distributed). In the descriptions above, a bucket size indicates a maximum value a value of prioritisedBitRate can have when the prioritisedBitRate is accumulated.

When second available SCell information, available subcarrier spacing information, maximum PUSCH duration, or logical channel group configuration information is configured in the MAC layer configuration information configured in the handover command message, the UE may perform the DAPS handover method proposed in the disclosure, and may apply the second PDCP layer architecture and maintain existing configuration information with respect to the MAC layer for the first bearer for the source BS which corresponds to a bearer identifier indicated above, and may configure the second available SCell information, the available subcarrier spacing information, the maximum PUSCH duration, or the logical channel group configuration information with respect to the MAC layer for the second bearer corresponding to the target BS.

Figure 1V:
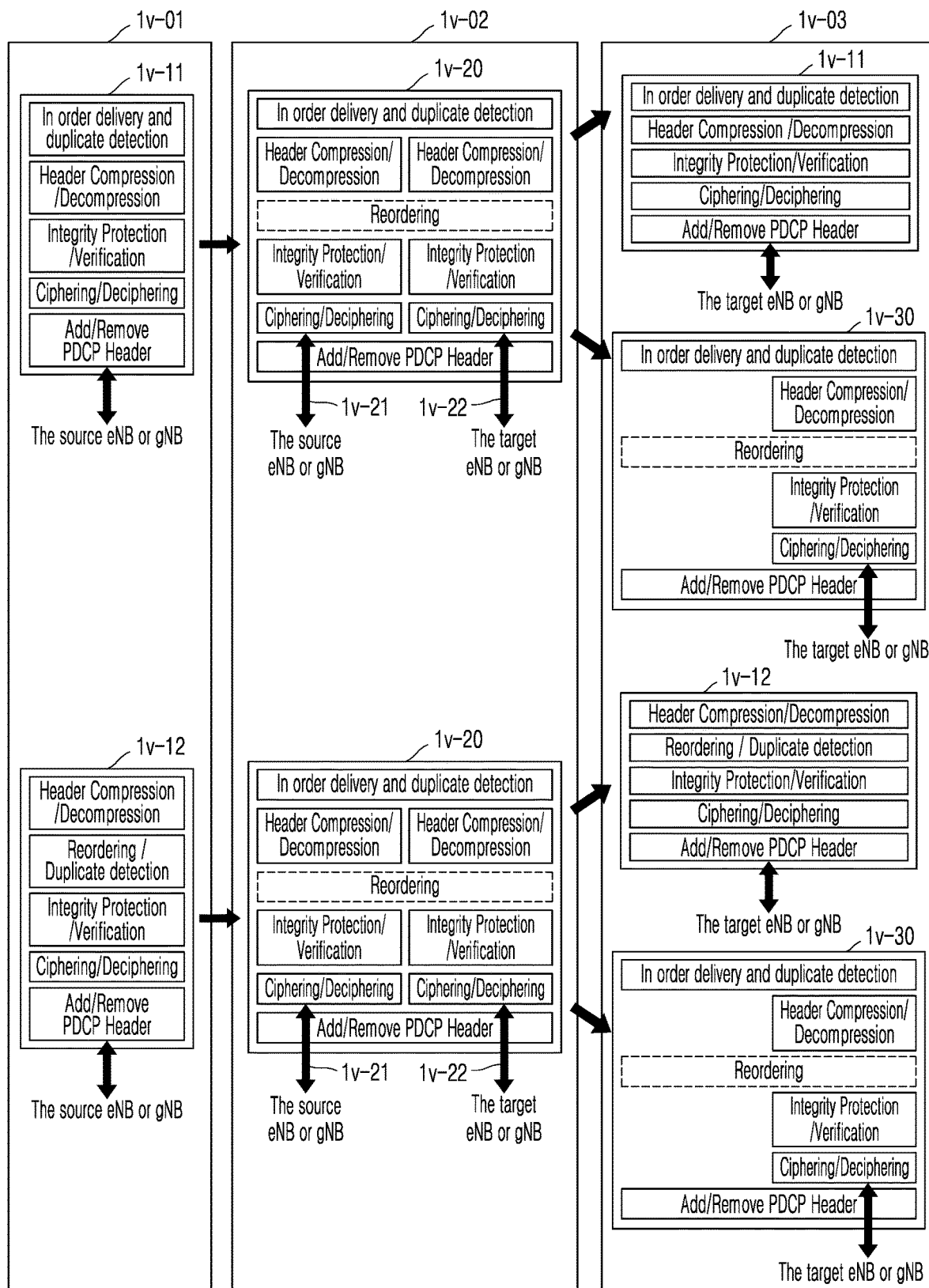
FIG. 1V illustrates architectures of an efficient PDCP layer which are to be applied to a DAPS handover method that is Embodiment 2 of an efficient handover method, and a method of applying architectures according to an embodiment of the disclosure.

FIG. 1V illustrates architectures of an efficient PDCP layer which are to be applied to a DAPS handover method that is Embodiment 2 of an efficient handover method, and a method of applying architectures according to an embodiment of the disclosure.

Referring to FIG. 1V, the disclosure proposes particular architectures and functions of the efficient PDCP layer which are to be applied to the DAPS handover method that is Embodiment 2 of the efficient handover method proposed in the disclosure, and the architectures of the PDCP layer to be proposed below are characterized in that, when a DAPS handover procedure is performed, different PDCP layer architectures may be applied to respective bearers at different time points.

For example, before the UE receives a handover command message from a BS, the UE may process and transmit or receive data by applying the first PDCP layer architecture and functions 1v-11 or 1v-12 proposed in the disclosure to each bearer in operation 1v-01.

However, when the UE receives a handover command message from the BS, and the handover command message indicates the DAPS handover method proposed in the disclosure or indicates the DAPS handover method for particular bearers, the UE may process and transmit or receive data by applying the second PDCP layer architecture and function 1v-20 proposed in the disclosure to each bearer or bearers for which the DAPS handover method is indicated in operation 1v-02.

For example, when the UE receives the handover command message from the BS, and the handover command message indicates the DAPS handover method proposed in the disclosure or indicates the DAPS handover method for particular bearers, the UE may switch the first PDCP layer architecture or function 1v-11 or 1v-12, which is used for each bearer, to the second PDCP layer architecture or function 1v-20 proposed in the disclosure with respect to each bearer or a bearer for which the DAPS handover method is indicated.

As another method, when the first condition proposed in the disclosure is satisfied, the UE may switch the first PDCP layer architecture or function 1v-11 or 1v-12, which is used for each bearer, to the second PDCP layer architecture or function 1v-20 proposed in the disclosure with respect to each bearer or a bearer for which the DAPS handover method is indicated in operation 1v-02.

In addition, in a case where the UE receives the handover command message from the BS, and the handover command message indicates the DAPS handover method proposed in the disclosure or indicates the DAPS handover method for particular bearers, or a PDCP realignment timer value is newly set, when the UE switches the first PDCP layer architecture or function 1v-11 or 1v-12 to the second PDCP layer architecture or function 1v-20 proposed in the disclosure with respect to each bearer or a bearer for which the DAPS handover method is indicated, the UE may update a variable for realignment to a PDCP SN or a COUNT value, which is predicted to be received next, and may stop and restart a realignment timer.

When the second condition proposed in the disclosure is satisfied when the UE performs the DAPS handover method proposed in the disclosure, the UE may release, from first bearers for the source BS, the second PDCP layer architecture and function 1v-20 applied to each bearer or a bearer for which the DAPS handover method is indicated, and may switch back to the first PDCP layer architecture and function 1v-11 or 1v-12 and may apply the first PDCP layer architecture and function 1v-11 or 1v-12. When the second condition is satisfied, and the UE switches the second PDCP layer architecture or function 1v-20 to the first PDCP layer architecture or function 1v-11 or 1v-12 proposed in the disclosure with respect to each bearer or a bearer for which the DAPS handover method is indicated, the UE may reset the variable for realignment, and may stop and reset the realignment timer. Thereafter, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. In addition, the UE may provide the plurality of items of processed data to the upper layer in ascending order. For example, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS.

As another method, when the second condition proposed in the disclosure is satisfied when the UE performs the DAPS handover method of the disclosure, the UE may release, from bearers for the source BS, the second PDCP layer architecture and function 1v-20 applied to each bearer or a bearer for which the DAPS handover method is indicated, and may switch to the third PDCP layer architecture or function 1v-30 and may apply the third PDCP layer architecture or function 1v-30. When the second condition is satisfied and thus the UE switches the second PDCP layer architecture or function 1v-20 to the third PDCP layer architecture or function 1v-30 proposed in the disclosure with respect to each bearer or a bearer for which the DAPS handover method is indicated, the UE may not stop nor reset but may continuously use the variable for realignment and the realignment timer.

However, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS. Afterward, the UE may provide the plurality of items of processed data to the upper layer in ascending order. For example, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS.

Referring to FIG. 1V of the disclosure, when the UE performs handover by applying, to respective bearers, the first PDCP layer architecture or function 1v-11 or 1v-12, the second PDCP layer architecture or function 1v-20, or the third PDCP layer architecture or function 1v-30, which are different from each other, at different time points, the UE may prevent data loss and may minimize a data interruption time.

The first PDCP layer architecture 1v-11 or 1v-12 proposed in FIG. 1V may have a 1-1 PDCP layer architecture, a 1-2 PDCP layer architecture, a 1-3 PDCP layer architecture, or a 1-4 PDCP layer architecture, which are proposed in the disclosure, and may have characteristics to be described below.

First, in a case where the first PDCP layer architecture 1v-11 or 1v-12 corresponds to the 1-1 PDCP layer architecture, the first PDCP layer architecture 1v-11 or 1v-12 may have characteristics below.

1> (When it is the 1-1 PDCP layer architecture,) for example, when the UE applies the first PDCP layer architecture and function 1v-11 to a PDCP layer (e.g., E-UTRA PDCP layer or LTE PDCP layer) connected to an AM RLC layer (e.g., E-UTRA AM RLC layer), the PDCP layer may have characteristics below.

2> The PDCP layer may first perform detection of out-of-window data or duplicate data on a plurality of items of received data. (Retransmission may occur in RLC AM, and sizes of LTE RLC SN and PDCP SN may be different, such that the duplicate data or the out-of-window data may be received. In the above, window indicates a range of PDCP SNs or COUNT values, in which valid data is received.)

3> Before the PDCP layer discards the out-of-window data or the duplicate data, the PDCP layer performs a deciphering procedure and a header decompression procedure and then performs a discard operation. (Because the data may include useful information (e.g., IR packet or header compression information) for the header decompression procedure, the UE may determine and then discard the data.)

2> The PDCP layer may immediately decipher a plurality of items of data without ordering, the data being received without being discarded, and may perform a header decompression procedure. This is because the E-UTRA AM RLC layer performs ordering on the plurality of items of data and provides the plurality of items of data to the PDCP layer.

2> Thereafter, the PDCP layer provides the plurality of items of data to an upper layer in ascending order of COUNT values.

Next, in a case where the first PDCP layer architecture 1v-11 or 1v-12 corresponds to the 1-2 PDCP layer architecture, the first PDCP layer architecture 1v-11 or 1v-12 may have characteristics below.

1> (When it is the 1-2 PDCP layer architecture,) for example, when the UE applies the first PDCP layer architecture and function 1v-11 to the PDCP layer (e.g., the E-UTRA PDCP layer or the LTE PDCP layer) connected to an UM RLC layer (e.g., E-UTRA UM RLC layer), the PDCP layer may have characteristics below.

2> The PDCP layer may be configured to not perform a procedure of detecting out-of-window data or duplicate data. This is because the UM E-UTRA RLC layer does not perform a retransmission procedure.

2> Thereafter, the PDCP layer may immediately perform a deciphering procedure and then a header decompression procedure on the plurality of items of received data.

2> Thereafter, the PDCP layer may perform a reordering procedure and then may provide the plurality of items of data (e.g., in ascending order) to its upper layer.

Next, in a case where the first PDCP layer architecture 1v-11 or 1v-12 corresponds to the 1-3 PDCP layer architecture, the first PDCP layer architecture 1v-11 or 1v-12 may have characteristics below.

1> (When it is the 1-3 PDCP layer architecture,) for example, when the UE applies the first PDCP layer architecture 1v-11 to the PDCP layer (e.g., the E-UTRA PDCP layer or the LTE PDCP layer) configured for a split bearer, a packet duplication bearer, or a LWA bearer, the UE may always apply a reordering procedure and a realignment timer and the PDCP layer may have characteristics below.

2> The PDCP layer may first perform detection of out-of-window data or duplicate data on a plurality of items of received data. (Retransmission may occur in RLC AM, data may be received at different time points from different RLC layers, and sizes of LTE RLC SN and PDCP SN may be different, such that the out-of-window data or the duplicate data may be received.)

3> The PDCP layer performs a deciphering procedure. However, the PDCP layer may not perform a header decompression procedure. (It is because the E-UTRA PDCP layer cannot configure a header compression protocol for the split bearer or the LWA bearer).

3> When an integrity protection or verification procedure has been performed, the PDCP layer may perform the integrity protection verification procedure and then may discard data. When the integrity verification procedure fails, the PDCP layer may discard the data and may report the failure to its upper layer.

3> The PDCP layer discards the out-of-window data or the duplicate data.

2> When the data is not discarded, the PDCP layer may immediately perform a deciphering procedure without reordering on a plurality of items of received data. Afterward, when the integrity protection or verification procedure is configured, the PDCP layer may perform integrity verification. When the integrity protection or verification procedure is performed, the PDCP layer may perform the integrity protection or verification procedure and then may discard data. When the integrity verification procedure fails, the PDCP layer may discard the data and may report the failure to the upper layer.

2> Afterward, the PDCP layer may perform reordering on a plurality of items of received data, and when PDCP SNs or COUNT values are sequentially aligned in ascending order without a gap therebetween, the PDCP layer may perform a header compression procedure (when the header compression procedure or a header decompression procedure is configured) and may provide the data to the upper layer in ascending order.

2> In a case where a realignment timer is running,

3> when data is provided to the upper layer, the data corresponding to COUNT value having the same value as a value obtained by subtracting 1 from a value a variable for realignment maintains, or when the plurality of items of data are all provided to the upper layer without a gap between PDCP SNs (COUNT values), 4> the PDCP layer stops and resets the realignment timer.

2> In a case where the realignment timer is not running,

3> when a buffer stores data that is not provided to the upper layer, or when there is a gap between PDCP SNs (COUNT values), 4> the PDCP layer starts the realignment timer.

4> Thereafter, the PDCP layer updates the variable for realignment to a PDCP SN or a COUNT value which is predicted to be received next time.

2> In a case where the realignment timer is expired,

3> when a header decompression procedure is configured to values of a plurality of items of stored data, the values being smaller than the variable for realignment, in ascending order of PDCP SNs or COUNT values, the PDCP layer performs the header decompression procedure and provides the data to the upper layer.

3> When a header decompression procedure is configured to values of a plurality of items of stored data, the values being equal to or greater than the variable for realignment, in ascending order of PDCP SNs or COUNT values, the PDCP layer performs the header decompression procedure and provides the data to the upper layer.

3> Thereafter, the PDCP layer updates a variable value of data, which is most recently provided to the upper layer, to a PDCP SN or a COUNT value of the data most recently provided to the upper layer.

3> When a buffer stores data that is not provided to the upper layer, or when there is a gap between PDCP SNs (COUNT values), 4> the PDCP layer starts the realignment timer.

4> Thereafter, the PDCP layer updates the variable for realignment to a PDCP SN or a COUNT value which is predicted to be received next time.

Next, in a case where the first PDCP layer architecture 1v-11 or 1v-12 corresponds to the 1-4 PDCP layer architecture, the first PDCP layer architecture 1v-11 or 1v-12 may have characteristics below.

1> (When it is the 1-4 PDCP layer architecture,) for example, when the UE applies the first PDCP layer architecture and function 1v-12 to a NR PDCP layer, the UE may always apply a reordering procedure and a realignment timer, and the NR PDCP layer may have characteristics below.

The NR PDCP layer may first perform a deciphering procedure on a plurality of items of received data.

When an integrity protection or verification procedure is configured, the NR PDCP layer may perform the integrity protection or verification procedure on the received data, and when the integrity verification procedure fails, the NR PDCP layer may discard the data and may report the failure to its upper layer.

2> The NR PDCP layer performs detection of out-of-window data or duplicate data on the received data. (The disclosure may be characterized in that the deciphering procedure is first performed and then the detection of out-of-window data or duplicate data is performed. As another method, in a case where the deciphering procedure is performed only when the integrity protection or verification procedure is configured, and then the detection of out-of-window data or duplicate data is performed but the integrity protection or verification procedure is not configured, the deciphering procedure may be performed only on a plurality of items of data on which the detection of out-of-window data or duplicate data is performed and that are not discarded.)

3> The NR PDCP layer discards the out-of-window data or the duplicate data.

2> When the data is not discarded, the NR PDCP layer may perform reordering on a plurality of items of received data, and when PDCP SNs or COUNT values are sequentially aligned in ascending order without a gap therebetween, the NR PDCP layer may perform a header compression procedure (when the header compression procedure or a header decompression procedure is configured) and may provide the data to the upper layer in ascending order.

2> Thereafter, the NR PDCP layer provides the data to the upper layer, in ascending order of COUNT values.

2> In a case where a realignment timer is running,

3> when data is provided to the upper layer, the data corresponding to COUNT value having the same value as a value obtained by subtracting 1 from a value a variable for realignment maintains, when the plurality of items of data are all provided to the upper layer without a gap between PDCP SNs (COUNT values), or when a value of a variable storing a PDCP SN or a COUNT value of data to be provided to the upper layer is equal to or greater than a value of a variable for realignment, 4> the NR PDCP layer stops and resets the realignment timer.

2> In a case where the realignment timer is not running,

3> when a buffer stores data that is not provided to the upper layer, when there is a gap between PDCP SNs (COUNT values), or when a value of a variable storing a COUNT value of first data that is not provided to the upper layer is smaller than a value of a variable for realignment, 4> the NR PDCP layer updates the variable for realignment to a PDCP SN or a COUNT value which is predicted to be received next time.

4> The NR PDCP layer starts the realignment timer.

2> In a case where the realignment timer is expired,

3> when a header decompression procedure is configured to values of a plurality of items of stored data, the values being smaller than the variable for realignment, in ascending order of PDCP SNs or COUNT values, the NR PDCP layer performs the header decompression procedure and provides the data to the upper layer.

3> When a header decompression procedure is configured to values of a plurality of items of stored data, the values being equal to or greater than the variable for realignment, in ascending order of PDCP SNs or COUNT values, the NR PDCP layer performs the header decompression procedure and provides the data to the upper layer.

3> Thereafter, the NR PDCP layer updates a variable value of first data, which is not provided to the upper layer, to a PDCP SN or a COUNT value of the first data that is not provided to the upper layer.

3> When a buffer stores data that is not provided to the upper layer, or when there is a gap between PDCP SNs (COUNT values), or when a value of a variable storing the COUNT value of the first data that is not provided to the upper layer is smaller than the value of the variable for realignment, 4> the NR PDCP layer updates the variable for realignment to a PDCP SN or a COUNT value which is predicted to be received next time.

4> The NR PDCP layer starts the realignment timer.

The second PDCP layer architecture 1v-20 proposed in FIG. 1V may have a 2-1 PDCP layer architecture or a 2-2 PDCP layer architecture, which are proposed in the disclosure, and may have characteristics to be described below.

The disclosure proposes the second PDCP layer architecture 1v-20 which is efficient in handover. The second PDCP layer architecture may be applied to Embodiment 2 of the efficient handover method for minimizing a data interruption time, which is proposed in the disclosure.

In the second PDCP layer architecture, the UE may perform data transmission or reception from or to a source BS 1v-21 by using protocol layers (e.g., a SDAP layer, a PDCP layer, a RLC layer, or a MAC layer) for a first bearer, and may perform data transmission or reception from or to a target BS 1v-22 by using protocol layers (e.g., a SDAP layer, a PDCP layer, a RLC layer, or a MAC layer) for a second bearer.

The PDCP layer for the first bearer and the PDCP layer for the second bearer may each be configured in the UE but may logically operate as one PDCP layer as shown in 1v-20. More specifically, by distinguishing between functions of a PDCP layer, one PDCP layer may be implemented as functions (e.g., an SN allocation function, a realignment function, an in-sequence delivery function, or a duplicate detection function) of an upper PDCP layer and functions (e.g., a deciphering or ciphering function, a header (or data) compression or decompression function, an integrity protection or verification function, or a duplicate detection function) of two lower PDCP layers respectively for the source BS and the target BS. In addition, as proposed above, when the DAPS handover method is performed, the UE may transmit UL data transmission to the source BS, and when the first condition is satisfied, the UE may switch to the target BS and may continuously receive DL data from the source BS and the target BS. Therefore, only one header (or data) compression protocol context for the source BS or the target BS may be maintained and applied to a UL, and two contexts for the source BS or the target BS may be maintained and applied to a DL.

The 2-1 PDCP layer architecture (e.g., an E-UTRA PDCP layer for the DAPS handover method) proposed in the disclosure, based on the second PDCP layer architecture, may have characteristics below.

An upper function of the transmission PDCP layer function may serve to allocate PDCP SNs to a plurality of items of data received from an upper layer. Two lower function of the transmission PDCP layer functions 1v-21 and 1v-22 respectively for the source BS and the target BS may serve to apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data) compression procedure when the header (or data) compression procedure is configured. When integrity protection is configured, the lower function of the transmission PDCP layer functions 1v-21 and 1v-22 may serve to apply a ciphering procedure by applying an integrity protection procedure to a PDCP header and data (PDCP SDU), may provide the data to be transmitted to the source BS to a transmission RLC layer for the first bearer, and may provide the data to be transmitted to the target BS to a transmission RLC layer for the second bearer, thereby performing transmission.

In order to accelerate a data processing speed, the two lower function of the transmission PDCP layer functions 1v-21 and 1v-22 may serve to perform parallel processing of header compression, integrity protection, or a ciphering procedure. In addition, the two lower function of the transmission PDCP layer functions 1v-21 and 1v-22 may serve to perform the integrity protection or the ciphering procedure by using security keys that are different in the two lower function of the transmission PDCP layer functions 1v-21 and 1v-22. In addition, a logically-one transmission PDCP layer may perform compression, integrity protection, or a ciphering procedure on a plurality of items of different data by applying different compression contexts, different security keys, or different security algorithms.

In the aforementioned situation, a reception PDCP layer function (i.e., the DL lower function of the reception PDCP layer functions 1v-21 and 1v-22 for the source BS or the target BS) may each independently serve to perform an out-of-window data detection or duplicate detection procedure on a plurality of data received from each of RLC layers, based on PDCP SNs or COUNT values, with respect to a plurality of items of data received from each of lower layers, in particular, with respect to a plurality of items of data received from two RLC layers for each of the source BS and the target BS. As another method, for convenience of implementation, the reception PDCP layer function may serve to perform the out-of-window data detection or duplicate detection procedure on all received data, based on PDCP SNs or COUNT values, without distinguishing between the RLC layers.

As another method, for more accurate duplicate detection, the reception PDCP layer function may serve to perform the out-of-window data detection on all received data, based on PDCP SNs or COUNT values, without distinguishing between the RLC layers, and separately perform the duplicate detection procedure on a plurality of items of data received from each of the RLC layers. As another method, when a plurality of items of data received from different BSs are overlapped each other, in order to prevent data loss for a header compression protocol, the reception PDCP layer function may serve to perform the out-of-window data detection on all received data, based on PDCP SNs or COUNT values, without distinguishing between the RLC layers, and perform the duplicate detection procedure on all data after a deciphering procedure, an integrity protection procedure, or a header (or data) decompression procedure is received with respect to a plurality of items of data received from each of the RLC layers.

Sub-functions of the reception PDCP layer may serve to immediately apply a deciphering procedure to a plurality of items of received data, by using separate header (or data) compression context or security key separately configured with the source BS and the target BS, and when integrity protection is configured, the sub-functions of the reception PDCP layer may serve to apply an integrity verification procedure to the PDCP header and the data (PDCP SDU).

In the 2-1 PDCP layer architecture, a header (or data) decompression procedure may be immediately performed, without reordering, on a plurality of items of data received from RLC layers for the first bearer corresponding to the source BS, and a header (or data) decompression procedure may be immediately performed, without reordering, on a plurality of items of data received from RLC layers for the second bearer corresponding to the target BS. In addition, to distinguish between the data received from the RLC layers for the first bearer corresponding to the source BS and the data received from the RLC layers for the second bearer corresponding to the target BS, an indicator is defined for each data, such that the PDCP layer may identify whether the data is received from the source BS or the target BS. As another method, a 1-bit indicator is defined in a PDCP header, a SDAP header, or an RLC header, such that the PDCP layer may identify whether the data is received from the source BS or the target BS. In addition, the PDCP layer may perform the duplicate detection procedure (a procedure in which only one data (including pre-received data or data provided to the upper layer) is allocated for each PDCP SN or each COUNT value and the others are all discarded), based on a PDCP SN or a COUNT value, on all of the plurality of items of data received from RLC layers for the first bearer corresponding to the source BS and the plurality of items of data received from RLC layers for the second bearer corresponding to the target BS, wherein the header (or data) compression procedure has been completed with respect to the plurality of items of data. Thereafter, the PDCP layer may perform a realignment procedure on all of the plurality of items of data received from RLC layers for the first bearer corresponding to the source BS and the plurality of items of data received from RLC layers for the second bearer corresponding to the target BS, in ascending order based on PDCP SNs or COUNT values, and may sequentially provide the plurality of items of data to the upper layer. Because the PDCP layer can receive data in no order from different BSs, i.e., from the first bearer or the second bearer, the PDCP layer may have to always perform the realignment procedure.

In order to accelerate a data processing speed, the two lower function of the reception PDCP layer functions may serve to perform parallel processing of header compression, integrity protection, or a ciphering procedure, based on each PDCP SN or each COUNT value. In addition, the two lower function of the reception PDCP layer functions may serve to perform the integrity protection, the ciphering procedure, or the header decompression procedure by using different header (or data) compression contexts or different security keys. In addition, the two lower function of the reception PDCP layer functions may serve to perform the integrity protection, the ciphering procedure, or the decompression procedure on a plurality of items of different data by applying different header (or data) compression contexts, different security keys, or different security algorithms in logically-one transmission PDCP layer. In addition, the lower function of the reception PDCP layer functions may serve to perform out-of-sequence deciphering or integrity verification procedure on each of a plurality of items of data received without relation to order of PDCP SNs or COUNT values.

When a PDCP layer distinguishes layers for the first bearer from layers for the second bearer, the PDCP layer may distinguish the layers (or a first RLC layer) for the first bearer from the layers (or a second RLC layer) for the second bearer, in consideration that the layer for the first bearer and the layer for the second bearer are connected to different MAC layers, have different logical channel identifiers, are different RLC layers connected to different MAC layers, or use different ciphering keys. By doing so, a ciphering procedure or a deciphering procedure may be performed on UL data and DL data by using different security keys, and the UL data and the DL data may be compressed or decompressed by using different compression protocol contexts.

The 2-2 PDCP layer architecture (e.g., an NR PDCP layer for the DAPS handover method) proposed in the disclosure, based on the second PDCP layer architecture, may have characteristics below.

An upper function of the transmission PDCP layer function may serve to allocate PDCP SNs to a plurality of items of data received from its upper layer. The two lower function of the transmission PDCP layer functions 1v-21 and 1v-22 respectively for the source BS and the target BS may serve to apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data) compression procedure when the header (or data) compression procedure is configured. When integrity protection is configured, the lower function of the transmission PDCP layer functions 1v-21 and 1v-22 may serve to apply a ciphering procedure by applying an integrity protection procedure to a PDCP header and data (PDCP SDU), may provide the data to be transmitted to the source BS to a transmission RLC layer for the first bearer, and may provide the data to be transmitted to the target BS to a transmission RLC layer for the second bearer, thereby performing transmission.

In order to accelerate a data processing speed, the two lower function of the transmission PDCP layer functions 1v-21 and 1v-22 may serve to perform parallel processing of header compression, integrity protection, or a ciphering procedure. In addition, the two lower function of the transmission PDCP layer functions 1v-21 and 1v-22 may serve to perform the integrity protection or the ciphering procedure by using different security keys. In addition, compression, integrity protection, or a ciphering procedure on a plurality of items of different data by applying different compression contexts, different security keys, or different security algorithms may be performed in logically-one transmission PDCP layer.

In the aforementioned situation, a reception PDCP layer function (i.e., the lower function of the reception PDCP layer functions 1v-21 and 1v-22 for the source BS or the target BS) may each independently serve to perform an out-of-window data detection or duplicate detection procedure on a plurality of items of data received from each of RLC layers, based on PDCP SNs or COUNT values, with respect to a plurality of items of data received from each of lower layers, in particular, with respect to a plurality of items of data received from two RLC layers for each of the source BS and the target BS. As another method, for convenience of implementation, the reception PDCP layer function may serve to perform the out-of-window data detection or duplicate detection procedure on all received data, based on PDCP SNs or COUNT values, without distinguishing between the RLC layers.

As another method, for more accurate duplicate detection, the reception PDCP layer function may serve to perform the out-of-window data detection on all received data, based on PDCP SNs or COUNT values, without distinguishing between the RLC layers, and separately perform the duplicate detection procedure on a plurality of items of data received from each of the RLC layers. As another method, when a plurality of items of data received from different BSs are overlapped each other, in order to prevent data loss for a header compression protocol, the reception PDCP layer function may serve to perform the out-of-window data detection on all received data, based on PDCP SNs or COUNT values, without distinguishing between the RLC layers, and perform the duplicate detection procedure on all data after a deciphering procedure, an integrity protection procedure, or a header (or data) decompression procedure is received with respect to a plurality of items of data received from each of the RLC layers.

Sub-functions of the reception PDCP layer may serve to immediately apply a deciphering procedure to a plurality of items of received data, by using separate header (or data) compression context or security key separately configured with the source BS and the target BS, and when integrity protection is configured, the sub-functions of the reception PDCP layer may serve to apply an integrity verification procedure to the PDCP header and the data (PDCP SDU).

In the 2-2 PDCP layer architecture, a reordering procedure may be performed on a plurality of items of data received from RLC layers for the first bearer corresponding to the source BS and a plurality of items of data received from RLC layers for the second bearer corresponding to the target BS, and may perform a header (or data) decompression procedure on the plurality of items of data received from each BS (the source BS or the target BS) in ascending order of PDCP SNs or COUNT values, by applying header (or data) compression context of each BS (the source BS or the target BS). In addition, to distinguish between the data received from the RLC layers for the first bearer corresponding to the source BS and the data received from the RLC layers for the second bearer corresponding to the target BS, an indicator is defined for each data, such that the PDCP layer may identify whether the data is received from the source BS or the target BS. As another method, a 1-bit indicator is defined in a PDCP header, a SDAP header, or an RLC header, such that the PDCP layer may identify whether the data is received from the source BS or the target BS. In addition, the PDCP layer may perform the duplicate detection procedure based on a PDCP SN or a COUNT value (a procedure in which only one data (including pre-received data or data provided to the upper layer) is allocated for each PDCP SN or each COUNT value and the others are all discarded) on all of the plurality of items of data received from RLC layers for the first bearer corresponding to the source BS and the plurality of items of data received from RLC layers for the second bearer corresponding to the target BS, wherein the header (or data) compression procedure has been completed with respect to the plurality of items of data. Thereafter, the PDCP layer may sequentially provide, to the upper layer in ascending order based on PDCP SNs or COUNT values, all of the plurality of items of data received from RLC layers for the first bearer corresponding to the source BS and the plurality of items of data received from RLC layers for the second bearer corresponding to the target BS. Because the PDCP layer can receive data in no order from different BSs, i.e., from the first bearer or the second bearer, the PDCP layer may have to always perform the realignment procedure.

In order to accelerate a data processing speed, the two lower function of the reception PDCP layer functions may serve to perform parallel processing of header compression, integrity protection, or a ciphering procedure, based on each PDCP SN or each COUNT value. In addition, the two lower function of the reception PDCP layer functions may serve to perform the integrity protection, the ciphering procedure, or the header decompression procedure by using different header (or data) compression contexts or different security keys. The two lower function of the reception PDCP layer functions may serve to perform the integrity protection, the ciphering procedure, or the decompression procedure on a plurality of items of different data by applying different header (or data) compression contexts, different security keys, or different security algorithms in logically-one transmission PDCP layer. In addition, the lower function of the reception PDCP layer functions may serve to perform out-of-sequence deciphering or integrity verification procedure on each of a plurality of items of data received without relation to order of PDCP SNs or COUNT values.

When a PDCP layer distinguishes layers for the first bearer from layers for the second bearer, the PDCP layer may distinguish the layers (or a first RLC layer) for the first bearer from the layers (or a second RLC layer) for the second bearer, in consideration that the layer for the first bearer and the layer for the second bearer are connected to different MAC layers, have different logical channel identifiers, are different RLC layers connected to different MAC layers, or use different ciphering keys. By doing so, a ciphering procedure or a deciphering procedure may be performed on UL data and DL data by using different security keys, and the UL data and the DL data may be compressed or decompressed by using different compression protocol contexts.

In the disclosure, provided is a third PDCP layer architecture 1v-30 which is efficient in handover. The third PDCP layer architecture may be applied to Embodiment 2 of the efficient handover method for minimizing a data interruption time, which is proposed in the disclosure. A PDCP layer function in the third PDCP layer architecture proposed in the disclosure may be equal to the second PDCP layer architecture proposed in the disclosure.

However, the third PDCP layer architecture may correspond to architecture from which the first bearer for the source BS in the second PDCP layer architecture is released. More specifically, the third PDCP layer architecture proposed in the disclosure may have same functions as those of the second PDCP layer architecture but may have architecture from which the first bearer (e.g., the SDAP layer, the PDCP layer, the RLC layer, or the MAC layer) for the source BS is released. Therefore, the third PDCP layer architecture may release QoS mapping information of the SDAP layer for the source BS, security key information for the PDCP layer for the source BS, header (or data) compression context information for the source BS, or the RLC layer or the MAC layer for the source BS.

Figure 1W:
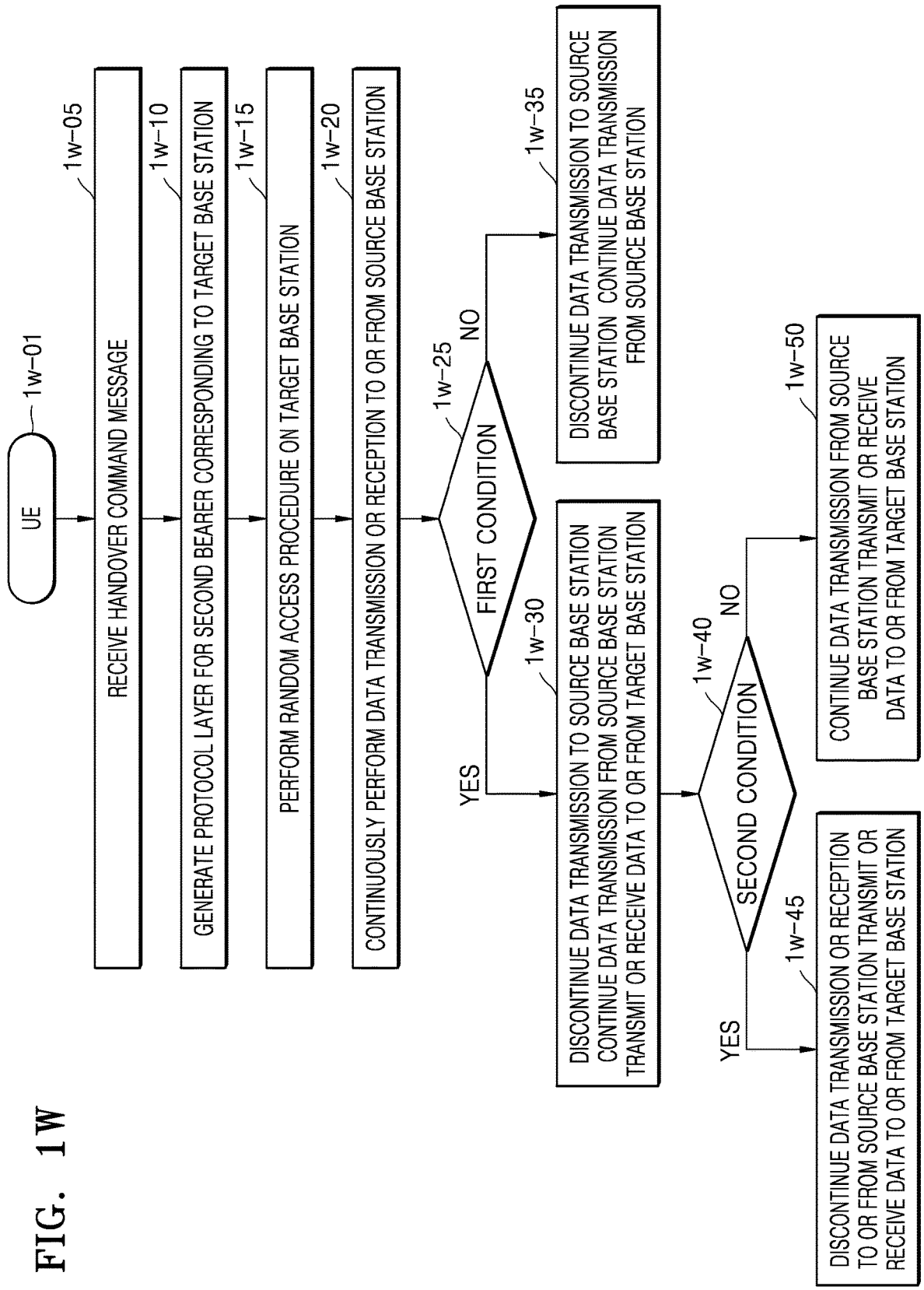
FIG. 1W is a diagram illustrating UE operations according to an embodiment of the disclosure.

FIG. 1W is a diagram illustrating UE operations according to an embodiment of the disclosure.

Referring to FIG. 1W, a UE 1w-01 may perform data transmission or reception to or from a source BS via each bearer by using a first PDCP layer architecture. When a handover command message received in operation 1w-05 by the UE 1w-01 indicates the DAPS handover method of Embodiment 2 proposed in the disclosure or indicates the DAPS handover method for each bearer, the UE 1w-01 may switch to a second PDCP layer architecture for each bearer or bearers for which the DAPS handover method is indicated, with respect to a target BS indicated in the handover command message, and may configure and establish protocol layers for a second bearer. When the UE 1w-01 performs a random access procedure on the target BS in operation 1w-10 and 1w-15, the UE 1w-01 may continuously perform data transmission or reception (UL data transmission and DL data reception) to or from the source BS by using protocol layers for a first bearer in operation 1w-20.

When the first condition of the disclosure is satisfied in operation 1w-25, the UE 1w-01 may discontinue UL data transmission to the source BS by using the protocol layers for the first bearer, and may switch the UL data transmission and thus may transmit UL data to the target BS by using the protocol layers for the second bearer. The UE 1w-01 may continuously receive DL data from the source BS and the target BS by using the protocol layers for the first and second bearers in operation 1w-30. In addition, a PDCP layer for the second bearer may continuously perform data transmission or reception to or from the target BS without interruption by using data to be transmitted or received, SN information, or information, such as header compression and decompression context, which is stored in a PDCP layer for the first bearer. When the first condition is not satisfied, the UE 1w-01 may continuously determine the first condition while continuously performing an ongoing procedure in operation 1w-35.

When the second condition is satisfied in operation 1w-40, the UE 1w-01 may discontinue DL data reception from the source BS by using the protocol layers for the first bearer in operation 1w-45. In addition, the PDCP layer for the second bearer may continuously perform data transmission or reception to or from the target BS without interruption by using data to be transmitted or received, SN information, or information, such as header compression and decompression context, which is stored in a PDCP layer for the first bearer. When the second condition is not satisfied, the UE 1w-01 may continuously determine the second condition while continuously performing an ongoing procedure in operation 1w-50.

According to an embodiment of the disclosure, a PDCP layer may perform different procedures according to types of handover indicated in a handover command message received by a UE.

When a handover type indicated in the handover command message the UE receives from a source BS is handover of Embodiment 1 (e.g., a normal handover method), or the UE receives the handover command message, when ReconfigWithSync information or MobilityControlInfo indicates a first handover method (e.g., Embodiment 1 of the disclosure or a normal handover method), Embodiment 2 (the DAPS handover method) proposed in the disclosure is not configured, or any bearer is not configured in bearer configuration information in Embodiment 2 (the DAPS handover method) proposed in the disclosure, or with respect to a bearer for which Embodiment 2 (the DAPS handover method) proposed in the disclosure is not configured in its bearer configuration information, the UE may perform a PDCP re-establishment procedure on the PDCP layer according to each bearer. For example, the UE may reset window state variables with respect to an SRB and may discard a plurality of items of stored data (PDCP SDU or PDCP PDU). In addition, the UE may reset window state variables with respect to a UM DRB, may perform, in ascending order of COUNT values, compression, ciphering, or integrity protection on a plurality of items of data that are not transmitted to a lower layer yet or for which a PDCP discard timer is not expired, based on header (or data) compression context or security key of the target BS, and then may transmit or retransmit the data. When a realignment timer is running, the UE may stop and reset the realignment timer, may process the plurality of items of received data (PDCP SDU or PDCP PDU) in order, and may provide the data to an upper layer. In addition, the UE does not reset window state variables with respect to an AM DRB, and may perform, based on header (or data) compression context or security key of the target BS, compression, ciphering, or integrity protection on data starting from first data (PDCP SDU or PDCP PDU) for which successful delivery is not acknowledged by a lower layer, in ascending order of PDCP SNs or COUNT values. As another method, the reception PDCP layer may process received data or store data due to a re-establishment procedure of a lower layer (e.g., the RLC layer), and when an indicator (drb-Continue ROHC) indicating to keep using header compression context is not configured for AM DRBs, the reception PDCP layer may perform a header decompression procedure on a plurality of pieces of stored data, based on header compression context (ROHC). In addition, the reception PDCP layer may process received data or store data due to the re-establishment procedure of the lower layer (e.g., the RLC layer), and may perform a header decompression procedure on a plurality of pieces of stored data with respect to AM DRBs, based on EHC. As another method, the reception PDCP layer may process received data or store data due to a re-establishment procedure of a lower layer (e.g., the RLC layer), and when an indicator (drb-Continue EHC) indicating to keep using header compression context is not configured for AM DRBs, the reception PDCP layer may perform a header decompression procedure on a plurality of pieces of stored data, based on header compression context (EHC).

When a handover type indicated in the handover command message the UE receives from the source BS is handover of Embodiment 2 (or is indicated for each bearer), or in a case where the UE receives the handover command message, when the handover command message or ReconfigWithSync information or mobilityControlInfo information configures Embodiment 2 (the DAPS handover method) proposed in the disclosure, when bearer configuration information configures Embodiment 2 (the DAPS handover method) proposed in the disclosure for a certain bearer, when bearer configuration information configures Embodiment 2 (the DAPS handover method) proposed in the disclosure for at least one bearer, or with respect to a bearer for which Embodiment 2 (the DAPS handover method) proposed in the disclosure is configured in bearer configuration information, when the UE receives the handover command message indicating the DAPS handover method for the PDCP layer, the PDCP layer for which the DAPS handover method is indicated may not perform a PDCP re-establishment procedure and may perform procedures below. For example, the PDCP layer may reset window state variables with respect to an SRB (variable resetting may be skipped to perform fallback when DAPS handover fails) or may discard a plurality of items of stored data (PDCP SDU or PDCP PDU). In addition, the PDCP layer may not reset window state variables with respect to an UM DRB, and may continuously perform, to or from the source BS, data transmission or reception on plurality of items of data that are not transmitted to its lower layer yet or for which a PDCP discard timer is not expired. In addition, the PDCP layer may not reset window state variables with respect to an AM DRB, and may continuously perform data transmission or reception to or from the source BS. In addition, the PDCP layer may not reset but changelessly use UL or DL ROHC context for the source BS, may reset UL or DL ROHC context for the target BS, and may start in an initial state (e.g., an IR state in U mode). As another method, the PDCP layer may reset UL or DL ROHC context for the source BS, may start an initial state (e.g., a IR state in U mode), may reset UL or DL ROHC context for the target BS, and may start in an initial state (e.g., a IR state in U mode).

The UE may perform procedures on each bearer (or a bearer for which Embodiment 2 is indicated), the procedures being proposed in the disclosure on condition that the first condition is satisfied.

The UE may perform procedures on each bearer (or a bearer for which Embodiment 2 is indicated), the procedures being proposed in the disclosure on condition that the second condition is satisfied.

As another method, the UE may perform one of PDCP reconfiguration methods below on a bearer for which the DAPS handover method is configured in the handover command message. The PDCP reconfiguration methods below or a PDCP reconfiguration procedure is configured in such a manner that, in the PDCP reconfiguration procedure, transmission window or reception window variables are not reset and a PDCP realignment timer and a PDCP data discard timer are continuously running.

1> First method for PDCP reconfiguration:
2> When the upper layer requests reconfiguration of a PDCP layer, and the DAPS handover method is configured, the UE may perform a procedure below.
3> The UE may establish a ciphering function and apply a ciphering algorithm and security key to the bearer (i.e., the bearer for which the DAPS handover method is configured in the handover command message), the ciphering algorithm and security key being provided with respect to the ciphering function from an upper layer.
3> The UE may establish an integrity protection function and apply, to the bearer, an integrity protection algorithm and security key that are provided with respect to the integrity protection function from the upper layer.
3> The UE may establish a header compression protocol and apply, to the bearer, header compression protocol configuration provided with respect to the header compression protocol from the upper layer.
2> When the upper layer requests PDCP layer reconfiguration and requests a RLC layer to be released (e.g., a RLC layer connected with the source BS (when the UE successfully completes DAPS handover to the target BS) or a RLC layer connected with the target BS (when the UE fails in the DAPS handover to the target BS and falls back to the source BS), the RLC layer being connected with the bearer, the UE may perform a procedure below.

3> The UE may release the ciphering function related to the RLC layer released from the bearer.

3> The UE may release the integrity protection function related to the RLC layer released from the bearer.

3> The UE may release the header compression protocol related to the RLC layer released from the bearer.

2> Second method for PDCP reconfiguration:

2> When the upper layer requests reconfiguration of a PDCP layer, and the DAPS handover method is configured, the UE may perform a procedure below.

3> The UE may establish a ciphering function and apply, to the bearer, a ciphering algorithm and security key which are provided with respect to the ciphering function from an upper layer.

3> The UE may establish an integrity protection function and apply, to the bearer, an integrity protection algorithm and security key that are provided with respect to the integrity protection function from the upper layer.

3> When a drb-ContinueROHC parameter (e.g., an indicator indicating to continuously use ROHC context or to use same ROHC context with respect to the source BS or the target BS) or an indicator indicating to recover data is not configured or is not indicated, or when a security key (e.g., a master Security key) is changed, is updated, is configured or indicated (e.g., as an indicator) or is received, the UE may establish a header compression protocol and apply, to the bearer, header compression protocol configuration provided with respect to the header compression protocol from the upper layer.

2> When the upper layer requests PDCP layer reconfiguration and requests a RLC layer to be released (e.g., a RLC layer connected with the source BS (when the UE successfully completes DAPS handover to the target BS) or a RLC layer connected with the target BS (when the UE fails in the DAPS handover to the target BS and falls back to the source BS), the RLC layer being connected with the bearer, the UE may perform a procedure below.

3> The UE may release the ciphering function related to the RLC layer released from the bearer.

3> The UE may release the integrity protection function related to the RLC layer released from the bearer.

3> When the drb-ContinueROHC parameter (e.g., the indicator indicating to continuously use ROHC context or to use same ROHC context with respect to the source BS or the target BS) or the indicator indicating to recover data is not configured or is not indicated, or when the security key (e.g., the master Security key) is changed, is updated, is configured or indicated (e.g., as an indicator) or is received, the UE may release the header compression protocol related to the RLC layer released from the bearer.

In First method or Second method for PDCP reconfiguration, the indicator indicating to continuously use ROHC context or the indicator indicating to use same ROHC context with respect to the source BS or the target BS, or the indicator indicating to recover data may be configured to be always included in configuration information of the bearer configured with the DAPS handover method in the handover command message (e.g., RRCReconfiguration message message), when the security key is not changed, is not configured, or is not updated in DAPS handover. > As another method, when the first condition proposed in disclosure is satisfied with respect to the bearer for which the DAPS handover method is configured in the handover command message, the PDCP layer of the UE may perform one of DL data switching methods below.

1> First method of DL data switching: when an upper layer indicates UL data switching because the first condition is satisfied with respect to the bearer for which DAPS handover is configured, a transmission PDCP layer may perform procedures below.

2> From a first PDCP SDU corresponding to PDCP data PDUs for which successful delivery is not acknowledged by a RLC layer connected with the source BS (or cell) with respect to AM DRBs, the transmission PDCP layer may perform transmission or retransmission of PDCP SDUs having PDCP SNs already allocated thereto before UL data is switched to the RLC layer connected with the source BS (or cell), in ascending order of COUNT values allocated to the PDCP SDUs.

3> The transmission PDCP layer performs a header compression procedure on the PDCP SDU by using or applying a header compression protocol (e.g., a header compression protocol for the target BS).

3> The transmission PDCP layer performs an integrity protection or ciphering procedure by using a COUNT value allocated to the PDCP SDU or applying a security key (e.g., a security key or algorithm for the target BS).

3> The transmission PDCP layer transfers the PDCP SDU having the procedure applied thereto to its lower layer.

2> The transmission PDCP layer may perform transmission of all PDCP SDUs in ascending order of COUNT values to the RLC layer connected with the target BS (or cell) for UM DRBs, wherein the PDCP SDUs are data-processed but are not transferred to its lower layer yet.

3> The transmission PDCP layer performs a header compression procedure on the PDCP SDU by using or applying a header compression protocol (e.g., a header compression protocol for the target BS).

3> The transmission PDCP layer performs an integrity protection or ciphering procedure by using a COUNT value allocated to the PDCP SDU or applying a security key (e.g., a security key or algorithm for the target BS).

3> The transmission PDCP layer transfers the PDCP SDU having the procedure applied thereto to its lower layer.

1> Second method of DL data switching: when an upper layer indicates UL data switching because the first condition is satisfied with respect to the bearer for which DAPS handover is configured, the transmission PDCP layer may perform procedures below.

2> When a drb-ContinueROHC parameter (e.g., an indicator indicating to continuously use ROHC context or to use same ROHC context with respect to the source BS or the target BS) or an indicator indicating to recover data is not configured or is not indicated, or when a security key (e.g., a master Security key) is changed, is updated, is configured or indicated (e.g., as an indicator) or is received, 3> From a first PDCP SDU corresponding to PDCP data PDUs for which successful delivery is not acknowledged by a RLC layer connected with the source BS (or cell) with respect to AM DRBs, the transmission PDCP layer may perform transmission or retransmission of PDCP SDUs having PDCP SNs already allocated thereto before UL data is switched to the RLC layer connected with the target BS (or cell), in ascending order of COUNT values allocated to the PDCP SDUs.

4> The transmission PDCP layer performs a header compression procedure on the PDCP SDU by using or applying a header compression protocol (e.g., a header compression protocol for the target BS).

4> The transmission PDCP layer performs an integrity protection or ciphering procedure by using a COUNT value allocated to the PDCP SDU or applying a security key (e.g., a security key or algorithm for the target BS).

4> The transmission PDCP layer transfers the PDCP SDU having the procedure applied thereto to its lower layer.

2> Otherwise (e.g., when a drb-ContinueROHC parameter (e.g., an indicator indicating to continuously use ROHC context or to use same ROHC context with respect to the source BS or the target BS) or an indicator indicating data recovery is configured or indicated, or when a security key (e.g., a master Security key) is not changed, is not updated, is not configured or is not indicated, or an indicator indicating that the security key is not changed is configured or received), 3> The transmission PDCP layer may trigger or perform a PDCP data recovery procedure on the AM DRBs.

3> For example, the transmission PDCP layer performs, in ascending order of allocated COUNT values, retransmission of all PDCP data PDUs that are from among PDCP data PDUs previously transmitted to a re-established AM RLC layer, a released AM RLC layer, or an AM RLC layer connected with the source BS (or cell) and for which successful delivery is not acknowledged by its lower layer (e.g., the AM RLC layer). By using the aforementioned method, it is possible to prevent a security issue, such as transmission of different data with a same security key, and because retransmission is selectively performed, unnecessary retransmission may be prevented. As another method, the transmission PDCP layer performs, in ascending order of allocated COUNT values, retransmission of all PDCP data PDUs starting from a first PDCP data PDU, which are from among PDCP data PDUs previously transmitted to the re-established or released AM RLC layer or the AM RLC layer connected with the source BS (or cell) and for which successful delivery is not acknowledged by its lower layer (e.g., the AM RLC layer). By using the aforementioned method, it is possible to prevent a security issue, such as transmission of different data with a same security key, and implementation of a BS may be simplified due to accumulated retransmission.

2> The transmission PDCP layer may perform transmission of all PDCP SDUs in ascending order of COUNT values to the RLC layer connected with the target BS (or cell) for UM DRBs, wherein the PDCP SDUs are data-processed but are not transferred to its lower layer yet.

3> The transmission PDCP layer performs a header compression procedure on the PDCP SDU by using or applying a header compression protocol (e.g., a header compression protocol for the target BS).

3> The transmission PDCP layer performs an integrity protection or ciphering procedure by using a COUNT value allocated to the PDCP SDU or applying a security key (e.g., a security key or algorithm for the target BS).

3> The transmission PDCP layer transfers the PDCP SDU having the procedure applied thereto to its lower layer.

2> In addition, in a case where the DAPS handover method is configured in the bearer connected with the transmission PDCP layer and the transmission PDCP layer performs the UL data switching in response to the first condition being satisfied, when the transmission PDCP layer indicates, to a MAC layer connected with the target BS (or cell), a volume of PDCP data to be retransmitted or transmitted, the transmission PDCP layer may indicate, to the MAC layer, the volume of PDCP data which excludes PDCP control data (e.g., a PDCP control PDU with respect to interspersed ROHC feedback) corresponding to the source BS (or cell).

2> When the indicator indicating to continuously use ROHC context or to use same ROHC context with respect to the source BS or the target BS (e.g., the drb-ContinueROHC parameter) or the indicator indicating to recover data is configured, when the security key is not changed, is not configured, or is not updated, or when the indicator indicating that the security key is not changed is configured, the transmission PDCP layer may use or apply one common header compression protocol (e.g., ROHC protocol) to the source BS and the target BS. As another method, the transmission PDCP layer may copy and apply the header compression or decompression protocol context for the source BS to the header compression or decompression protocol context for the target BS, or may changelessly apply context, such as context for the source BS to context for the target BS. As another method, the transmission PDCP layer may apply same header compression or decompression protocol context to the target BS or the source BS. As another method, the transmission PDCP layer may operate one header compression or decompression protocol for the target BS or the source BS, and may apply same header compression or decompression protocol context. For example, when the indicator indicating to continuously use ROHC context or to use same ROHC context with respect to the source BS or the target BS (e.g., the drb-ContinueROHC parameter) or the indicator indicating to recover data is not configured, when the security key is changed, is configured, or is updated, or when an indicator indicating that the security key is changed is configured, the transmission PDCP layer may apply or use a first header compression protocol (e.g., ROHC protocol) to the source BS and may apply or use a second header compression protocol (e.g., ROHC protocol) to the target BS.

1> Third method of DL data switching: when an upper layer indicates UL data switching because the first condition is satisfied with respect to the bearer for which DAPS handover is configured, the transmission PDCP layer may perform procedures below.

2> When a drb-ContinueROHC parameter (e.g., an indicator indicating to continuously use ROHC context or to use same ROHC context with respect to the source BS or the target BS) or an indicator indicating to recover data is not configured or is not indicated, or when a security key (e.g., a master Security key) is changed, is updated, is configured or indicated (e.g., as an indicator) or is received, 3> From a first PDCP SDU corresponding to PDCP data PDUs for which successful delivery is not acknowledged by a RLC layer connected with the source BS (or cell) with respect to AM DRBs, the transmission PDCP layer may perform transmission or retransmission of PDCP SDUs having PDCP SNs already allocated thereto before UL data is switched to the RLC layer connected with the target BS (or cell), in ascending order of COUNT values allocated to the PDCP SDUs.

4> The transmission PDCP layer performs a header compression procedure on the PDCP SDU by using or applying a header compression protocol (e.g., a header compression protocol for the target BS).

4> The transmission PDCP layer performs an integrity protection or ciphering procedure by using a COUNT value allocated to the PDCP SDU or applying a security key (e.g., a security key or algorithm for the target BS).

4> The transmission PDCP layer transfers the PDCP SDU having the procedure applied thereto to its lower layer.

2> Otherwise (e.g., when a drb-ContinueROHC parameter (e.g., an indicator indicating to continuously use ROHC context or to use same ROHC context with respect to the source BS or the target BS) or an indicator indicating data recovery is configured or indicated, or when a security key (e.g., a master Security key) is not changed, is not updated, is not configured or is not indicated, or an indicator indicating that the security key is not changed is configured or received), 3> With respect to AM DRBs, from among PDCP data PDUs previously transmitted to a re-established AM RLC layer, a released AM RLC layer, or an AM RLC layer connected with the source BS (or the cell), the transmission PDCP layer may perform retransmission on PDCP data PDUs for which successful delivery is not acknowledged by its lower layer (e.g., the AM RLC layer), in ascending order of allocated COUNT values. By using the aforementioned method, it is possible to prevent a security issue, such as transmission of different data with a same security key, and because retransmission is selectively performed, unnecessary retransmission may be prevented. As another method, the transmission PDCP layer performs, in ascending order of allocated COUNT values, retransmission of all PDCP data PDUs starting from a first PDCP data PDU, which are from among PDCP data PDUs previously transmitted to the re-established or released AM RLC layer or the AM RLC layer connected with the source BS (or cell) and for which successful delivery is not acknowledged by its lower layer (e.g., the AM RLC layer). By using the aforementioned method, it is possible to prevent a security issue, such as transmission of different data with a same security key, and implementation of a BS may be simplified due to accumulated retransmission.

2> The transmission PDCP layer may perform transmission of all PDCP SDUs in ascending order of COUNT values to the RLC layer connected with the target BS (or cell) for UM DRBs, wherein the PDCP SDUs are data-processed but are not transferred to its lower layer yet.

3> The transmission PDCP layer performs a header compression procedure on the PDCP SDU by using or applying a header compression protocol (e.g., a header compression protocol for the target BS).

3> The transmission PDCP layer performs an integrity protection or ciphering procedure by using a COUNT value allocated to the PDCP SDU or applying a security key (e.g., a security key or algorithm for the target BS).

3> The transmission PDCP layer transfers the PDCP SDU having the procedure applied thereto to its lower layer.

2> In addition, in a case where the DAPS handover method is configured in the bearer connected with the transmission PDCP layer and the transmission PDCP layer performs the UL data switching in response to the first condition being satisfied, when the transmission PDCP layer indicates, to a MAC layer connected with the target BS (or cell), a volume of PDCP data to be retransmitted or transmitted, the transmission PDCP layer may indicate, to the MAC layer, the volume of PDCP data which excludes PDCP control data (e.g., a PDCP control PDU with respect to interspersed ROHC feedback) corresponding to the source BS (or cell).

2> When the indicator indicating to continuously use ROHC context or to use same ROHC context with respect to the source BS or the target BS (e.g., the drb-ContinueROHC parameter) or the indicator indicating to recover data is configured, when the security key is not changed, is not configured, or is not updated, or when the indicator indicating that the security key is not changed is configured, the transmission PDCP layer may use or apply one common header compression protocol (e.g., ROHC protocol) to the source BS and the target BS. As another method, the transmission PDCP layer may copy and apply the header compression or decompression protocol context for the source BS to the header compression or decompression protocol context for the target BS, or may changelessly apply context, such as context for the source BS to context for the target BS. As another method, the transmission PDCP layer may apply same header compression or decompression protocol context to the target BS or the source BS. As another method, the transmission PDCP layer may operate one header compression or decompression protocol for the target BS or the source BS, and may apply same header compression or decompression protocol context. For example, when the indicator indicating to continuously use ROHC context or to use same ROHC context with respect to the source BS or the target BS (e.g., the drb-ContinueROHC parameter) or the indicator indicating to recover data is not configured, when the security key is changed, is configured, or is updated, or when an indicator indicating that the security key is changed is configured, the transmission PDCP layer may apply or use a first header compression protocol (e.g., ROHC protocol) to the source BS and may apply or use a second header compression protocol (e.g., ROHC protocol) to the target BS.

As another method, in order to address a security issue of transmitting different data by using a same security key, the security issue possibly occurring when the DAPS handover method uses the same security key in the source BS (cell) and the target BS (cell) (e g, handover in a BS, handover in a central unit (CU), or handover between distributed units (DUs)), when a network or a BS indicates a DAPS handover method, the network or the BS may add, to an indication message, security configuration information indicating to always change or update a security key, or when the network or the BS indicates a DAPS handover method, the network or the BS may transmit a handover command message (e.g., RRCReconfiguration message) including security configuration information as a default.

When the source BS indicates, to the UE, handover to which embodiments proposed in the disclosure are applied, the source BS may start data forwarding to the target BS when a third condition below is satisfied. The third condition may mean that one or more conditions below are satisfied. When the source BS receives, from the target BS, an indication indicating that the UE successfully completed handover transmits a handover command message to the UE transmits a handover command message to the UE and identifies successful delivery (HARQ ACK or NACK or RLC ACK or NACK) of the handover command message receives, from the UE, an indication (e.g., an RRC message (e.g., an RRCReconfiguration message)) indicating that a link to the source BS is to be released, or receives a MAC CE, an RLC control PDU, or PDCP control PDU from the UE transmits the handover command message to the UE and starts a certain timer, and then the timer is expired does not receive acknowledgement (HARQ ACK or NACK or RLC ACK or NACK) with respect to successful delivery of DL data from the UE for a certain time Hereinafter, operations of the PDCP layer which particularly performs technologies proposed above in the disclosure will now be proposed.

According to an embodiment of the disclosure, when the PDCP layer of the UE performs the DAPS handover method proposed in the disclosure, the PDCP layer may process data according to a procedure below and may transfer the data to its lower layer or may indicate a volume of the data to its lower layer.

When the transmission PDCP layer is connected to a plurality of RLC layers (or two RLC layers), and indicates a volume of PDCP data to a MAC layer for the source BS or the target BS so as to trigger a buffer status report or to calculate a volume of a buffer, the transmission PDCP layer may perform a procedure below.
- 1> When a PDCP duplication function (a packet duplication technology or PDCP packet duplication) is enabled,
- 2> the transmission PDCP layer may indicate a volume of PDCP data (PDCP data PDU or PDCP control PDU) to a MAC layer connected to a first RLC layer.
- 2> the transmission PDCP layer may indicate a volume of PDCP data (PDCP data PDU) excluding a volume of PDCP control data (PDCP control PDU) to a MAC layer connected to a second RLC layer.

Otherwise (i.e., when the PDCP duplication function (the packet duplication technology or the PDCP packet duplication) is not enabled),
- 2> When a volume of entire data including a volume of PDCP data and a volume of RLC data standing by for initial transmission from RLC layers connected to the PDCP layer is equal to or greater than a threshold value for UL data transmission (the threshold value may be configured based on an RRC message received from a BS as in FIG. 1R), and (or)
- 2> and (or), when the transmission PDCP layer is not connected to the bearer for which the DAPS handover method is configured (or the DAPS handover method is not configured), and (or)
- 2> and (or), when the RLC layers (or the two RLC layers) connected to the transmission PDCP layer respectively belong to different cell groups (or BSs),
- 3> the transmission PDCP layer may indicate the volume of PDCP data to the MAC layer connected to the first RLC layer and the MAC layer connected to the second RLC layer.
- 2> Otherwise, when the transmission PDCP layer is connected to the bearer for which the DAPS handover method is configured (or the DAPS handover method is configured),
- 3> if the transmission PDCP layer did not receive, from its upper layer or its lower layer, an indicator indicating that the first condition is satisfied or an indicator indicating to switch UL data transmission,
- 4> the transmission PDCP layer may indicate the volume of PDCP data to the MAC layer for the source BS or the target BS.
- 3> Otherwise (i.e., if the transmission PDCP layer received, from its upper layer or its lower layer, the indicator indicating that the first condition is satisfied or the indicator indicating to switch UL data transmission),
- 4> the transmission PDCP layer may indicate, to the target BS or the MAC layer for the target BS, a volume of PDCP data which excludes PDCP control data (ROHC feedback (interspersed ROHC feedback) or a PDCP status report) or a volume of the PDCP control data for the source BS or related to the source BS.
- 2> Otherwise (i.e., when the volume of entire data including the volume of PDCP data and the volume of RLC data standing by for initial transmission from the RLC layers connected to the PDCP layer is smaller than the threshold value for UL data transmission, when the transmission PDCP layer is not connected to the bearer for which the DAPS handover method is configured (or the DAPS handover method is configured), or when the RLC layers (or the two RLC layers) connected to the transmission PDCP layer do not respectively belong to different cell groups (or BSs),
- 3> the transmission PDCP layer may indicate the volume of PDCP data (PDCP PDU, PDCP data PDU, or PDCP control PDU) to the MAC layer connected to the first RLC layer.
- 3> The transmission PDCP layer may indicate, to the MAC layer connected to the second RLC layer, that the volume of PDCP data (PDCP PDU, PDCP data PDU, or PDCP control PDU) is 0.

Figure 1X:
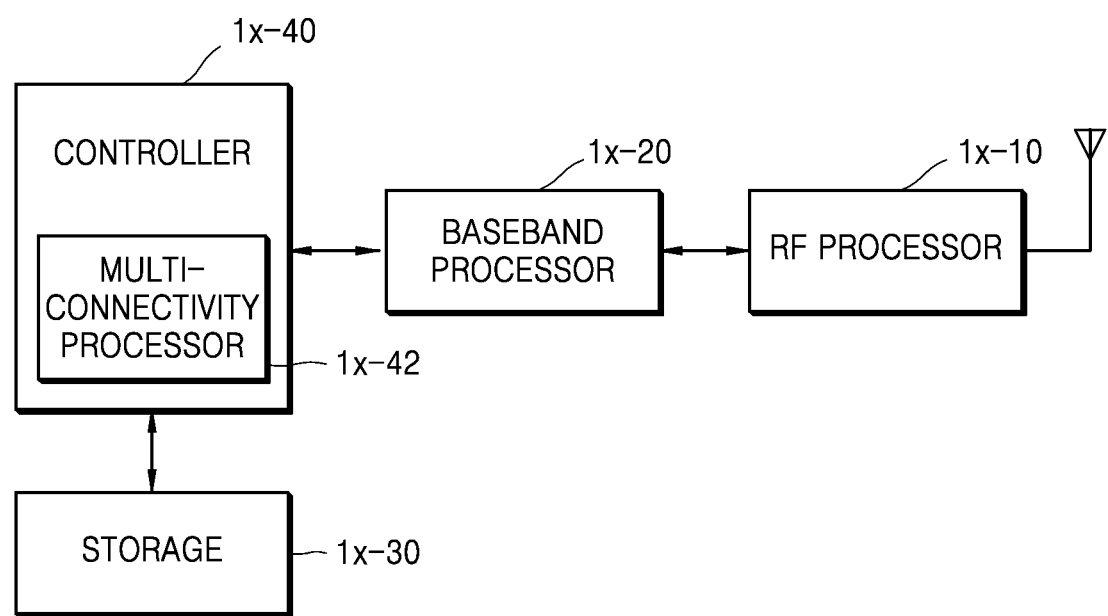
FIG. 1X is a diagram illustrating a configuration of a UE according to an embodiment of the disclosure.

FIG. 1X is a diagram illustrating a configuration of a UE according to an embodiment of the disclosure.

Referring to FIG. 1X, the UE may include a radio frequency (RF) processor 1x-10, a baseband processor 1x-20, a storage 1x-30, and a controller 1x-40 including a multi-connectivity processor 1x-42. However, the configuration of the UE is not limited to that shown in FIG. 1X.

The RF processor 1x-10 performs functions for transmitting and receiving signals through wireless channels, e.g., band conversion and amplification of the signals. For example, the RF processor 1x-10 up-converts a baseband signal provided from the baseband processor 1x-20, into an RF band signal and then transmits the RF band signal through an antenna, and down-converts an RF band signal received through the antenna, into a baseband signal. For example, the RF processor 1x-10 may include a transmit filter, a receive filter, an amplifier, a mixer, an oscillator, a digital-to-analog convertor (DAC), an analog-to-digital convertor (ADC), or the like. Although only one antenna is illustrated in FIG. 1X, the UE may include a plurality of antennas. The RF processor 1x-10 may include a plurality of RF chains. In addition, the RF processor 1x-10 may perform beamforming. For beamforming, the RF processor 1x-10 may adjust phases and intensities of respective signals that are transmitted or received through a plurality of antennas or antenna elements. The RF processor 1x-10 may perform a MIMO operation and may receive a plurality of layers in the MIMO operation. The RF processor 1x-10 may perform receive beam sweeping by appropriately configuring a plurality of antennas or antenna elements, or may adjust a direction and a beam width of a received beam to coordinate with a transmit beam, by the control of the controller 1x-40.

The baseband processor 1x-20 performs conversion between a baseband signal and a bitstream based on physical layer specifications of a system. For example, for data transmission, the baseband processor 1x-20 generates complex symbols by encoding and modulating a transmit bitstream. For data reception, the baseband processor 1l-20 reconstructs a received bitstream by demodulating and decoding a baseband signal provided from the RF processor 1x-10. For example, according to an OFDM scheme, for data transmission, the baseband processor 1x-20 generates complex symbols by encoding and modulating a transmit bitstream, maps the complex symbols to subcarriers, and then configures OFDM symbols by performing inverse fast Fourier transformation (IFFT) and inserting a cyclic prefix (CP). For data reception, the baseband processor 1x-20 segments a baseband signal provided from the RF processor 1x-10, into OFDM symbol units, reconstructs signals mapped to subcarriers by performing fast Fourier transformation (FFT)

calculation, and then reconstructs a received bitstream by demodulating and decoding the signals.

The baseband processor 1x-20 and the RF processor 1x-10 transmit and receive signals in a manner described above. Accordingly, the baseband processor 1x-20 and the RF processor 1x-10 may also be called a transmitter, a receiver, a transceiver, or a communicator. At least one of the baseband processor 1x-20 or the RF processor 1x-10 may include a plurality of communication modules to support a plurality of different radio access technologies. At least one of the baseband processor 1x-20 or the RF processor 1x-10 may include different communication modules to process signals of different frequency bands. For example, the different radio access technologies may include an LTE network, a NR network, or the like. The different frequency bands may include a super-high frequency (SHF) (e.g., 2.5 GHz or 5 GHz) band and a millimeter wave (mmWave) (e.g., 60 GHz) band.

The storage 1x-30 may store basic programs, application programs, and data, e.g., configuration information, for operations of the UE. The storage 1x-30 may provide the stored data upon request by the controller 1x-40.

The controller 1x-40 controls overall operations of the UE. For example, the controller 1x-40 may control elements of the UE, such that configuration information may be applied to each bearer in the DAPS handover method according to an embodiment of the disclosure. In addition, for example, the controller 1x-40 transmits and receives signals through the baseband processor 1x-20 and the RF processor 1x-10. In addition, the controller 1x-40 records or reads data on or from the storage 1x-30. To this end, the controller 1x-40 may include at least one processor. For example, the controller 1x-40 may include a communication processor (CP) for controlling communications and an application processor (AP) for controlling an upper layer, such as an application program.

Figure 1Y:
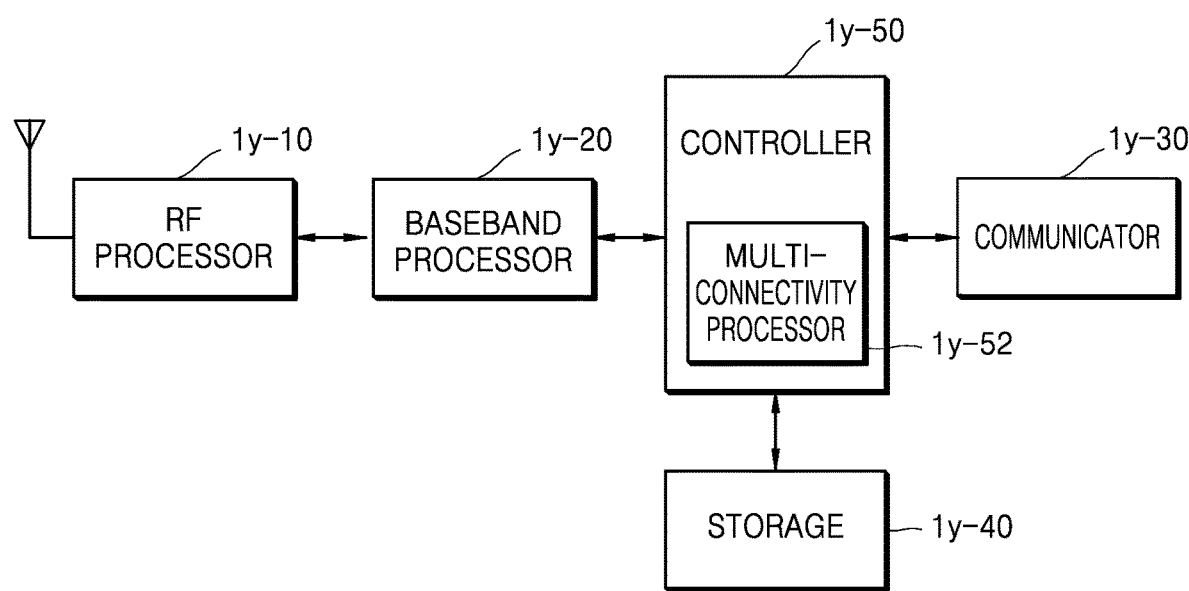
FIG. 1Y is a diagram illustrating a configuration of a transmission and reception point (TRP/Tx/Rx point) in a wireless communication system according to an embodiment of the disclosure.

FIG. 1Y is a diagram illustrating a configuration of a transmission and reception point (TRP) in a wireless communication system according to an embodiment of the disclosure.

Referring to FIG. 1Y, the BS may include an RF processor 1y-10, a baseband processor 1y-20, a communicator 1y-30 (also referred to as the backhaul communicator 1y-30), a storage 1y-40, and a controller 1y-50 including a multi-connectivity processor 1y-52. However, the configuration of the BS is not limited to that shown in FIG. 1Y.

The RF processor 1y-10 performs functions for transmitting and receiving signals through wireless channels, e.g., band conversion and amplification of the signals. For example, the RF processor 1y-10 up-converts a baseband signal provided from the baseband processor 1y-20, into an RF band signal and then transmits the RF band signal through an antenna, and down-converts an RF band signal received through the antenna, into a baseband signal. For example, the RF processor 1y-10 may include a transmit filter, a receive filter, an amplifier, a mixer, an oscillator, a DAC, an ADC, or the like. Although only one antenna is illustrated in FIG. 1M, the first access node (e.g., the BS) may include a plurality of antennas. The RF processor 1y-10 may include a plurality of RF chains. In addition, the RF processor 1y-10 may perform beamforming. For beamforming, the RF processor 1y-10 may adjust phases and intensities of respective signals that are transmitted or received through a plurality of antennas or antenna elements. The RF processor 1y-10 may perform a DL MIMO operation by transmitting one or more layers.

The baseband processor 1y-20 performs conversion between a baseband signal and a bitstream based on physical layer specifications of a first radio access technology. For example, for data transmission, the baseband processor 1y-20 may generate complex symbols by encoding and modulating a transmit bitstream. For data reception, the baseband processor 1y-20 reconstructs a received bitstream by demodulating and decoding a baseband signal provided from the RF processor 1y-10. For example, according to an OFDM scheme, for data transmission, the baseband processor 1y-20 generates complex symbols by encoding and modulating a transmit bitstream, maps the complex symbols to subcarriers, and then configures OFDM symbols by performing IFFT and inserting a CP. For data reception, the baseband processor 1y-20 segments a baseband signal provided from the RF processor 1y-10, into OFDM symbol units, reconstructs signals mapped to subcarriers by performing FFT calculation, and then reconstructs a received bitstream by demodulating and decoding the signals. The baseband processor 1y-20 and the RF processor 1y-10 transmit and receive signals as described above. As such, the baseband processor 1y-20 and the RF processor 1y-10 may also be called a transmitter, a receiver, a transceiver, a communicator, or a wireless communicator.

The communicator 1y-30 provides an interface for communicating with other nodes in a network.

The storage 1y-30 may store basic programs, application programs, and data, e.g., configuration information, for operations of the BS that is a main BS. In particular, the storage 1y-40 may store, for example, information about bearers assigned for a connected UE and measurement results reported from the connected UE. The storage 1y-40 may store criteria information used to determine whether to provide or release multiconnection to or from the UE. The storage 1y-40 provides the stored data upon request by the controller 1y-50.

The controller 1y-50 controls overall operations of the main BS. For example, the controller 1y-50 may control elements of the TRP, such that configuration information may be applied to each bearer in the DAPS handover method according to an embodiment of the disclosure. In addition, for example, the controller 1y-50 transmits and receives signals through the baseband processor 1y-20 and the RF processor 1y-10 or the backhaul communicator 1y-30. The controller 1y-50 records or reads data on or from the storage 1y-40. To this end, the controller 1y-50 may include at least one processor.

The methods according to the embodiments of the disclosure as described in the detailed description or in the following claims may be implemented as hardware, software, or a combination of hardware and software.

When implemented as software, a computer-readable storage medium or a computer program product, which stores one or more programs (e.g., software modules), may be provided. The one or more programs that are stored in the computer-readable storage medium or the computer program product are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read-only memory (ROM), electrically erasable programmable read only memory (EEPROM), a magnetic disc storage device, a compact disc-ROM (CD-ROM), digital versatile discs (DVDs), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks, such as the Internet, an intranet, a local area network (LAN), a wide LAN (WLAN), and a storage area network (SAN). Such a storage device may access, via an external port, the electronic device for performing embodiments of the disclosure. Furthermore, an additional storage device on the communication network may access the electronic device for performing embodiments of the disclosure.

In the disclosure, the terms "computer program product" or "computer-readable recording medium" are used to totally indicate a memory, a hard disc mounted in a hard disk drive, and a medium, such as a signal. The "computer program product" or the "computer-readable recording medium" is a means to be provided to the method of applying configuration information to each bearer in the DAPS handover method in a wireless communication information according to the disclosure.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

It should be understood that the embodiments of the disclosure in the specification and drawings should be considered in a descriptive sense only and not for purposes of limitation. For example, it will be understood by one of ordinary skill in the art that various changes in form and details may be made based on the technical concept of the disclosure. In addition, the embodiments of the disclosure may be combined to be implemented, when required. For example, the BS and the UE may operate in a manner that portions of an embodiment of the disclosure are combined with portions of another embodiment of the disclosure. The embodiments of the disclosure may also be applied to other communication systems, and various modifications based on the technical concept of the embodiments of the disclosure may be made. For example, the embodiments of the disclosure may be applied to the LTE system, the 5G or NR system, a 6th generation (6G) system, or the like, The disclosure provides an apparatus and a method capable of effectively providing a service in a mobile communication system.

While the disclosure has been shown and described with reference to various embodiment thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
receiving, from a source base station, a control message for a handover, the control message including information indicating that a data radio bearer (DRB) is configured for a dual active protocol stack (DAPS) handover; and
in case that an uplink data switching is requested from an upper layer, indicating, by a packet data convergence protocol (PDCP) entity for the DRB, a PDCP data volume excluding a PDCP Control protocol data unit (PDU) associated with the source base station, to a medium access control (MAC) entity for a target base station and indicating, by the PDCP entity for the DRB, a PDCP data volume of the PDCP Control PDU associated with the source base station, to a MAC entity for the source base station.

2. The method of claim 1, wherein the PDCP Control PDU associated with the source base station includes an interspersed robust header compression (ROHC) feedback associated with the source base station.

3. The method of claim 1, further comprising:
in case that the uplink data switching is not requested from the upper layer, indicating, by the PDCP entity for the DRB, a PDCP data volume, to the MAC entity for the source base station.

4. The method of claim 1, wherein a PDCP duplication is deactivated for the DRB.

5. The method of claim 1, further comprising:
triggering, by the MAC entity for the target base station, a buffer status reporting (BSR) based on the PDCP data volume excluding the PDCP Control PDU associated with the source base station.

6. The method of claim 1, further comprising:
triggering, by the MAC entity for the source base station, a buffer status reporting (BSR) based on the PDCP data volume of the PDCP Control PDU associated with the source base station.

7. The method of claim 1, wherein the uplink data switching is requested from the upper layer when a random access procedure is successfully performed on the target base station.

8. A terminal in a wireless communication system, the terminal comprising:
a transceiver; and
at least one processor configured to:
receive via the transceiver, from a source base station, a control message for a handover, the control message including information indicating that a data radio bearer (DRB) is configured for a dual active protocol stack (DAPS) handover, and
in case that an uplink data switching is requested from an upper layer, indicate, by a packet data convergence protocol (PDCP) entity for the DRB, a PDCP data volume excluding a PDCP Control protocol data unit (PDU) associated with the source base station, to a medium access control (MAC) entity for a target base station and indicate, by the PDCP entity for the DRB, a PDCP data volume of the PDCP Control PDU associated with the source base station, to a MAC entity for the source base station.

9. The terminal of claim 8, wherein the PDCP Control PDU associated with the source base station includes an interspersed robust header compression (ROHC) feedback associated with the source base station.

10. The terminal of claim 8, wherein the processor is further configured to:
in case that the uplink data switching is not requested from the upper layer, indicate, by the PDCP entity for the DRB, a PDCP data volume, to the MAC entity for the source base station.

11. The terminal of claim 8, wherein a PDCP duplication is deactivated for the DRB.

12. The terminal of claim 8, wherein the processor is further configured to:
- trigger, by the MAC entity for the target base station, a buffer status reporting (BSR) based on the PDCP data volume excluding the PDCP Control PDU associated with the source base station.

13. The terminal of claim 8, wherein the processor is further configured to:
- trigger, by the MAC entity for the source base station, a buffer status reporting (BSR) based on the PDCP data volume of the PDCP Control PDU associated with the source base station.

14. The terminal of claim 8, wherein the uplink data switching is requested from the upper layer when a random access procedure is successfully performed on the target base station.

\* \* \* \* \*